(12) United States Patent
Lin et al.

(10) Patent No.: US 12,506,953 B2
(45) Date of Patent: Dec. 23, 2025

(54) DEVICE, METHODS, AND GRAPHICAL USER INTERFACES FOR CAPTURING AND DISPLAYING MEDIA

(71) Applicant: Apple Inc., Cupertino, CA (US)

(72) Inventors: Chia Yang Lin, San Francisco, CA (US); Johnnie B. Manzari, San Francisco, CA (US); Ivan Markovic, Mill Valley, CA (US); William A. Sorrentino, III, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 17/992,789

(22) Filed: Nov. 22, 2022

(65) Prior Publication Data

US 2023/0336865 A1 Oct. 19, 2023

Related U.S. Application Data

(60) Provisional application No. 63/409,690, filed on Sep. 23, 2022, provisional application No. 63/338,864, filed on May 5, 2022, provisional application No. 63/285,897, filed on Dec. 3, 2021.

(51) Int. Cl.
*H04N 23/63* (2023.01)
*H04N 23/60* (2023.01)

(52) U.S. Cl.
CPC ......... *H04N 23/635* (2023.01); *H04N 23/632* (2023.01); *H04N 23/64* (2023.01)

(58) Field of Classification Search
CPC ...... H04N 23/632; H04N 23/63; H04N 23/64; H04N 23/635; H04N 5/91; G06F 3/0484; G06F 3/048; G06F 3/0488; G06F 3/04845; G06F 3/04842; G06F 3/04815; G06F 2203/04806
See application file for complete search history.

(56) References Cited

U.S. PATENT DOCUMENTS

| | | | |
|---|---|---|---|
| 4,518,237 A | 5/1985 | Mizokami | |
| 4,933,702 A | 6/1990 | Komatsuzaki et al. | |
| 5,463,443 A | 10/1995 | Tanaka et al. | |
| 5,557,358 A | 9/1996 | Mukai et al. | |
| 5,615,384 A | 3/1997 | Allard et al. | |
| 5,825,353 A | 10/1998 | Will | |
| 6,262,769 B1 | 7/2001 | Anderson et al. | |
| 6,268,864 B1 | 7/2001 | Chen et al. | |
| 6,278,466 B1 | 8/2001 | Chen | |

(Continued)

FOREIGN PATENT DOCUMENTS

| | | | |
|---|---|---|---|
| CA | 2729392 A1 | 8/2011 | |
| CA | 2965700 A1 | 5/2016 | |

(Continued)

OTHER PUBLICATIONS

Non-Final Office Action received for U.S. Appl. No. 17/846,962, mailed on May 9, 2024, 19 pages.

(Continued)

*Primary Examiner* — Xi Wang
(74) *Attorney, Agent, or Firm* — YHE Law LLP

(57) ABSTRACT

The present disclosure generally relates to techniques and user interfaces for capturing media, displaying a preview of media, displaying a recording indicator, displaying a camera user interface, and/or displaying previously captured media.

42 Claims, 34 Drawing Sheets

(56) References Cited

U.S. PATENT DOCUMENTS

| | | |
|---|---|---|
| 6,359,837 B1 | 3/2002 | Tsukamoto |
| 6,429,896 B1 | 8/2002 | Aruga et al. |
| 6,522,347 B1 | 2/2003 | Sakai et al. |
| 6,677,981 B1 | 1/2004 | Mancuso et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,900,840 B1 | 5/2005 | Schinner et al. |
| 7,417,680 B2 | 8/2008 | Aoki et al. |
| 7,463,304 B2 | 12/2008 | Murray |
| 7,515,178 B1 | 4/2009 | Fleischman et al. |
| 7,583,892 B2 | 9/2009 | Okumura |
| 8,073,207 B2 | 12/2011 | Ayaki et al. |
| 8,185,839 B2 | 5/2012 | Jalon et al. |
| 8,189,087 B2 | 5/2012 | Misawa et al. |
| 8,493,408 B2 | 7/2013 | Williamson et al. |
| 8,576,304 B2 | 11/2013 | Ishibashi |
| 8,624,836 B1 | 1/2014 | Miller et al. |
| 8,638,371 B2 | 1/2014 | Laberge et al. |
| 8,659,555 B2 | 2/2014 | Pihlaja |
| 8,675,084 B2 | 3/2014 | Bolton et al. |
| 8,723,988 B2 | 5/2014 | Thorn |
| 8,736,704 B2 | 5/2014 | Jasinski et al. |
| 8,736,716 B2 | 5/2014 | Prentice |
| 8,742,890 B2 | 6/2014 | Gocho et al. |
| 8,762,895 B2 | 6/2014 | Mehta et al. |
| 8,848,097 B2 | 9/2014 | Makii |
| 8,885,978 B2 | 11/2014 | Cote et al. |
| 8,941,749 B2 | 1/2015 | Yahata |
| 9,001,226 B1 | 4/2015 | Ng et al. |
| 9,024,938 B2 | 5/2015 | Joshi |
| 9,077,896 B2 | 7/2015 | Park et al. |
| 9,143,692 B2 | 9/2015 | Hayashi |
| 9,158,974 B1 | 10/2015 | Laska et al. |
| 9,172,866 B2 | 10/2015 | Ito et al. |
| 9,223,486 B2 | 12/2015 | Shin et al. |
| 9,230,306 B2 | 1/2016 | Sun et al. |
| 9,250,797 B2 | 2/2016 | Roberts et al. |
| 9,264,660 B1 | 2/2016 | Petterson et al. |
| 9,288,476 B2 | 3/2016 | Sandrew et al. |
| 9,313,397 B2 | 4/2016 | Harris et al. |
| 9,313,401 B2 | 4/2016 | Frey et al. |
| 9,342,230 B2 | 5/2016 | Bastien et al. |
| 9,360,671 B1 | 6/2016 | Zhou |
| 9,423,868 B2 | 8/2016 | Iwasaki |
| 9,451,144 B2 | 9/2016 | Dye |
| 9,467,812 B2 | 10/2016 | Jung et al. |
| 9,507,420 B2 | 11/2016 | Tartz et al. |
| 9,538,069 B2 | 1/2017 | Nagao |
| 9,544,563 B1 | 1/2017 | Cheng et al. |
| 9,600,178 B2 | 3/2017 | Yun et al. |
| 9,609,221 B2 | 3/2017 | Kim et al. |
| 9,667,881 B2 | 5/2017 | Harris et al. |
| 9,716,825 B1 | 7/2017 | Manzari et al. |
| 9,767,613 B1 | 9/2017 | Bedikian et al. |
| 9,874,933 B1 | 1/2018 | Carryer |
| 9,942,463 B2 | 4/2018 | Kuo et al. |
| 9,973,674 B2 | 5/2018 | Dye et al. |
| 10,015,298 B2 | 7/2018 | Yang et al. |
| 10,021,294 B2 | 7/2018 | Kwon et al. |
| 10,055,887 B1 | 8/2018 | Gil et al. |
| 10,127,639 B2 | 11/2018 | Miura et al. |
| 10,152,222 B2 | 12/2018 | Ozawa et al. |
| 10,176,622 B1 | 1/2019 | Waggoner et al. |
| 10,187,587 B2 | 1/2019 | Hasinoff et al. |
| 10,225,463 B2 | 3/2019 | Yun et al. |
| 10,230,901 B2 | 3/2019 | Harris et al. |
| 10,270,983 B1 | 4/2019 | Van Os et al. |
| 10,297,034 B2 | 5/2019 | Nash et al. |
| 10,304,231 B2 | 5/2019 | Saito |
| 10,313,652 B1 | 6/2019 | Falstrup et al. |
| 10,325,417 B1 | 6/2019 | Scapel et al. |
| 10,326,942 B2 | 6/2019 | Shabtay et al. |
| 10,345,592 B2 | 7/2019 | Samec et al. |
| 10,397,469 B1 | 8/2019 | Yan et al. |
| 10,397,500 B1 | 8/2019 | Xu et al. |
| 10,447,908 B2 | 10/2019 | Lee et al. |
| 10,467,729 B1 | 11/2019 | Perera et al. |
| 10,467,775 B1 | 11/2019 | Waggoner et al. |
| 10,474,194 B1 | 11/2019 | Ell et al. |
| 10,523,879 B2 | 12/2019 | Dye et al. |
| 10,574,895 B2 | 2/2020 | Lee et al. |
| 10,585,551 B2 | 3/2020 | Lee et al. |
| 10,614,139 B2 | 4/2020 | Fujioka et al. |
| 10,645,294 B1 | 5/2020 | Manzari et al. |
| 10,652,470 B1 | 5/2020 | Manzari et al. |
| 10,674,072 B1 | 6/2020 | Manzari et al. |
| 10,681,282 B1 | 6/2020 | Manzari et al. |
| 10,681,341 B2 | 6/2020 | Lutter et al. |
| 10,735,642 B1 | 8/2020 | Manzari et al. |
| 10,735,643 B1 | 8/2020 | Manzari et al. |
| 10,791,273 B1 | 9/2020 | Manzari et al. |
| 10,958,850 B2 | 3/2021 | Kwak et al. |
| 10,962,935 B1 | 3/2021 | Ely et al. |
| 11,032,535 B2 | 6/2021 | Lutter et al. |
| 11,032,536 B2 | 6/2021 | Lutter et al. |
| 11,039,074 B1 | 6/2021 | Manzari et al. |
| 11,054,973 B1 | 7/2021 | Manzari et al. |
| 11,070,717 B2 | 7/2021 | Cragg et al. |
| 11,099,650 B1 * | 8/2021 | Haynold ................ G06F 3/016 |
| 11,140,313 B1 | 10/2021 | Knott |
| 11,209,957 B2 | 12/2021 | Dryer et al. |
| 11,212,449 B1 | 12/2021 | Manzari et al. |
| 11,321,857 B2 | 5/2022 | Stauber et al. |
| 11,350,026 B1 | 5/2022 | Manzari et al. |
| 11,399,155 B2 | 7/2022 | Van Os et al. |
| 11,431,891 B2 | 8/2022 | O'Leary et al. |
| 11,468,625 B2 | 10/2022 | Manzari et al. |
| 11,490,017 B2 | 11/2022 | Bernstein et al. |
| 11,550,420 B2 | 1/2023 | Bovet et al. |
| 11,570,359 B2 | 1/2023 | Lee et al. |
| 11,606,496 B2 | 3/2023 | Watanabe et al. |
| 11,747,969 B1 | 9/2023 | Karunamuni |
| 11,811,961 B2 | 11/2023 | Zhang et al. |
| 11,877,064 B1 * | 1/2024 | Douglas ................ G02B 30/22 |
| 2002/0140803 A1 | 10/2002 | Gutta et al. |
| 2002/0167604 A1 | 11/2002 | Ban et al. |
| 2002/0171737 A1 | 11/2002 | Tullis et al. |
| 2003/0025802 A1 | 2/2003 | Mayer, Jr. et al. |
| 2003/0107664 A1 | 6/2003 | Suzuki |
| 2003/0122930 A1 | 7/2003 | Schofield et al. |
| 2003/0160756 A1 | 8/2003 | Numano |
| 2003/0174216 A1 | 9/2003 | Iguchi et al. |
| 2003/0184587 A1 | 10/2003 | Ording et al. |
| 2004/0041924 A1 | 3/2004 | White et al. |
| 2004/0061796 A1 | 4/2004 | Honda et al. |
| 2004/0090469 A1 | 5/2004 | Moon et al. |
| 2004/0090546 A1 | 5/2004 | Doron |
| 2004/0189861 A1 | 9/2004 | Tom et al. |
| 2004/0201699 A1 | 10/2004 | Parulski et al. |
| 2005/0027515 A1 | 2/2005 | Huang et al. |
| 2005/0134695 A1 | 6/2005 | Deshpande et al. |
| 2005/0189419 A1 | 9/2005 | Igarashi et al. |
| 2005/0206981 A1 | 9/2005 | Hung |
| 2005/0210403 A1 | 9/2005 | Satanek |
| 2005/0237383 A1 | 10/2005 | Soga et al. |
| 2005/0248660 A1 | 11/2005 | Stavely et al. |
| 2005/0270397 A1 | 12/2005 | Battles |
| 2006/0033831 A1 | 2/2006 | Ejima et al. |
| 2006/0132482 A1 | 6/2006 | Oh et al. |
| 2006/0158730 A1 | 7/2006 | Kira |
| 2006/0187322 A1 | 8/2006 | Janson et al. |
| 2006/0209067 A1 | 9/2006 | Pellacini et al. |
| 2007/0025711 A1 | 2/2007 | Marcus et al. |
| 2007/0025723 A1 | 2/2007 | Baudisch et al. |
| 2007/0031062 A1 | 2/2007 | Pal et al. |
| 2007/0040810 A1 | 2/2007 | Dowe et al. |
| 2007/0097088 A1 | 5/2007 | Battles |
| 2007/0109417 A1 | 5/2007 | Hyttfors et al. |
| 2007/0140675 A1 | 6/2007 | Yanagi et al. |
| 2007/0153112 A1 | 7/2007 | Ueda et al. |
| 2007/0165103 A1 | 7/2007 | Arima et al. |
| 2007/0228259 A1 | 10/2007 | Hohenberger |
| 2007/0254640 A1 | 11/2007 | Bliss |

(56) References Cited

U.S. PATENT DOCUMENTS

| | | |
|---|---|---|
| 2007/0273769 A1 | 11/2007 | Takahashi |
| 2007/0291152 A1 | 12/2007 | Suekane et al. |
| 2008/0030592 A1 | 2/2008 | Border et al. |
| 2008/0084484 A1 | 4/2008 | Ochi et al. |
| 2008/0106601 A1 | 5/2008 | Matsuda |
| 2008/0129759 A1 | 6/2008 | Jeon et al. |
| 2008/0129825 A1 | 6/2008 | Deangelis et al. |
| 2008/0131019 A1 | 6/2008 | Ng |
| 2008/0143840 A1 | 6/2008 | Corkum et al. |
| 2008/0192020 A1 | 8/2008 | Kang et al. |
| 2008/0218611 A1 | 9/2008 | Parulski et al. |
| 2008/0222558 A1 | 9/2008 | Cho et al. |
| 2008/0259154 A1 | 10/2008 | Garrison et al. |
| 2008/0284855 A1 | 11/2008 | Umeyama et al. |
| 2008/0309811 A1 | 12/2008 | Fujinawa et al. |
| 2009/0009612 A1 | 1/2009 | Tico et al. |
| 2009/0021576 A1 | 1/2009 | Linder et al. |
| 2009/0021600 A1 | 1/2009 | Watanabe |
| 2009/0022422 A1 | 1/2009 | Sorek et al. |
| 2009/0027515 A1 | 1/2009 | Maruyama et al. |
| 2009/0027539 A1 | 1/2009 | Kunou |
| 2009/0040332 A1 | 2/2009 | Yoshino et al. |
| 2009/0046097 A1 | 2/2009 | Franklin |
| 2009/0051783 A1 | 2/2009 | Kim et al. |
| 2009/0102918 A1 | 4/2009 | Sakamoto et al. |
| 2009/0102933 A1 | 4/2009 | Harris et al. |
| 2009/0109316 A1 | 4/2009 | Matsui |
| 2009/0167671 A1 | 7/2009 | Kerofsky |
| 2009/0167672 A1 | 7/2009 | Kerofsky |
| 2009/0175511 A1 | 7/2009 | Lee et al. |
| 2009/0227295 A1 | 9/2009 | Kim |
| 2009/0244318 A1 | 10/2009 | Makii |
| 2009/0262088 A1 | 10/2009 | Moll-Carrillo et al. |
| 2009/0263044 A1 | 10/2009 | Imagawa et al. |
| 2009/0276700 A1 | 11/2009 | Anderson et al. |
| 2009/0315671 A1 | 12/2009 | Gocho |
| 2009/0322901 A1 | 12/2009 | Subbotin et al. |
| 2010/0020221 A1 | 1/2010 | Tupman et al. |
| 2010/0020222 A1 | 1/2010 | Jones et al. |
| 2010/0033615 A1 | 2/2010 | Mori |
| 2010/0039522 A1 | 2/2010 | Huang |
| 2010/0066853 A1 | 3/2010 | Aoki et al. |
| 2010/0066889 A1 | 3/2010 | Ueda et al. |
| 2010/0066890 A1 | 3/2010 | Ueda et al. |
| 2010/0066895 A1 | 3/2010 | Ueda et al. |
| 2010/0123737 A1 | 5/2010 | Williamson et al. |
| 2010/0162160 A1 | 6/2010 | Stallings et al. |
| 2010/0164893 A1 | 7/2010 | Shin et al. |
| 2010/0194931 A1 | 8/2010 | Kawaguchi et al. |
| 2010/0208122 A1 | 8/2010 | Yumiki |
| 2010/0231735 A1 | 9/2010 | Burian et al. |
| 2010/0231777 A1 | 9/2010 | Shintani et al. |
| 2010/0232703 A1 | 9/2010 | Aiso |
| 2010/0238327 A1 | 9/2010 | Griffith et al. |
| 2010/0245287 A1 | 9/2010 | Thorn |
| 2010/0259645 A1 | 10/2010 | Kaplan et al. |
| 2010/0283743 A1 | 11/2010 | Coddington |
| 2010/0289825 A1 | 11/2010 | Shin et al. |
| 2010/0289910 A1 | 11/2010 | Kamshilin et al. |
| 2010/0302280 A1 | 12/2010 | Szeliski et al. |
| 2011/0008033 A1 | 1/2011 | Ichimiya et al. |
| 2011/0013049 A1 | 1/2011 | Thörn |
| 2011/0018970 A1 | 1/2011 | Wakabayashi |
| 2011/0019058 A1 | 1/2011 | Sakai et al. |
| 2011/0019069 A1 | 1/2011 | Kojima et al. |
| 2011/0043662 A1 | 2/2011 | Kim |
| 2011/0050864 A1 | 3/2011 | Bond |
| 2011/0058052 A1 | 3/2011 | Bolton et al. |
| 2011/0074710 A1 | 3/2011 | Weeldreyer et al. |
| 2011/0074830 A1 | 3/2011 | Rapp et al. |
| 2011/0109581 A1 | 5/2011 | Ozawa et al. |
| 2011/0115932 A1 | 5/2011 | Shin et al. |
| 2011/0138332 A1 | 6/2011 | Miyagawa |
| 2011/0157379 A1 | 6/2011 | Kimura |
| 2011/0176039 A1 | 7/2011 | Lo |
| 2011/0187879 A1 | 8/2011 | Ochiai |
| 2011/0199495 A1 | 8/2011 | Laberge et al. |
| 2011/0242369 A1 | 10/2011 | Misawa et al. |
| 2011/0249078 A1 | 10/2011 | Abuan et al. |
| 2011/0296163 A1 | 12/2011 | Abernethy et al. |
| 2012/0002898 A1 | 1/2012 | Côté et al. |
| 2012/0011456 A1 | 1/2012 | Noda et al. |
| 2012/0026378 A1 | 2/2012 | Pang et al. |
| 2012/0056997 A1 | 3/2012 | Jang |
| 2012/0057064 A1 | 3/2012 | Gardiner et al. |
| 2012/0069206 A1 | 3/2012 | Hsieh |
| 2012/0120277 A1 | 5/2012 | Tsai et al. |
| 2012/0127189 A1 | 5/2012 | Park et al. |
| 2012/0127346 A1 | 5/2012 | Sato et al. |
| 2012/0133797 A1 | 5/2012 | Sato et al. |
| 2012/0162242 A1 | 6/2012 | Amano et al. |
| 2012/0162455 A1 | 6/2012 | Kim et al. |
| 2012/0169776 A1 | 7/2012 | Rissa et al. |
| 2012/0188394 A1 | 7/2012 | Park et al. |
| 2012/0194559 A1 | 8/2012 | Lim |
| 2012/0206621 A1 | 8/2012 | Chen et al. |
| 2012/0235990 A1 | 9/2012 | Yamaji |
| 2012/0243802 A1 | 9/2012 | Fintel et al. |
| 2012/0274830 A1 | 11/2012 | Kameyama et al. |
| 2012/0293611 A1 | 11/2012 | Lee |
| 2012/0308209 A1 | 12/2012 | Zaletel |
| 2012/0320141 A1 | 12/2012 | Bowen et al. |
| 2013/0009858 A1 | 1/2013 | Lacey |
| 2013/0010170 A1 | 1/2013 | Matsuzawa et al. |
| 2013/0038546 A1 | 2/2013 | Mineo |
| 2013/0038771 A1 | 2/2013 | Brunner et al. |
| 2013/0055119 A1 | 2/2013 | Luong |
| 2013/0057472 A1 | 3/2013 | Dizac et al. |
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0091298 A1 | 4/2013 | Ozzie et al. |
| 2013/0093904 A1 | 4/2013 | Wagner et al. |
| 2013/0109425 A1 | 5/2013 | Kerger et al. |
| 2013/0120386 A1 | 5/2013 | Wilensky et al. |
| 2013/0135315 A1 | 5/2013 | Bares et al. |
| 2013/0141362 A1 | 6/2013 | Asanuma et al. |
| 2013/0155308 A1 | 6/2013 | Wu et al. |
| 2013/0165186 A1 | 6/2013 | Choi |
| 2013/0179831 A1 | 7/2013 | Izaki |
| 2013/0194378 A1 | 8/2013 | Brown |
| 2013/0201307 A1 | 8/2013 | Schloter et al. |
| 2013/0208093 A1 | 8/2013 | Sun et al. |
| 2013/0210563 A1 | 8/2013 | Hollinger |
| 2013/0222671 A1 | 8/2013 | Tseng et al. |
| 2013/0235222 A1 | 9/2013 | Karn et al. |
| 2013/0235226 A1 | 9/2013 | Karn et al. |
| 2013/0235234 A1 | 9/2013 | Cucci et al. |
| 2013/0239057 A1 | 9/2013 | Ubillos et al. |
| 2013/0246948 A1 | 9/2013 | Chen et al. |
| 2013/0265467 A1 | 10/2013 | Matsuzawa et al. |
| 2013/0278576 A1 | 10/2013 | Lee et al. |
| 2013/0286251 A1 | 10/2013 | Wood et al. |
| 2013/0311186 A1 | 11/2013 | Lee et al. |
| 2013/0329074 A1 | 12/2013 | Zhang et al. |
| 2013/0346916 A1 | 12/2013 | Williamson et al. |
| 2014/0007021 A1 | 1/2014 | Akiyama et al. |
| 2014/0009639 A1 | 1/2014 | Lee |
| 2014/0022399 A1 | 1/2014 | Rashid et al. |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1 | 1/2014 | Noda et al. |
| 2014/0037178 A1 | 2/2014 | Park |
| 2014/0043368 A1 | 2/2014 | Yu |
| 2014/0043517 A1 | 2/2014 | Yim et al. |
| 2014/0047389 A1 | 2/2014 | Aarabi |
| 2014/0049536 A1 | 2/2014 | Neuman et al. |
| 2014/0063175 A1 | 3/2014 | Jafry et al. |
| 2014/0063313 A1 | 3/2014 | Choi et al. |
| 2014/0071325 A1 | 3/2014 | Kawahara et al. |
| 2014/0078371 A1 | 3/2014 | Kinoshita |
| 2014/0092272 A1 | 4/2014 | Choi |
| 2014/0099994 A1 | 4/2014 | Bishop et al. |

(56) References Cited

U.S. PATENT DOCUMENTS

| | | |
|---|---|---|
| 2014/0104449 A1 | 4/2014 | Masarik et al. |
| 2014/0108928 A1 | 4/2014 | Mumick |
| 2014/0118563 A1 | 5/2014 | Mehta et al. |
| 2014/0132735 A1 | 5/2014 | Lee et al. |
| 2014/0143678 A1 | 5/2014 | Mistry et al. |
| 2014/0152886 A1 | 6/2014 | Morgan-mar et al. |
| 2014/0160304 A1 | 6/2014 | Galor et al. |
| 2014/0160316 A1 | 6/2014 | Hwang |
| 2014/0176469 A1 | 6/2014 | Lim |
| 2014/0184524 A1 | 7/2014 | Schiefer et al. |
| 2014/0192232 A1 | 7/2014 | Park et al. |
| 2014/0192233 A1 | 7/2014 | Kakkori et al. |
| 2014/0204229 A1 | 7/2014 | Leung et al. |
| 2014/0218383 A1 | 8/2014 | Srivastava |
| 2014/0218599 A1 | 8/2014 | Nakamura et al. |
| 2014/0226052 A1 | 8/2014 | Kang et al. |
| 2014/0232838 A1 | 8/2014 | Jorgensen et al. |
| 2014/0232921 A1 | 8/2014 | Kim et al. |
| 2014/0240471 A1 | 8/2014 | Srinivasa et al. |
| 2014/0240531 A1 | 8/2014 | Nakai et al. |
| 2014/0240551 A1 | 8/2014 | Kim et al. |
| 2014/0240577 A1 | 8/2014 | Masugi |
| 2014/0253470 A1 | 9/2014 | Havilio |
| 2014/0267867 A1 | 9/2014 | Lee et al. |
| 2014/0281966 A1 | 9/2014 | Kajiyama et al. |
| 2014/0281983 A1 | 9/2014 | Xian et al. |
| 2014/0282223 A1 | 9/2014 | Bastien et al. |
| 2014/0285698 A1 | 9/2014 | Geiss |
| 2014/0300635 A1 | 10/2014 | Suzuki |
| 2014/0300779 A1 | 10/2014 | Yeo et al. |
| 2014/0307147 A1 | 10/2014 | Hanzawa et al. |
| 2014/0310598 A1 | 10/2014 | Sprague et al. |
| 2014/0327639 A1 | 11/2014 | Papakipos et al. |
| 2014/0333671 A1 | 11/2014 | Phang et al. |
| 2014/0333790 A1 | 11/2014 | Wakazono |
| 2014/0333824 A1 | 11/2014 | Xiu |
| 2014/0351753 A1 | 11/2014 | Shin et al. |
| 2014/0354845 A1 | 12/2014 | Mølgaard et al. |
| 2014/0359438 A1 | 12/2014 | Matsuki |
| 2014/0362257 A1 | 12/2014 | Viljamaa et al. |
| 2014/0362274 A1 | 12/2014 | Christie et al. |
| 2014/0368601 A1 | 12/2014 | Decharms |
| 2014/0368719 A1 | 12/2014 | Kaneko et al. |
| 2014/0372856 A1 | 12/2014 | Radakovitz et al. |
| 2014/0375862 A1 | 12/2014 | Kim et al. |
| 2015/0022649 A1 | 1/2015 | Koppal |
| 2015/0022674 A1 | 1/2015 | Koss et al. |
| 2015/0033129 A1 | 1/2015 | Cho et al. |
| 2015/0042852 A1 | 2/2015 | Lee et al. |
| 2015/0049233 A1 | 2/2015 | Choi |
| 2015/0070362 A1 | 3/2015 | Hirai |
| 2015/0085174 A1 | 3/2015 | Shabtay et al. |
| 2015/0092077 A1 | 4/2015 | Feder et al. |
| 2015/0116353 A1 | 4/2015 | Miura et al. |
| 2015/0116448 A1 | 4/2015 | Gottlieb |
| 2015/0116542 A1 | 4/2015 | Lee |
| 2015/0135109 A1 | 5/2015 | Zambetti et al. |
| 2015/0135234 A1 | 5/2015 | Hall |
| 2015/0138079 A1 | 5/2015 | Lannsjö |
| 2015/0145950 A1 | 5/2015 | Murphy et al. |
| 2015/0146079 A1 | 5/2015 | Kim |
| 2015/0150141 A1 | 5/2015 | Szymanski et al. |
| 2015/0154448 A1 | 6/2015 | Murayama et al. |
| 2015/0172534 A1 | 6/2015 | Miyakawa et al. |
| 2015/0181135 A1 | 6/2015 | Shimosato |
| 2015/0189162 A1 | 7/2015 | Kuo et al. |
| 2015/0194186 A1 | 7/2015 | Lee et al. |
| 2015/0201130 A1 | 7/2015 | Cho et al. |
| 2015/0212723 A1 | 7/2015 | Lim et al. |
| 2015/0220249 A1 | 8/2015 | Snibbe et al. |
| 2015/0248198 A1 | 9/2015 | Somlai-Fisher et al. |
| 2015/0248213 A1 | 9/2015 | Postal |
| 2015/0249775 A1 | 9/2015 | Jacumet |
| 2015/0249785 A1 | 9/2015 | Mehta et al. |
| 2015/0254855 A1 | 9/2015 | Patankar et al. |
| 2015/0254868 A1 | 9/2015 | Srikanth et al. |
| 2015/0256749 A1 | 9/2015 | Frey et al. |
| 2015/0264202 A1 | 9/2015 | Pawlowski |
| 2015/0271389 A1 | 9/2015 | Huang et al. |
| 2015/0281585 A1 | 10/2015 | Guldogan |
| 2015/0289104 A1 | 10/2015 | Jung et al. |
| 2015/0297185 A1 | 10/2015 | Mccormack et al. |
| 2015/0301731 A1 | 10/2015 | Okamoto et al. |
| 2015/0310583 A1 | 10/2015 | Hume et al. |
| 2015/0312185 A1 | 10/2015 | Langholz et al. |
| 2015/0334291 A1 | 11/2015 | Cho et al. |
| 2015/0334292 A1 | 11/2015 | Tartz et al. |
| 2015/0341536 A1 | 11/2015 | Huang et al. |
| 2015/0350141 A1 | 12/2015 | Yang et al. |
| 2015/0350523 A1 | 12/2015 | Kinoshita |
| 2015/0350533 A1 | 12/2015 | Harris et al. |
| 2015/0350535 A1 | 12/2015 | Voss |
| 2015/0362998 A1 | 12/2015 | Park et al. |
| 2015/0370458 A1 | 12/2015 | Chen |
| 2016/0012567 A1 | 1/2016 | Siddiqui et al. |
| 2016/0026371 A1 | 1/2016 | Lu et al. |
| 2016/0029004 A1 | 1/2016 | Campbell et al. |
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050351 A1 | 2/2016 | Lee et al. |
| 2016/0050446 A1 | 2/2016 | Fujioka et al. |
| 2016/0065832 A1 | 3/2016 | Kim et al. |
| 2016/0077725 A1 | 3/2016 | Maeda |
| 2016/0080639 A1 | 3/2016 | Choi et al. |
| 2016/0088280 A1 | 3/2016 | Sadi et al. |
| 2016/0117829 A1 | 4/2016 | Yoon et al. |
| 2016/0119552 A1 | 4/2016 | Oh et al. |
| 2016/0127636 A1 | 5/2016 | Ito et al. |
| 2016/0127638 A1 | 5/2016 | Guo et al. |
| 2016/0132201 A1 | 5/2016 | Shaw et al. |
| 2016/0148384 A1 | 5/2016 | Bud et al. |
| 2016/0162039 A1 | 6/2016 | Eilat et al. |
| 2016/0173869 A1 | 6/2016 | Srikanth et al. |
| 2016/0188181 A1 | 6/2016 | Smith |
| 2016/0212319 A1 | 7/2016 | Harris et al. |
| 2016/0219212 A1 | 7/2016 | Shoji |
| 2016/0219217 A1 | 7/2016 | Williams et al. |
| 2016/0225175 A1 | 8/2016 | Kim et al. |
| 2016/0227016 A1 | 8/2016 | Kim et al. |
| 2016/0241777 A1 | 8/2016 | Rav-acha et al. |
| 2016/0247288 A1 | 8/2016 | Omori et al. |
| 2016/0255268 A1 | 9/2016 | Kang et al. |
| 2016/0259413 A1 | 9/2016 | Anzures et al. |
| 2016/0283586 A1 | 9/2016 | Thapliyal et al. |
| 2016/0316147 A1 | 10/2016 | Bernstein et al. |
| 2016/0337570 A1 | 11/2016 | Tan et al. |
| 2016/0337582 A1 | 11/2016 | Shimauchi et al. |
| 2016/0357353 A1 | 12/2016 | Miura et al. |
| 2016/0357354 A1 | 12/2016 | Chen et al. |
| 2016/0360097 A1 | 12/2016 | Penha et al. |
| 2016/0360116 A1 | 12/2016 | Penha et al. |
| 2016/0366344 A1 | 12/2016 | Pan et al. |
| 2016/0373631 A1 | 12/2016 | Titi et al. |
| 2016/0373650 A1 | 12/2016 | Kim et al. |
| 2017/0006210 A1 | 1/2017 | Dye et al. |
| 2017/0011773 A1 | 1/2017 | Lee |
| 2017/0013179 A1 | 1/2017 | Kang et al. |
| 2017/0019604 A1 | 1/2017 | Kim et al. |
| 2017/0024872 A1 | 1/2017 | Olsson et al. |
| 2017/0026565 A1 | 1/2017 | Hong et al. |
| 2017/0032269 A1 | 2/2017 | Portilla et al. |
| 2017/0034449 A1 | 2/2017 | Eum et al. |
| 2017/0038852 A1 | 2/2017 | Hildreth et al. |
| 2017/0039686 A1 | 2/2017 | Miura et al. |
| 2017/0041549 A1 | 2/2017 | Kim et al. |
| 2017/0041677 A1 | 2/2017 | Anderson et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0054960 A1 | 2/2017 | Chien et al. |
| 2017/0064184 A1 | 3/2017 | Tsai |

(56) References Cited

U.S. PATENT DOCUMENTS

| | | |
|---|---|---|
| 2017/0064205 A1 | 3/2017 | Choi et al. |
| 2017/0064213 A1 | 3/2017 | Windmark et al. |
| 2017/0092329 A1 | 3/2017 | Kim et al. |
| 2017/0094019 A1 | 3/2017 | Ahmed et al. |
| 2017/0109912 A1 | 4/2017 | Lee et al. |
| 2017/0111567 A1 | 4/2017 | Pila |
| 2017/0124664 A1 | 5/2017 | Savenok et al. |
| 2017/0134605 A1 | 5/2017 | Ju et al. |
| 2017/0139572 A1 | 5/2017 | Sunkavalli et al. |
| 2017/0186162 A1 | 6/2017 | Mihic et al. |
| 2017/0230576 A1 | 8/2017 | Sparks et al. |
| 2017/0230585 A1 | 8/2017 | Nash et al. |
| 2017/0237888 A1 | 8/2017 | Harris et al. |
| 2017/0243389 A1 | 8/2017 | Wild et al. |
| 2017/0244482 A1 | 8/2017 | Dimare et al. |
| 2017/0244896 A1 | 8/2017 | Chien et al. |
| 2017/0244897 A1 | 8/2017 | Jung et al. |
| 2017/0257559 A1 | 9/2017 | Stricker |
| 2017/0257596 A1 | 9/2017 | Murata et al. |
| 2017/0264817 A1 | 9/2017 | Yan et al. |
| 2017/0285764 A1 | 10/2017 | Kim et al. |
| 2017/0287220 A1 | 10/2017 | Khalid et al. |
| 2017/0289462 A1 | 10/2017 | Eum et al. |
| 2017/0302840 A1 | 10/2017 | Hasinoff et al. |
| 2017/0315772 A1 | 11/2017 | Lee et al. |
| 2017/0324784 A1 | 11/2017 | Taine et al. |
| 2017/0336961 A1 | 11/2017 | Heo et al. |
| 2017/0354888 A1 | 12/2017 | Benedetto et al. |
| 2017/0358071 A1 | 12/2017 | Yamaoka et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2017/0371538 A1 | 12/2017 | Zhang et al. |
| 2017/0371844 A1 | 12/2017 | Yao |
| 2018/0007315 A1 | 1/2018 | Kim et al. |
| 2018/0021684 A1 | 1/2018 | Benedetto |
| 2018/0032536 A1 | 2/2018 | Stachowski |
| 2018/0047200 A1 | 2/2018 | O'Hara et al. |
| 2018/0048820 A1 | 2/2018 | Hinkel et al. |
| 2018/0052571 A1 | 2/2018 | Seol et al. |
| 2018/0077332 A1 | 3/2018 | Shimura et al. |
| 2018/0088787 A1 | 3/2018 | Bereza et al. |
| 2018/0091728 A1 | 3/2018 | Brown et al. |
| 2018/0096487 A1 | 4/2018 | Nash et al. |
| 2018/0107367 A1 | 4/2018 | Rinneberg et al. |
| 2018/0109722 A1 | 4/2018 | Laroia et al. |
| 2018/0113577 A1 | 4/2018 | Burns et al. |
| 2018/0114543 A1 | 4/2018 | Novikoff |
| 2018/0120661 A1 | 5/2018 | Kilgore et al. |
| 2018/0124299 A1 | 5/2018 | Brook |
| 2018/0129224 A1 | 5/2018 | Hur |
| 2018/0146132 A1 | 5/2018 | Manzari et al. |
| 2018/0152611 A1 | 5/2018 | Li et al. |
| 2018/0184008 A1 | 6/2018 | Kondo |
| 2018/0184061 A1 | 6/2018 | Kitsunai et al. |
| 2018/0198985 A1 | 7/2018 | Ishitsuka |
| 2018/0199025 A1 | 7/2018 | Holzer et al. |
| 2018/0213144 A1 | 7/2018 | Kim et al. |
| 2018/0213161 A1 | 7/2018 | Kanda et al. |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0234608 A1 | 8/2018 | Sudo et al. |
| 2018/0239930 A1 | 8/2018 | Lai et al. |
| 2018/0262677 A1 | 9/2018 | Dye et al. |
| 2018/0267703 A1 | 9/2018 | Kamimaru et al. |
| 2018/0270420 A1 | 9/2018 | Lee et al. |
| 2018/0278823 A1 | 9/2018 | Horesh |
| 2018/0284979 A1 | 10/2018 | Choi et al. |
| 2018/0288310 A1 | 10/2018 | Goldenberg |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0335901 A1 | 11/2018 | Manzari et al. |
| 2018/0349008 A1 | 12/2018 | Manzari et al. |
| 2018/0349659 A1 | 12/2018 | Manzari et al. |
| 2018/0352165 A1 | 12/2018 | Zhen et al. |
| 2018/0364815 A1 | 12/2018 | Moussette et al. |
| 2018/0376122 A1 | 12/2018 | Park et al. |
| 2019/0007589 A1 | 1/2019 | Kadambala et al. |
| 2019/0028650 A1 | 1/2019 | Bernstein et al. |
| 2019/0029513 A1 | 1/2019 | Gunnerson et al. |
| 2019/0051032 A1 | 2/2019 | Chu et al. |
| 2019/0080189 A1 | 3/2019 | Van Os et al. |
| 2019/0082097 A1 | 3/2019 | Manzari et al. |
| 2019/0089873 A1 | 3/2019 | Misawa et al. |
| 2019/0108684 A1 | 4/2019 | Callaghan |
| 2019/0114740 A1 | 4/2019 | Ogino et al. |
| 2019/0121216 A1 | 4/2019 | Shabtay et al. |
| 2019/0138259 A1 | 5/2019 | Bagaria et al. |
| 2019/0141030 A1 | 5/2019 | Cockerill et al. |
| 2019/0149706 A1 | 5/2019 | Rivard et al. |
| 2019/0174054 A1 | 6/2019 | Srivastava et al. |
| 2019/0199926 A1 | 6/2019 | An et al. |
| 2019/0205861 A1 | 7/2019 | Bace |
| 2019/0206031 A1 | 7/2019 | Kim et al. |
| 2019/0220089 A1 | 7/2019 | Kakizawa et al. |
| 2019/0222769 A1 | 7/2019 | Srivastava et al. |
| 2019/0235743 A1 | 8/2019 | Ono |
| 2019/0250812 A1 | 8/2019 | Davydov et al. |
| 2019/0253619 A1 | 8/2019 | Davydov et al. |
| 2019/0289201 A1 | 9/2019 | Nishimura et al. |
| 2019/0318538 A1 | 10/2019 | Li et al. |
| 2019/0379821 A1 | 12/2019 | Kobayashi et al. |
| 2019/0379837 A1 | 12/2019 | Kim et al. |
| 2020/0045245 A1 | 2/2020 | Van Os et al. |
| 2020/0053288 A1 | 2/2020 | Kim et al. |
| 2020/0059605 A1 | 2/2020 | Liu et al. |
| 2020/0068121 A1 | 2/2020 | Wang |
| 2020/0082599 A1 | 3/2020 | Manzari |
| 2020/0104021 A1 | 4/2020 | Bylenok et al. |
| 2020/0105003 A1 | 4/2020 | Stauber et al. |
| 2020/0106952 A1 | 4/2020 | Missig et al. |
| 2020/0106965 A1 | 4/2020 | Malia et al. |
| 2020/0128191 A1 | 4/2020 | Sun et al. |
| 2020/0150836 A1 | 5/2020 | Penha et al. |
| 2020/0204725 A1 | 6/2020 | Li |
| 2020/0221020 A1 | 7/2020 | Manzari et al. |
| 2020/0236278 A1 | 7/2020 | Yeung et al. |
| 2020/0242788 A1 | 7/2020 | Jacobs et al. |
| 2020/0244879 A1 | 7/2020 | Hohjoh |
| 2020/0285806 A1 | 9/2020 | Radakovitz et al. |
| 2020/0336660 A1 | 10/2020 | Dong et al. |
| 2020/0342613 A1 | 10/2020 | Altuev et al. |
| 2020/0358963 A1 | 11/2020 | Manzari et al. |
| 2020/0382723 A1 | 12/2020 | Pena et al. |
| 2020/0410763 A1 | 12/2020 | Hare et al. |
| 2021/0012761 A1 | 1/2021 | Song |
| 2021/0051275 A1 | 2/2021 | Brown et al. |
| 2021/0081093 A1 | 3/2021 | Yun et al. |
| 2021/0081450 A1* | 3/2021 | Lopez .................. H04N 23/64 |
| 2021/0146838 A1 | 5/2021 | Goseberg et al. |
| 2021/0160431 A1 | 5/2021 | Chen et al. |
| 2021/0168300 A1 | 6/2021 | Wang et al. |
| 2021/0195093 A1 | 6/2021 | Manzari et al. |
| 2021/0201953 A1 | 7/2021 | Takahashi et al. |
| 2021/0248371 A1* | 8/2021 | Carter ...................... G06T 7/74 |
| 2021/0266447 A1 | 8/2021 | Ding et al. |
| 2021/0281746 A1 | 9/2021 | Fleizach et al. |
| 2021/0286510 A1 | 9/2021 | Tyler et al. |
| 2021/0304629 A1* | 9/2021 | Barron .................. G06V 20/20 |
| 2021/0344845 A1 | 11/2021 | Li et al. |
| 2021/0373750 A1 | 12/2021 | Manzari et al. |
| 2021/0389850 A1 | 12/2021 | Charlton et al. |
| 2021/0397338 A1 | 12/2021 | Davydov et al. |
| 2022/0006946 A1 | 1/2022 | Missig et al. |
| 2022/0050867 A1* | 2/2022 | Waller ............... G06F 16/5854 |
| 2022/0053126 A1 | 2/2022 | Zhao et al. |
| 2022/0053142 A1 | 2/2022 | Manzari et al. |
| 2022/0057984 A1 | 2/2022 | Yang et al. |
| 2022/0070385 A1 | 3/2022 | Van Os et al. |
| 2022/0086336 A1 | 3/2022 | Zhang |
| 2022/0103758 A1 | 3/2022 | Manzari et al. |

(56) References Cited

U.S. PATENT DOCUMENTS

| | | |
|---|---|---|
| 2022/0124241 A1 | 4/2022 | Manzari et al. |
| 2022/0134226 A1 | 5/2022 | Takura et al. |
| 2022/0207838 A1 | 6/2022 | Anvaripour et al. |
| 2022/0210328 A1* | 6/2022 | Anvaripour .............. G06F 3/00 |
| 2022/0210337 A1 | 6/2022 | Anvaripour et al. |
| 2022/0217253 A1 | 7/2022 | Tian et al. |
| 2022/0217275 A1 | 7/2022 | Fan |
| 2022/0224828 A1 | 7/2022 | Lim et al. |
| 2022/0256068 A1 | 8/2022 | Geiss et al. |
| 2022/0262022 A1 | 8/2022 | Stauber et al. |
| 2022/0264028 A1 | 8/2022 | Manzari et al. |
| 2022/0276041 A1 | 9/2022 | Dryer et al. |
| 2022/0279116 A1 | 9/2022 | Zhou |
| 2022/0294992 A1 | 9/2022 | Manzari et al. |
| 2022/0319100 A1 | 10/2022 | Manzari et al. |
| 2022/0321797 A1 | 10/2022 | Bian et al. |
| 2022/0353425 A1 | 11/2022 | Manzari et al. |
| 2022/0382440 A1 | 12/2022 | Manzari et al. |
| 2022/0382443 A1 | 12/2022 | Clarke et al. |
| 2022/0394190 A1 | 12/2022 | Cui et al. |
| 2022/0408020 A1 | 12/2022 | Zhang |
| 2022/0417416 A1 | 12/2022 | Li et al. |
| 2023/0007186 A1 | 1/2023 | Li et al. |
| 2023/0016178 A1 | 1/2023 | Ma et al. |
| 2023/0018557 A1 | 1/2023 | Jiang |
| 2023/0020616 A1 | 1/2023 | Manzari et al. |
| 2023/0081664 A1 | 3/2023 | Li |
| 2023/0087879 A1 | 3/2023 | An et al. |
| 2023/0098395 A1 | 3/2023 | O'Leary et al. |
| 2023/0115929 A1 | 4/2023 | Bian et al. |
| 2023/0116044 A1 | 4/2023 | Han |
| 2023/0118567 A1 | 4/2023 | Manzari et al. |
| 2023/0156144 A1 | 5/2023 | Cui |
| 2023/0156316 A1 | 5/2023 | Kang et al. |
| 2023/0164427 A1 | 5/2023 | Lu et al. |
| 2023/0179856 A1 | 6/2023 | Shin |
| 2023/0188831 A1 | 6/2023 | Hyun et al. |
| 2023/0188861 A1 | 6/2023 | Bian |
| 2023/0209179 A1 | 6/2023 | Manzari et al. |
| 2023/0217097 A1 | 7/2023 | Wu et al. |
| 2023/0217098 A1 | 7/2023 | Wang et al. |
| 2023/0224575 A1 | 7/2023 | Ding et al. |
| 2023/0252659 A1 | 8/2023 | Stauber et al. |
| 2023/0254573 A1 | 8/2023 | Manzari et al. |
| 2023/0262317 A1 | 8/2023 | O'Leary et al. |
| 2023/0308742 A1 | 9/2023 | Lin et al. |
| 2023/0308743 A1 | 9/2023 | Ku et al. |
| 2023/0308778 A1 | 9/2023 | Yang |
| 2023/0319394 A1 | 10/2023 | Manzari et al. |
| 2023/0325989 A1 | 10/2023 | Zhao |
| 2023/0328429 A1 | 10/2023 | Bian |
| 2023/0333704 A1 | 10/2023 | Chen |
| 2023/0345110 A1 | 10/2023 | Yi et al. |
| 2023/0345113 A1 | 10/2023 | Liu |
| 2023/0353862 A1 | 11/2023 | Yi et al. |
| 2023/0359314 A1 | 11/2023 | Karunamuni |
| 2023/0359315 A1 | 11/2023 | Karunamuni et al. |
| 2023/0359316 A1 | 11/2023 | Karunamuni |
| 2023/0367472 A1 | 11/2023 | Clarke et al. |
| 2023/0370507 A1 | 11/2023 | Chang et al. |
| 2023/0393705 A1 | 12/2023 | Krenn |
| 2023/0418426 A1 | 12/2023 | Karunamuni |
| 2024/0080543 A1 | 3/2024 | Manzari et al. |
| 2024/0168626 A1 | 5/2024 | Davydov et al. |
| 2024/0259669 A1 | 8/2024 | Missig et al. |
| 2024/0259670 A1 | 8/2024 | Manzari et al. |
| 2024/0284037 A1 | 8/2024 | Manzari et al. |
| 2024/0361898 A1 | 10/2024 | Ardaud et al. |
| 2024/0422425 A1 | 12/2024 | Che et al. |
| 2024/0430564 A1 | 12/2024 | Manzari et al. |
| 2025/0022211 A1 | 1/2025 | Manzari et al. |
| 2025/0024133 A1 | 1/2025 | Manzari et al. |
| 2025/0088734 A1 | 3/2025 | Manzari et al. |
| 2025/0110574 A1 | 4/2025 | Alonso et al. |
| 2025/0113094 A1 | 4/2025 | Alonso et al. |
| 2025/0113095 A1 | 4/2025 | Alonso et al. |
| 2025/0238127 A1 | 7/2025 | Alonso et al. |
| 2025/0238128 A1 | 7/2025 | Manzari et al. |
| 2025/0238129 A1 | 7/2025 | Moussette et al. |
| 2025/0240516 A1 | 7/2025 | Zumbrunnen et al. |

FOREIGN PATENT DOCUMENTS

| | | |
|---|---|---|
| CA | 2729392 C | 5/2017 |
| CA | 2965925 A1 | 3/2018 |
| CN | 1437365 A | 8/2003 |
| CN | 1499878 A | 5/2004 |
| CN | 1705346 A | 12/2005 |
| CN | 1901717 A | 1/2007 |
| CN | 101243383 A | 8/2008 |
| CN | 101282422 A | 10/2008 |
| CN | 101300830 A | 11/2008 |
| CN | 101310519 A | 11/2008 |
| CN | 101355655 A | 1/2009 |
| CN | 101364031 A | 2/2009 |
| CN | 101427574 A | 5/2009 |
| CN | 101533330 A | 9/2009 |
| CN | 101576996 A | 11/2009 |
| CN | 101681462 A | 3/2010 |
| CN | 101778220 A | 7/2010 |
| CN | 101883213 A | 11/2010 |
| CN | 101931691 A | 12/2010 |
| CN | 102084327 A | 6/2011 |
| CN | 102088554 A | 6/2011 |
| CN | 102272700 A | 12/2011 |
| CN | 102369723 A | 3/2012 |
| CN | 102428655 A | 4/2012 |
| CN | 102457661 A | 5/2012 |
| CN | 102474560 A | 5/2012 |
| CN | 202309894 U | 7/2012 |
| CN | 202330968 U | 7/2012 |
| CN | 102855079 A | 1/2013 |
| CN | 103051837 A | 4/2013 |
| CN | 103051841 A | 4/2013 |
| CN | 103052961 A | 4/2013 |
| CN | 103297719 A | 9/2013 |
| CN | 103309602 A | 9/2013 |
| CN | 103324329 A | 9/2013 |
| CN | 103685925 A | 3/2014 |
| CN | 103702039 A | 4/2014 |
| CN | 103777742 A | 5/2014 |
| CN | 103970472 A | 8/2014 |
| CN | 104346080 A | 2/2015 |
| CN | 104346099 A | 2/2015 |
| CN | 104423946 A | 3/2015 |
| CN | 104461288 A | 3/2015 |
| CN | 104781773 A | 7/2015 |
| CN | 104813322 A | 7/2015 |
| CN | 104836947 A | 8/2015 |
| CN | 105049726 A | 11/2015 |
| CN | 105138259 A | 12/2015 |
| CN | 105183442 A | 12/2015 |
| CN | 105190511 A | 12/2015 |
| CN | 105229571 A | 1/2016 |
| CN | 105338256 A | 2/2016 |
| CN | 105474163 A | 4/2016 |
| CN | 105589637 A | 5/2016 |
| CN | 105620393 A | 6/2016 |
| CN | 105630290 A | 6/2016 |
| CN | 105637855 A | 6/2016 |
| CN | 105765967 A | 7/2016 |
| CN | 105981372 A | 9/2016 |
| CN | 105991915 A | 10/2016 |
| CN | 106067947 A | 11/2016 |
| CN | 106104448 A | 11/2016 |
| CN | 106161956 A | 11/2016 |
| CN | 106210184 A | 12/2016 |
| CN | 106210550 A | 12/2016 |
| CN | 106257909 A | 12/2016 |
| CN | 106303280 A | 1/2017 |
| CN | 106341611 A | 1/2017 |
| CN | 106375662 A | 2/2017 |
| CN | 106412214 A | 2/2017 |
| CN | 106412412 A | 2/2017 |

(56) References Cited

FOREIGN PATENT DOCUMENTS

| | | |
|---|---|---|
| CN | 106412445 A | 2/2017 |
| CN | 106445219 A | 2/2017 |
| CN | 106791357 A | 5/2017 |
| CN | 106791377 A | 5/2017 |
| CN | 106791420 A | 5/2017 |
| CN | 106921829 A | 7/2017 |
| CN | 107077274 A | 8/2017 |
| CN | 107079141 A | 8/2017 |
| CN | 107566721 A | 1/2018 |
| CN | 107580693 A | 1/2018 |
| CN | 107710135 A | 2/2018 |
| CN | 107770448 A | 3/2018 |
| CN | 107800945 A | 3/2018 |
| CN | 107820011 A | 3/2018 |
| CN | 107924113 A | 4/2018 |
| CN | 108174096 A | 6/2018 |
| CN | 108196761 A | 6/2018 |
| CN | 108319629 A | 7/2018 |
| CN | 108353126 A | 7/2018 |
| CN | 108391053 A | 8/2018 |
| CN | 108419019 A | 8/2018 |
| CN | 108513070 A | 9/2018 |
| CN | 108549522 A | 9/2018 |
| CN | 108600610 A | 9/2018 |
| CN | 108668083 A | 10/2018 |
| CN | 108848308 A | 11/2018 |
| CN | 108886569 A | 11/2018 |
| CN | 109005366 A | 12/2018 |
| CN | 109061985 A | 12/2018 |
| CN | 109313530 A | 2/2019 |
| CN | 109496425 A | 3/2019 |
| CN | 105338244 B | 4/2019 |
| CN | 109639970 A | 4/2019 |
| CN | 109644217 A | 4/2019 |
| CN | 109644229 A | 4/2019 |
| CN | 109769396 A | 5/2019 |
| CN | 110678832 A | 1/2020 |
| CN | 111034164 A | 4/2020 |
| CN | 111142724 A | 5/2020 |
| DE | 202017002874 U1 | 9/2017 |
| DK | 201670753 A1 | 1/2018 |
| DK | 201670755 A1 | 1/2018 |
| DK | 201670627 A1 | 2/2018 |
| EP | 0257972 A2 | 3/1988 |
| EP | 0651543 A2 | 5/1995 |
| EP | 0651543 A3 | 12/1997 |
| EP | 1278099 A1 | 1/2003 |
| EP | 1953663 A1 | 8/2008 |
| EP | 0651543 B1 | 9/2008 |
| EP | 2194508 A1 | 6/2010 |
| EP | 2430766 A2 | 3/2012 |
| EP | 2454872 A1 | 5/2012 |
| EP | 2482179 A2 | 8/2012 |
| EP | 2487613 A1 | 8/2012 |
| EP | 2487913 A2 | 8/2012 |
| EP | 2430766 A4 | 12/2012 |
| EP | 2579572 A1 | 4/2013 |
| EP | 2640060 A1 | 9/2013 |
| EP | 2682855 A2 | 1/2014 |
| EP | 2830297 A1 | 1/2015 |
| EP | 2843530 A1 | 3/2015 |
| EP | 2950198 A1 | 12/2015 |
| EP | 2966855 A2 | 1/2016 |
| EP | 2972677 A1 | 1/2016 |
| EP | 2430766 B1 | 3/2016 |
| EP | 3008575 A1 | 4/2016 |
| EP | 3012732 A1 | 4/2016 |
| EP | 3033837 A1 | 6/2016 |
| EP | 3033837 A4 | 3/2017 |
| EP | 3217341 A1 | 9/2017 |
| EP | 2194508 B1 | 12/2017 |
| EP | 3333544 A1 | 6/2018 |
| EP | 3033837 B1 | 10/2018 |
| EP | 3393119 A1 | 10/2018 |
| EP | 3135028 B1 | 1/2019 |
| EP | 2482179 B1 | 3/2019 |
| EP | 3457680 A1 | 3/2019 |
| EP | 3012732 B1 | 5/2019 |
| EP | 3008575 B1 | 7/2019 |
| EP | 3633975 A1 | 4/2020 |
| EP | 3736676 A1 | 11/2020 |
| EP | 2682855 B1 | 2/2021 |
| EP | 3833002 A1 | 6/2021 |
| EP | 3633975 B1 | 5/2023 |
| EP | 4195658 A1 | 6/2023 |
| GB | 2307383 A | 5/1997 |
| GB | 2515797 A | 1/2015 |
| GB | 2523670 A | 9/2015 |
| JP | 2-179078 A | 7/1990 |
| JP | 3-129573 A | 6/1991 |
| JP | 6-215092 A | 8/1994 |
| JP | 9-116792 A | 5/1997 |
| JP | 9-179998 A | 7/1997 |
| JP | 11-355617 A | 12/1999 |
| JP | 2000-207549 A | 7/2000 |
| JP | 2000-244905 A | 9/2000 |
| JP | 2001-101259 A | 4/2001 |
| JP | 2001-245204 A | 9/2001 |
| JP | 2001-298649 A | 10/2001 |
| JP | 2003-8964 A | 1/2003 |
| JP | 2003-18438 A | 1/2003 |
| JP | 2003-32597 A | 1/2003 |
| JP | 2003-241293 A | 8/2003 |
| JP | 2003-248549 A | 9/2003 |
| JP | 2004-15595 A | 1/2004 |
| JP | 2004-135074 A | 4/2004 |
| JP | 2005-31466 A | 2/2005 |
| JP | 2005-191641 A | 7/2005 |
| JP | 2005-191985 A | 7/2005 |
| JP | 2005-311699 A | 11/2005 |
| JP | 2006-332809 A | 12/2006 |
| JP | 3872041 B2 | 1/2007 |
| JP | 2007-28211 A | 2/2007 |
| JP | 2007-124279 A | 5/2007 |
| JP | 2007124398 A | 5/2007 |
| JP | 2007-258869 A | 10/2007 |
| JP | 2007-274017 A | 10/2007 |
| JP | 2008-66978 A | 3/2008 |
| JP | 2008-236534 A | 10/2008 |
| JP | 2009-105919 A | 5/2009 |
| JP | 2009-212899 A | 9/2009 |
| JP | 2009-217816 A | 9/2009 |
| JP | 2009-246468 A | 10/2009 |
| JP | 2009-273023 A | 11/2009 |
| JP | 2009-290782 A | 12/2009 |
| JP | 2009-545256 A | 12/2009 |
| JP | 2010-117444 A | 5/2010 |
| JP | 2010-119147 A | 5/2010 |
| JP | 2010-182023 A | 8/2010 |
| JP | 2010-211166 A | 9/2010 |
| JP | 2010-268052 A | 11/2010 |
| JP | 2011-87167 A | 4/2011 |
| JP | 2011-91570 A | 5/2011 |
| JP | 2011-124864 A | 6/2011 |
| JP | 2011-211552 A | 10/2011 |
| JP | 2012-44564 A | 3/2012 |
| JP | 2012-79302 A | 4/2012 |
| JP | 2012-89973 A | 5/2012 |
| JP | 2012-147379 A | 8/2012 |
| JP | 2012-253748 A | 12/2012 |
| JP | 2013-9274 A | 1/2013 |
| JP | 2013-68861 A | 3/2013 |
| JP | 2013-70303 A | 4/2013 |
| JP | 2013-106289 A | 5/2013 |
| JP | 2013-546238 A | 12/2013 |
| JP | 2014-23083 A | 2/2014 |
| JP | 2014-60501 A | 4/2014 |
| JP | 2014-107836 A | 6/2014 |
| JP | 2014-123069 A | 7/2014 |
| JP | 2014-212415 A | 11/2014 |
| JP | 2015-1716 A | 1/2015 |
| JP | 2015-5255 A | 1/2015 |
| JP | 2015-22716 A | 2/2015 |
| JP | 2015-25897 A | 2/2015 |

(56) References Cited

FOREIGN PATENT DOCUMENTS

| | | |
|---|---|---|
| JP | 2015-50713 A | 3/2015 |
| JP | 2015-76717 A | 4/2015 |
| JP | 2015-91098 A | 5/2015 |
| JP | 2015-104031 A | 6/2015 |
| JP | 2015-111822 A | 6/2015 |
| JP | 2015-149095 A | 8/2015 |
| JP | 2015-534742 A | 12/2015 |
| JP | 2016-39613 A | 3/2016 |
| JP | 2016-66978 A | 4/2016 |
| JP | 2016-72965 A | 5/2016 |
| JP | 2016-129315 A | 7/2016 |
| JP | 2016-175175 A | 10/2016 |
| JP | 2017-34474 A | 2/2017 |
| JP | 2017-521737 A | 8/2017 |
| JP | 2018-10488 A | 1/2018 |
| JP | 2018-107711 A | 7/2018 |
| JP | 2018-117186 A | 7/2018 |
| JP | 2018-121235 A | 8/2018 |
| JP | 2019-507928 A | 3/2019 |
| JP | 2019-62556 A | 4/2019 |
| JP | 2019-203399 A | 11/2019 |
| JP | 2020-42602 A | 3/2020 |
| JP | 6982047 B2 | 11/2021 |
| KR | 10-2009-0096833 A | 9/2009 |
| KR | 10-2012-0004928 A | 1/2012 |
| KR | 10-2012-0025872 A | 3/2012 |
| KR | 10-2012-0048397 A | 5/2012 |
| KR | 10-2012-0054406 A | 5/2012 |
| KR | 10-2012-0057696 A | 6/2012 |
| KR | 10-2012-0093322 A | 8/2012 |
| KR | 10-2013-0033445 A | 4/2013 |
| KR | 10-1341095 B1 | 12/2013 |
| KR | 10-1343591 B1 | 12/2013 |
| KR | 10-2014-0019631 A | 2/2014 |
| KR | 10-2014-0049850 A | 4/2014 |
| KR | 10-2014-0062801 A | 5/2014 |
| KR | 10-2015-0014290 A | 2/2015 |
| KR | 10-2016-0019145 A | 2/2016 |
| KR | 10-2016-0020396 A | 2/2016 |
| KR | 10-2016-0020791 A | 2/2016 |
| KR | 10-2016-0075583 A | 6/2016 |
| KR | 10-1674959 B1 | 11/2016 |
| KR | 10-2017-0123125 A | 11/2017 |
| KR | 101799223 B1 | 11/2017 |
| KR | 10-2017-0135975 A | 12/2017 |
| KR | 10-2018-0024761 A | 3/2018 |
| KR | 10-2018-0037076 A | 4/2018 |
| KR | 10-2018-0095331 A | 8/2018 |
| KR | 10-2018-0108847 A | 10/2018 |
| KR | 10-2018-0116574 A | 10/2018 |
| KR | 10-2018-0137610 A | 12/2018 |
| KR | 10-1939253 B1 | 1/2019 |
| KR | 10-2019-0034248 A | 4/2019 |
| KR | 10-2020-0001601 A | 1/2020 |
| KR | 10-2020-0130139 A | 11/2020 |
| KR | 10-2020-0140378 A | 12/2020 |
| WO | 99/39307 A1 | 8/1999 |
| WO | 2005/043892 A1 | 5/2005 |
| WO | 2007/126707 A1 | 11/2007 |
| WO | 2008/014301 A2 | 1/2008 |
| WO | 2008/020655 A1 | 2/2008 |
| WO | 2009/078091 A1 | 6/2009 |
| WO | 2010/059426 A2 | 5/2010 |
| WO | 2010/077048 A2 | 7/2010 |
| WO | 2010/102678 A1 | 9/2010 |
| WO | 2010/077048 A3 | 10/2010 |
| WO | 2010/131869 A2 | 11/2010 |
| WO | 2010/134275 A1 | 11/2010 |
| WO | 2011/007264 A1 | 1/2011 |
| WO | 2010/131869 A3 | 2/2011 |
| WO | 2010/059426 A3 | 5/2011 |
| WO | 2012/001947 A1 | 1/2012 |
| WO | 2012/006251 A1 | 1/2012 |
| WO | 2012/019163 A2 | 2/2012 |
| WO | 2012/051720 A2 | 4/2012 |
| WO | 2013/136394 A1 | 9/2013 |
| WO | 2013/169849 A2 | 11/2013 |
| WO | 2014/066115 A1 | 5/2014 |
| WO | 2014/109125 A1 | 7/2014 |
| WO | 2014/159779 A1 | 10/2014 |
| WO | 2014/160819 A1 | 10/2014 |
| WO | 2014/165141 A1 | 10/2014 |
| WO | 2014/200734 A1 | 12/2014 |
| WO | 2014/200798 A1 | 12/2014 |
| WO | 2015/023044 A1 | 2/2015 |
| WO | 2015/026864 A1 | 2/2015 |
| WO | 2015/034969 A2 | 3/2015 |
| WO | 2015/080744 A1 | 6/2015 |
| WO | 2015/085042 A1 | 6/2015 |
| WO | 2015/112868 A1 | 7/2015 |
| WO | 2014/200798 A8 | 8/2015 |
| WO | 2015/183438 A1 | 12/2015 |
| WO | 2015/187494 A1 | 12/2015 |
| WO | 2015/190666 A1 | 12/2015 |
| WO | 2016/024440 A1 | 2/2016 |
| WO | 2016/028806 A1 | 2/2016 |
| WO | 2016/028807 A1 | 2/2016 |
| WO | 2016/028808 A1 | 2/2016 |
| WO | 2016/028809 A1 | 2/2016 |
| WO | 2016/073804 A2 | 5/2016 |
| WO | 2016/073804 A3 | 7/2016 |
| WO | 2016/144563 A1 | 9/2016 |
| WO | 2016/172619 A1 | 10/2016 |
| WO | 2016/204936 A1 | 12/2016 |
| WO | 2016/208539 A1 | 12/2016 |
| WO | 2017/051605 A1 | 3/2017 |
| WO | 2017/058834 A1 | 4/2017 |
| WO | 2017/187573 A1 | 11/2017 |
| WO | 2017/218193 A1 | 12/2017 |
| WO | 2018/012395 A1 | 1/2018 |
| WO | 2018/048838 A1 | 3/2018 |
| WO | 2018/057267 A1 | 3/2018 |
| WO | 2018/057268 A1 | 3/2018 |
| WO | 2018/099037 A1 | 6/2018 |
| WO | 2018/144339 A2 | 8/2018 |
| WO | 2018/159864 A1 | 9/2018 |
| WO | 2018/222244 | 12/2018 |
| WO | 2018/226264 A1 | 12/2018 |
| WO | 2019/050562 A1 | 3/2019 |
| WO | 2019/118933 A1 | 6/2019 |
| WO | 2019/217148 A1 | 11/2019 |
| WO | 2021/093793 A1 | 5/2021 |
| WO | 2024/001513 A1 | 1/2024 |

OTHER PUBLICATIONS

Notice of Acceptance received for Australian Patent Application No. 2023200607, mailed on May 9, 2024, 3 pages.
Office Action received for European Patent Application No. 20728854.9, mailed on May 7, 2024, 10 pages.
Corrected Notice of Allowance received for U.S. Appl. No. 18/196,997, mailed on Nov. 15, 2024, 2 pages.
Corrected Notice of Allowance received for U.S. Appl. No. 18/628,021, mailed on Sep. 12, 2024, 2 pages.
Decision to Grant received for Japanese Patent Application No. 2024-060293, mailed on Oct. 15, 2024, 3 pages (1 page of English Translation and 2 pages of Official Copy).
Egg Flakes, "Use Slow Shutter to capture night scenes and light trails", Online available at: https://www.jianshu.com/p/6c742da00d3c, Mar. 8, 2018, 5 pages (1 page of English Translation and 4 pages of Official Copy).
Non-Final Office Action received for U.S. Appl. No. 18/137,369, mailed on Dec. 4, 2024, 13 pages.
Non-Final Office Action received for U.S. Appl. No. 18/423,234, mailed on Sep. 16, 2024, 9 pages.
Notice of Acceptance received for Australian Patent Application No. 2024213126, mailed on Oct. 30, 2024, 3 pages.
Notice of Allowance received for Chinese Patent Application No. 202210849316.2, mailed on Nov. 9, 2024, 4 pages (1 page of English Translation and 3 pages of Official Copy).
Notice of Allowance received for Korean Patent Application No. 10-2023-7016569, mailed on Sep. 10, 2024, 7 pages (2 pages of English Translation and 5 pages of Official Copy).

(56) References Cited

OTHER PUBLICATIONS

Notice of Allowance received for Korean Patent Application No. 10-2023-7041271, mailed on Nov. 24, 2024, 7 pages (2 pages of English Translation and 5 pages of Official Copy).
Notice of Allowance received for U.S. Appl. No. 17/546,968, mailed on Sep. 13, 2024, 25 pages.
Notice of Allowance received for U.S. Appl. No. 17/846,962, mailed on Oct. 25, 2024, 2 pages.
Notice of Allowance received for U.S. Appl. No. 17/846,962, mailed on Sep. 30, 2024, 8 pages.
Notice of Allowance received for U.S. Appl. No. 18/196,997, mailed on Nov. 4, 2024, 11 pages.
Office Action received for Australian Patent Application No. 2023226764, mailed on Nov. 13, 2024, 3 pages.
Office Action received for Australian Patent Application No. 2024213126, mailed on Sep. 26, 2024, 3 pages.
Office Action received for Chinese Patent Application No. 202010235395.9, mailed on Oct. 19, 2024, 12 pages (7 pages of English Translation and 5 pages of Official Copy).
Office Action received for Chinese Patent Application No. 202210849316.2, mailed on Aug. 30, 2024, 7 pages (4 pages of English Translation and 3 pages of Official Copy).
Office Action received for European Patent Application No. 23173036.7, mailed on Nov. 8, 2024, 5 pages.
Office Action received for Indian Patent Application No. 202218016788, mailed on Sep. 4, 2024, 5 pages.
Office Action received for Indian Patent Application No. 202218054598, mailed on Oct. 3, 2024, 5 pages.
Office Action received for Japanese Patent Application No. 2023-158354, mailed on Dec. 2, 2024, 6 pages (3 pages of English Translation and 3 pages of Official Copy).
Office Action received for Korean Patent Application No. 10-2023-0125143, mailed on Sep. 24, 2024, 9 pages (4 pages of English Translation and 5 pages of Official Copy).
Supplemental Notice of Allowance received for U.S. Appl. No. 17/546,968, mailed on Sep. 25, 2024, 2 pages.
Applicant-Initiated Interview Summary received for U.S. Appl. No. 17/546,968, mailed on Jan. 16, 2024, 3 pages.
Corrected Notice of Allowance received for U.S. Appl. No. 18/121,458, mailed on Jan. 18, 2024, 2 pages.
Summons to Attend Oral Proceedings received for European Patent Application No. 19707557.5, mailed on Jan. 26, 2024, 6 pages.
Office Action received for Chinese Patent Application No. 201980012481.9, mailed on Dec. 24, 2024, 17 pages (9 pages of English Translation and 8 pages of Official Copy).
Applicant-Initiated Interview Summary received for U.S. Appl. No. 17/466,824, mailed on Sep. 28, 2023, 2 pages.
Applicant-Initiated Interview Summary received for U.S. Appl. No. 17/479,897, mailed on Jun. 12, 2023, 2 pages.
Board Decision received for Chinese Patent Application No. 201811446867.4, mailed on Apr. 26, 2023, 21 pages (5 pages of English Translation and 16 pages of Official copy).
Brief Communication Regarding Oral Proceedings received for European Patent Application No. 21163791.3, mailed on Nov. 7, 2023, 4 pages.
Computerhilfen, "Whatsapp: Voice Message without Holding the Button", Retrieved from Internet: <https://www.youtube.com/watch?v=ofFCKvs5URw>, Jan. 14, 2018, 9 pages.
Corrected Notice of Allowance received for U.S. Appl. No. 17/041,412, mailed on May 17, 2023, 2 pages.
Corrected Notice of Allowance received for U.S. Appl. No. 17/479,897, mailed on Aug. 17, 2023, 2 pages.
Decision to Grant received for European Patent Application No. 20168009.7, mailed on Jun. 22, 2023, 4 pages.
Decision to Grant received for European Patent Application No. 20206197.4, mailed on Oct. 6, 2023, 4 pages.
Decision to Grant received for European Patent Application No. 20210373.5, mailed on May 19, 2023, 4 pages.
Decision to Grant received for European Patent Application No. 21733324.4, mailed on Jun. 2, 2023, 3 pages.
Decision to Grant received for Japanese Patent Application No. 2021-187533, mailed on Sep. 28, 2023, 3 pages (1 page of English Translation and 2 pages of Official Copy).
Extended European Search Report received for European Patent Application No. 23173036.7, mailed on Jul. 24, 2023, 13 pages.
Intention to Grant received for European Patent Application No. 20206196.6, mailed on Nov. 10, 2023, 10 pages.
Intention to Grant received for European Patent Application No. 20206197.4, mailed on May 25, 2023, 9 pages.
International Search Report and Written Opinion received for PCT Patent Application No. PCT/US2022/050916, mailed on May 15, 2023, 23 pages.
Non-Final Office Action received for U.S. Appl. No. 15/995,040, mailed on Jun. 7, 2023, 26 pages.
Non-Final Office Action received for U.S. Appl. No. 17/466,824, mailed on May 25, 2023, 33 pages.
Non-Final Office Action received for U.S. Appl. No. 17/479,897, mailed on Apr. 25, 2023, 14 pages.
Office Action received for U.S. Appl. No. 18/114,880, mailed on Aug. 29, 2023, 10 pages.
Non-Final Office Action received for U.S. Appl. No. 18/196,997, mailed on Nov. 20, 2023, 12 pages.
Notice of Acceptance received for Australian Patent Application No. 2022204465, mailed on May 26, 2023, 3 pages.
Notice of Acceptance received for Australian Patent Application No. 2022221466, mailed on Aug. 31, 2023, 3 pages.
Notice of Acceptance received for Australian Patent Application No. 2022228191, mailed on Oct. 10, 2023, 3 pages.
Notice of Allowance received for Korean Patent Application No. 10-2020-0124139, mailed on Jun. 19, 2023, 7 pages (2 pages of English Translation and 5 pages of Official Copy).
Notice of Allowance received for Korean Patent Application No. 10-2022-7033119, mailed on Jul. 26, 2023, 7 pages (2 pages of English Translation and 5 pages of Official Copy).
Notice of Allowance received for Korean Patent Application No. 10-2023-7009943, mailed on Aug. 31, 2023, 7 pages (2 pages of English Translation and 5 pages of Official Copy).
Notice of Allowance received for U.S. Appl. No. 17/041,412, mailed on Apr. 26, 2023, 11 pages.
Notice of Allowance received for U.S. Appl. No. 17/466,824, mailed on Nov. 8, 2023, 5 pages.
Notice of Allowance received for U.S. Appl. No. 17/479,897, mailed on Jul. 26, 2023, 7 pages.
Notice of Allowance received for U.S. Appl. No. 17/479,897, mailed on Oct. 3, 2023, 5 pages.
Notice of Allowance received for U.S. Appl. No. 17/510,168, mailed on May 3, 2023, 10 pages.
Notice of Allowance received for U.S. Appl. No. 18/114,880, mailed on Nov. 15, 2023, 11 pages.
Notice of Hearing received for Indian Patent Application No. 201818045872, mailed on Nov. 16, 2023, 2 pages.
Notice of Hearing received for Indian Patent Application No. 201818046896, mailed on Jul. 11, 2023, 2 pages.
Office Action received for Australian Patent Application No. 2022221466, mailed on Jun. 16, 2023, 2 pages.
Office Action received for Australian Patent Application No. 2022228121, mailed on Jul. 7, 2023, 3 pages.
Office Action received for Australian Patent Application No. 2022228121, mailed on Sep. 20, 2023, 3 pages.
Office Action received for Australian Patent Application No. 2022228191, mailed on Aug. 16, 2023, 4 pages.
Office Action received for Chinese Patent Application No. 201980012481.9, mailed on Jun. 8, 2023, 16 pages (9 pages of English Translation and 7 pages of Official Copy).
Office Action received for Chinese Patent Application No. 202110766668.7, mailed on Jun. 7, 2023, 13 pages (9 pages of English Translation and 4 pages of Official Copy).
Office Action received for European Patent Application No. 21157252.4, mailed on Jul. 24, 2023, 5 pages.
Office Action received for Japanese Patent Application No. 2021-187533, mailed on Jun. 26, 2023, 6 pages (3 pages of English Translation and 3 pages of Official Copy).

(56) References Cited

OTHER PUBLICATIONS

Office Action received for Japanese Patent Application No. 2022-095182, mailed on Sep. 25, 2023, 10 pages (5 pages of English Translation and 5 pages of Official Copy).
Office Action received for Japanese Patent Application No. 2022-130725, mailed on Sep. 4, 2023, 2 pages (1 page of English Translation and 1 page of Official Copy).
Office Action received for Japanese Patent Application No. 2022-145387, mailed on Oct. 2, 2023, 7 pages (3 pages of English Translation and 4 pages of Official Copy).
Summons to Attend Oral Proceedings received for European Patent Application No. 21163791.3, mailed on May 3, 2023, 6 pages.
Summons to Oral Proceedings received for European Patent Application No. 17184710.6, mailed on May 10, 2023, 3 pages.
Yuan, Ye, "Iphone 4s Original Secrets", China Railway Press, 2012, 15 pages (Official Copy Only). {See Communication under 37 CFR § 1.98(a) (3)}.
Extended European Search Report received for European Patent Application No. 24155758.6, mailed on Mar. 20, 2024, 11 pages.
Notice of Allowance received for U.S. Appl. No. 18/196,997, mailed on Mar. 28, 2024, 11 pages.
Result of Consultation received for European Patent Application No. 20206196.6, mailed on Mar. 27, 2024, 4 pages.
Applicant-Initiated Interview Summary received for U.S. Appl. No. 18/628,021, mailed on Aug. 5, 2024, 4 pages.
Notice of Allowance received for U.S. Appl. No. 17/846,962, mailed on Aug. 1, 2024, 7 pages.
Office Action received for Japanese Patent Application No. 2024-060293, mailed on Jul. 29, 2024, 6 pages (3 pages of English Translation and 3 pages of Official Copy).
Junxiang, Zhang, "Playing My New iPad", The Publishing House of Ordinance Industry, Sep. 30, 2012, pp. 217-219.
Advisory Action received for U.S. Appl. No. 16/144,629, mailed on Dec. 13, 2019, 9 pages.
Advisory Action received for U.S. Appl. No. 16/144,629, mailed on Jan. 6, 2021, 10 pages.
Applicant Initiated Interview Summary received for U.S. Appl. No. 17/190,879, mailed on Oct. 26, 2021, 3 pages.
Applicant-Initiated Interview Summary received for U.S. Appl. No. 16/271,583 mailed on Mar. 2, 2020, 3 pages.
Applicant-Initiated Interview Summary received for U.S. Appl. No. 16/271,583, mailed on Jul. 14, 2020, 4 pages.
Applicant-Initiated Interview Summary received for U.S. Appl. No. 15/995,040, mailed on Aug. 2, 2022, 5 pages.
Applicant-Initiated Interview Summary received for U.S. Appl. No. 15/995,040, mailed on Dec. 23, 2019, 5 pages.
Applicant-Initiated Interview Summary received for U.S. Appl. No. 15/995,040, mailed on Jul. 27, 2020, 4 pages.
Applicant-Initiated Interview Summary received for U.S. Appl. No. 15/995,040, mailed on Nov. 18, 2022, 5 pages.
Applicant-Initiated Interview Summary received for U.S. Appl. No. 15/995,040, mailed on Nov. 24, 2020, 4 pages.
Applicant-Initiated Interview Summary received for U.S. Appl. No. 16/144,629, mailed on Jul. 2, 2020, 5 pages.
Applicant-Initiated Interview Summary received for U.S. Appl. No. 16/144,629, mailed on Nov. 23, 2020, 3 pages.
Applicant-Initiated Interview Summary received for U.S. Appl. No. 16/528,257, mailed on Nov. 18, 2021, 2 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/584,100, mailed on Feb. 19, 2020, 3 pages.
Applicant-Initiated Interview Summary received for U.S. Appl. No. 16/586,344, mailed on Feb. 27, 2020, 3 pages.
Applicant-Initiated Interview Summary received for U.S. Appl. No. 17/027,317, mailed on Dec. 21, 2020, 4 pages.
Applicant-Initiated Interview Summary received for U.S. Appl. No. 17/220,596, mailed on Aug. 18, 2021, 3 pages.
Applicant-Initiated Interview Summary received for U.S. Appl. No. 17/466,824, mailed on Oct. 5, 2022, 2 pages.
Applicant-Initiated Interview Summary received for U.S. Appl. No. 17/479,897, mailed on Oct. 31, 2022, 3 pages.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Certificate of Examination received for Australian Patent Application No. 2017100683, mailed on Jan. 16, 2018, 2 pages.
Certificate of Examination received for Australian Patent Application No. 2020100720, mailed on Nov. 11, 2020, 2 pages.
Certificate of Examination received for Australian Patent Application No. 2020104220, mailed on Apr. 1, 2021, 2 pages.
Certificate of Examination received for Australian Patent Application No. 2021103004, mailed on Sep. 13, 2021, 2 pages.
Certificate of Examination received for Australian Patent Application No. 2021107587, mailed on Apr. 29, 2022, 2 pages.
Corrected Notice of Allowance received for U.S. Appl. No. 14/641,251, mailed on Jun. 17, 2016, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/273,453, mailed on Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453, mailed on Nov. 27, 2017., 2 pages.
Corrected Notice of Allowance received for U.S. Appl. No. 15/273,503, mailed on Nov. 2, 2017, 2 pages.
Corrected Notice of Allowance received for U.S. Appl. No. 15/273,503, mailed on Nov. 24, 2017, 2 pages.
Corrected Notice of Allowance received for U.S. Appl. No. 15/858,175, mailed on Sep. 21, 2018, 2 pages.
Corrected Notice of Allowance received for U.S. Appl. No. 16/144,629, mailed on Apr. 21, 2022, 5 pages.
Corrected Notice of Allowance received for U.S. Appl. No. 16/144,629, mailed on Aug. 24, 2022, 6 pages.
Corrected Notice of Allowance received for U.S. Appl. No. 16/144,629, mailed on Jun. 23, 2022, 5 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/528,257, mailed on Feb. 3, 2022, 2 pages.
Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, mailed on Jan. 29, 2020, 3 pages.
Corrected Notice of Allowance received for U.S. Appl. No. 16/584,044, mailed on Mar. 4, 2020., 2 pages.
Corrected Notice of Allowance received for U.S. Appl. No. 16/584,100, mailed on Feb. 21, 2020, 9 pages.
Corrected Notice of Allowance received for U.S. Appl. No. 16/584,693, mailed on Feb. 21, 2020, 15 pages.
Corrected Notice of Allowance received for U.S. Appl. No. 16/584,693, mailed on Mar. 4, 2020, 2 pages.
Corrected Notice of Allowance received for U.S. Appl. No. 16/584,693, mailed on Mar. 20, 2020, 2 pages.

(56) References Cited

OTHER PUBLICATIONS

Corrected Notice of Allowance received for U.S. Appl. No. 16/586,314, mailed on Apr. 8, 2020, 5 pages.
Corrected Notice of Allowance received for U.S. Appl. No. 16/586,314, mailed on Mar. 4, 2020, 3 pages.
Corrected Notice of Allowance received for U.S. Appl. No. 16/586,344, mailed on Apr. 7, 2020, 4 pages.
Corrected Notice of Allowance received for U.S. Appl. No. 16/586,344, mailed on Jan. 23, 2020, 4 pages.
Corrected Notice of Allowance received for U.S. Appl. No. 16/586,344, mailed on Mar. 17, 2020, 4 pages.
Corrected Notice of Allowance received for U.S. Appl. No. 16/825,879, mailed on Aug. 13, 2021, 2 pages.
Corrected Notice of Allowance received for U.S. Appl. No. 16/825,879, mailed on Jul. 23, 2021, 2 pages.
Corrected Notice of Allowance received for U.S. Appl. No. 16/825,879, mailed on Sep. 15, 2021, 2 pages.
Corrected Notice of Allowance received for U.S. Appl. No. 16/835,651, mailed on Aug. 10, 2021, 4 pages.
Corrected Notice of Allowance received for U.S. Appl. No. 16/835,651, mailed on Aug. 13, 2021, 2 pages.
Corrected Notice of Allowance received for U.S. Appl. No. 16/835,651, mailed on Jul. 28, 2021, 4 pages.
Corrected Notice of Allowance received for U.S. Appl. No. 16/835,651, mailed on Jun. 14, 2021, 2 pages.
Corrected Notice of Allowance received for U.S. Appl. No. 17/027,484, mailed on May 14, 2021, 5 pages.
Corrected Notice of Allowance received for U.S. Appl. No. 17/027,484, mailed on May 28, 2021, 5 pages.
Corrected Notice of Allowance received for U.S. Appl. No. 17/190,879, mailed on Nov. 19, 2021, 2 pages.
Corrected Notice of Allowance received for U.S. Appl. No. 17/220,596, mailed on Nov. 4, 2021, 3 pages.
Corrected Notice of Allowance received for U.S. Appl. No. 17/220,596, mailed on Nov. 18, 2021, 27 pages.
Corrected Notice of Allowance received for U.S. Appl. No. 17/354,376, mailed on Apr. 11, 2022, 5 pages.
Corrected Notice of Allowance received for U.S. Appl. No. 17/354,376, mailed on Feb. 16, 2022, 5 pages.
Corrected Notice of Allowance received for U.S. Appl. No. 17/354,376, mailed on Mar. 23, 2022, 6 pages.
Corrected Notice of Allowance received for U.S. Appl. No. 17/740,032, mailed on Nov. 3, 2022, 6 pages.
Decision of Refusal received for Japanese Patent Application No. 2018-243463, mailed on Feb. 25, 2019, 8 pages (5 pages of English Translation and 3 pages of Official Copy).
Decision of Refusal received for Japanese Patent Application No. 2018-545502, mailed on Feb. 25, 2019, 11 pages (7 pages of English Translation and 4 pages of Official Copy).
Decision on Appeal received for Japanese Patent Application No. 2018-225131, mailed on Mar. 11, 2021, 5 pages (4 pages of English Translation and 1 page of Official Copy).
Decision on Appeal received for Japanese Patent Application No. 2018-545502, mailed on Mar. 25, 2021, 3 pages (1 page of English Translation and 2 pages of Official Copy).
Decision on Appeal received for U.S. Appl. No. 15/995,040, mailed on Dec. 29, 2021, 14 pages.
Decision on Appeal received for U.S. Appl. No. 16/144,629, mailed on Jan. 18, 2022, 8 pages.
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201670627, mailed on Nov. 29, 2018, 2 pages.
Decision to Grant received for Danish Patent Application No. PA201670753, mailed on Mar. 6, 2019, 2 pages.
Decision to Grant received for Danish Patent Application No. PA201670755, mailed on Mar. 6, 2019, 2 pages.
Decision to Grant received for Danish Patent Application No. PA201970593, mailed on Sep. 7, 2021, 2 pages.
Decision to Grant received for Danish Patent Application No. PA201970601, mailed on Feb. 3, 2021, 2 pages.
Decision to Grant received for Danish Patent Application No. PA201970603, mailed on May 21, 2021, 2 pages.
Decision to Grant received for European Patent Application No. 15712218.5, mailed on Jun. 7, 2018, 2 pages.
Decision to Grant received for European Patent Application No. 17809168.2, mailed on Oct. 21, 2021, 3 pages.
Decision to Grant received for European Patent Application No. 18176890.4, mailed on Jul. 9, 2020, 3 pages.
Decision to Grant received for European Patent Application No. 18183054.8, mailed on Jan. 21, 2021, 3 pages.
Decision to Grant received for European Patent Application No. 18209460.7, mailed on Apr. 9, 2021, 2 pages.
Decision to Grant received for European Patent Application No. 18214698.5, mailed on Sep. 10, 2020, 3 pages.
Decision to Grant received for Japanese Patent Application No. 2018-243463, mailed on Aug. 17, 2020, 2 pages (1 page of English Translation and 1 page of Official Copy).
Decision to Grant received for Japanese Patent Application No. 2019-203399, mailed on Oct. 20, 2021, 3 pages (1 page of English Translation and 2 pages of Official Copy).
Decision to Grant received for Japanese Patent Application No. 2020-070418, mailed on Feb. 8, 2021, 3 pages (1 page of English Translation and 2 pages of Official Copy).
Decision to Grant received for Japanese Patent Application No. 2020-184470, mailed on Jul. 1, 2021, 3 pages (1 page of English Translation and 2 pages of Official Copy).
Decision to Grant received for Japanese Patent Application No. 2020-184471, mailed on Jul. 1, 2021, 3 pages (1 page of English Translation and 2 pages of Official Copy).
Decision to Grant received for Japanese Patent Application No. 2021-051385, mailed on Jul. 8, 2021, 3 pages (1 page of English Translation and 2 pages of Official Copy).
Decision to Refuse received for European Patent Application No. 17184710.6, mailed on Jun. 16, 2020, 9 pages.
Decision to Refuse received for Japanese Patent Application No. 2018-225131, mailed on Jul. 8, 2019, 6 pages (4 pages of English Translation and 2 pages of Official Copy).
Decision to Refuse received for Japanese Patent Application No. 2018-243463, mailed on Jul. 8, 2019, 5 pages (3 pages of English Translation and 2 pages of Official Copy).
Decision to Refuse received for Japanese Patent Application No. 2018-545502, mailed on Jul. 8, 2019, 5 pages (3 pages of English Translation and 2 pages of Official Copy).
European Search Report received for European Patent Application No. 18209460.7, mailed on Mar. 15, 2019, 4 pages.
European Search Report received for European Patent Application No. 18214698.5, mailed on Mar. 21, 2019, 5 pages.
European Search Report received for European Patent Application No. 20206196.6, mailed on Dec. 8, 2020, 4 pages.
European Search Report received for European Patent Application No. 20206197.4, mailed on Nov. 30, 2020, 4 pages.
European Search Report received for European Patent Application No. 20210373.5, mailed on Apr. 13, 2021, 4 pages.
European Search Report received for European Patent Application No. 21157252.4, mailed on Apr. 16, 2021, 4 pages.
European Search Report received for European Patent Application No. 21163791.3, mailed on May 6, 2021, 5 pages.
Examiner Initiated-Interview Summary received for U.S. Appl. No. 16/528,941, mailed on Dec. 1, 2020, 2 pages.
Examiner-Initiated Interview Summary received for U.S. Appl. No. 17/220,596, mailed on Oct. 7, 2021, 2 pages.
Examiner's Answer to Appeal Brief received for U.S. Appl. No. 15/995,040, mailed on Jun. 23, 2021, 31 pages.
Examiner's Answer to Appeal Brief received for U.S. Appl. No. 16/144,629, mailed on Jul. 21, 2021, 21 pages.
Extended European Search Report received for European Patent Application No. 20168009.7, mailed on Sep. 11, 2020, 12 pages.
Extended Search Report received for European Patent Application 17809168.2, mailed on Jun. 28, 2018, 9 pages.

(56) References Cited

OTHER PUBLICATIONS

Final Office Action received for U.S. Appl. No. 15/268,115, mailed on Oct. 11, 2017., 48 pages.
Final Office Action received for U.S. Appl. No. 15/995,040, mailed on Oct. 6, 2022, 27 pages.
Final Office Action received for U.S. Appl. No. 15/995,040, mailed on Oct. 17, 2019, 20 pages.
Final Office Action received for U.S. Appl. No. 15/995,040, mailed on Sep. 2, 2020, 21 pages.
Final Office Action received for U.S. Appl. No. 16/144,629, mailed on Sep. 11, 2020, 22 pages.
Final Office Action received for U.S. Appl. No. 16/144,629, mailed on Sep. 18, 2019, 22 pages.
Final Office Action received for U.S. Appl. No. 16/271,583, mailed on Aug. 26, 2020, 18 pages.
Final Office Action received for U.S. Appl. No. 16/528,941, mailed on Jul. 13, 2020, 15 pages.
Final Office Action received for U.S. Appl. No. 17/466,824, mailed on Nov. 25, 2022, 35 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA201670627, mailed on Jun. 11, 2018, 2 pages.
Intention to Grant received for Danish Patent Application No. PA201670753, mailed on Oct. 29, 2018, 2 pages.
Intention to Grant received for Danish Patent Application No. PA201670755, mailed on Nov. 13, 2018, 2 pages.
Intention to Grant received for Danish Patent Application No. PA201970593, mailed on Apr. 13, 2021, 2 pages.
Intention to Grant received for Danish Patent Application No. PA201970601, mailed on Sep. 21, 2020, 2 pages.
Intention to Grant received for Danish Patent Application No. PA201970603, mailed on Jan. 13, 2021, 2 pages.
Intention to Grant received for Danish Patent Application No. PA202070611, mailed on May 5, 2021, 2 pages.
Intention to Grant received for European Patent Application No. 15712218.5, mailed on Jan. 24, 2018, 7 pages.
Intention to Grant received for European Patent Application No. 17809168.2, mailed on Jun. 25, 2021, 8 pages.
Intention to Grant received for European Patent Application No. 18176890.4, mailed on Feb. 28, 2020, 8 pages.
Intention to Grant received for European Patent Application No. 18183054.8, mailed on Nov. 5, 2020, 6 pages.
Intention to Grant received for European Patent Application No. 18209460.7, mailed on Jan. 15, 2021, 8 pages.
Intention to Grant received for European Patent Application No. 18214698.5, mailed on Apr. 21, 2020, 8 pages.
Intention to Grant received for European Patent Application No. 20168009.7, mailed on May 17, 2022, 9 pages.
Intention to Grant received for European Patent Application No. 20168009.7, mailed on Oct. 31, 2022, 9 pages.
Intention to Grant received for European Patent Application No. 21733324.4, mailed on Sep. 13, 2022, 7 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2017/035321, mailed on Dec. 27, 2018, 11 Pages.
International Preliminary Report on Patentability received for PCT Patent Application No. PCT/US2019/017363, mailed on Aug. 20, 2020, 9 pages.
International Preliminary Report on Patentability received for PCT Patent Application No. PCT/US2019/049101, mailed on Mar. 25, 2021, 17 pages.
International Preliminary Report on Patentability received for PCT Patent Application No. PCT/US2020/031643, mailed on Nov. 18, 2021, 27 pages.
International Search Report and Written Opinion received for PCT Patent Application No. PCT/US2017/035321, mailed on Oct. 6, 2017, 15 pages.
International Search Report and Written Opinion received for PCT Patent Application No. PCT/US2019/017363, mailed on Aug. 12, 2019, 12 pages.
International Search Report and Written Opinion received for PCT Patent Application No. PCT/US2019/049101, mailed on Dec. 16, 2019, 26 pages.
International Search Report and Written Opinion received for PCT Patent Application No. PCT/US2020/031643, mailed on Dec. 2, 2020, 33 pages.
International Search Report and Written Opinion received for PCT Patent Application No. PCT/US2020/031643, mailed on Nov. 2, 2020, 34 pages.
International Search Report and Written Opinion received for PCT Patent Application No. PCT/US2021/034304, mailed on Oct. 11, 2021, 24 pages.
International Search Report and Written Opinion received for PCT Patent Application No. PCT/US2021/046877, mailed on Mar. 1, 2022, 17 pages.
Invitation to Pay Addition Fees received for PCT Patent Application No. PCT/US2017/035321, mailed on Aug. 17, 2017, 3 pages.
Invitation to Pay Additional Fees and Partial International Search Report received for PCT Patent Application No. PCT/US2019/049101, mailed on Oct. 24, 2019, 17 pages.
Invitation to Pay Additional Fees received for PCT Patent Application No. PCT/US2019/017363, mailed on Jun. 17, 2019, 8 pages.
Invitation to Pay Additional Fees received for PCT Patent Application No. PCT/US2020/031643, mailed on Sep. 9, 2020, 30 pages.
Invitation to Pay Additional Fees received for PCT Patent Application No. PCT/US2021/034304, mailed on Aug. 20, 2021, 16 pages.
Invitation to Pay Additional Fees received for PCT Patent Application No. PCT/US2021/046877, mailed on Jan. 5, 2022, 10 pages.
IPhone User Guide For iOS 4.2 and 4.3 Software, Available at https://manuals.info.apple.com/MANUALS/1000/MA1539/en_US/iPhone_iOS4_User_Guide.pdf, 2011, 274 pages.
Nikon Digital Camera D7200 User's Manual, online available at: https://download.nikonimglib.com/archive3/dbHI400jWws903mGr6q98a4k8F90/D7200UM_SG(En)05.pdf, 2005, 416 pages.
Non-Final Office Action received for U.S. Appl. No. 16/528,257, mailed on Jul. 30, 2021, 12 pages.
Non-Final Office Action received for U.S. Appl. No. 14/869,807, mailed on Dec. 2, 2016, 23 pages.
Non-Final Office Action received for U.S. Appl. No. 15/268,115, mailed on Apr. 13, 2017, 44 pages.
Non-Final Office Action received for U.S. Appl. No. 15/273,522, mailed on Nov. 30, 2016, 15 pages.
Non-Final Office Action received for U.S. Appl. No. 15/273,544, mailed on May 25, 2017, 18 pages.
Non-Final Office Action received for U.S. Appl. No. 15/995,040, mailed on Apr. 8, 2022, 21 pages.
Non-Final Office Action received for U.S. Appl. No. 15/995,040, mailed on Apr. 15, 2020, 19 pages.
Non-Final Office Action received for U.S. Appl. No. 15/995,040, mailed on May 16, 2019, 24 pages.
Non-Final Office Action received for U.S. Appl. No. 16/144,629, mailed on Mar. 13, 2020, 24 pages.
Non-Final Office Action received for U.S. Appl. No. 16/144,629, mailed on Mar. 29, 2019, 18 pages.
Non-Final Office Action received for U.S. Appl. No. 16/271,583, mailed on May 6, 2020, 24 pages.
Non-Final Office Action received for U.S. Appl. No. 16/271,583, mailed on Nov. 29, 2019, 18 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/582,595, mailed on Nov. 26, 2019, 17 pages.

(56) References Cited

OTHER PUBLICATIONS

Non-Final Office Action received for U.S. Appl. No. 16/583,020, mailed on Nov. 14, 2019, 9 pages.
Non-Final Office Action received for U.S. Appl. No. 16/825,879, mailed on May 5, 2021, 12 pages.
Non-Final Office Action received for U.S. Appl. No. 17/027,317, mailed on Nov. 17, 2020, 17 pages.
Non-Final Office Action received for U.S. Appl. No. 17/190,879, mailed on Oct. 13, 2021, 10 pages.
Non-Final Office Action received for U.S. Appl. No. 17/220,596, mailed on Jun. 10, 2021, 31 pages.
Non-Final Office Action received for U.S. Appl. No. 17/466,824, mailed on May 11, 2022, 30 pages.
Non-Final Office Action received for U.S. Appl. No. 17/479,897, mailed on Aug. 30, 2022, 10 pages.
Notice of Acceptance received for Australian Patent Application No. 2017286130, mailed on Apr. 26, 2019, 3 pages.
Notice of Acceptance received for Australian Patent Application No. 2019213341, mailed on Aug. 25, 2020, 3 pages.
Notice of Acceptance received for Australian Patent Application No. 2019218241, mailed on Mar. 9, 2022, 3 pages.
Notice of Acceptance received for Australian Patent Application No. 2019338180, mailed on Jun. 27, 2022, 3 pages.
Notice of Acceptance received for Australian Patent Application No. 2020239717, mailed on Jun. 1, 2022, 3 pages.
Notice of Acceptance received for Australian Patent Application No. 2020260413, mailed on Oct. 14, 2021, 3 pages.
Notice of Acceptance received for Australian Patent Application No. 2020267151, mailed on Dec. 9, 2020, 3 pages.
Notice of Acceptance received for Australian Patent Application No. 2020277216, mailed on Mar. 15, 2021, 3 pages.
Notice of Acceptance received for Australian Patent Application No. 2021201167, mailed on Mar. 15, 2021, 3 pages.
Notice of Acceptance received for Australian Patent Application No. 2021203210, mailed on Jul. 9, 2021, 3 pages.
Notice of Acceptance received for Australian Patent Application No. 2021254567, mailed on Nov. 17, 2021, 3 pages.
Notice of Acceptance received for Australian Patent Application No. 2022200966, mailed on Feb. 25, 2022, 3 pages.
Notice of Acceptance received for Australian Patent Application No. 2022202377, mailed on May 11, 2022, 3 pages.
Notice of Allowance received for Brazilian Patent Application No. 112018074765-3, mailed on Oct. 8, 2019, 2 pages (1 page of English Translation and 1 page of Official Copy).
Notice of Allowance received for Chinese Patent Application No. 201580046237.6, mailed on Aug. 29, 2018, 4 pages (1 page of English Translation and 3 pages of Official copy).
Notice of Allowance received for Chinese Patent Application No. 201710657424.9, mailed on May 8, 2020, 2 pages (1 page of English Translation and 1 page of Official Copy).
Notice of Allowance received for Chinese Patent Application No. 201780002533.5, mailed on Apr. 14, 2020, 2 pages (1 page of English Translation and 1 page of Official Copy).
Notice of Allowance received for Chinese Patent Application No. 201810566134.8, mailed on Apr. 7, 2020, 3 pages (1 page of English Translation and 2 pages of Official Copy).
Notice of Allowance received for Chinese Patent Application No. 201810664927.3, mailed on Jul. 19, 2019, 2 pages (1 page of English Translation and 1 page of Official Copy).
Notice of Allowance received for Chinese Patent Application No. 201811512767.7, mailed on Jul. 27, 2020, 4 pages (1 page of English Translation and 3 pages of Official Copy).
Notice of Allowance received for Chinese Patent Application No. 202010287950.2, mailed on Mar. 22, 2022, 7 pages (03 pages of English Translation and 04 pages of Official Copy).
Notice of Allowance received for Chinese Patent Application No. 202010287953.6, mailed on Mar. 18, 2021, 7 pages (3 pages of English Translation and 4 pages of Official Copy).
Notice of Allowance received for Chinese Patent Application No. 202010287958.9, mailed on Aug. 27, 2021, 6 pages (3 pages of English Translation and 3 pages of Official Copy).
Notice of Allowance received for Chinese Patent Application No. 202010287961.0, mailed on Mar. 9, 2021, 8 pages (4 pages of English Translation and 4 pages of Official Copy).
Notice of Allowance received for Chinese Patent Application No. 202010287975.2, mailed on Mar. 1, 2021, 7 pages (3 pages of English Translation and 4 pages of Official Copy).
Notice of Allowance received for Chinese Patent Application No. 202010600151.6, mailed on Aug. 13, 2021, 2 pages (1 page of English Translation and 1 page of Official Copy).
Notice of Allowance received for Chinese Patent Application No. 202010600197.8, mailed on Feb. 9, 2022, 5 pages (1 page of English Translation and 4 pages of Official Copy).
Notice of Allowance received for Chinese Patent Application No. 202010601484.0, mailed on Nov. 23, 2021, 2 pages (1 page of English Translation and 1 page of Official Copy).
Notice of Allowance received for Chinese Patent Application No. 202011480411.7, mailed on Feb. 18, 2022, 6 pages (3 pages of English Translation and 3 pages of Official Copy).
Notice of Allowance received for Chinese Patent Application No. 202180002106.3, mailed on May 5, 2022, 6 pages (3 pages of English Translation and 3 pages of Official Copy).
Notice of Allowance received for Japanese Patent Application No. 2018-171188, mailed on Jul. 16, 2019, 3 pages (1 page of English Translation and 2 pages of Official Copy).
Notice of Allowance received for Japanese Patent Application No. 2020-159338, mailed on Jul. 19, 2022, 3 pages (1 page of English Translation and 2 pages of Official Copy).
Notice of Allowance received for Japanese Patent Application No. 2020-542592, mailed on Nov. 14, 2022, 2 pages (1 page of English Translation and 1 page of Official Copy).
Notice of Allowance received for Japanese Patent Application No. 2021-510849, mailed on May 16, 2022, 4 pages (1 page of English Translation and 3 pages of Official Copy).
Notice of Allowance received for Japanese Patent Application No. 2021-565919, mailed on Oct. 3, 2022, 3 pages (1 page of English Translation and 2 of pages Official Copy).
Notice of Allowance received for Korean Patent Application No. 10-2018-7026743, mailed on Mar. 20, 2019, 7 pages (1 page of English Translation and 6 pages of Official Copy).
Notice of Allowance received for Korean Patent Application No. 10-2018-7028849, mailed on Feb. 1, 2019, 4 pages (1 page of English Translation and 3 pages of Official Copy).
Notice of Allowance received for Korean Patent Application No. 10-2018-7034780, mailed on Jun. 19, 2019, 4 pages (1 page of English Translation and 3 pages of Official Copy).
Notice of Allowance received for Korean Patent Application No. 10-2018-7036893, mailed on Jun. 12, 2019, 4 pages (1 page of English Translation and 3 pages of Official Copy).
Notice of Allowance received for Korean Patent Application No. 10-2019-7027042, mailed on Nov. 26, 2020, 4 pages (1 page of English Translation and 3 pages of Official Copy).
Notice of Allowance received for Korean Patent Application No. 10-2020-0052618, mailed on Mar. 23, 2021, 5 pages (2 page of English Translation and 3 pages of Official Copy).
Notice of Allowance received for Korean Patent Application No. 10-2020-0143726, mailed on Nov. 10, 2020, 5 pages (2 pages of English Translation and 3 pages of Official Copy).
Notice of Allowance received for Korean Patent Application No. 10-2020-0155924, mailed on Nov. 23, 2020, 7 pages (2 pages of English Translation and 5 pages of Official Copy).
Notice of Allowance received for Korean Patent Application No. 10-2020-7022663, mailed on Jun. 23, 2022, 6 pages (2 pages of English Translation and 4 pages of Official Copy).
Notice of Allowance received for Korean Patent Application No. 10-2021-0022053, mailed on Nov. 23, 2021, 5 pages (2 pages of English Translation and 3 pages of Official Copy).
Notice of Allowance received for Korean Patent Application No. 10-2021-7000954, mailed on Aug. 18, 2021, 5 pages (2 pages of English Translation and 3 pages of Official Copy).

(56) References Cited

OTHER PUBLICATIONS

Notice of Allowance received for Korean Patent Application No. 10-2021-7035687, mailed on Dec. 30, 2021, 5 pages (1 page of English Translation and 4 pages of Official Copy).
Notice of Allowance received for Korean Patent Application No. 10-2021-7036337, mailed on Apr. 5, 2022, 4 pages (1 page of English Translation and 3 pages of Official Copy).
Notice of Allowance received for Korean Patent Application No. 10-2022-7023077, mailed on Nov. 1, 2022, 8 pages (2 pages of English Translation and 6 pages of Official Copy).
Notice of Allowance received for Taiwanese U.S. Appl. No. 15/273,544, mailed on Jun. 12, 2017, 3 pages (Official Copy Only). {See Communication under 37 CFR § 1.98(a) (3)}.
Notice of Allowance received for U.S. Appl. No. 15/273,544, mailed on Aug. 10, 2021, 5 pages.
Notice of Allowance received for U.S. Appl. No. 15/273,544, mailed on May 19, 2021, 5 pages.
Notice of Allowance received for U.S. Appl. No. 15/273,544, mailed on May 18, 2016, 13 pages.
Notice of Allowance received for U.S. Appl. No. 15/273,544, mailed on Jun. 21, 2017., 9 Pages.
Notice of Allowance received for U.S. Appl. No. 15/273,544, mailed on Oct. 10, 2017., 9 pages.
Notice of Allowance received for U.S. Appl. No. 15/268,115, mailed on Mar. 7, 2018, 15 pages.
Notice of Allowance received for U.S. Appl. No. 15/273,544, mailed on Oct. 12, 2017., 11 pages.
Notice of Allowance received for U.S. Appl. No. 15/273,544, mailed on Aug. 14, 2017, 9 pages.
Notice of Allowance received for U.S. Appl. No. 15/273,544, mailed on Mar. 28, 2017., 9 Pages.
Notice of Allowance received for U.S. Appl. No. 15/273,544, mailed on May 19, 2017, 2 pages.
Notice of Allowance received for U.S. Appl. No. 15/273,544, mailed on May 23, 2017, 2 pages.
Notice of Allowance received for U.S. Appl. No. 15/273,544, mailed on Mar. 13, 2018, 8 pages.
Notice of Allowance received for U.S. Appl. No. 15/273,544, mailed on Oct. 27, 2017., 8 pages.
Notice of Allowance received for U.S. Appl. No. 15/858,175, mailed on Jun. 1, 2018, 8 pages.
Notice of Allowance received for U.S. Appl. No. 15/858,175, mailed on Sep. 12, 2018, 8 pages.
Notice of Allowance received for U.S. Appl. No. 15/975,581, mailed on Oct. 3, 2018, 25 pages.
Notice of Allowance received for U.S. Appl. No. 16/584,693, mailed on Apr. 7, 2022, 8 pages.
Notice of Allowance received for U.S. Appl. No. 16/584,693, mailed on Jul. 25, 2022, 10 pages.
Notice of Allowance received for U.S. Appl. No. 16/191,117, mailed on Oct. 29, 2019, 9 pages.
Notice of Allowance received for U.S. Appl. No. 16/584,693, mailed on Apr. 14, 2021, 6 pages.
Notice of Allowance received for U.S. Appl. No. 16/584,693, mailed on Dec. 9, 2020, 6 pages.
Notice of Allowance received for U.S. Appl. No. 16/584,693, mailed on Jul. 23, 2021, 6 pages.
Notice of Allowance received for U.S. Appl. No. 16/584,693, mailed on May 10, 2021, 3 pages.
Notice of Allowance received for U.S. Appl. No. 16/584,693, mailed on Jan. 14, 2022, 10 pages.
Notice of Allowance received for U.S. Appl. No. 16/584,693, mailed on Mar. 20, 2020, 9 pages.
Notice of Allowance received for U.S. Appl. No. 16/584,693, mailed on Apr. 1, 2020, 5 pages.
Notice of Allowance received for U.S. Appl. No. 16/584,693, mailed on Feb. 28, 2020, 5 pages.
Notice of Allowance received for U.S. Appl. No. 16/584,693, mailed on Dec. 11, 2019, 15 pages.
Notice of Allowance received for U.S. Appl. No. 16/584,693, mailed on Mar. 30, 2020, 16 pages.
Notice of Allowance received for U.S. Appl. No. 16/584,693, mailed on Nov. 14, 2019, 13 pages.
Notice of Allowance received for U.S. Appl. No. 16/584,693, mailed on Apr. 8, 2020, 12 pages.
Notice of Allowance received for U.S. Appl. No. 16/584,100, mailed on Jan. 14, 2020, 13 pages.
Notice of Allowance received for U.S. Appl. No. 16/584,693, mailed on Jan. 15, 2020, 15 pages.
Notice of Allowance received for U.S. Appl. No. 16/584,693, mailed on May 4, 2020, 12 pages.
Notice of Allowance received for U.S. Appl. No. 17/566,094, mailed on Apr. 1, 2020, 8 pages.
Notice of Allowance received for U.S. Appl. No. 17/566,094, mailed on Jan. 9, 2020, 10 pages.
Notice of Allowance received for U.S. Appl. No. 17/566,094, mailed on Dec. 16, 2019, 12 pages.
Notice of Allowance received for U.S. Appl. No. 17/566,094, mailed on Mar. 27, 2020, 12 pages.
Notice of Allowance received for U.S. Appl. No. 17/566,094, mailed on Jul. 13, 2021, 9 pages.
Notice of Allowance received for U.S. Appl. No. 17/566,094, mailed on Sep. 28, 2021, 8 pages.
Notice of Allowance received for U.S. Appl. No. 17/566,094, mailed on Jul. 23, 2021, 8 pages.
Notice of Allowance received for U.S. Appl. No. 17/566,094, mailed on Jun. 1, 2021, 10 pages.
Notice of Allowance received for U.S. Appl. No. 17/566,094, mailed on Nov. 10, 2021, 9 pages.
Notice of Allowance received for U.S. Appl. No. 17/566,094, mailed on Apr. 12, 2021, 7 pages.
Notice of Allowance received for U.S. Appl. No. 17/566,094, mailed on Jan. 13, 2021, 10 pages.
Notice of Allowance received for U.S. Appl. No. 17/566,094, mailed on May 3, 2021, 11 pages.
Notice of Allowance received for U.S. Appl. No. 17/566,094, mailed on Nov. 10, 2021, 8 pages.
Notice of Allowance received for U.S. Appl. No. 17/566,094, mailed on Oct. 21, 2021, 43 pages.
Notice of Allowance received for U.S. Appl. No. 17/566,094, mailed on Jan. 27, 2022, 10 pages.
Notice of Allowance received for U.S. Appl. No. 17/566,094, mailed on Mar. 4, 2022, 5 pages.
Notice of Allowance received for U.S. Appl. No. 17/566,094, mailed on Mar. 30, 2022, 5 pages.
Notice of Allowance received for U.S. Appl. No. 17/566,094, mailed on Nov. 22, 2022, 10 pages.
Notice of Allowance received for U.S. Appl. No. 17/732,191, mailed on Nov. 9, 2022, 12 pages.
Notice of Allowance received for U.S. Appl. No. 17/740,032, mailed on Oct. 13, 2022, 11 pages.
Office Action received for Australian Patent Application No. 2017100683, mailed on Sep. 20, 2017, 3 pages.
Office Action received for Australian Patent Application No. 2017100684, mailed on Jan. 24, 2018, 4 pages.
Office Action received for Australian Patent Application No. 2017100684, mailed on Oct. 5, 2017, 4 pages.
Office Action Received for Australian Patent Application No. 2017286130, mailed on Jan. 21, 2019, 4 pages.
Office Action received for Australian Patent Application No. 2019213341, mailed on Jun. 30, 2020, 6 pages.
Office Action received for Australian Patent Application No. 2019218241, mailed on Apr. 1, 2021, 3 pages.
Office Action received for Australian Patent Application No. 2019338180, mailed on Feb. 18, 2022, 3 pages.
Office Action received for Australian Patent Application No. 2020100720, mailed on Jul. 9, 2020, 7 pages.
Office Action received for Australian Patent Application No. 2020100720, mailed on Sep. 1, 2020, 5 pages.
Office Action received for Australian Patent Application No. 2020239717, mailed on Dec. 15, 2021, 6 pages.

(56) References Cited

OTHER PUBLICATIONS

Office Action received for Australian Patent Application No. 2020239717, mailed on Jun. 23, 2021, 7 pages.
Office Action received for Australian Patent Application No. 2020239717, mailed on Mar. 16, 2022, 4 pages.
Office Action received for Australian Patent Application No. 2020239717, mailed on Sep. 28, 2021, 6 pages.
Office Action received for Australian Patent Application No. 2020260413, mailed on Jun. 24, 2021, 2 pages.
Office Action received for Australian Patent Application No. 2020277216, mailed on Dec. 17, 2020, 5 pages.
Office Action received for Australian Patent Application No. 2021103004, mailed on Aug. 12, 2021, 5 pages.
Office Action received for Australian Patent Application No. 2021107587, mailed on Feb. 1, 2022, 6 pages.
Office Action received for Brazilian Patent Application No. BR122018076550-0, mailed on Sep. 28, 2022, 7 pages (1 page of English Translation and 6 pages of Official Copy).
Office Action received for Chinese Patent Application No. 201580046237.6, mailed on Feb. 6, 2018, 10 pages (5 pages of English Translation and 5 pages of Official Copy).
Office Action received for Chinese Patent Application No. 201710657424.9, mailed on Sep. 17, 2019, 23 pages (11 pages of English Translation and 12 pages of Official Copy).
Office Action received for Chinese Patent Application No. 201780002533.5, mailed on Apr. 25, 2019, 17 pages (7 pages of English Translation and 10 pages of Official Copy).
Office Action received for Chinese Patent Application No. 201780002533.5, mailed on Feb. 3, 2020, 6 pages (3 pages of English Translation and 3 pages of Official Copy).
Office Action received for Chinese Patent Application No. 201780002533.5, mailed on Sep. 26, 2019, 21 pages (9 pages of English Translation and 12 pages of Official Copy).
Office Action received for Chinese Patent Application No. 201810566134.8, mailed on Aug. 13, 2019, 14 pages (8 pages of English Translation and 6 pages of Official Copy).
Office Action received for Chinese Patent Application No. 201810664927.3, mailed on Mar. 28, 2019, 11 pages (5 pages of English Translation and 6 pages of Official Copy).
Office Action received for Chinese Patent Application No. 201811446867.4, mailed on Dec. 31, 2019, 12 pages (5 pages of English Translation and 7 pages of Official Copy).
Office Action received for Chinese Patent Application No. 201811446867.4, mailed on May 6, 2020, 10 pages (5 pages of English Translation and 5 pages of Official Copy).
Office Action received for Chinese Patent Application No. 201811446867.4, mailed on Sep. 8, 2020, 9 pages (4 pages of English Translation and 5 pages of Official Copy).
Office Action received for Chinese Patent Application No. 201811512767.7, mailed on Dec. 20, 2019, 14 pages (7 pages of English Translation and 7 pages of Official Copy).
Office Action received for Chinese Patent Application No. 201811512767.7, mailed on Jun. 4, 2020, 6 pages (3 pages of English Translation and 3 pages of Official Copy).
Office Action received for Chinese Patent Application No. 202010287950.2, mailed on Aug. 10, 2021, 12 pages (6 pages of English Translation and 6 pages of Official Copy).
Office Action received for Chinese Patent Application No. 202010287950.2, mailed on Feb. 20, 2021, 22 pages (10 pages of English Translation and 12 pages of Official Copy).
Office Action received for Chinese Patent Application No. 202010287950.2, mailed on Nov. 19, 2021, 8 pages (5 pages of English Translation and 3 pages of Official Copy).
Office Action received for Chinese Patent Application No. 202010287953.6, mailed on Jan. 14, 2021, 14 pages (7 pages of English Translation and 7 pages of Official Copy).
Office Action received for Chinese Patent Application No. 202010287958.9, mailed on Jan. 5, 2021, 16 pages (8 pages of English Translation and 8 pages of Official Copy).
Office Action received for Chinese Patent Application No. 202010287961.0, mailed on Dec. 30, 2020, 16 pages (8 pages of English Translation and 8 pages of Official Copy).
Office Action received for Chinese Patent Application No. 202010287975.2, mailed on Dec. 30, 2020, 17 pages (9 pages of English Translation and 8 pages of Official Copy).
Office Action received for Chinese Patent Application No. 202010600151.6, mailed on Apr. 29, 2021, 11 pages (5 pages of English Translation and 6 pages of Official copy).
Office Action received for Chinese Patent Application No. 202010600197.8, mailed on Jul. 2, 2021, 14 pages (6 pages of English Translation and 8 pages of Official Copy).
Office Action received for Chinese Patent Application No. 202010601484.0, mailed on Jun. 3, 2021, 13 pages (6 pages of English Translation and 7 pages of Official Copy).
Office Action received for Chinese Patent Application No. 202011480411.7, mailed on Aug. 2, 2021, 12 pages (6 pages of English Translation and 6 pages of Official Copy).
Office Action received for Chinese Patent Application No. 202011480411.7, mailed on Jan. 12, 2022, 7 pages (4 pages of English Translation and 3 pages of Official Copy).
Office Action received for Chinese Patent Application No. 202110766668.7, mailed on Feb. 16, 2022, 12 pages (6 pages of English Translation and 6 pages of Official Copy).
Office Action received for Chinese Patent Application No. 202110766668.7, mailed on Sep. 15, 2022, 18 pages (9 pages of English Translation and 9 pages of Official Copy).
Office Action received for Chinese Patent Application No. 202180002106.3, mailed on Feb. 16, 2022, 12 pages (6 pages of English Translation and 6 pages of Official Copy).
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Sep. 6, 2016, 4 pages.
Office Action received for Danish Patent Application No. PA201670627, mailed on Apr. 5, 2017, 3 pages.
Office Action received for Danish Patent Application No. PA201670627, mailed on Nov. 6, 2017, 2 pages.
Office Action received for Danish Patent Application No. PA201670627, mailed on Oct. 11, 2016, 8 pages.
Office Action received for Danish Patent Application No. PA201670753, mailed on Dec. 20, 2016, 7 pages.
Office Action received for Danish Patent Application No. PA201670753, mailed on Jul. 5, 2017., 4 pages.
Office Action received for Danish Patent Application No. PA201670753, mailed on Mar. 23, 2018, 5 pages.
Office Action received for Danish Patent Application No. PA201670755, mailed on Apr. 6, 2017, 5 pages.
Office Action received for Danish Patent Application No. PA201670755, mailed on Apr. 20, 2018, 2 pages.
Office Action received for Danish Patent Application No. PA201670755, mailed on Dec. 22, 2016, 6 pages.
Office Action received for Danish Patent Application No. PA201670755, mailed on Oct. 20, 2017., 4 pages.
Office Action received for Danish Patent Application No. PA201870623, mailed on Jan. 30, 2020, 2 pages.
Office Action received for Danish Patent Application No. PA201870623, mailed on Jul. 12, 2019, 4 pages.
Office Action received for Danish Patent Application No. PA201970592, mailed on Mar. 2, 2020, 5 pages.
Office Action received for Danish Patent Application No. PA201970592, mailed on Oct. 26, 2020, 5 pages.
Office Action received for Danish Patent Application No. PA201970593, mailed on Apr. 16, 2020, 2 pages.
Office Action received for Danish Patent Application No. PA201970593, mailed on Feb. 2, 2021, 2 pages.
Office Action received for Danish Patent Application No. PA201970593, mailed on Mar. 10, 2020, 4 pages.
Office Action received for Danish Patent Application No. PA201970595, mailed on Mar. 10, 2020, 4 pages.

(56) References Cited

OTHER PUBLICATIONS

Office Action received for Danish Patent Application No. PA201970600, mailed on Mar. 9, 2020, 5 pages.
Office Action received for Danish Patent Application No. PA201970601, mailed on Aug. 13, 2020, 3 pages.
Office Action received for Danish Patent Application No. PA201970601, mailed on Jan. 31, 2020, 3 pages.
Office Action received for Danish Patent Application No. PA201970601, mailed on Nov. 11, 2019, 8 pages.
Office Action received for Danish Patent Application No. PA201970603, mailed on Nov. 4, 2020, 3 pages.
Office Action received for Danish Patent Application No. PA201970605, mailed on Mar. 10, 2020, 5 pages.
Office Action received for Danish Patent Application No. PA202070611, mailed on Dec. 22, 2020, 7 pages.
Office Action received for European Patent Application 17809168.2, mailed on Jan. 7, 2020, 5 pages.
Office Action received for European Patent Application 17809168.2, mailed on Oct. 8, 2020, 4 pages.
Office Action received for European Patent Application No. 15712218.5, mailed on Aug. 3, 2017, 4 pages.
Office Action received for European Patent Application No. 17184710.6, mailed on Dec. 21, 2018, 7 pages.
Office Action received for European Patent Application No. 18176890.4, mailed on Oct. 16, 2018, 8 pages.
Office Action received for European Patent Application No. 18183054.8, mailed on Feb. 24, 2020, 6 pages.
Office Action received for European Patent Application No. 18183054.8, mailed on Nov. 16, 2018, 8 Pages.
Office Action received for European Patent Application No. 18209460.7, mailed on Apr. 10, 2019, 7 pages.
Office Action received for European Patent Application No. 18209460.7, mailed on Apr. 21, 2020, 5 pages.
Office Action received for European Patent Application No. 18214698.5, mailed on Apr. 2, 2019, 8 pages.
Office Action received for European Patent Application No. 19707557.5, mailed on Jun. 3, 2022, 5 pages.
Office Action received for European Patent Application No. 20168009.7, mailed on Apr. 20, 2021, 6 pages.
Office Action received for European Patent Application No. 20168009.7, mailed on Sep. 13, 2021, 8 pages.
Office Action received for European Patent Application No. 20206196.6, mailed on Aug. 10, 2022, 13 pages.
Office Action received for European Patent Application No. 20206196.6, mailed on Jan. 13, 2021, 10 pages.
Office Action received for European Patent Application No. 20206197.4, mailed on Aug. 27, 2021, 6 pages.
Office Action received for European Patent Application No. 20206197.4, mailed on Jan. 12, 2021, 9 pages.
Office Action received for European Patent Application No. 20206197.4, mailed on Mar. 18, 2022, 7 pages.
Office Action received for European Patent Application No. 20210373.5, mailed on Dec. 9, 2021, 7 pages.
Office Action received for European Patent Application No. 20210373.5, mailed on May 10, 2021, 9 pages.
Office Action received for European Patent Application No. 20210373.5, mailed on May 31, 2022, 5 pages.
Office Action received for European Patent Application No. 21157252.4, mailed on Apr. 23, 2021, 8 pages.
Office Action received for European Patent Application No. 21163791.3, mailed on Jun. 2, 2021, 8 pages.
Office Action received for European Patent Application No. 21163791.3, mailed on Sep. 20, 2022, 6 pages.
Office Action received for Indian Patent Application No. 201817024430, mailed on Sep. 27, 2021, 8 pages.
Office Action received for Indian Patent Application No. 201818025015, mailed on Feb. 4, 2022, 7 pages.
Office Action received for Indian Patent Application No. 201818045872, mailed on Oct. 13, 2021, 7 pages.
Office Action received for Indian Patent Application No. 201818046896, mailed on Feb. 2, 2022, 7 pages.
Office Action received for Indian Patent Application No. 202014041530, mailed on Dec. 8, 2021, 7 pages.
Office Action received for Indian Patent Application No. 202118021941, mailed on Mar. 23, 2022, 5 pages.
Office Action received for Indian Patent Application No. 202118028159, mailed on Jun. 27, 2022, 6 pages.
Office Action received for Indian Patent Application No. 202215010325, mailed on Oct. 10, 2022, 7 pages.
Office Action received for Japanese Patent Application No. 2018-225131, mailed on Aug. 17, 2020, 21 pages (6 pages of English Translation and 15 pages of Official Copy).
Office Action received for Japanese Patent Application No. 2018-225131, mailed on Mar. 4, 2019, 10 pages (6 pages of English Translation and 4 pages of Official Copy).
Office Action received for Japanese Patent Application No. 2018-545502, mailed on Aug. 17, 2020, 14 pages (6 pages of English Translation and 8 pages of Official Copy).
Office Action received for Japanese Patent Application No. 2019-203399, mailed on Aug. 10, 2021, 4 pages (2 pages of English Translation and 2 pages of Official Copy).
Office Action received for Japanese Patent Application No. 2020-070418, mailed on Aug. 3, 2020, 22 pages (14 pages of English Translation and 8 pages of Official Copy).
Office Action received for Japanese Patent Application No. 2020-159338, mailed on Dec. 8, 2021, 9 pages (5 pages of English Translation and 4 pages of Official Copy).
Office Action received for Japanese Patent Application No. 2020-184470, mailed on May 10, 2021, 3 pages (1 page of English Translation and 2 pages of Official Copy).
Office Action received for Japanese Patent Application No. 2020-184471, mailed on May 10, 2021, 3 pages (1 page of English Translation and 2 pages of Official Copy).
Office Action received for Japanese Patent Application No. 2020-542592, mailed on Aug. 1, 2022, 5 pages (2 pages of English Translation and 3 pages of Official Copy).
Office Action received for Japanese Patent Application No. 2020-542592, mailed on Sep. 21, 2021, 5 pages (3 pages of English Translation and 2 pages of Official Copy).
Office Action received for Japanese Patent Application No. 2021-565919, mailed on Jun. 13, 2022, 4 pages (2 pages of English Translation and 2 pages of Official Copy).
Office Action received for Korean Patent Application No. 10-2018-7026743, mailed on Jan. 17, 2019, 5 pages (2 pages of English Translation and 3 pages of Official Copy).
Office Action received for Korean Patent Application No. 10-2018-7034780, mailed on Apr. 4, 2019, 11 pages (5 pages of English Translation and 6 pages of Official Copy).
Office Action received for Korean Patent Application No. 10-2018-7036893, mailed on Apr. 9, 2019, 6 pages (2 pages of English Translation and 4 pages of Official Copy).
Office Action received for Korean Patent Application No. 10-2019-7027042, mailed on May 13, 2020, 6 pages (2 pages of English Translation and 4 pages of Official Copy).
Office Action received for Korean Patent Application No. 10-2020-0052618, mailed on Aug. 18, 2020, 11 pages (5 pages of English Translation and 6 pages of Official Copy).
Office Action received for Korean Patent Application No. 10-2020-7022663, mailed on Aug. 17, 2021, 11 pages (5 pages of English Translation and 6 pages of Official Copy).
Office Action received for Korean Patent Application No. 10-2021-0022053, mailed on Mar. 1, 2021, 11 pages (5 pages of English Translation and 6 pages of Official Copy).
Office Action received for Korean Patent Application No. 10-2021-7000954, mailed on Jan. 28, 2021, 5 pages (2 pages of English Translation and 3 pages of Official Copy).
Office Action received for Korean Patent Application No. 10-2021-7006145, mailed on Oct. 12, 2022, 14 pages (6 pages of English Translation and 8 pages of Official Copy).
Office Action received for Korean Patent Application No. 10-2021-7036337, mailed on Dec. 8, 2021, 6 pages (2 pages of English Translation and 4 pages of Official Copy).

(56) References Cited

OTHER PUBLICATIONS

Office Action received for Korean Patent Application No. 10-2022-7010505, mailed on Jun. 14, 2022, 5 pages (2 pages of English Translation and 3 pages of Official Copy).
Office Action received for Korean Patent Application No. 10-2022-7023077, mailed on Jul. 25, 2022, 6 pages (2 pages of English Translation and 4 pages of Official Copy).
Office Action received for Taiwanese Patent Application No. 104107328, mailed on Dec. 28, 2016, 4 pages (1 page of Search Report and 3 pages of Official Copy).
PreAppeal Review Report received for Japanese Patent Application No. 2018-225131, mailed on Jan. 24, 2020, 8 pages (4 pages of English Translation and 4 pages of Official Copy).
PreAppeal Review Report received for Japanese Patent Application No. 2018-545502, mailed on Jan. 24, 2020, 8 pages (3 pages of English Translation and 5 pages of Official Copy).
Procamera Capture the Moment, Online Available at: http://www.procamera-app.com/procamera_manual/ProCamera_Manual_EN.pdf, Apr. 21, 2016, 63 pages.
Record of Oral Hearing received for U.S. Appl. No. 16/144,629, mailed on Jan. 28, 2022, 13 pages.
Remote Shot for SmartWatch 2, Available online at:—https://play.google.com/store/apps/details?id=net.watea.sw2.rshot&hl=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Search Report and Opinion received for Danish Patent Application No. PA201870623, mailed on Dec. 20, 2018, 8 pages.
Search Report and Opinion received for Danish Patent Application No. PA201970592, mailed on Nov. 7, 2019, 8 pages.
Search Report and Opinion received for Danish Patent Application No. PA201970593, mailed on Oct. 29, 2019, 10 pages.
Search Report and Opinion received for Danish Patent Application No. PA201970595, mailed on Nov. 8, 2019, 16 pages.
Search Report and Opinion received for Danish Patent Application No. PA201970600, mailed on Nov. 5, 2019, 11 pages.
Search Report and Opinion received for Danish Patent Application No. PA201970603, mailed on Nov. 15, 2019, 9 pages.
Search Report and Opinion received for Danish Patent Application No. PA201970605, mailed on Nov. 12, 2019, 10 pages.
Sony Xperia XZ3 Camera Review—The Colors, Duke, The Colors! Android Headlines—Android News & Tech News, Available online at <https://www.youtube.com/watch?v=mwpYXzWVOgw>, See especially 1:02-1:27, 2:28-2:30, Nov. 3, 2018, 3 pages.
Summons to Attend Oral Proceedings received for European Patent Application No. 17184710.6, mailed on Sep. 17, 2019, 7 pages.
Supplementary European Search Report received for European Patent Application No. 18176890.4, mailed on Sep. 20, 2018, 4 pages.
Supplementary European Search Report received for European Patent Application No. 18183054.8, mailed on Oct. 11, 2018, 4 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
AstroVideo, "AstroVideo enables you to use a low-cost, low-light video camera to capture astronomical images.", Available online at: https://www.coaa.co.uk/astrovideo.htm, Retrieved on: Nov. 18, 2019, 5 pages.
Clover Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-more/, May 1, 2019, 8 pages.
Demetriou Soteris, "Analyzing & Designing the Security of Shared Resources On Smartphone Operating Systems", Dissertation, University of Illinois at Urbana-Champaign Online available at: https://www.ideals.illinois.edu/bitstream/handle/2142/100907/DEMETRIOU-DISSERTATION-2018.pdf?sequence=1&isAllowed=n, 2018, 211 pages.
Drunk Beauty Flower Digital Technology, "iPhone Xs Max Camera Tips, Tricks, Features and Complete Tutorial", Available online at: https://www.ixigua.com/6606874981844386308?wid_try=1, Oct. 2, 2018, 2 pages (Official Copy Only). {See Communication under 37 CFR § 1.98(a) (3)}.
Dutta Tushars., "Warning! iOS Apps With Camera Access Permission Can Spy On You", Online available at: https://web.archive.org/web/20180219092123/https://techviral.net/ios-apps-camera-can-spy/, Feb. 19, 2018, 3 pages.
Feng et al., "3D Direct Human-Computer Interface Paradigm Based on Free Hand Tracking", Chinese Journal of Computers, vol. 37, No. 6, Jun. 30, 2014, 15 pages (Official copy only). {See Communication under 37 CFR § 1.98(a) (3)}.
Franks Tech Help,"DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson Andrews., "Aspect Ratio: What it is and Why it Matters", Retrieved from <https://web.archive.org/web/20190331225429/https://digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at <https://web.archive.org/web/20180823142417/https://www.gsmarena.com/honor_10-review-1771p5.php>, Aug. 23, 2018, 11 pages.
Hall Brent, "Samsung Galaxy Phones Pro Mode (S7/S8/S9/Note 8/Note 9): When, why, & How to Use It", See Especially 3:18-5:57, Available Online at <https://www.youtube.com/watch?v=KwPxGUDRKTg>, Jun. 19, 2018, 3 pages.
Hernández Carlos, "Lens Blur in the New Google Camera App", Available online at: https://research.googleblog.com/2014/04/lens-blur-in-new-google-camera-app.html, https://ai.googleblog.com/2014/04/lens-blur-in-new-google-camera-app.html, Apr. 16, 2014, 6 pages.
Huawei Mobile PH, "Huawei P10 Tips & Tricks: Compose Portraits with Wide Aperture (Bokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Imagespacetv, "Olympus OM-D E-M1 Mark II—Highlights & Shadows with Gavin Hoey", Online available at: https://www.youtube.com/watch?v=goEhh1n--hQ, Aug. 3, 2018, 3 pages.
King Juliea., "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Osxdaily, "How to Zoom the Camera on iPhone", Available Online at: https://osxdaily.com/2012/04/18/zoom-camera-iphone/, Apr. 18, 2012, 6 pages.
Office action received for Danish Patent Application No. PA201570791, mailed on Apr. 6, 2016, 12 pages.
International Search Report and Written Opinion received for PCT Patent Application No. PCT/US2015/019298, mailed on Jul. 13, 2015, 17 pages.

(56) References Cited

OTHER PUBLICATIONS

PlayMemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Schiffhauer Alexander, "See the Light with Night Sight", Available online at: https://www.blog.google/products/pixel/see-light-night-sight, Nov. 14, 2018, 6 pages.
Shareit, "WhatsApp Easy Way to Record Long Voice Messages—New Update", Retrieved from Internet: <https://www.youtube.com/watch?v=3MVnYGt8v1I>, Apr. 7, 2018, 39 pages.
Shaw et al., ""Skills for Closeups Photography"", Watson-Guptill Publications, Nov. 1999, 5 pages (Official Copy Only). {See Communication under 37 CFR § 1.98(a) (3)}.
shiftdelete.net, "Oppo Reno 10x Zoom On Inceleme—Huawei P30 Pro'ya rakip mi geliyor?", Available online at <https://www.youtube.com/watch?v=ev2wIUztdrg>, See especially 5:34-6:05., Apr. 24, 2019, 2 pages.
Sigdel Prakash, "How to record WhatsApp voice massage without continue holding down button", Available Online at: https://www.youtube.com/watch?v=m3Hz6TXt0PA, Dec. 6, 2017, 9 pages.
Smart Reviews, "Honor10 AI Camera's In Depth Review", See Especially 2:37-2:48; 6:39-6:49, Available Online at <https://www.youtube.com/watch?v=oKFqRvxeDBQ>, May 31, 2018, 2 pages.
Sony, "User Guide, Xperia XZ3, H8416/H9436/H9493", Sony Mobile Communications Inc., Retrieved from <https://www-support-downloads.sonymobile.com/h8416/userguide_EN_H8416-H9436-H9493_2_Android9.0.pdf>, See pp. 86-102., 2018, 121 pages.
Tech Stuff, "Telegram 4.0: Video Messages + Telescope, Payments and more . . . ", Available Online at: https://www.youtube.com/watch?v=y0alJRPH7nQ, May 20, 2017, 6 pages.
Techsmith, "Snagit® 11 Snagit 11.4 Help", available at <http://assets.techsmith.com/Downloads/ua-tutorials-snagit-11/Snagit_11.pdf>, Jan. 2014, 146 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Avalaible online at <https://www.youtube.com/watch?v=TGCKxBuiO5c>, See especially 12:40-17:25, Oct. 7, 2018, 3 pages.
Tico et al., "Robust method of digital image stabilization", Nokia Research Center, ISCCSP, Malta, Mar. 12-14, 2008, pp. 316-321.
Travel Tech Sports Channel, "New WhatsApp update—voice message recording made easy-Want to record long voice messages", Available Online at: https://www.youtube.com/watch?v=SEviqgsAdUk, Nov. 30, 2017, 13 pages.
Vivo India, "Bokeh Mode | Vivo V9", Available Online at <https://www.youtube.com/watch?v=B5AIHhH5Rxs>, Mar. 25, 2018, 3 pages.
Whitacre Michele, "Photography 101 | Exposure Meter", Online available at: https://web.archive.org/web/20160223055834/http://www.michelewhitacrephotographyblog.com, Feb. 23, 2016, 4 pages.
Wong Richard, "Huawei Smartphone (P20/P10/P9, Mate 10/9) Wide Aperture Mode Demo", Available Online at <https://www.youtube.com/watch?v=eLY3LsZGDPA>, May 7, 2017, 2 pages.
Wu et al., "Security Threats to Mobile Multimedia Applications: Camera-Based Attacks on Mobile Phones", IEEE Communications Magazine, Available online at: http://www.ieeeprojectmadurai.in/BASE/ANDROID/Security%20Threats%20to%20Mobile.pdf, Mar. 2014, pp. 80-87.
Xeetechcare, "Samsung Galaxy S10—Super Night Mode & Ultra-Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Junxiang, Zhang, "Playing My New iPad", The Publishing House of Ordinance Industry, Sep. 30, 2012, pp. 217-219 (Official Copy only) {See Communication Under Rule 37 CFR § 1.98(a) (3)}.
Office Action received for Chinese Patent Application No. 201980012481.9, mailed on Nov. 21, 2023, 18 pages (10 pages of English Translation and 8 pages of Official Copy).
Office Action received for Indian Patent Application No. 202118028158, mailed on Apr. 22, 2024, 7 pages.
Decision to Refuse received for European Patent Application No. 21163791.3, mailed on Dec. 4, 2023, 16 pages.
Minutes of the Oral Proceedings received for European Patent Application No. 21163791.3, mailed on Dec. 1, 2023, 6 pages.
Non-Final Office Action received for U.S. Appl. No. 17/546,968, mailed on Nov. 24, 2023, 34 pages.
Notice of Allowance received for U.S. Appl. No. 18/121,458, mailed on Dec. 6, 2023, 9 pages.
Notice of Hearing received for Indian Patent Application No. 202118028159, mailed on Nov. 22, 2023, 2 pages.
Communication for Board of Appeal received for European Patent Application No. 17184710.6, mailed on Feb. 29, 2024, 13 pages.
Decision to Grant received for Japanese Patent Application No. 2022-145387, mailed on Mar. 4, 2024, 3 pages (1 page of English Translation and 2 pages of Official Copy).
Final Office Action received for U.S. Appl. No. 17/546,968, mailed on Mar. 19, 2024, 43 pages.
Notice of Allowance received for U.S. Appl. No. 17/466,824, mailed on Mar. 13, 2024, 5 pages.
Notice of Allowance received for U.S. Appl. No. 18/121,458, mailed on Mar. 12, 2024, 9 pages.
Applicant-Initiated Interview Summary received for U.S. Appl. No. 17/041,412, mailed on Jan. 31, 2023, 7 pages.
Applicant-Initiated Interview Summary received for U.S. Appl. No. 17/466,824, mailed on Apr. 20, 2023, 2 pages.
Board Opinion received for Chinese Patent Application No. 201811446867.4, mailed on Feb. 14, 2023, 11 pages (4 pages of English Translation and 7 pages of Official Copy).
Corrected Notice of Allowance received for U.S. Appl. No. 17/041,412, mailed on Apr. 12, 2023, 2 pages.
Corrected Notice of Allowance received for U.S. Appl. No. 17/041,412, mailed on Mar. 23, 2023, 7 pages.
Corrected Notice of Allowance received for U.S. Appl. No. 17/041,412, mailed on Mar. 31, 2023, 6 pages.
Corrected Notice of Allowance received for U.S. Appl. No. 17/510,168, mailed on Mar. 16, 2023, 2 pages.
Corrected Notice of Allowance received for U.S. Appl. No. 17/510,168, mailed on Mar. 29, 2023, 2 pages.
Corrected Notice of Allowance received for U.S. Appl. No. 17/566,094, mailed on Feb. 8, 2023, 2 pages.
Corrected Notice of Allowance received for U.S. Appl. No. 17/566,094, mailed on Jan. 5, 2023, 2 pages.
Corrected Notice of Allowance received for U.S. Appl. No. 17/566,094, mailed on Jan. 23, 2023, 2 pages.
Corrected Notice of Allowance received for U.S. Appl. No. 17/566,094, mailed on Mar. 7, 2023, 2 pages.
Corrected Notice of Allowance received for U.S. Appl. No. 17/740,032, mailed on Feb. 15, 2023, 6 pages.
Final Office Action received for U.S. Appl. No. 17/479,897, mailed on Jan. 10, 2023, 15 pages.
Hearing Notice received for Indian Patent Application No. 201817024430, mailed on Apr. 6, 2023, 2 pages.
Intention to Grant received for European Patent Application No. 20168009.7, mailed on Feb. 28, 2023, 10 pages.
Intention to Grant received for European Patent Application No. 20206197.4, mailed on Dec. 15, 2022, 10 pages.
Intention to Grant received for European Patent Application No. 20210373.5, mailed on Jan. 10, 2023, 12 pages.
Intention to Grant received for European Patent Application No. 21733324.4, mailed on Jan. 9, 2023, 9 pages.
International Preliminary Report on Patentability received for PCT Patent Application No. PCT/US2021/034304, mailed on Dec. 15, 2022, 19 pages.

(56) References Cited

OTHER PUBLICATIONS

International Preliminary Report on Patentability received for PCT Patent Application No. PCT/US2021/046877, mailed on Apr. 6, 2023, 12 pages.
Invitation to Pay Additional Fee received for PCT Patent Application No. PCT/US2022/050916, mailed on Mar. 23, 2023, 16 pages.
Non-Final Office Action received for U.S. Appl. No. 17/041,412, mailed on Dec. 5, 2022, 13 pages.
Non-Final Office Action received for U.S. Appl. No. 17/510,168, mailed on Dec. 6, 2022, 11 pages.
Notice of Acceptance received for Australian Patent Application No. 2021290292, mailed on Jan. 23, 2023, 3 pages.
Notice of Allowance received for Brazilian Patent Application No. BR122018076550-0, mailed on Jan. 3, 2022, 3 pages (1 page of English Translation and 2 pages of Official Copy).
Notice of Allowance received for Korean Patent Application No. 10-2021-7006145, mailed on Mar. 6, 2023, 5 pages (2 pages of English Translation and 3 pages of Official Copy).
Notice of Allowance received for Korean Patent Application No. 10-2022-7010505, mailed on Dec. 26, 2022, 7 pages (2 pages of English Translation and 5 pages of Official Copy).
Notice of Allowance received for U.S. Appl. No. 17/041,412, mailed on Mar. 15, 2023, 13 pages.
Notice of Allowance received for U.S. Appl. No. 17/510,168, mailed on Feb. 13, 2023, 10 pages.
Notice of Allowance received for U.S. Appl. No. 17/566,094, mailed on Feb. 23, 2023, 8 pages.
Notice of Allowance received for U.S. Appl. No. 17/732,191, mailed on Feb. 27, 2023, 12 pages.
Notice of Allowance received for U.S. Appl. No. 17/740,032, mailed on Feb. 1, 2023, 9 pages.
Office Action received for Australian Patent Application No. 2021290292, mailed on Nov. 24, 2022, 2 pages.
Office Action received for Australian Patent Application No. 2022204465, mailed on Mar. 10, 2023, 4 pages.
Office Action received for Chinese Patent Application No. 201980012481.9, mailed on Jan. 12, 2023, 18 pages (9 pages of English Translation and 9 pages of Official Copy).
Office Action received for Chinese Patent Application No. 202110766668.7, mailed on Jan. 20, 2023, 11 pages (6 pages of English Translation and 5 pages of Official Copy).
Office Action received for Chinese Patent Application No. 202210849242.2, mailed on Jan. 20, 2023, 12 pages (6 pages of English Translation and 6 pages of Official Copy).
Office Action received for European Patent Application No. 19769316.1, mailed on Jan. 12, 2023, 10 pages.
Office Action received for Indian Patent Application No. 202117009020, mailed on Feb. 6, 2023, 7 pages.
Office Action received for Japanese Patent Application No. 2021-187533, mailed on Feb. 6, 2023, 7 pages (4 pages of English Translation and 3 pages of Official Copy).
Office Action received for Korean Patent Application No. 10-2020-0124139, mailed on Jan. 17, 2023, 10 pages (5 pages of English Translation and 5 pages of Official Copy).
Office Action received for Korean Patent Application No. 10-2022-7033119, mailed on Mar. 29, 2023, 5 pages (2 pages of English Translation and 3 pages of Official Copy).
Applicant-Initiated Interview Summary received for U.S. Appl. No. 18/423,234, mailed on Jan. 2, 2025, 2 pages.
Decision to Grant received for Japanese Patent Application No. 2024-001951, mailed on Jan. 7, 2025, 4 pages (2 pages of English Translation and 2 pages of Official Copy).
Corrected Notice of Allowance received for U.S. Appl. No. 18/196,997, mailed on Aug. 19, 2024, 2 pages.
Notice of Allowance received for U.S. Appl. No. 18/628,021, mailed on Aug. 28, 2024, 9 pages.
Corrected Notice of Allowance received for U.S. Appl. No. 18/196,997, mailed on Jun. 3, 2024, 2 pages.
Corrected Notice of Allowance received for U.S. Appl. No. 18/196,997, mailed on May 23, 2024, 2 pages.

Minutes of the Oral Proceedings received for European Patent Application No. 17184710.6, mailed on May 22, 2024, 4 pages.
Notice of Allowance received for U.S. Appl. No. 17/546,968, mailed on May 31, 2024, 24 pages.
Notice of Allowance received for U.S. Appl. No. 18/628,021, mailed on Jun. 5, 2024, 9 pages.
Decision to Grant received for Japanese Patent Application No. 2022-130725, mailed on Dec. 11, 2023, 2 pages (1 page of English Translation and 1 page of Official Copy).
Notice of Acceptance received for Australian Patent Application No. 2022228121, mailed on Dec. 13, 2023, 3 pages.
Office Action received for Australian Patent Application No. 2023200607, mailed on Dec. 20, 2023, 3 pages.
Invitation to Pay Search Fees received for European Patent Application No. 20728854.9, mailed on Feb. 23, 2024, 3 pages.
Notice of Allowance received for U.S. Appl. No. 18/114,880, mailed on Feb. 15, 2024, 17 pages.
Office Action received for Australian Patent Application No. 2023200607, mailed on Feb. 22, 2024, 2 pages.
Office Action received for Chinese Patent Application No. 202210849316.2, mailed on Jan. 18, 2024, 12 pages (6 pages of English Translation and 6 pages of Official Copy).
Notice of Allowance received for U.S. Appl. No. 18/196,997, mailed on Jul. 15, 2024, 11 pages.
Office Action received for Japanese Patent Application No. 2022-199433, mailed on Jul. 2, 2024, 6 pages (3 pages of English Translation and 3 pages of Official Copy).
Corrected Notice of Allowance received for U.S. Appl. No. 17/466,824, mailed on Feb. 6, 2024, 2 pages.
Notice of Allowance received for Japanese Patent Application No. 2022-095182, mailed on Feb. 5, 2024, 4 pages (1 page of English Translation and 3 pages of Official Copy).
Office Action received for Japanese Patent Application No. 2022-199433, mailed on Jan. 29, 2024, 6 pages (3 pages of English Translation and 3 pages of Official Copy).
Office Action received for Korean Patent Application No. 10-2023-7016569, mailed on Jan. 22, 2024, 10 pages (4 pages of English Translation and 6 pages of Official Copy).
Applicant-Initiated Interview Summary received for U.S. Appl. No. 17/546,968, mailed on Apr. 26, 2024, 2 pages.
Corrected Notice of Allowance received for U.S. Appl. No. 18/196,997, mailed on Apr. 18, 2024, 2 pages.
Corrected Notice of Allowance received for U.S. Appl. No. 18/196,997, mailed on Apr. 25, 2024, 2 pages.
Notice of Allowance received for Korean Patent Application No. 10-2023-7036985, mailed on Apr. 11, 2024, 7 pages (2 pages of English Translation and 5 pages of Official Copy).
Office Action received for Chinese Patent Application No. 202010235395.9, mailed on Mar. 16, 2024, 18 pages (9 pages of English Translation and 9 pages of Official Copy).
Office Action received for European Patent Application No. 20728854.9, mailed on Apr. 8, 2024, 7 pages.
Office Action received for Indian Patent Application No. 202117017871, mailed on Apr. 4, 2024, 8 pages.
Final Office Action received for U.S. Appl. No. 18/423,234, mailed on Dec. 19, 2024, 8 pages.
Intention to Grant received for European Patent Application No. 19769316.1, mailed on Dec. 17, 2024, 9 pages.
Manogajapathi et al., "Detecting Camera Based Traitor and Fraudulent Apps on Smartphone", World Conference on Futuristic Trends in Research and Innovation for Social Welfare (Startup Conclave), IEEE, Feb. 29, 2016, 5 pages.
Office Action received for Australian Patent Application No. 2023282230, mailed on Dec. 9, 2024, 2 pages.
Office Action received for Australian Patent Application No. 2023285892, mailed on Dec. 16, 2024, 5 pages.
Wanjale et al., "AAPS: Android Based System for Camera Based Attacks", International Journal of Emerging Technologies and Engineering (IJETE) vol. 1 Issue 10, Nov. 2014, pp. 246-247.
Wu et al., "Analyzing Mobile Phone Vulnerabilities Caused by Camera", IEEE Global Communications Conference, Dec. 8, 2014, 5 pages.

(56) References Cited

OTHER PUBLICATIONS

Corrected Notice of Allowance received for U.S. Appl. No. 18/196,997, mailed on Jun. 13, 2024, 2 pages.
Corrected Notice of Allowance received for U.S. Appl. No. 18/628,021, mailed on Jun. 24, 2024, 2 pages.
International Preliminary Report on Patentability received for PCT Patent Application No. PCT/US2022/050916, mailed on Jun. 13, 2024, 18 pages.
Office Action received for Korean Patent Application No. 10-2023-7002360, mailed on Jun. 5, 2024, 6 pages (2 pages of English Translation and 4 pages of Official Copy).
Supplemental Notice of Allowance received for U.S. Appl. No. 17/546,968, mailed on Jun. 14, 2024, 2 pages.
Decision to Grant received for Japanese Patent Application No. 2024-173257, mailed on Aug. 5, 2025, 3 pages (1 page of English Translation and 2 pages of Official Copy).
Notice of Allowance received for U.S. Appl. No. 18/423,234, mailed on Aug. 11, 2025, 6 pages.
Notice of Allowance received for Korean Patent Application No. 10-2023-7002360, mailed on Feb. 5, 2025, 8 pages (2 pages of English Translation and 6 pages of Official Copy).
Notice of Hearing received for Indian Patent Application No. 202215010325, mailed on Feb. 18, 2025, 3 pages.
Office Action received for Chinese Patent Application No. 202110356908.6, mailed on Jan. 25, 2025, 10 pages (5 pages of English Translation and 5 pages of Official Copy).
Intention to Grant received for European Patent Application No. 20206196.6, mailed on Jul. 14, 2025, 10 pages.
Intention to Grant received for European Patent Application No. 23173036.7, mailed on Jun. 30, 2025, 9 pages.
International Search Report and Written Opinion received for PCT Patent Application No. PCT/US2025/010440, mailed on Jul. 4, 2025, 20 pages.
Invitation to Pay Additional Fees and Partial International Search Report received for PCT Patent Application No. PCT/US2025/010440, mailed on May 13, 2025, 15 pages.
Non-Final Office Action received for U.S. Appl. No. 18/892,251, mailed on Jul. 11, 2025, 28 pages.
Notice of Allowance received for Chinese Patent Application No. 202110356908.6, mailed on Jul. 1, 2025, 2 pages (1 page of English Translation and 1 page of Official Copy).
Office Action received for Australian Patent Application No. 2023285892, mailed on Jul. 21, 2025, 5 pages.
Office Action received for Chinese Patent Application No. 202010235395.9, mailed on May 31, 2025, 15 pages (7 pages of English Translation and 8 pages of Official Copy).
Extended European Search Report received for European Application No. 24182717.9, mailed on Jan. 31, 2025, 6 pages.
Non-Final Office Action received for U.S. Appl. No. 18/781,667, mailed on Jul. 1, 2025, 18 pages.
Notice of Allowance received for Japanese Patent Application No. 2024-532566, mailed on Jun. 13, 2025, 5 pages (1 page of English Translation and 4 pages of Official Copy).
Office Action received for European Patent Application No. 20728854.9, mailed on Jun. 20, 2025, 6 pages.
Intention to Grant received for European Patent Application No. 24182717.9, mailed on Jun. 6, 2025, 8 pages.
Office Action received for European Patent Application No. 24155758.6, mailed on May 28, 2025, 8 pages.
Office Action received for Japanese Patent Application No. 2023-158354, mailed on Jun. 3, 2025, 6 pages (3 pages of English Translation and 3 pages of Official Copy).
Applicant-Initiated Interview Summary received for U.S. Appl. No. 18/423,234, mailed on May 9, 2025, 2 pages.
Corrected Notice of Allowance received for U.S. Appl. No. 18/137,369, mailed on May 12, 2025, 2 pages.
Decision to Grant received for European Patent Application No. 19769316.1, mailed on Apr. 25, 2025, 4 pages.
Intention to Grant received for European Patent Application No. 20206196.6, mailed on Mar. 10, 2025, 10 pages.
International Search Report and Written Opinion received for PCT Patent Application No. PCT/US2024/044796, mailed on Nov. 28, 2024, 17 pages.
[Iphone] How To Turn On/Off (Enable/Disable) "Show Outside The Frame" On The Camera, Func!! , Available Online at: https://func.jp/iphone-camera-frame-exterior/, Nov. 5, 2024, 8 pages.
Notice of Acceptance received for Australian Patent Application No. 2023226764, mailed on Apr. 11, 2025, 3 pages.
Notice of Allowance received for U.S. Appl. No. 18/137,369, mailed on Apr. 15, 2025, 11 pages.
Notice of Hearing received for Indian Patent Application No. 202215010325, mailed on Mar. 10, 2025, 3 pages.
Office Action received for Australian Patent Application No. 2023285892, mailed on Apr. 11, 2025, 4 pages.
Office Action received for Chinese Patent Application No. 202010235395.9, mailed on Mar. 1, 2025, 16 pages (9 pages of English Translation and 7 pages of Official Copy).
Office Action received for European Patent Application No. 21773186.8, mailed on Mar. 20, 2025, 7 pages.
Office Action received for Indian Patent Application No. 202118009190, mailed on Mar. 24, 2025, 7 pages.
Office Action received for Indian Patent Application No. 202318031344, mailed on Apr. 1, 2025, 7 pages.
Office Action received for Japanese Patent Application No. 2024-532566, mailed on Mar. 7, 2025, 14 pages (7 pages of English Translation and 7 pages of Official Copy).
Office Action received for Korean Patent Application No. 10-2023-0125143, mailed on May 19, 2025, 9 pages (4 pages of English Translation and 5 pages of Official Copy).
Shinobu Umi, "What Happens if You Turn Off "Show Outside Frame" In The Camera App?—Why Can't I Ask About The Iphone Anymore?", available online at: https://news.mynavi.jp/article/20210216 ]iphone_why/>, Feb. 16, 2021, 5 pages (1 page of English Translation and 4 pages of Official Copy).
Shinobu Unakami, "Camera—Intention of Continuous Shooting Will be Video Photographing by Application!?—iPhone which cannot now be heard—why—", available online at: https://news.mynavi.jp/article/20201119 - iphone_why/, Nov. 19, 2020, 3 pages (Official Copy only) {See Communication Under Rule 37 CFR § 1.98(a) (3)}.
Slice42, "iPhone 11 Quicktake", available online at: https://www.voutube.com/watch?v=hMwTfD44nUg, Sep. 30, 2019, 2 pages (Official Copy Only) {See Communication Under Rule 37 CFR § 1.98(a) (3)}.
Ygigazine,"Basic camera operation method of iPhone 11 Pro", available online at: https://www.youtube.com/shorts/Jr7a6F7hUiA, Sep. 21, 2019, 2 pages (Official Copy only) {See Communication Under Rule 37 CFR § 1.98(a) (3)}.
Applicant-Initiated Interview Summary received for U.S. Appl. No. 18/137,369, mailed on Mar. 7, 2025, 2 pages.
Notice of Hearing received for Indian Patent Application No. 202118021941, mailed on Feb. 21, 2025, 2 pages.
Office Action received for Chinese Patent Application No. 201980012481.9, mailed on Feb. 26, 2025, 14 pages (1 page of English Translation and 13 pages of Official Copy).
Office Action received for European Patent Application No. 21157252.4, mailed on Feb. 24, 2025, 6 pages.
Office Action received for Japanese Patent Application No. 2024-033171, mailed on Feb. 25, 2025, 12 pages (6 pages of English Translation and 6 pages of Official Copy).
Extended European Search Report received for European Patent Application No. 25172958.8, mailed on Jul. 23, 2025, 11 pages.
Focos—Bokeh Camera for Dual Lens, Available Online at: http://web.archive.org/web/20180908220222/http://focos.me/, Sep. 8, 2018, 7 pages.
Notice of Allowance received for Japanese Patent Application No. 2024-033171, mailed on Jul. 18, 2025, 4 pages (1 page of English Translation and 3 pages of Official Copy).
Office Action received for Korean Patent Application No. 10-2024-7018082, mailed on Oct. 16, 2025, 20 pages (9 pages of English Translation and 11 pages of Official Copy).

* cited by examiner

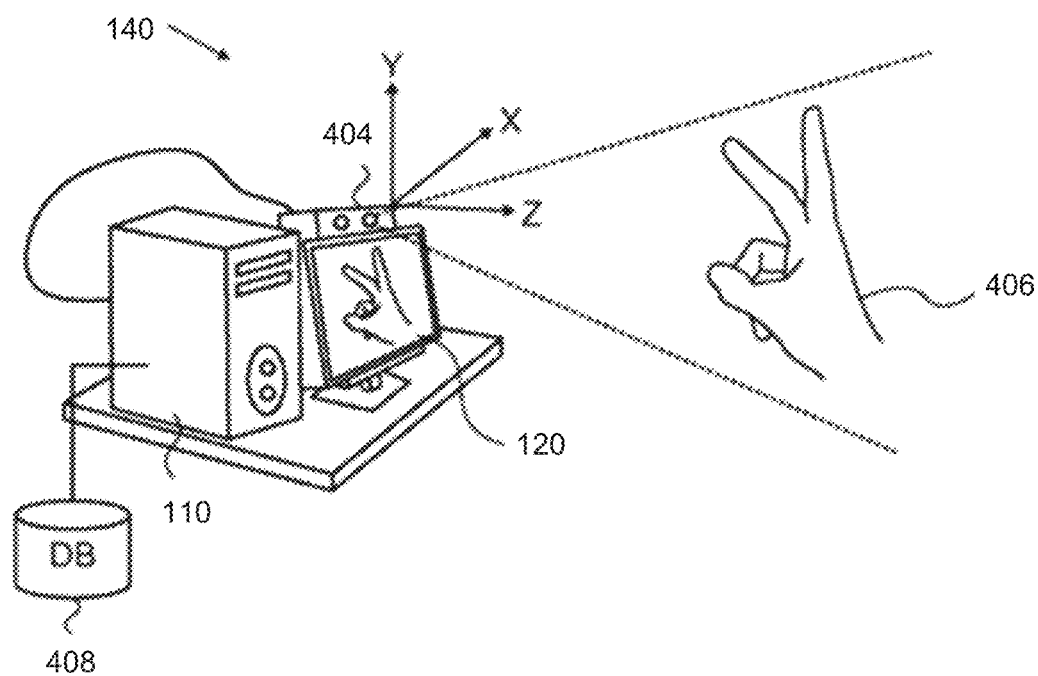
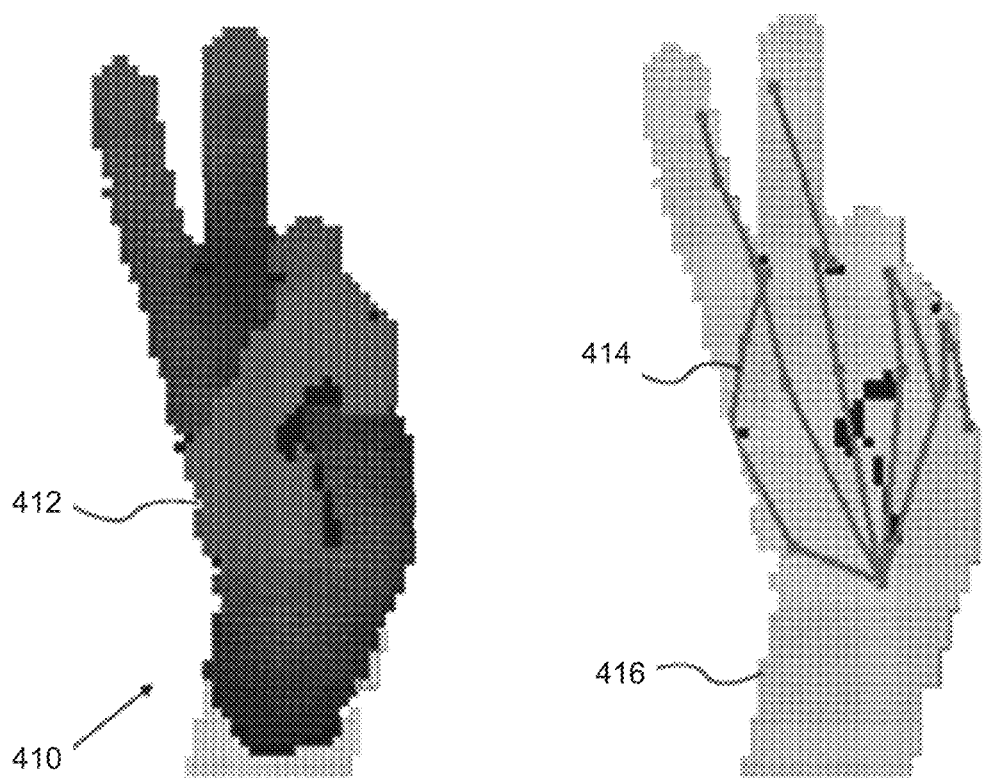
FIG. 4

800 

802
While displaying, via the display generation component, a first user interface that is overlaid over a representation of a physical environment, wherein the representation of the physical environment changes as the portion of the physical environment that corresponds to the representation of the physical environment changes and/or a viewpoint of the user changes, detect a request to display a media capture user interface

804
In response to detecting the request to display the media capture user interface, display, via the display generation component, a media capture preview that includes a representation of a portion of a field-of-view of the one or more cameras with content that is updated as the portion of the physical environment that is in the portion of the field-of-view of the one or more cameras changes, wherein:

806
The media capture preview indicates boundaries of media that will be captured in response to detecting a media capture input while the media capture user interface is displayed

808
The media capture preview is displayed while a first portion of the representation of the physical environment is visible, where the first portion of the representation of the physical environment was visible before the request to display the media capture user interface was detected

810
The media capture preview is displayed in place of a second portion of the representation of the physical environment, wherein the first portion of the representation of the physical environment is updated as the portion of the physical environment that corresponds to the first portion of the representation of the physical environment changes and/or the viewpoint of the user changes

902
While a viewpoint of a user is in a first pose, display, via the display generation component, an extended reality user interface that includes a preview of a field-of-view of the one or more cameras that is overlaid on a first portion of a three-dimensional environment that is visible in the viewpoint of the user, wherein the preview includes a representation of the first portion of the three-dimensional environment and is displayed with a respective spatial configuration relative to the viewpoint of the user

904
Detect a change in the pose of the viewpoint of the user from the first pose to a second pose that is different from the first pose

906
In response to detecting the change in the pose of the viewpoint of the user from the first pose to the second pose, shift the preview of the field-of-view of the one or more cameras away from the respective spatial configuration relative to the viewpoint of the user in a direction that is determined based on the change in the pose of the viewpoint of the user from the first pose to the second pose, wherein the shifting of the preview of the field-of-view of the one or more cameras occurs at a first speed, wherein, while the preview of the field-of-view of the one or more cameras is shifting based on the change in pose of the viewpoint of the user, the representation of the three-dimensional environment changes based on the change in pose of the viewpoint of the user at a second speed that is different from the first speed

1202
Displaying, via the display generation component, an extended reality camera user interface that includes:

1204
A representation of a physical environment

1206
A recording indicator that indicates a recording region within a field-of-view of the one or more cameras, wherein the recording indicator includes at least a first edge region that has a visual parameter that decreases through a plurality of different values for the visual parameter in a visible portion of the recording indicator, where the values of the parameter progressively decrease as a distance from the first edge region of the recording indicator increases

*FIG. 12*

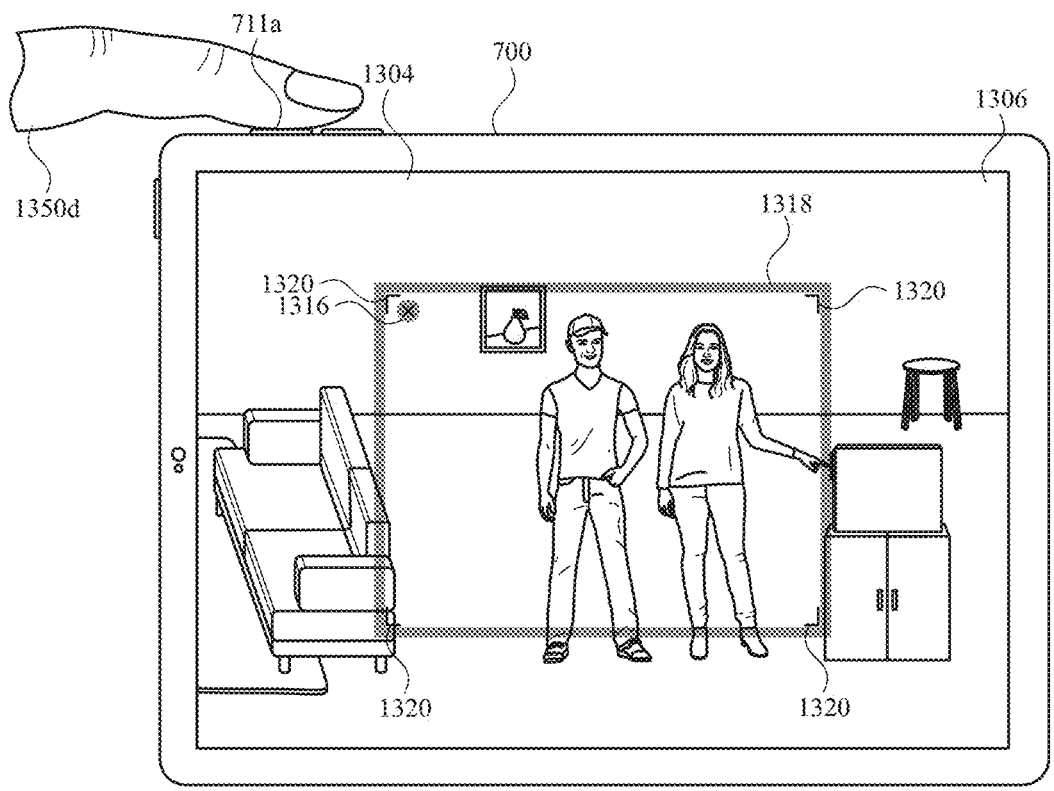
*FIG. 13D*
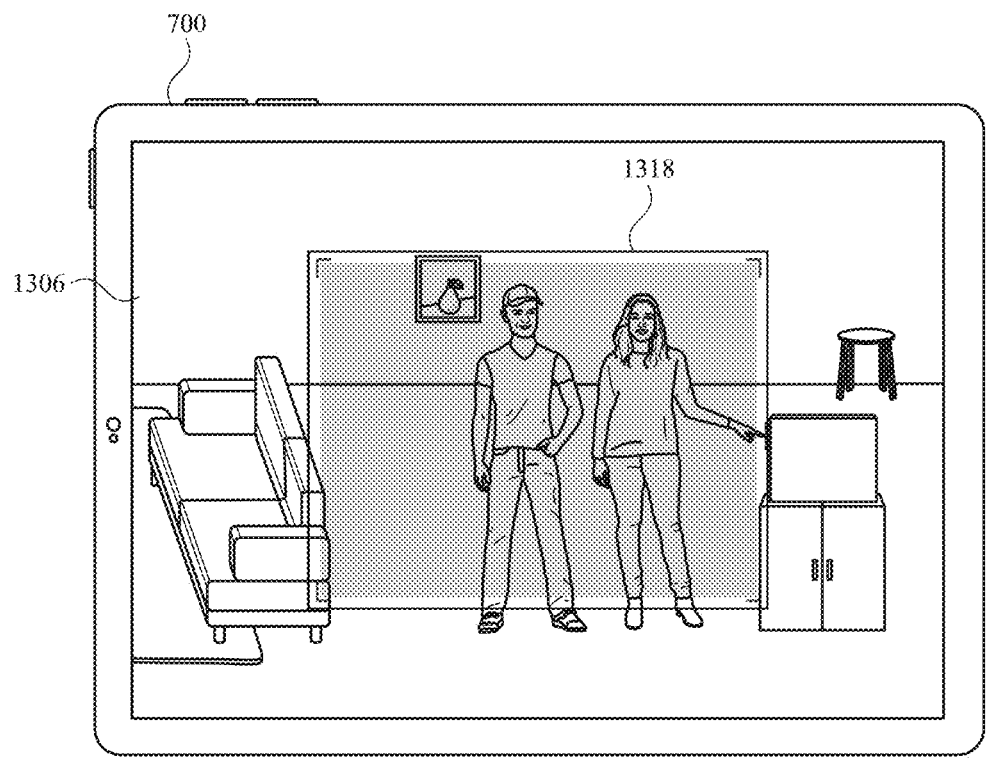
*FIG. 13E1*

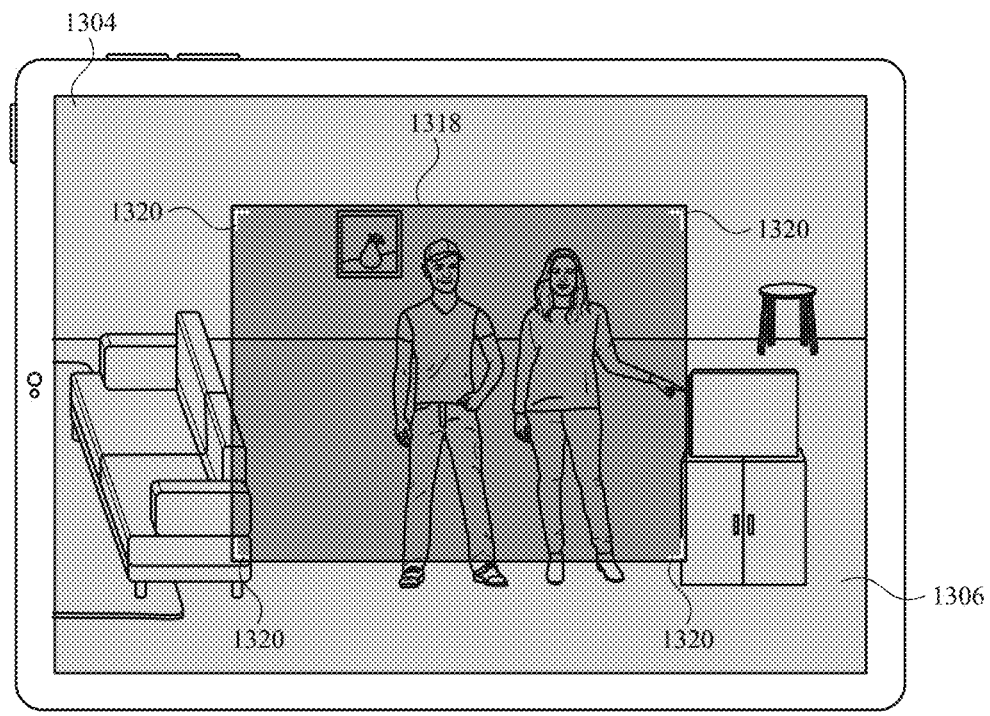
*FIG. 13E2*
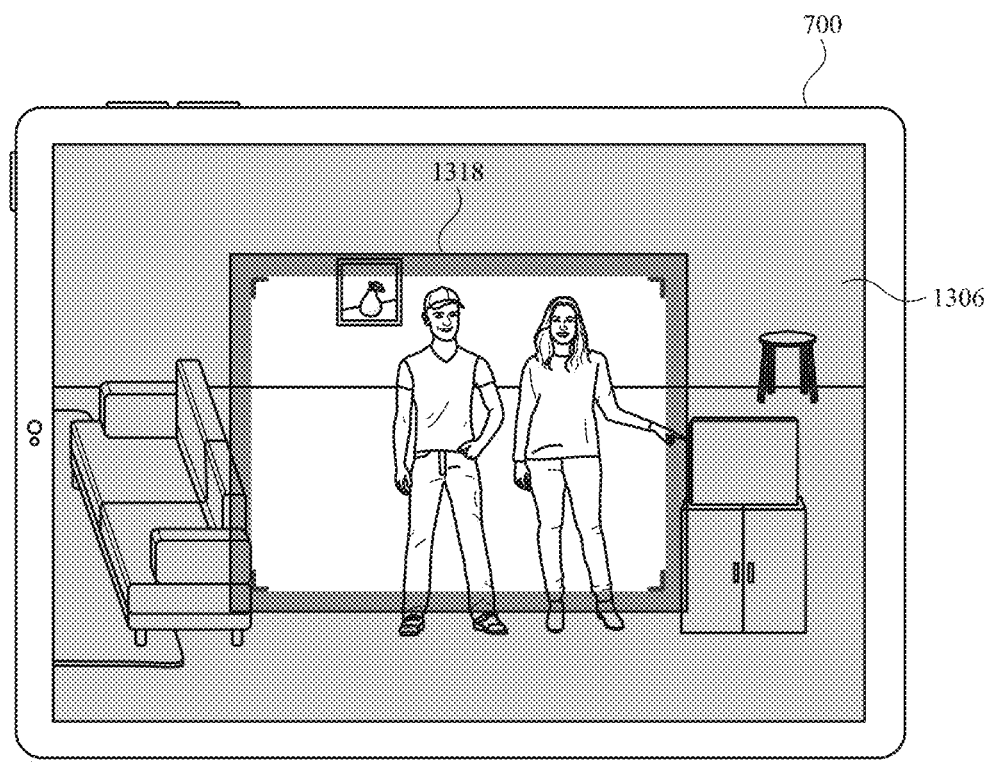
*FIG. 13E3*

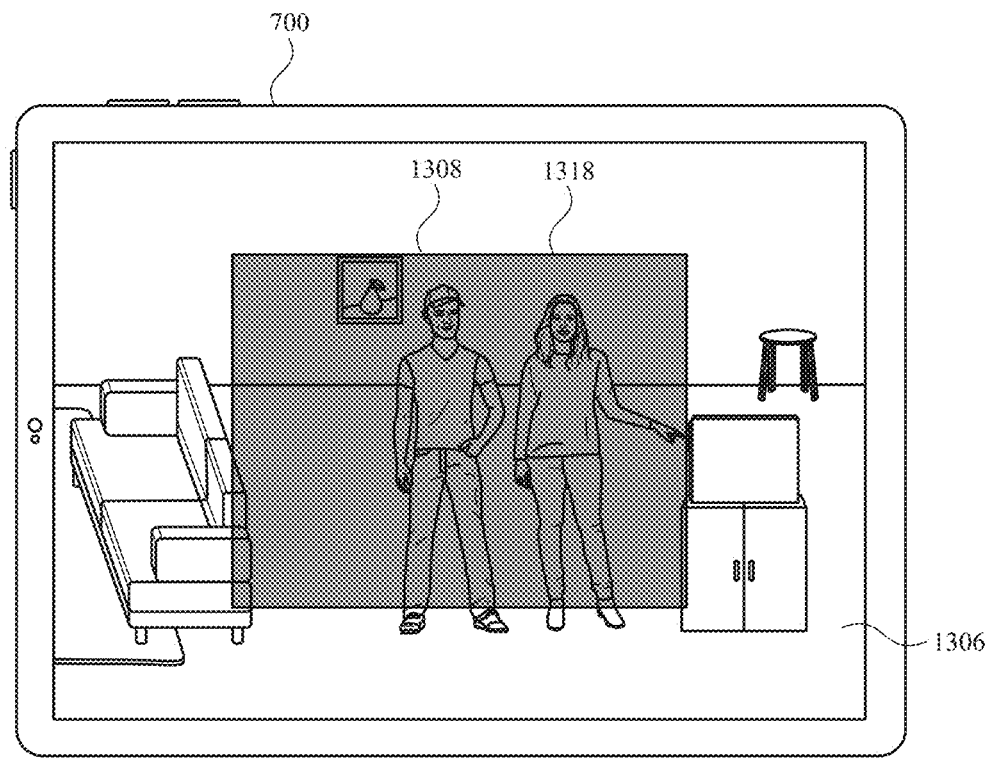
*FIG. 13E4*
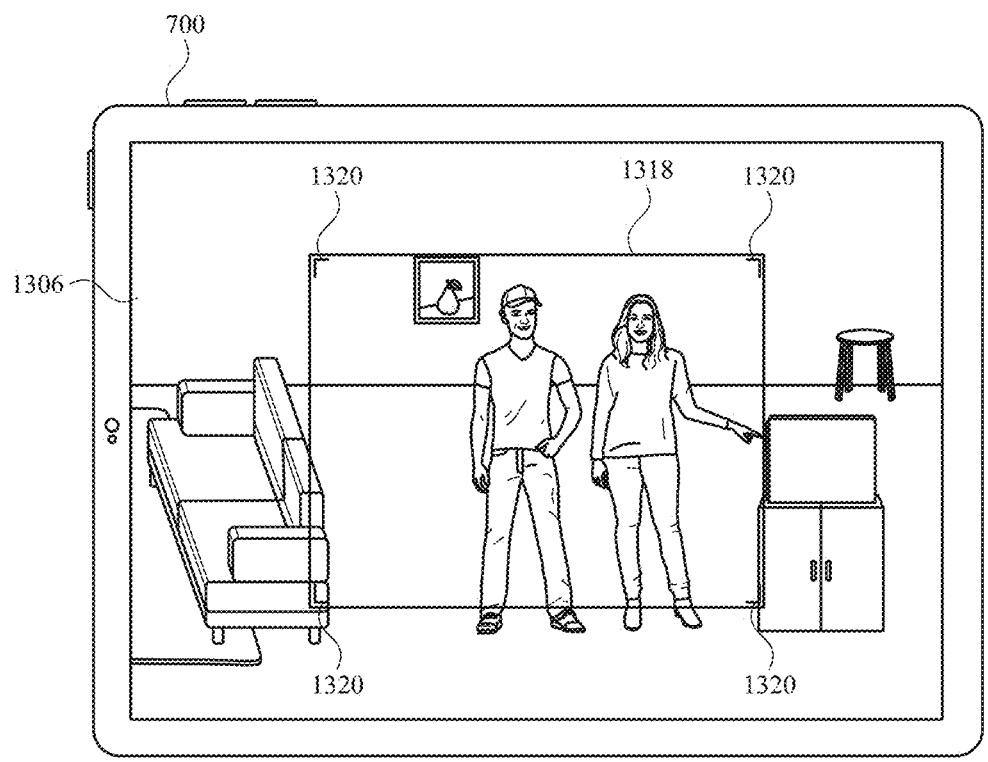
*FIG. 13E5*

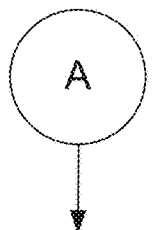

1510
In response to detecting the first request to capture media:

1512
Capture, using the one or more cameras, a first media item that includes at least the first portion of the representation of the physical environment

1514
Change the appearance of the viewfinder, wherein changing the appearance of the viewfinder includes:

1516
Changing the appearance of a first portion of content that is within a threshold distance of a first side of the boundary of the viewfinder

1518
Changing the appearance of a second portion of content that is within the threshold distance of a second side of the boundary of the viewfinder, that is different from the first side of the boundary of the viewfinder

*FIG. 15B*

DEVICE, METHODS, AND GRAPHICAL USER INTERFACES FOR CAPTURING AND DISPLAYING MEDIA

CROSS-REFERENCE TO RELATED APPLICATIONS

This application claims priority to U.S. Provisional Patent Application 63/409,690, entitled "DEVICES, METHODS, AND GRAPHICAL USER INTERFACES FOR CAPTURING AND DISPLAYING MEDIA," filed Sep. 23, 2022, to U.S. Provisional Patent Application 63/338,864, entitled "DEVICES, METHODS, AND GRAPHICAL USER INTERFACES FOR CAPTURING AND DISPLAYING MEDIA," filed May 5, 2022, and to U.S. Provisional Patent Application 63/285,897, entitled "DEVICES, METHODS, AND GRAPHICAL USER INTERFACES FOR CAPTURING AND DISPLAYING MEDIA," filed Dec. 3, 2021. The contents of each of these applications are incorporated herein by reference in their entirety.

TECHNICAL FIELD

The present disclosure relates generally to computer systems that are in communication with a display generation component and, optionally, one or more input devices, and one or more cameras that provide computer-generated experiences, including, but not limited to, electronic devices that provide virtual reality and mixed reality experiences via a display.

BACKGROUND

The development of computer systems for capturing and/or displaying media in various environments, such as augmented reality environments, has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for capturing and/or displaying media in various environments are cumbersome, inefficient, and limited. For example, systems that provide insufficient visual feedback for capturing media, systems that require a series of complex inputs to perform a media capturing process, and systems in which the display of media is complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make capturing and/or displaying media in various environments more efficient and intuitive for a user. Such methods and interfaces optionally complement or replace conventional methods for capturing and/or displaying media in various environments. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for capturing and/or displaying media in various environments. Such methods and interfaces may complement or replace conventional methods for capturing and/or displaying media. Such methods and interfaces reduce the number, extent, and/or the nature of the inputs from a user and produce a more efficient human-machine interface. For battery-operated computing devices, such methods and interfaces conserve power and increase the time between battery charges and reduce the amount processing power.

In accordance with some embodiments, a method performed at a computer system that is in communication with a display generation component and one or more cameras is described. The method comprises: while displaying, via the display generation component, a first user interface that is overlaid over a representation of a physical environment, wherein the representation of the physical environment changes as the portion of the physical environment that corresponds to the representation of the physical environment changes and/or a viewpoint of the user changes, detecting a request to display a media capture user interface; and in response to detecting the request to display the media capture user interface, displaying, via the display generation component, a media capture preview that includes a representation of a portion of a field-of-view of the one or more cameras with content that is updated as the portion of the physical environment that is in the portion of the field-of-view of the one or more cameras changes, wherein: the media capture preview indicates boundaries of media that will be captured in response to detecting a media capture input while the media capture user interface is displayed; the media capture preview is displayed while a first portion of the representation of the physical environment is visible, where the first portion of the representation of the physical environment was visible before the request to display the media capture user interface was detected; and the media capture preview is displayed in place of a second portion of the representation of the physical environment, wherein the first portion of the representation of the physical environment is updated as the portion of the physical environment that corresponds to the first portion of the representation of the physical environment changes and/or the viewpoint of the user changes.

In accordance with some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: while displaying, via the display generation component, a first user interface that is overlaid over a representation of a physical environment, wherein the representation of the physical environment changes as the portion of the physical environment that corresponds to the representation of the physical environment changes and/or a viewpoint of the user changes, detecting a request to display a media capture user interface; and in response to detecting the request to display the media capture user interface, displaying, via the display generation component, a media capture preview that includes a representation of a portion of a field-of-view of the one or more cameras with content that is updated as the portion of the physical environment that is in the portion of the field-of-view of the one or more cameras changes, wherein: the media capture preview indicates boundaries of media that will be captured in response to detecting a media capture input while the media capture user interface is displayed; the media capture preview is displayed while a first portion of the representation of the physical environment is visible, where the first portion of the representation of the physical environment was visible before the request to display the media capture user interface was detected; and the media capture preview is displayed in place of a second portion of the representation of the physical environment, wherein the first portion of the representation of the physical environment is updated as the portion of the physical environment that corresponds to the first portion of the representation of the physical environment changes and/or the viewpoint of the user changes.

In accordance with some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: while displaying, via the display generation component, a first user interface that is overlaid over a representation of a physical environment, wherein the representation of the physical environment changes as the portion of the physical environment that corresponds to the representation of the physical environment changes and/or a viewpoint of the user changes, detecting a request to display a media capture user interface; and in response to detecting the request to display the media capture user interface, displaying, via the display generation component, a media capture preview that includes a representation of a portion of a field-of-view of the one or more cameras with content that is updated as the portion of the physical environment that is in the portion of the field-of-view of the one or more cameras changes, wherein: the media capture preview indicates boundaries of media that will be captured in response to detecting a media capture input while the media capture user interface is displayed; the media capture preview is displayed while a first portion of the representation of the physical environment is visible, where the first portion of the representation of the physical environment was visible before the request to display the media capture user interface was detected; and the media capture preview is displayed in place of a second portion of the representation of the physical environment, wherein the first portion of the representation of the physical environment is updated as the portion of the physical environment that corresponds to the first portion of the representation of the physical environment changes and/or the viewpoint of the user changes.

In accordance with some embodiments, a computer system that is in communication with a display generation component and one or more cameras is described. The computer system comprises: one or more processors; and memory storing one or more programs configured to be executed by the one or more processors, the one or more programs including instructions for: while displaying, via the display generation component, a first user interface that is overlaid over a representation of a physical environment, wherein the representation of the physical environment changes as the portion of the physical environment that corresponds to the representation of the physical environment changes and/or a viewpoint of the user changes, detecting a request to display a media capture user interface; and in response to detecting the request to display the media capture user interface, displaying, via the display generation component, a media capture preview that includes a representation of a portion of a field-of-view of the one or more cameras with content that is updated as the portion of the physical environment that is in the portion of the field-of-view of the one or more cameras changes, wherein: the media capture preview indicates boundaries of media that will be captured in response to detecting a media capture input while the media capture user interface is displayed; the media capture preview is displayed while a first portion of the representation of the physical environment is visible, where the first portion of the representation of the physical environment was visible before the request to display the media capture user interface was detected; and the media capture preview is displayed in place of a second portion of the representation of the physical environment, wherein the first portion of the representation of the physical environment is updated as the portion of the physical environment that corresponds to the first portion of the representation of the physical environment changes and/or the viewpoint of the user changes.

In accordance with some embodiments, a computer system that is in communication with a display generation component and one or more cameras is described. The computer system comprises: means, while displaying, via the display generation component, a first user interface that is overlaid over a representation of a physical environment, wherein the representation of the physical environment changes as the portion of the physical environment that corresponds to the representation of the physical environment changes and/or a viewpoint of the user changes, for detecting a request to display a media capture user interface; and means, responsive to detecting the request to display the media capture user interface, for displaying, via the display generation component, a media capture preview that includes a representation of a portion of a field-of-view of the one or more cameras with content that is updated as the portion of the physical environment that is in the portion of the field-of-view of the one or more cameras changes, wherein: the media capture preview indicates boundaries of media that will be captured in response to detecting a media capture input while the media capture user interface is displayed; the media capture preview is displayed while a first portion of the representation of the physical environment is visible, where the first portion of the representation of the physical environment was visible before the request to display the media capture user interface was detected; and the media capture preview is displayed in place of a second portion of the representation of the physical environment, wherein the first portion of the representation of the physical environment is updated as the portion of the physical environment that corresponds to the first portion of the representation of the physical environment changes and/or the viewpoint of the user changes.

In accordance with some embodiments, a computer program product is described. The computer program product comprises one or more programs configured to be executed by one or more processors of a computer system that is in communication with a display generation component and one or more cameras. The one or more programs include instructions for: while displaying, via the display generation component, a first user interface that is overlaid over a representation of a physical environment, wherein the representation of the physical environment changes as the portion of the physical environment that corresponds to the representation of the physical environment changes and/or a viewpoint of the user changes, detecting a request to display a media capture user interface; and in response to detecting the request to display the media capture user interface, displaying, via the display generation component, a media capture preview that includes a representation of a portion of a field-of-view of the one or more cameras with content that is updated as the portion of the physical environment that is in the portion of the field-of-view of the one or more cameras changes, wherein: the media capture preview indicates boundaries of media that will be captured in response to detecting a media capture input while the media capture user interface is displayed; the media capture preview is displayed while a first portion of the representation of the physical environment is visible, where the first portion of the representation of the physical environment was visible before the request to display the media capture user interface was detected; and the media capture preview is displayed in place of a second portion of the representation of the physical environment, wherein the first portion of the representation of the physical environment is updated as the portion of the physical environment that corresponds to the first portion of the representation of the physical environment changes and/or the viewpoint of the user changes.

In accordance with some embodiments, a method performed at a computer system that is in communication with a display generation component and one or more cameras is described. The method comprises: while a viewpoint of a user is in a first pose, displaying, via the display generation component, an extended reality user interface that includes a preview of a field-of-view of the one or more cameras that is overlaid on a first portion of a three-dimensional environment that is visible in the viewpoint of the user, wherein the preview includes a representation of the first portion of the three-dimensional environment and is displayed with a respective spatial configuration relative to the viewpoint of the user; detecting a change in the pose of the viewpoint of the user from the first pose to a second pose that is different from the first pose; and in response to detecting the change in the pose of the viewpoint of the user from the first pose to the second pose, shifting the preview of the field-of-view of the one or more cameras away from the respective spatial configuration relative to the viewpoint of the user in a direction that is determined based on the change in the pose of the viewpoint of the user from the first pose to the second pose, wherein the shifting of the preview of the field-of-view of the one or more cameras occurs at a first speed, wherein, while the preview of the field-of-view of the one or more cameras is shifting based on the change in pose of the viewpoint of the user, the representation of the three-dimensional environment changes based on the change in pose of the viewpoint of the user at a second speed that is different from the first speed.

In accordance with some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: while a viewpoint of a user is in a first pose, displaying, via the display generation component, an extended reality user interface that includes a preview of a field-of-view of the one or more cameras that is overlaid on a first portion of a three-dimensional environment that is visible in the viewpoint of the user, wherein the preview includes a representation of the first portion of the three-dimensional environment and is displayed with a respective spatial configuration relative to the viewpoint of the user; detecting a change in the pose of the viewpoint of the user from the first pose to a second pose that is different from the first pose; and in response to detecting the change in the pose of the viewpoint of the user from the first pose to the second pose, shifting the preview of the field-of-view of the one or more cameras away from the respective spatial configuration relative to the viewpoint of the user in a direction that is determined based on the change in the pose of the viewpoint of the user from the first pose to the second pose, wherein the shifting of the preview of the field-of-view of the one or more cameras occurs at a first speed, wherein, while the preview of the field-of-view of the one or more cameras is shifting based on the change in pose of the viewpoint of the user, the representation of the three-dimensional environment changes based on the change in pose of the viewpoint of the user at a second speed that is different from the first speed.

In accordance with some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: while a viewpoint of a user is in a first pose, displaying, via the display generation component, an extended reality user interface that includes a preview of a field-of-view of the one or more cameras that is overlaid on a first portion of a three-dimensional environment that is visible in the viewpoint of the user, wherein the preview includes a representation of the first portion of the three-dimensional environment and is displayed with a respective spatial configuration relative to the viewpoint of the user; detecting a change in the pose of the viewpoint of the user from the first pose to a second pose that is different from the first pose; and in response to detecting the change in the pose of the viewpoint of the user from the first pose to the second pose, shifting the preview of the field-of-view of the one or more cameras away from the respective spatial configuration relative to the viewpoint of the user in a direction that is determined based on the change in the pose of the viewpoint of the user from the first pose to the second pose, wherein the shifting of the preview of the field-of-view of the one or more cameras occurs at a first speed, wherein, while the preview of the field-of-view of the one or more cameras is shifting based on the change in pose of the viewpoint of the user, the representation of the three-dimensional environment changes based on the change in pose of the viewpoint of the user at a second speed that is different from the first speed.

In accordance with some embodiments, a computer system that is in communication with a display generation component and one or more cameras is described. The computer system comprises: one or more processors: and memory storing one or more programs configured to be executed by the one or more processors, the one or more programs including instructions for: while a viewpoint of a user is in a first pose, displaying, via the display generation component, an extended reality user interface that includes a preview of a field-of-view of the one or more cameras that is overlaid on a first portion of a three-dimensional environment that is visible in the viewpoint of the user, wherein the preview includes a representation of the first portion of the three-dimensional environment and is displayed with a respective spatial configuration relative to the viewpoint of the user: detecting a change in the pose of the viewpoint of the user from the first pose to a second pose that is different from the first pose; and in response to detecting the change in the pose of the viewpoint of the user from the first pose to the second pose, shifting the preview of the field-of-view of the one or more cameras away from the respective spatial configuration relative to the viewpoint of the user in a direction that is determined based on the change in the pose of the viewpoint of the user from the first pose to the second pose, wherein the shifting of the preview of the field-of-view of the one or more cameras occurs at a first speed, wherein, while the preview of the field-of-view of the one or more cameras is shifting based on the change in pose of the viewpoint of the user, the representation of the three-dimensional environment changes based on the change in pose of the viewpoint of the user at a second speed that is different from the first speed.

In accordance with some embodiments, a computer system that is in communication with a display generation component and one or more cameras is described. The computer system comprises: means, while a viewpoint of a user is in a first pose, for displaying, via the display generation component, an extended reality user interface that includes a preview of a field-of-view of the one or more cameras that is overlaid on a first portion of a three-dimensional environment that is visible in the viewpoint of the user, wherein the preview includes a representation of the first portion of the three-dimensional environment and is displayed with a respective spatial configuration relative to the viewpoint of the user; means for detecting a change in the pose of the viewpoint of the user from the first pose to a second pose that is different from the first pose; and means responsive to detecting the change in the pose of the viewpoint of the user from the first pose to the second pose, for shifting the preview of the field-of-view of the one or more cameras away from the respective spatial configuration relative to the viewpoint of the user in a direction that is determined based on the change in the pose of the viewpoint of the user from the first pose to the second pose, wherein the shifting of the preview of the field-of-view of the one or more cameras occurs at a first speed, wherein, while the preview of the field-of-view of the one or more cameras is shifting based on the change in pose of the viewpoint of the user, the representation of the three-dimensional environment changes based on the change in pose of the viewpoint of the user at a second speed that is different from the first speed.

In accordance with some embodiments, a computer program product is described. The computer program product comprises one or more programs configured to be executed by one or more processors of a computer system that is in communication with a display generation component. The one or more programs include instructions for: while a viewpoint of a user is in a first pose, displaying, via the display generation component, an extended reality user interface that includes a preview of a field-of-view of the one or more cameras that is overlaid on a first portion of a three-dimensional environment that is visible in the viewpoint of the user, wherein the preview includes a representation of the first portion of the three-dimensional environment and is displayed with a respective spatial configuration relative to the viewpoint of the user; detecting a change in the pose of the viewpoint of the user from the first pose to a second pose that is different from the first pose; and in response to detecting the change in the pose of the viewpoint of the user from the first pose to the second pose, shifting the preview of the field-of-view of the one or more cameras away from the respective spatial configuration relative to the viewpoint of the user in a direction that is determined based on the change in the pose of the viewpoint of the user from the first pose to the second pose, wherein the shifting of the preview of the field-of-view of the one or more cameras occurs at a first speed, wherein, while the preview of the field-of-view of the one or more cameras is shifting based on the change in pose of the viewpoint of the user, the representation of the three-dimensional environment changes based on the change in pose of the viewpoint of the user at a second speed that is different from the first speed.

In accordance with some embodiments, a method performed at a computer system that is in communication with a display generation component. The method comprises; while displaying an extended reality environment user interface, detecting a request to display captured media that includes immersive content that, when viewed from a respective range of one or more viewpoints provides a first set of visual cues that the user is at least partially surrounded by the content; and in response to detecting the request to display the captured media, displaying the captured media as a three-dimensional representation of the captured media that is displayed at a location selected by the computer system so that a first viewpoint of the user is outside of the respective range of one or more viewpoints.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while displaying an extended reality environment user interface, detecting a request to display captured media that includes immersive content that, when viewed from a respective range of one or more viewpoints provides a first set of visual cues that the user is at least partially surrounded by the content; and in response to detecting the request to display the captured media, displaying the captured media as a three-dimensional representation of the captured media that is displayed at a location selected by the computer system so that a first viewpoint of the user is outside of the respective range of one or more viewpoints.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while displaying an extended reality environment user interface, detecting a request to display captured media that includes immersive content that, when viewed from a respective range of one or more viewpoints provides a first set of visual cues that the user is at least partially surrounded by the content; and in response to detecting the request to display the captured media, displaying the captured media as a three-dimensional representation of the captured media that is displayed at a location selected by the computer system so that a first viewpoint of the user is outside of the respective range of one or more viewpoints.

In accordance with some embodiments, a computer system that is in communication with a display generation component. The computer system comprises: one or more processors; and memory storing one or more programs configured to be executed by the one or more processors, the one or more programs including instructions for: while displaying an extended reality environment user interface, detecting a request to display captured media that includes immersive content that, when viewed from a respective range of one or more viewpoints provides a first set of visual cues that the user is at least partially surrounded by the content; and in response to detecting the request to display the captured media, displaying the captured media as a three-dimensional representation of the captured media that is displayed at a location selected by the computer system so that a first viewpoint of the user is outside of the respective range of one or more viewpoints.

In accordance with some embodiments, a computer system that is in communication with a display generation component is described. The computer system comprises: means, while displaying an extended reality environment user interface, for detecting a request to display captured media that includes immersive content that, when viewed from a respective range of one or more viewpoints provides a first set of visual cues that the user is at least partially surrounded by the content; and means responsive to detecting the request to display the captured media, for displaying the captured media as a three-dimensional representation of the captured media that is displayed at a location selected by the computer system so that a first viewpoint of the user is outside of the respective range of one or more viewpoints.

In accordance with some embodiments, a computer program product is described. The computer program product comprises one or more programs configured to be executed by one or more processors of a computer system that is in communication with a display generation component. The one or more programs include instructions for: while displaying an extended reality environment user interface, detecting a request to display captured media that includes immersive content that, when viewed from a respective range of one or more viewpoints provides a first set of visual cues that the user is at least partially surrounded by the content: and in response to detecting the request to display the captured media, displaying the captured media as a three-dimensional representation of the captured media that is displayed at a location selected by the computer system so that a first viewpoint of the user is outside of the respective range of one or more viewpoints.

In accordance with some embodiments, a method performed at a computer system that is in communication with a display generation component and one or more cameras is described. The method comprises: displaying, via the display generation component, an extended reality camera user interface that includes: a representation of a physical environment; and a recording indicator that indicates a recording region within a field-of-view of the one or more cameras, wherein the recording indicator includes at least a first edge region that has a visual parameter that decreases through a plurality of different values for the visual parameter in a visible portion of the recording indicator, where the values of the parameter progressively decrease as a distance from the first edge region of the recording indicator increases.

In accordance with some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: displaying, via the display generation component, an extended reality camera user interface that includes: a representation of a physical environment; and a recording indicator that indicates a recording region within a field-of-view of the one or more cameras, wherein the recording indicator includes at least a first edge region that has a visual parameter that decreases through a plurality of different values for the visual parameter in a visible portion of the recording indicator, where the values of the parameter progressively decrease as a distance from the first edge region of the recording indicator increases.

In accordance with some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: displaying, via the display generation component, an extended reality camera user interface that includes: a representation of a physical environment; and a recording indicator that indicates a recording region within a field-of-view of the one or more cameras, wherein the recording indicator includes at least a first edge region that has a visual parameter that decreases through a plurality of different values for the visual parameter in a visible portion of the recording indicator, where the values of the parameter progressively decrease as a distance from the first edge region of the recording indicator increases.

In accordance with some embodiments, a computer system that is configured to communicate with a display generation component and one or more cameras is described. The computer system comprises: one or more processors; and memory storing one or more programs configured to be executed by the one or more processors, the one or more programs including instructions for: displaying, via the display generation component, an extended reality camera user interface that includes: a representation of a physical environment; and a recording indicator that indicates a recording region within a field-of-view of the one or more cameras, wherein the recording indicator includes at least a first edge region that has a visual parameter that decreases through a plurality of different values for the visual parameter in a visible portion of the recording indicator, where the values of the parameter progressively decrease as a distance from the first edge region of the recording indicator increases.

In accordance with some embodiments, a computer system that is configured to communicate with a display generation component and one or more cameras is described. The computer system comprises: means for displaying, via the display generation component, an extended reality camera user interface that includes: a representation of a physical environment; and a recording indicator that indicates a recording region within a field-of-view of the one or more cameras, wherein the recording indicator includes at least a first edge region that has a visual parameter that decreases through a plurality of different values for the visual parameter in a visible portion of the recording indicator, where the values of the parameter progressively decrease as a distance from the first edge region of the recording indicator increases.

In accordance with some embodiments, a computer program product is described. The computer program product comprises one or more programs configured to be executed by one or more processors of a computer system that is in communication with a display generation component and one or more cameras. The one or more programs include instructions for: displaying, via the display generation component, an extended reality camera user interface that includes: a representation of a physical environment; and a recording indicator that indicates a recording region within a field-of-view of the one or more cameras, wherein the recording indicator includes at least a first edge region that has a visual parameter that decreases through a plurality of different values for the visual parameter in a visible portion of the recording indicator, where the values of the parameter progressively decrease as a distance from the first edge region of the recording indicator increases.

In accordance with some embodiments, a method performed at a computer system that is in communication with a display generation component, one or more input devices, and one or more cameras is described. The method comprises: detecting, via the one or more input devices, a request to display a camera user interface; and in response to detecting the request to display the camera user interface, displaying the camera user interface, wherein the camera user interface includes a reticle virtual object that indicates a capture region of the one or more cameras, wherein displaying the camera user interface includes: in accordance with a determination that a set of one or more criteria is satisfied, displaying the camera user interface with a tutorial within the camera user interface, wherein the tutorial provides information about how to capture media with the computer system while the camera user interface is displayed; and in accordance with a determination that the set of one or more criteria is not satisfied, displaying the camera user interface without displaying the tutorial.

In accordance with some embodiments, a non-transitory computer readable storage medium is described. The non-transitory computer-readable storage medium stores one or more programs configured to be executed by one or more processors of a computer system that is in communication with a display generation component, one or more input devices, and one or more cameras, the one or more programs including instructions for: detecting, via the one or more input devices, a request to display a camera user interface; and in response to detecting the request to display the camera user interface, displaying the camera user interface, wherein the camera user interface includes a reticle virtual object that indicates a capture region of the one or more cameras, wherein displaying the camera user interface includes: in accordance with a determination that a set of one or more criteria is satisfied, displaying the camera user interface with a tutorial within the camera user interface, wherein the tutorial provides information about how to capture media with the computer system while the camera user interface is displayed; and in accordance with a determination that the set of one or more criteria is not satisfied, displaying the camera user interface without displaying the tutorial.

In accordance with some embodiments, a transitory computer readable storage medium is described. The transitory computer-readable storage medium stores one or more programs configured to be executed by one or more processors of a computer system that is in communication with a display generation component, one or more input devices, and one or more cameras, the one or more programs including instructions for: detecting, via the one or more input devices, a request to display a camera user interface; and in response to detecting the request to display the camera user interface, displaying the camera user interface, wherein the camera user interface includes a reticle virtual object that indicates a capture region of the one or more cameras, wherein displaying the camera user interface includes: in accordance with a determination that a set of one or more criteria is satisfied, displaying the camera user interface with a tutorial within the camera user interface, wherein the tutorial provides information about how to capture media with the computer system while the camera user interface is displayed; and in accordance with a determination that the set of one or more criteria is not satisfied, displaying the camera user interface without displaying the tutorial.

In accordance with some embodiments, a computer system is described. The computer system comprises one or more processors, wherein the computer system is configured to communicate with a display generation component, one or more input devices, and one or more cameras; and memory storing one or more programs configured to be executed by the one or more processors, the one or more programs including instructions for: detecting, via the one or more input devices, a request to display a camera user interface; and in response to detecting the request to display the camera user interface, displaying the camera user interface, wherein the camera user interface includes a reticle virtual object that indicates a capture region of the one or more cameras, wherein displaying the camera user interface includes: in accordance with a determination that a set of one or more criteria is satisfied, displaying the camera user interface with a tutorial within the camera user interface, wherein the tutorial provides information about how to capture media with the computer system while the camera user interface is displayed; and in accordance with a determination that the set of one or more criteria is not satisfied, displaying the camera user interface without displaying the tutorial.

In accordance with some embodiments, a computer system is described. The computer system is configured to communicate with a display generation component, one or more input devices, and one or more cameras, and the computer system comprises: means for detecting, via the one or more input devices, a request to display a camera user interface; and means, responsive to detecting the request to display the camera user interface, for displaying the camera user interface, wherein the camera user interface includes a reticle virtual object that indicates a capture region of the one or more cameras, wherein displaying the camera user interface includes: in accordance with a determination that a set of one or more criteria is satisfied, displaying the camera user interface with a tutorial within the camera user interface, wherein the tutorial provides information about how to capture media with the computer system while the camera user interface is displayed; and in accordance with a determination that the set of one or more criteria is not satisfied, displaying the camera user interface without displaying the tutorial.

In accordance with some embodiments, a computer program product is described. The computer program product comprising one or more programs configured to be executed by one or more processors of a computer system that is in communication with a display generation component, one or more input devices, and one or more cameras, the one or more programs including instructions for: detecting, via the one or more input devices, a request to display a camera user interface; and in response to detecting the request to display the camera user interface, displaying the camera user interface, wherein the camera user interface includes a reticle virtual object that indicates a capture region of the one or more cameras, wherein displaying the camera user interface includes: in accordance with a determination that a set of one or more criteria is satisfied, displaying the camera user interface with a tutorial within the camera user interface, wherein the tutorial provides information about how to capture media with the computer system while the camera user interface is displayed; and in accordance with a determination that the set of one or more criteria is not satisfied, displaying the camera user interface without displaying the tutorial.

In accordance with some embodiments, a method performed at a computer system that is in communication with a display generation component, one or more input devices, and one or more cameras is described. The method comprises: displaying, via the display generation component, a user interface that includes: a representation of a physical environment, wherein a first portion of the representation of the physical environment is within a capture region of the one or more cameras and a second portion of the representation of the physical environment is outside of the capture region of the one or more cameras; and a viewfinder, wherein the viewfinder includes a boundary; while displaying the user interface, detecting, via the one or more input devices, a first request to capture media; and in response to detecting the first request to capture media: capturing, using the one or more cameras, a first media item that includes at least the first portion of the representation of the physical environment; and changing the appearance of the viewfinder, wherein changing the appearance of the viewfinder includes: changing the appearance of a first portion of content that is within a threshold distance of a first side of the boundary of the viewfinder; and changing the appearance of a second portion of content that is within the threshold distance of a second side of the boundary of the viewfinder, that is different from the first side of the boundary of the viewfinder.

In accordance with some embodiments, a non-transitory computer readable storage medium is described. The non-transitory computer-readable storage medium stores one or more programs configured to be executed by one or more processors of a computer system that is in communication with a display generation component, one or more input devices, and one or more cameras, the one or more programs including instructions for: displaying, via the display generation component, a user interface that includes: a representation of a physical environment, wherein a first portion of the representation of the physical environment is within a capture region of the one or more cameras and a second portion of the representation of the physical environment is outside of the capture region of the one or more cameras; and a viewfinder, wherein the viewfinder includes a boundary; while displaying the user interface, detecting, via the one or more input devices, a first request to capture media; and in response to detecting the first request to capture media: capturing, using the one or more cameras, a first media item that includes at least the first portion of the representation of the physical environment; and changing the appearance of the viewfinder, wherein changing the appearance of the viewfinder includes: changing the appearance of a first portion of content that is within a threshold distance of a first side of the boundary of the viewfinder; and changing the appearance of a second portion of content that is within the threshold distance of a second side of the boundary of the viewfinder, that is different from the first side of the boundary of the viewfinder.

In accordance with some embodiments, a transitory computer readable storage medium is described. The transitory computer-readable storage medium stores one or more programs configured to be executed by one or more processors of a computer system that is in communication with a display generation component, one or more input devices, and one or more cameras, the one or more programs including instructions for: displaying, via the display generation component, a user interface that includes: a representation of a physical environment, wherein a first portion of the representation of the physical environment is within a capture region of the one or more cameras and a second portion of the representation of the physical environment is outside of the capture region of the one or more cameras; and a viewfinder, wherein the viewfinder includes a boundary; while displaying the user interface, detecting, via the one or more input devices, a first request to capture media; and in response to detecting the first request to capture media: capturing, using the one or more cameras, a first media item that includes at least the first portion of the representation of the physical environment; and changing the appearance of the viewfinder, wherein changing the appearance of the viewfinder includes: changing the appearance of a first portion of content that is within a threshold distance of a first side of the boundary of the viewfinder; and changing the appearance of a second portion of content that is within the threshold distance of a second side of the boundary of the viewfinder, that is different from the first side of the boundary of the viewfinder.

In accordance with some embodiments, a computer system is described. The computer system comprises one or more processors, wherein the computer system is configured to communicate with a display generation component, one or more input devices, and one or more cameras; and memory storing one or more programs configured to be executed by the one or more processors, the one or more programs including instructions for: displaying, via the display generation component, a user interface that includes: a representation of a physical environment, wherein a first portion of the representation of the physical environment is within a capture region of the one or more cameras and a second portion of the representation of the physical environment is outside of the capture region of the one or more cameras; and a viewfinder, wherein the viewfinder includes a boundary; while displaying the user interface, detecting, via the one or more input devices, a first request to capture media; and in response to detecting the first request to capture media: capturing, using the one or more cameras, a first media item that includes at least the first portion of the representation of the physical environment; and changing the appearance of the viewfinder, wherein changing the appearance of the viewfinder includes: changing the appearance of a first portion of content that is within a threshold distance of a first side of the boundary of the viewfinder; and changing the appearance of a second portion of content that is within the threshold distance of a second side of the boundary of the viewfinder, that is different from the first side of the boundary of the viewfinder.

In accordance with some embodiments, a computer system is described. The computer system is configured to communicate with a display generation component, one or more input devices, and one or more cameras, and the computer system comprises: means for displaying, via the display generation component, a user interface that includes: a representation of a physical environment, wherein a first portion of the representation of the physical environment is within a capture region of the one or more cameras and a second portion of the representation of the physical environment is outside of the capture region of the one or more cameras; and a viewfinder, wherein the viewfinder includes a boundary; means, while displaying the user interface, for detecting, via the one or more input devices, a first request to capture media; and means, responsive to detecting the first request to capture media, for: capturing, using the one or more cameras, a first media item that includes at least the first portion of the representation of the physical environment; and changing the appearance of the viewfinder, wherein changing the appearance of the viewfinder includes: changing the appearance of a first portion of content that is within a threshold distance of a first side of the boundary of the viewfinder; and changing the appearance of a second portion of content that is within the threshold distance of a second side of the boundary of the viewfinder, that is different from the first side of the boundary of the viewfinder.

In accordance with some embodiments, a computer program product is described. The computer program product comprising one or more programs configured to be executed by one or more processors of a computer system that is in communication with a display generation component, one or more input devices, and one or more cameras, the one or more programs including instructions for: displaying, via the display generation component, a user interface that includes: a representation of a physical environment, wherein a first portion of the representation of the physical environment is within a capture region of the one or more cameras and a second portion of the representation of the physical environment is outside of the capture region of the one or more cameras; and a viewfinder, wherein the viewfinder includes a boundary; while displaying the user interface, detecting, via the one or more input devices, a first request to capture media; and in response to detecting the first request to capture media: capturing, using the one or more cameras, a first media item that includes at least the first portion of the representation of the physical environment; and changing the appearance of the viewfinder, wherein changing the appearance of the viewfinder includes: changing the appearance of a first portion of content that is within a threshold distance of a first side of the boundary of the viewfinder; and changing the appearance of a second portion of content that is within the threshold distance of a second side of the boundary of the viewfinder, that is different from the first side of the boundary of the viewfinder.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 8 is a flow diagram of a method of capturing media in accordance with some embodiments.

FIG. 9 is a flow diagram of a method of displaying a preview of media in accordance with some embodiments.

FIG. 12 is a flow diagram of a method for displaying a representation of a physical environment with a recording indicator in accordance with some embodiments.

FIGS. 13A-13J illustrate example techniques for displaying a camera user interface.

FIGS. 15A-15B are flow diagrams of a method for changing the appearance of a view finder, in accordance with some embodiments.

DESCRIPTION OF EMBODIMENTS

The present disclosure relates to user interfaces for providing an extended reality (XR) experience to a user, in accordance with some embodiments.

Figure 10:
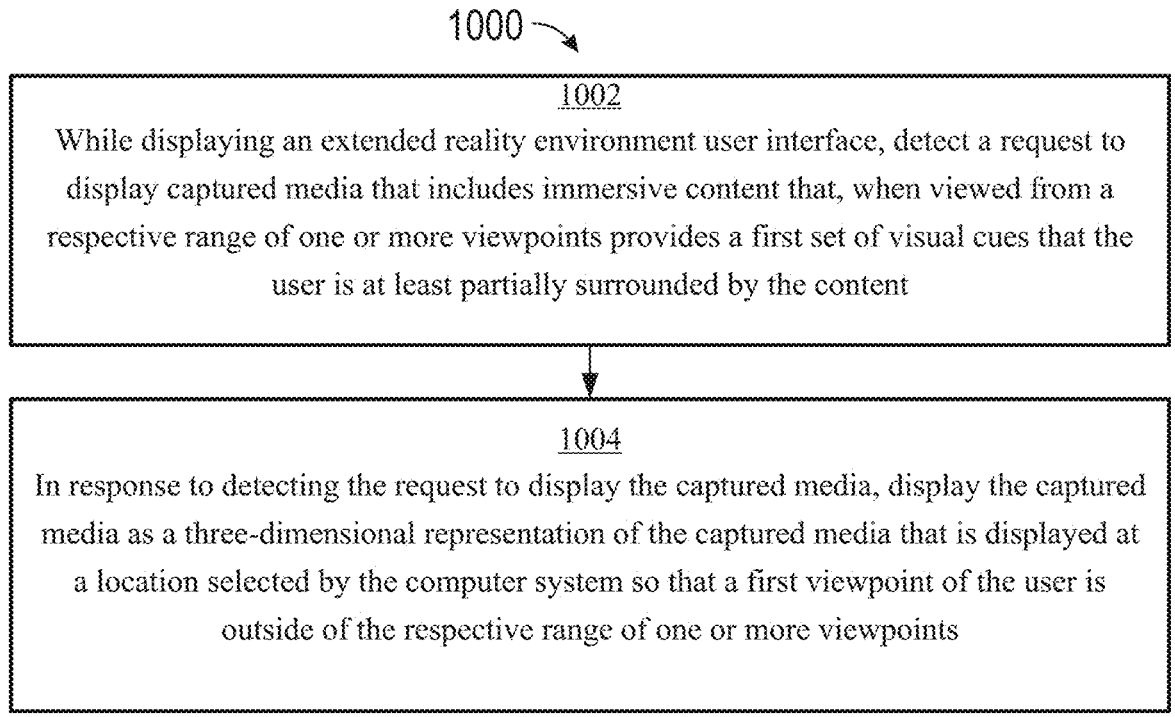
FIG. 10 is a flow diagram of a method for displaying previously captured media, in accordance with some embodiments.
Figure 14:
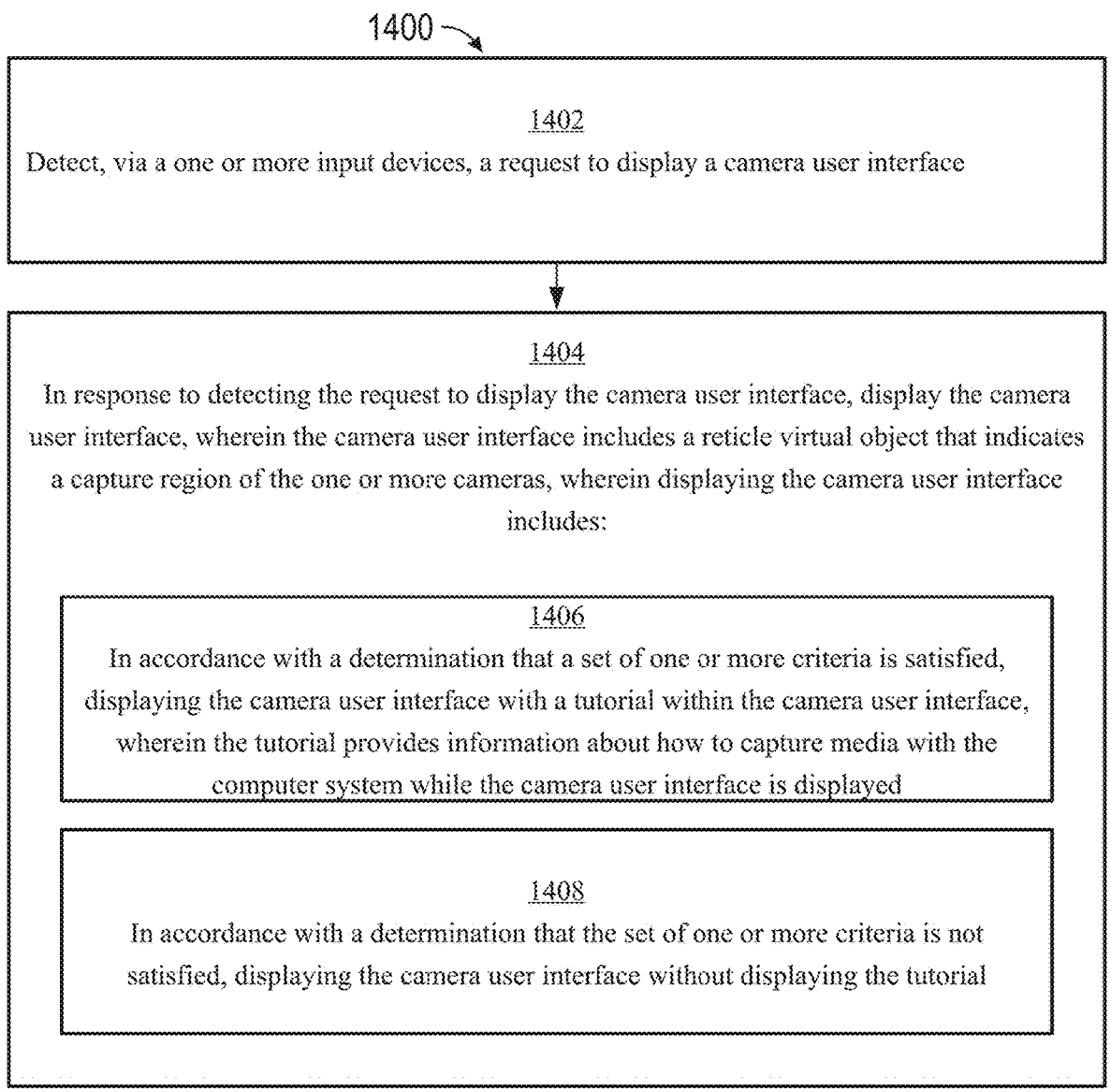
FIG. 14 is a flow diagram of a method for displaying information related to capturing media, in accordance with some embodiments.
Figure 15A:
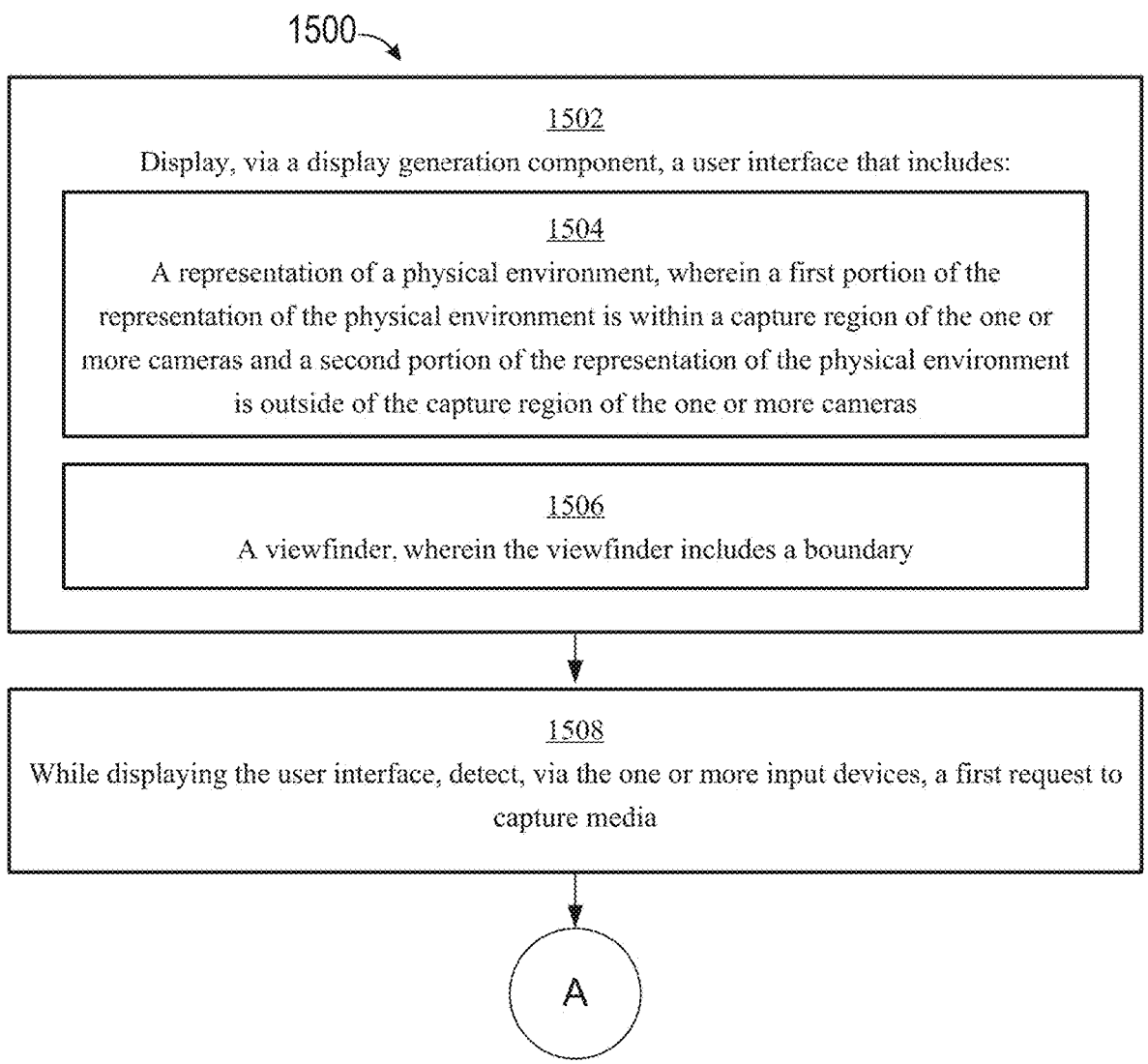

FIGS. 1-6 provide a description of example computer systems for providing XR experiences to users. FIGS. 7A-7Q illustrate example techniques for capturing and/or displaying media in various environments, in accordance with some embodiments. FIG. 8 is a flow diagram of methods of capturing and viewing media, in accordance with various embodiments. FIG. 9 is a flow diagram of methods of displaying a preview of media, in accordance with various embodiments. FIG. 10 is a flow diagram of methods of displaying previously captured media, in accordance with various embodiments. The user interfaces in FIGS. 7A-7Q illustrate the processes in FIGS. 8, 9, and 10. FIGS. 11A-11D illustrate example techniques for displaying a representation of a physical environment with a recording indicator in accordance with some embodiments. FIG. 12 is a flow diagram of methods of displaying a representation of a physical environment with a recording indicator in accordance with some embodiments. The user interfaces in FIGS. 11A-11D illustrate the processes in FIG. 12. FIGS. 13A-13J illustrate example techniques for displaying a camera user interface, in accordance with some embodiments. FIG. 14 is a flow diagram of a method for displaying information related to capturing media, in accordance with some embodiments. FIGS. 15A-15B are flow diagrams of a method for changing the appearance of a viewfinder, in accordance with some embodiments. The user interfaces in FIGS. 13A-13J illustrate the processes in FIGS. 14, 15A, and 15B.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
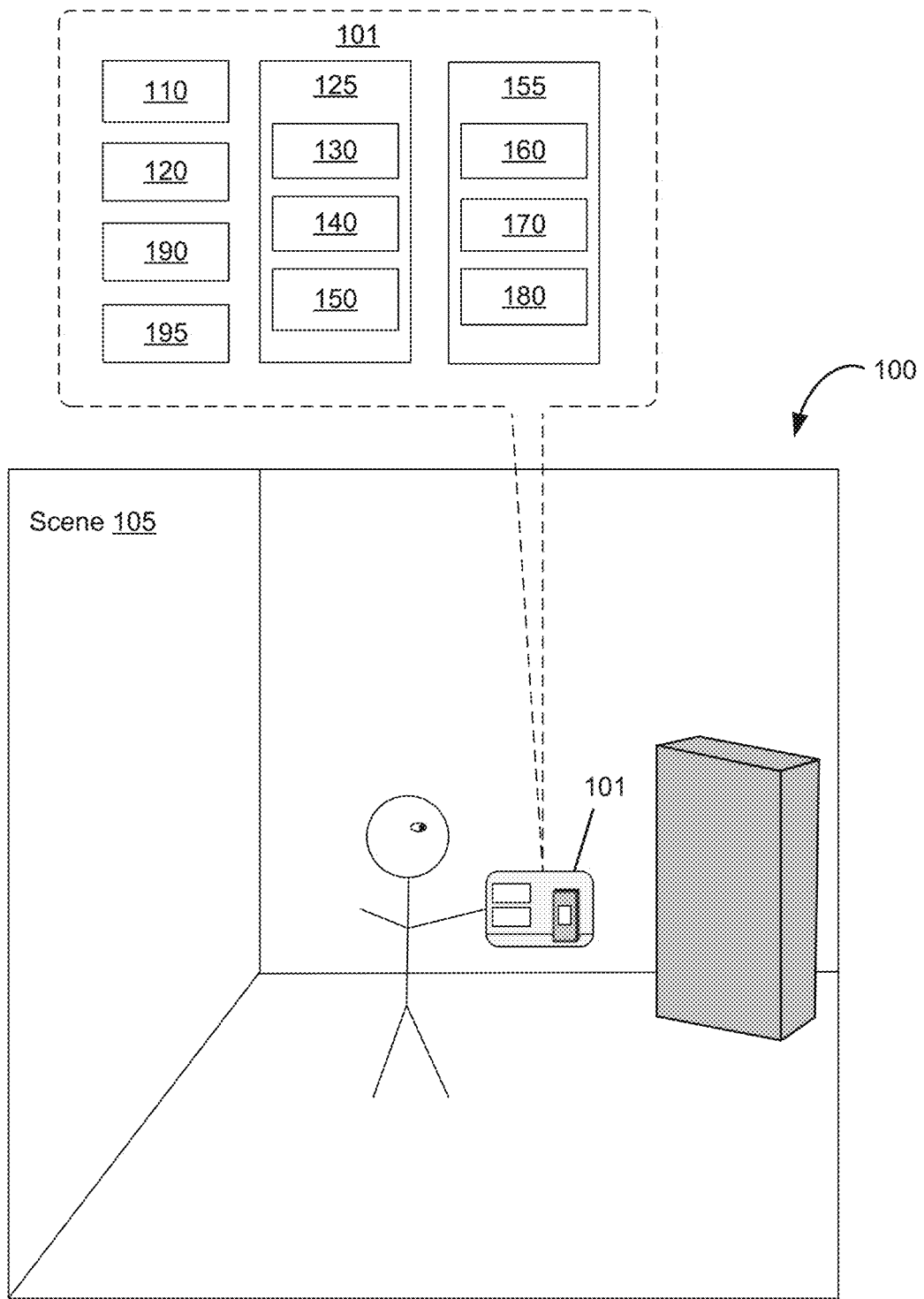
FIG. 1 is a block diagram illustrating an operating environment of a computer system for providing XR experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display.

Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
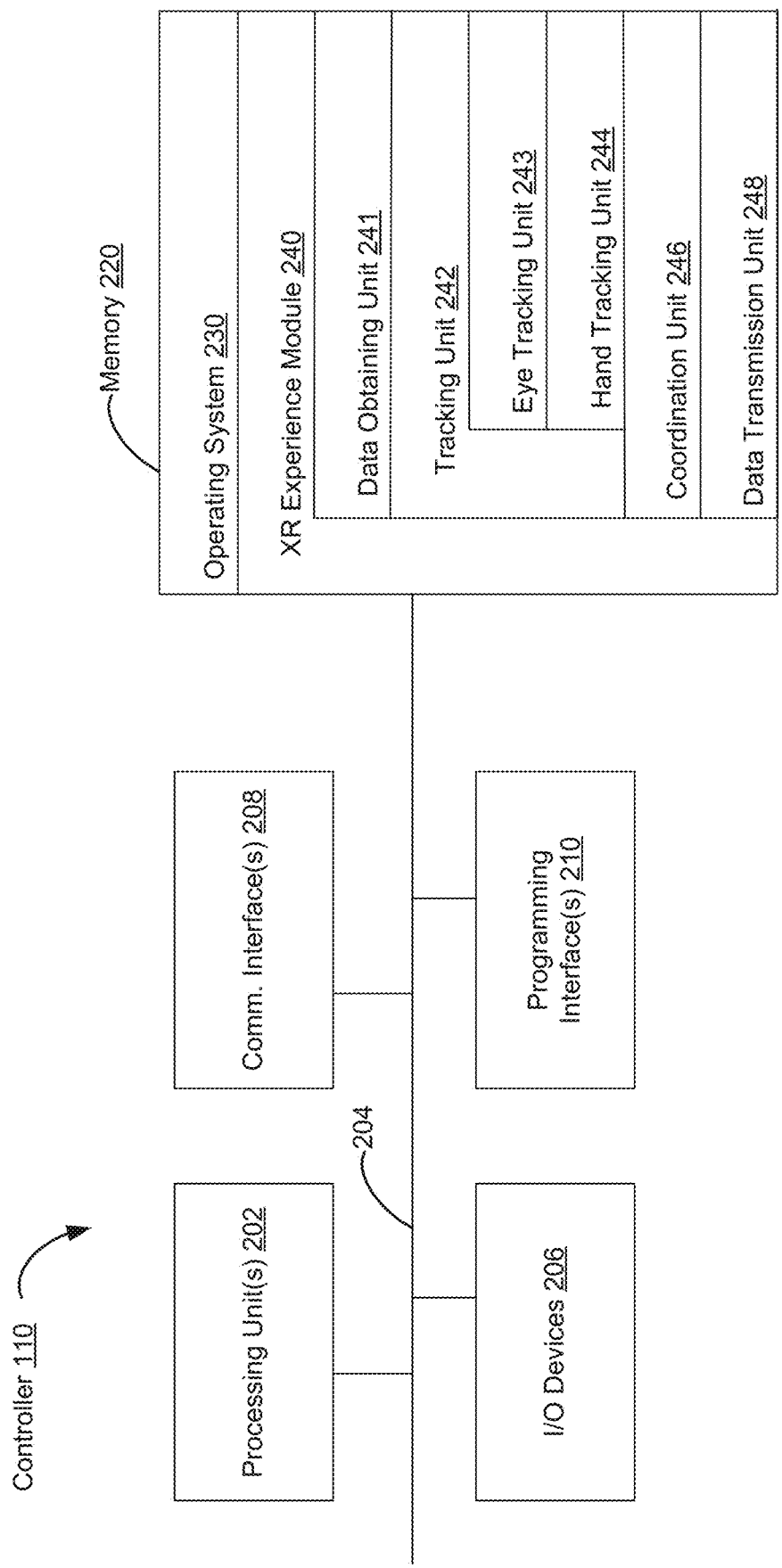
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
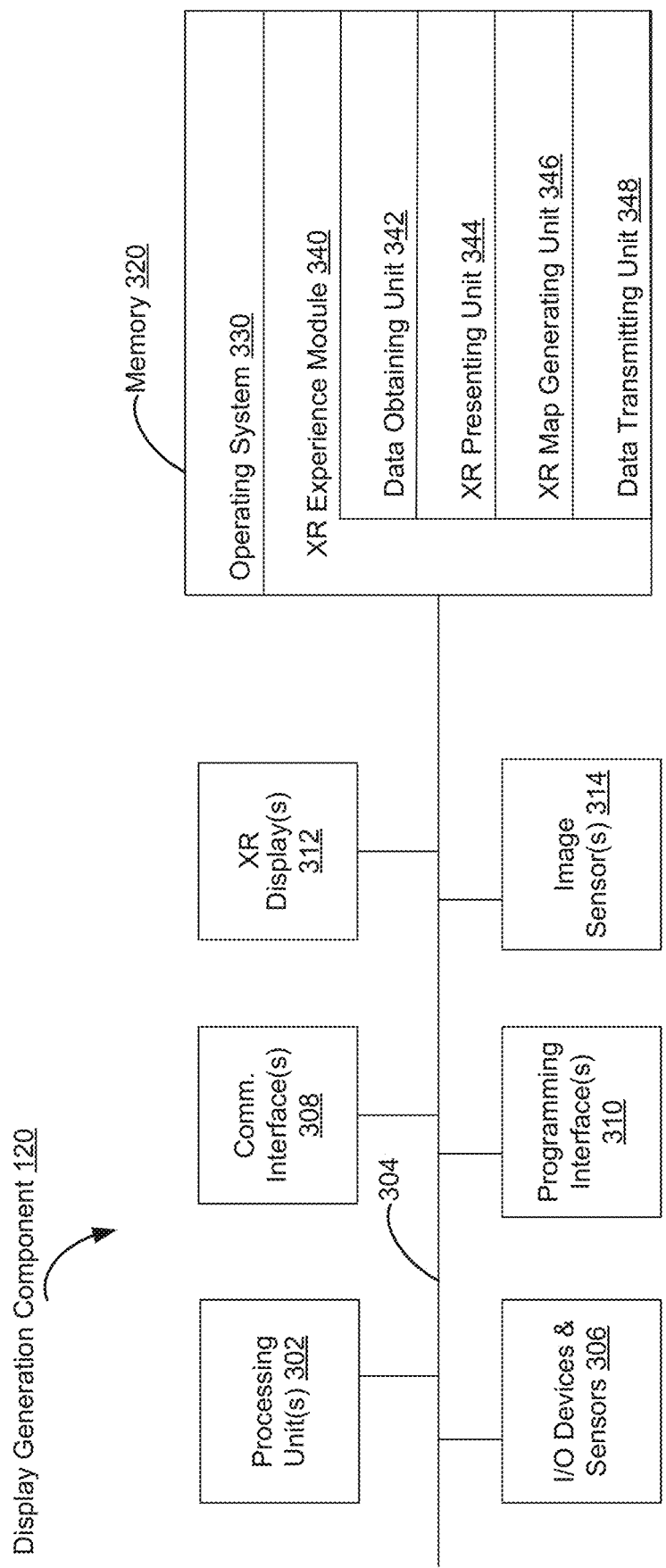
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
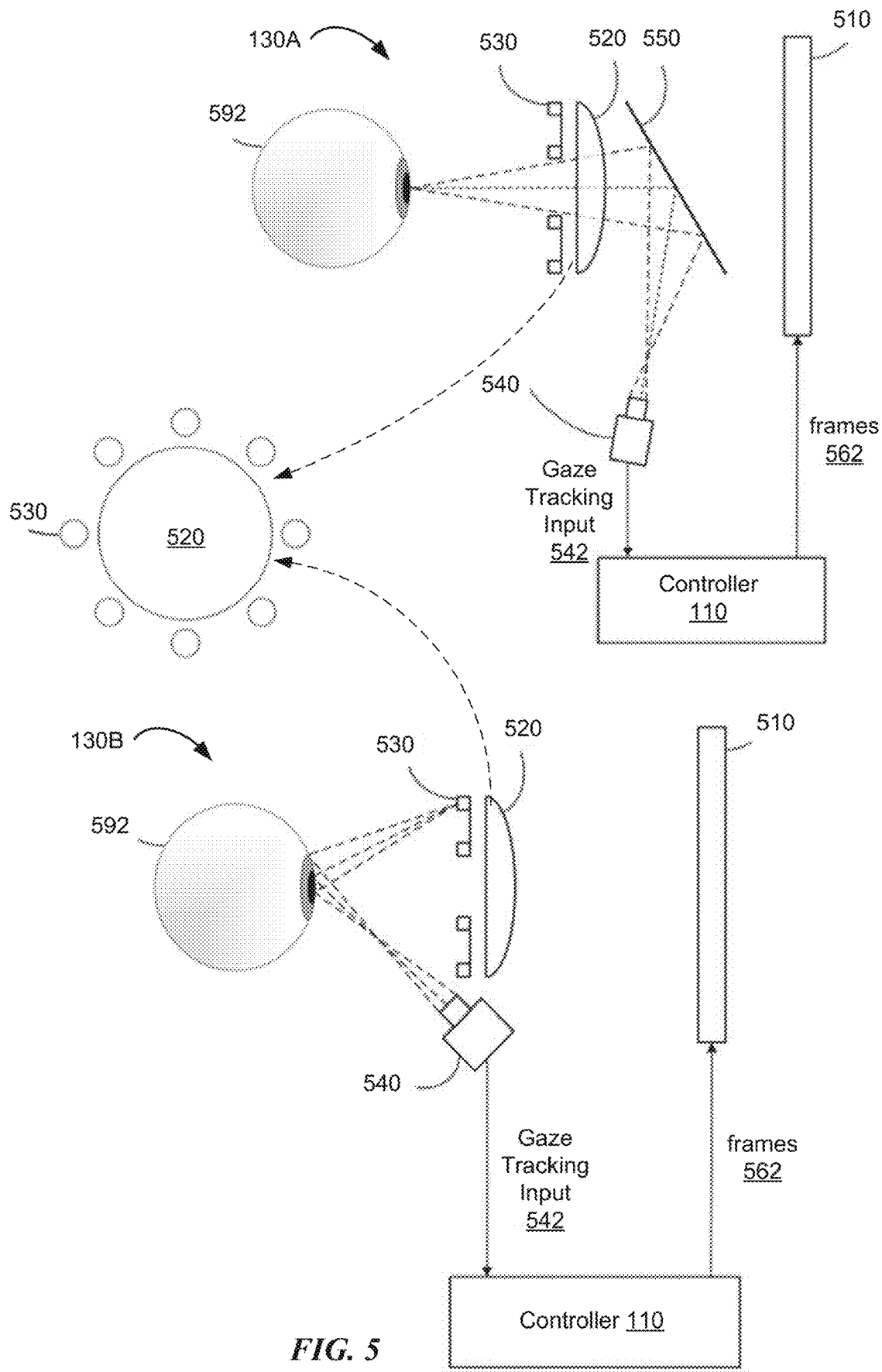
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
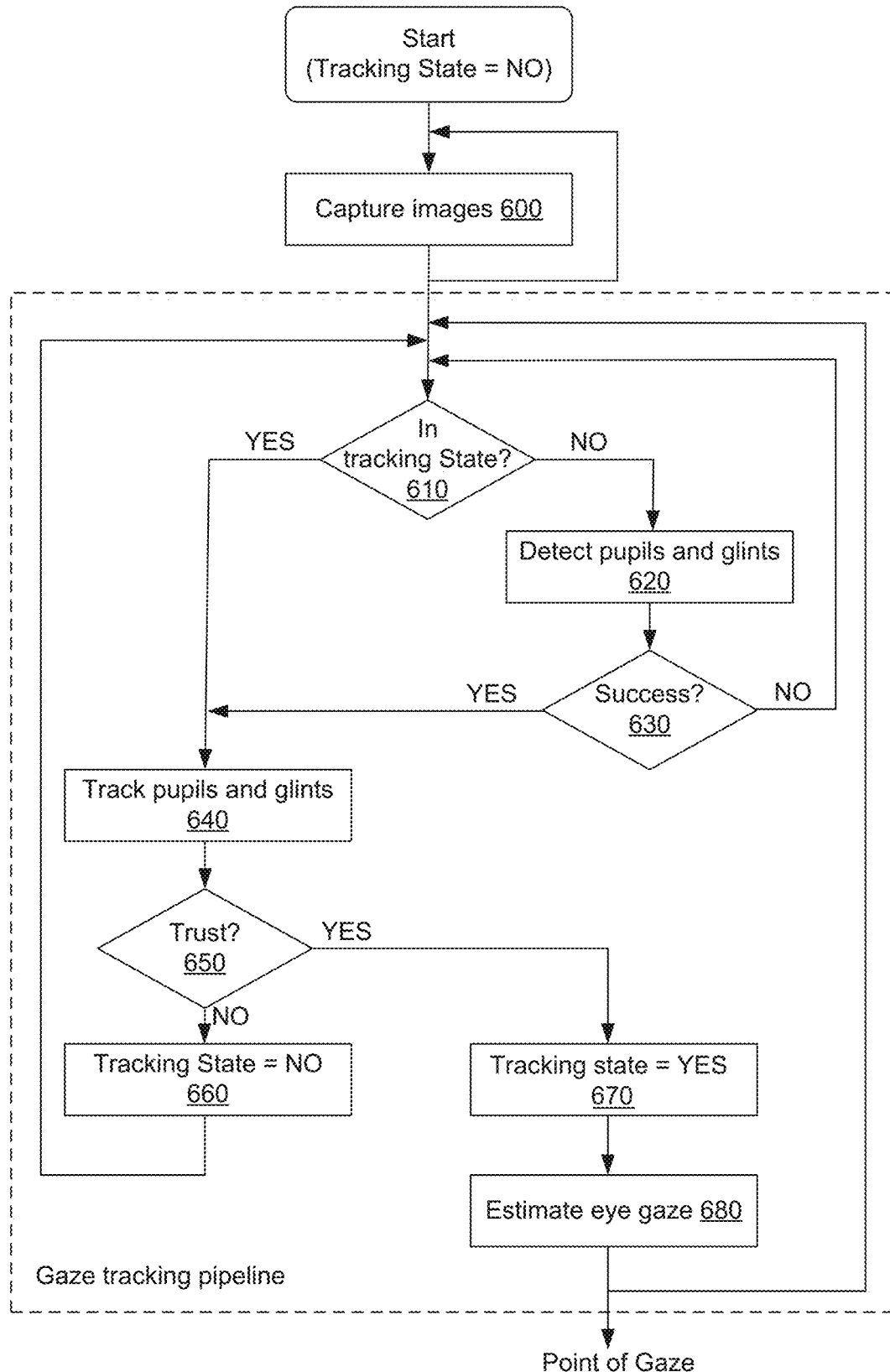
FIG. 6 is a flow diagram illustrating a glint-assisted gaze tracking pipeline in accordance with some embodiments.
Figure 7A:
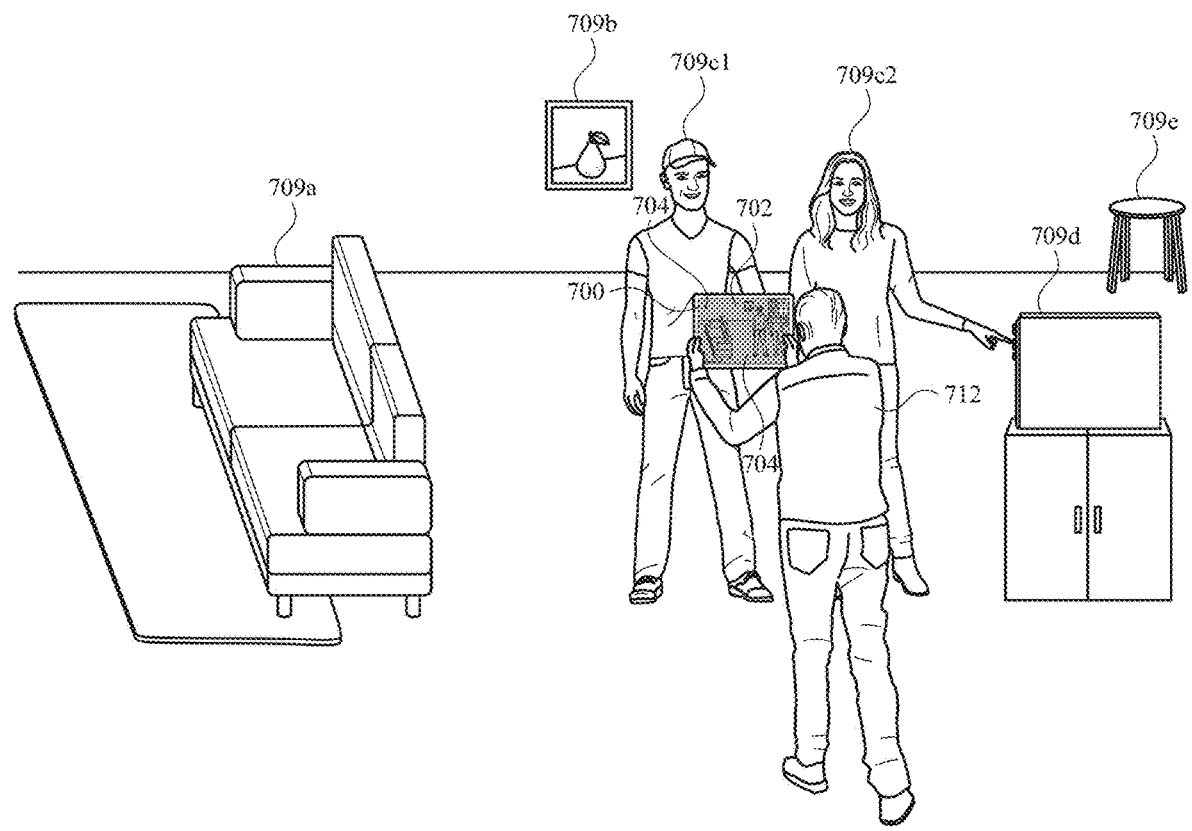
FIGS. 7A-7Q illustrate example techniques for capturing and/or displaying media in some environments in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, and (optionally) one or cameras and one or more input devices.

FIGS. 7A-7Q illustrate example techniques for capturing and/or displaying media in various environments in accordance with some embodiments. FIG. 8 is a flow diagram of a method of capturing media in accordance with various embodiments. FIG. 9 is a flow diagram of a method of displaying a preview of media in accordance with various embodiments. FIG. 10 is a flow diagram of a method for displaying previously captured media. The user interfaces in FIGS. 7A-7Q are used to illustrate the processes described below, including the processes in FIGS. 8, 9, and 10.

FIGS. 7A-7Q illustrate example techniques for capturing and viewing media, in accordance with some embodiments. The schematics and user interfaces in FIGS. 7A-7Q are used to illustrate the processes described below, including the processes in FIGS. 8, 9, and 10.

Figure 7B:
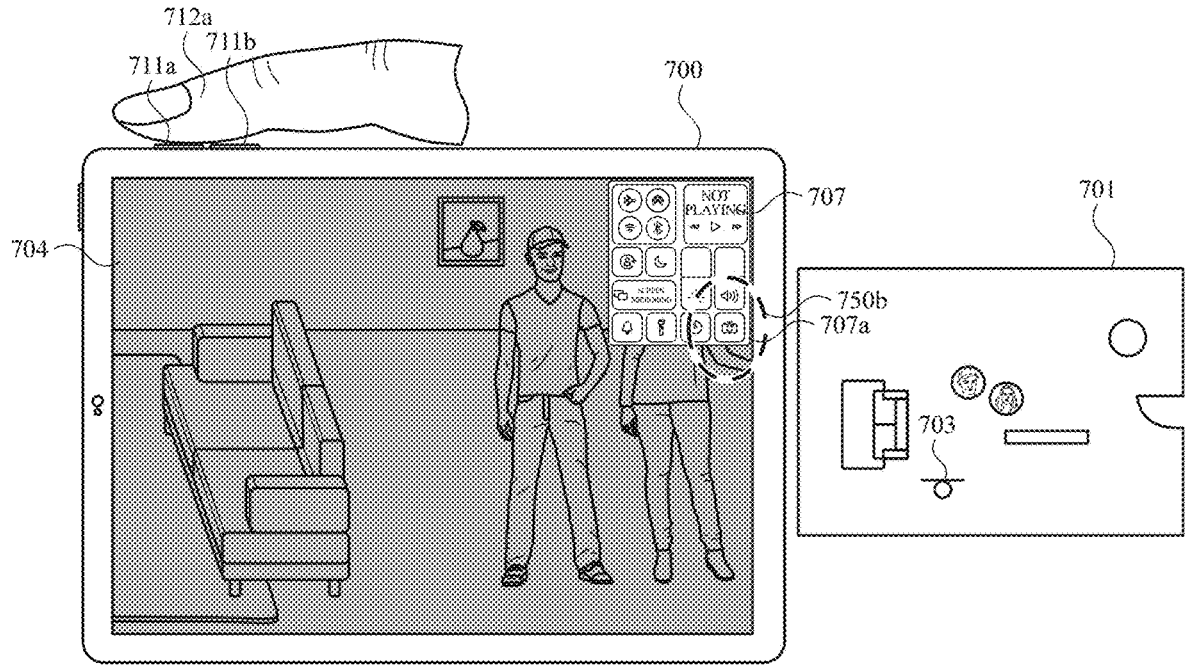

FIG. 7A illustrates user 712 holding computer system 700 that includes display 702 in a physical environment (e.g., a room in a home). The physical environment includes couch 709a, picture 709b, first individual 709c1, second individual 709c2, television 709d, and table 709e. Display 702 presents representation of the physical environment 704 (e.g., using "pass-through video" as described above). User 712 is holding computer system 700 such that couch 709a, picture 709b, first individual 709c1, and second individual 709c2 are visible from a viewpoint of the user that, for virtual passthrough, is determined based on a location of a portion of computer system 700 that includes one or more cameras that are used to obtain visual information about the physical environment and generate a virtual environment based on the visual information about the visual environment. In the embodiment of FIGS. 7A-7Q, the viewpoint of the user corresponds to the field-of-view of one or more cameras that are in communication with computer system 700 (e.g., cameras on the backside of computer system 700). Accordingly, for virtual passthrough, as computer system 700 is moved throughout the physical environment, the field-of-view of the one or more cameras changes which causes the viewpoint of the user to change. Because couch 709*a*, picture 709*b*, the individual 709*c*1 and second individual 709*c*2 are visible from the viewpoint of the user in FIG. 7A, display 702 includes a depiction of couch 709*a*, picture 709*b*, first individual 709*c*1, and second individual 709*c*2. When user 712 looks at display 702, user 712 can see representation of physical environment 704 along with one or more virtual objects that computer system 700 can display (e.g., as shown in FIGS. 7B-7Q). Thus, computer system 700 presents an augmented reality environment through display 702.

While computer system 700 is a tablet in FIG. 7A, in some embodiments, computer system 700 can be one or more other devices, such as a handheld device (e.g., a smart phone) and/or a head-mounted device. In some embodiments, when computer system 700 is a head-mounted device, representation of physical environment 704 is an extended reality environment. In some embodiments, while representation of physical environment 704 is an extended reality environment, representation of physical environment 704 includes immersive visual properties that include the display of depth data (e.g., the foreground and the background of representation of physical environment 704 are displayed differently so as to present a visual effect of depth when viewed by a user of computer system 700). In some embodiments, computer system 700 includes one or more components of computer system 101, and/or display 702 includes components of display generation component 120. In some embodiments, display 702 presents a representation of a virtual environment (e.g., instead of the physical environment at FIG. 7A).

FIGS. 7B-7E illustrate a method for capturing spatial (e.g., immersive) media. In FIGS. 7B-7E, computer system 700 remains in the physical environment shown in FIG. 7A, as illustrated in schematic diagram 701, which is discussed in more detail below. In FIGS. 7B-7E, computer system 700 is now shown in an enlarged view to better illustrate the content visible on display 702. As illustrated in FIG. 7B, computer system 700 displays control center virtual object 707 (e.g., in response to a swipe gesture on display 702 performed by user 712). Control center virtual object 707 includes a plurality of virtual objects. Each virtual object included in control center virtual object 707 is selectable. Each virtual object included in control center virtual object 707, when selected, causes computer system 700 to perform a respective operation (e.g., modify a playback status of computer system 700, modify the volume at which computer system 700 outputs audio, cause the display of an application that is presently installed on computer system 700, and/or any other suitable operation).

As illustrated in FIG. 7B, computer system 700 presents representation of the physical environment 704. Representation of physical environment 704 corresponds to the viewpoint of the user (e.g., representation of physical environment 704 includes content that is visible from the viewpoint of the user). That is, when the viewpoint of the user changes, representation of physical environment 704 changes based on the change of the viewpoint of the user of computer system 700. In some embodiments, representation of physical environment 704 is a passthrough representation of at least a portion the physical environment that surrounds computer system 700.

As illustrated in FIG. 7B, representation of physical environment 704 visually contrasts with the display of control center virtual object 707. Representation of physical environment 704 includes a first amount of shading/blurring while the display of control center virtual object 707 is displayed with a second amount of shading/blurring (e.g., no shading/blurring) that is different from the first amount of shading/blurring. In some embodiments, representation of physical environment 704 does not contrast with the display of control center virtual object 707. In some embodiments, representation of physical environment 704 does not have any amount of blurring/shading.

FIGS. 7B-7Q include schematic diagram 701 of the physical environment. Computer system 700 is represented by indication 703 within schematic diagram 701. That is, the location and orientation of indication 703 in schematic diagram 701 is representative of the location and orientation of computer system 700 within the physical environment. While schematic diagram 701 depicts the physical environment shown in FIG. 7A, it should be recognized that this is merely an example and techniques described here can work with other types of physical environments. Schematic diagram 701 is only a visual aid. Computer system 700 does not display schematic diagram 701.

FIG. 7B illustrates computer system 700 as having hardware button 711*a* (e.g., a hardware input device/mechanism) (e.g., physical input device) and hardware button 711*b*. Further, FIG. 7B illustrates body portion 712*a* of user 712. Body portion 712*a* depicts one of user's 704 digits (e.g., user's pointer finger, ring finger, pinkie finger, middle finger, or thumb). In some embodiments, representation of body portion 712*a* is any other portion of user's 704 body (e.g., wrist, arm, hand and/or any other suitable body portion) capable of activating hardware button 711*a* or hardware button 711*b*. At FIG. 7B, computer system 700 detects body portion's 712*a* activation of hardware button 711*a* or computer system 700 detects input 750*b* directed at camera virtual object 707*a*. In some embodiments, input 750*b* is a tap input (e.g., an air tap in space that corresponds to the location of the display of camera virtual object 707*a*) on camera virtual object 707*a*. In some embodiments, input 750*b* is a gaze input (e.g., a sustained gaze) that is directed towards the direction of the display of camera virtual object 707*a*. In some embodiments, input 750*b* is an air tap input in combination with a detection of a gaze in the direction of the display of camera virtual object 707*a*. In some embodiments, input 750*b* is a gaze and blink that is directed towards the direction of the display of camera virtual object 707*a*.

Figure 7C:
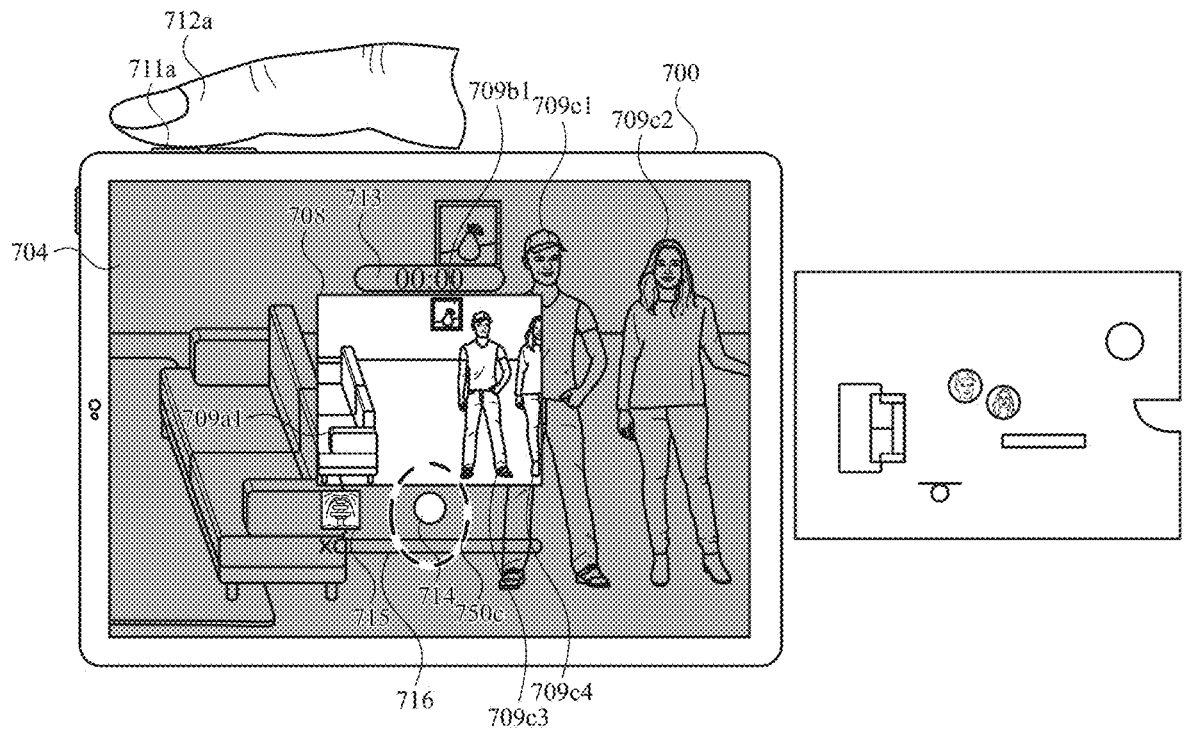

As illustrated in FIG. 7C, in response to detecting body portion's 712*a* activation of hardware button 711*a* or input 750*b* directed at camera virtual object 707*a*, computer system 700 displays media capture preview 708, timer virtual object 713, camera shutter virtual object 714, re-positioning virtual object 716, dismiss virtual object 719, and photo well virtual object 715. Computer system 700 displays media capture preview 708 as overlaid on top of representation of physical environment 704. As illustrated in FIG. 7C, the display of media capture preview 708 is smaller (e.g., takes up less space on display 702) than representation of physical environment 704. In some embodiments, computer system 700 is a head-mounted device that presents representation of physical environment 704 along with one or more virtual objects that computer system 700 displays via a display generation component that encloses (or substantially encloses) the field-of-view of the user. In embodiments where computer system 700 is an HMD, the viewpoint of the user is locked to the forward facing direction of the user's head, such that representation of physical environment 704 and one or more virtual objects, such as, media capture preview 708 shift as the user's head moves (e.g., because computer system 700 also moves as the user's head moves).

Timer virtual object 713, camera shutter virtual object 714, re-positioning virtual object 716, dismiss virtual object 719, and photo well virtual object 715 are all anchored to media capture preview 708. That is, the locations of the display of timer virtual object 713, camera shutter virtual object 714, re-positioning virtual object 716, and photo well virtual object 715 is associated with the location of the display of media capture preview 708. In some embodiments, the locations of the display of timer virtual object 713, camera shutter virtual object 714, re-positioning virtual object 716, dismiss virtual object 719, and photo well virtual object 715 change when to the location of the display of media capture preview 708 changing (see, e.g., FIGS. 7F-7G). As illustrated in FIG. 7C, computer system 700 displays media capture preview 708 above/on top of camera shutter virtual object 714 and in the center of display 702. As illustrated in FIG. 7C, media capture preview 708 includes a portion of representation of physical environment 704 that was visible prior to computer system 700 displaying media capture preview 708. For example, at FIG. 7B, (e.g., before computer system 700 displays media capture preview 708) representation of physical environment includes couch 709a, picture 709b, first individual 709c1, and second individual 709c2. Accordingly, as illustrated in FIG. 7C, media capture preview 708 includes a depiction of couch 709a1, picture 709b1, first individual 709c3, and second individual 709c4. Media capture preview 708 provides a preview of the content that will be captured in response to computer system 700 detecting a request to capture media. The content that is displayed within media capture preview 708 is based on the field-of-view of the one or more cameras that are in communication with computer system 700 (e.g., the content that is displayed within media capture preview 708 is within the field-of-view of the one or more cameras that are in communication with computer system 700). The content that is displayed within media capture preview 708 changes based on changes to the field-of-view of the one or more cameras. In some embodiments, computer system 700 includes two cameras and the content that is displayed within media capture preview 708 is content that falls within the field-of-view of both of the two cameras, which allows for the capture of immersive content.

In FIG. 7C, the viewpoint of the user that corresponds to representation of physical environment 704 has a wider visual angular range than the angular range of the field-of-view that corresponds to media capture preview 708. This causes representation of physical environment 704 to depict a greater amount of the physical environment than the amount of the physical environment depicted within media capture preview 708 (e.g., the entirety of the sofa is visible in representation of physical environment 704 whereas only a portion of the sofa is visible in media capture preview 708). Thus, media captured while media capture preview 708 appears as shown in FIG. 7C would include only a portion of the sofa, rather than the entirety of the sofa. In some embodiments, the representation of the physical environment included in media capture preview 708 is displayed at a first scale and representation of physical environment 704 is presented at a second scale that is larger than the first scale. In some embodiments, computer system 700 includes two cameras having different, but overlapping fields-of-view and media capture preview 708 represents portions of the physical environment that are common to the fields-of-view of both cameras (e.g., where the FOVs overlap) whereas representation of physical environment 704 includes content within the FOVs of the first and/or the second camera of the two cameras (e.g., both overlapping and non-overlapping). In some embodiments, computer system's 700 display of media capture preview 708 includes content that is included in representation of physical environment 704. In some embodiments, representation of physical environment 704 is displayed from an immersive perspective and the content included in the display of media capture preview 708 is displayed from a non-immersive perspective.

As illustrated in FIG. 7C, media capture preview 708 is displayed with a visual appearance that includes no dimming and/or blurring and representation of physical environment 704 is displayed as dimmed and/or blurred. This provides a contrast between the display of media capture preview 708 and representation of physical environment 704. In some embodiments, representation of physical environment 704 is not dimmed and/or blurred prior to computer system 700 detecting input 750b or prior to computer system 700 detecting body portion's 712a activation of hardware button 711a at FIG. 7B. In some embodiments, representation of physical environment 704 is dimmed and/or blurred (e.g., fades out) in response to computer system 700 detecting input 750b or in response to computer system 700 detecting body portion's 712a activation of hardware button 711a.

With respect to the virtual objects that are anchored to the display of media capture preview 708, timer virtual object 713 provides an indication of an amount of time (e.g., minutes, seconds, hours) that has elapsed since computer system 700 has initiated a media capture process. Photo well virtual object 715 includes a representation of a most recently captured media item (e.g., a still photo or video). In some embodiments, photo well virtual object 715 includes a representation of a most recently captured media item that is captured by computer system 700. In some embodiments, photo well virtual object 715 includes a representation of a most recently captured media item that is captured by an external device that is in communication with computer system 700. As illustrated in FIG. 7C, photo well virtual object 715 includes a representation of a water fountain. Accordingly, the most recently captured media item includes a depiction of the water fountain.

Selection of camera shutter virtual object 714 initiates a process on computer system 700 for capturing media that includes content that is shown within media capture preview 708. Re-positioning virtual object 716 allows user 712 to reposition the location of the display of media capture preview 708. For example, moving the display location of re-positioning virtual object 716 to the left results in display of media capture preview 708 being moved to the left. Selection of dismiss virtual object 719 causes computer system 700 to cease to display media capture preview 708. In some embodiments, when media capture preview 708 ceases to be displayed, representation of physical environment 704 becomes unblurred and/or unshaded.

At FIG. 7C, computer system 700 detects body portion's 712a activation of hardware button 711a or computer system 700 detects input 750c directed at camera shutter virtual object 714. In some embodiments, input 750c is a tap on camera shutter virtual object 714 (e.g., an air tap in space that corresponds to the location of the display of camera shutter virtual object 714). In some embodiments, input 750*c* is a gaze (e.g., a sustained gaze) input that is directed towards the direction of the display of camera shutter virtual object 714. In some embodiments, input 750*c* is an air tap input in combination with a detection of a gaze in the direction of the display of camera shutter virtual object 714. In some embodiments, input 750*c* is a gaze and blink that is directed towards the direction of the display of camera shutter virtual object 714. In some embodiments, body portion's 712*a* activation of hardware button 711*a* or input 750*c* is a long press (e.g., a press and hold) (e.g., the duration of body portion's 712*a* activation of hardware button or input 750*c* spans over a multiple seconds). In some embodiments, body portion's 712*a* activation of hardware button 711 or input 750*c* is a short press (e.g., press and release) (e.g., the duration of body portion's 712*a* activation of hardware button 711*a* or input 750*c* is less than a second). In some embodiments, a specific air gesture (e.g., as described above in reference to selection of virtual objects in XR environments) that is recognized as a request to capture media is detected.

Figure 7D:
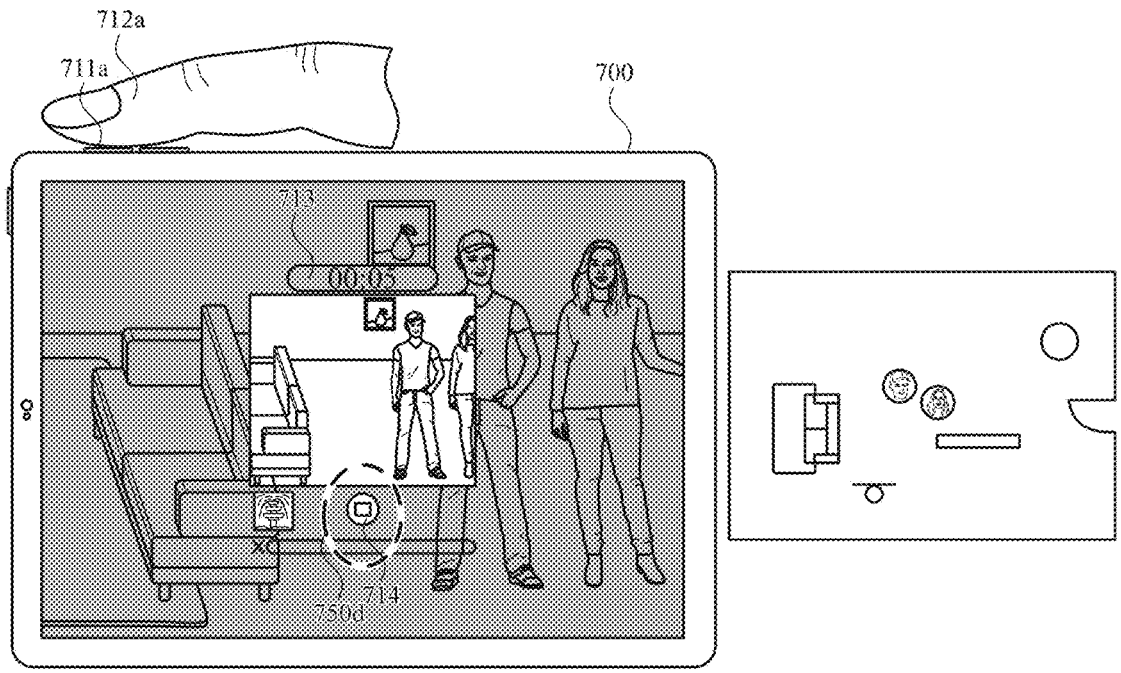

At FIG. 7D, in response to detecting body portion's 712*a* activation of hardware button 711*a* or in response to detecting input 750*c*, computer system 700 initiates a media capturing process. At FIG. 7D, a determination is made that body portion's 712*a* activation of hardware button 711 or input 750*c* is a long press. Because a determination is made that body portion's 712*a* activation of hardware button 711 or input 750*c* is a long press, video media is captured (e.g., and not still media). The media capturing process records content that is displayed within media capture preview 708 while the media capturing process is underway. In some embodiments, the field-of-view of the one or more cameras in communication with computer system 700 is changed during the media capture process which causes what is displayed within media capture preview 708 to change and which causes the content being captured by the media capturing process to change. In some embodiments, in accordance with a determination that body portion's 712*a* activation of hardware button 711 or input 750*c* is a short press, still media (e.g., a photograph) is captured via the media capturing process.

As illustrated in FIG. 7D, display of timer virtual object 713 reads "00:05" (e.g., 5 seconds). Timer virtual object 713 in FIG. 7D indicates that five seconds has elapsed since computer system 700 initiated the media capturing process. Further, as illustrated in FIG. 7D, the display of camera shutter virtual object 714 includes a square. Display of camera shutter virtual object 714 with a square indicates that computer system 700 is presently recording video media. In some embodiments, the shape, size, and or color of camera shutter virtual object 714 is updated to indicate that computer system 700 is presently recording video media. At FIG. 7D, computer system 700 detects body portion's 712*a* activation of hardware button 711*a* or computer system 700 detects input 750*d* directed at camera shutter virtual object 714. In some embodiments, input 750*d* is a tap input on camera shutter virtual object 714 (e.g., an air tap in space that corresponds to the location of the display of camera shutter virtual object 714). In some embodiments, input 750*b* is a gaze input that is directed towards the direction of the display of camera shutter virtual object 714. In some embodiments, input 750*d* is an air tap in combination with a detection of a gaze in the direction of the display of camera shutter virtual object 714. In some embodiments, input 750*d* is a gaze and blink that is directed towards the direction of the display of camera shutter virtual object 714.

Figure 7E:
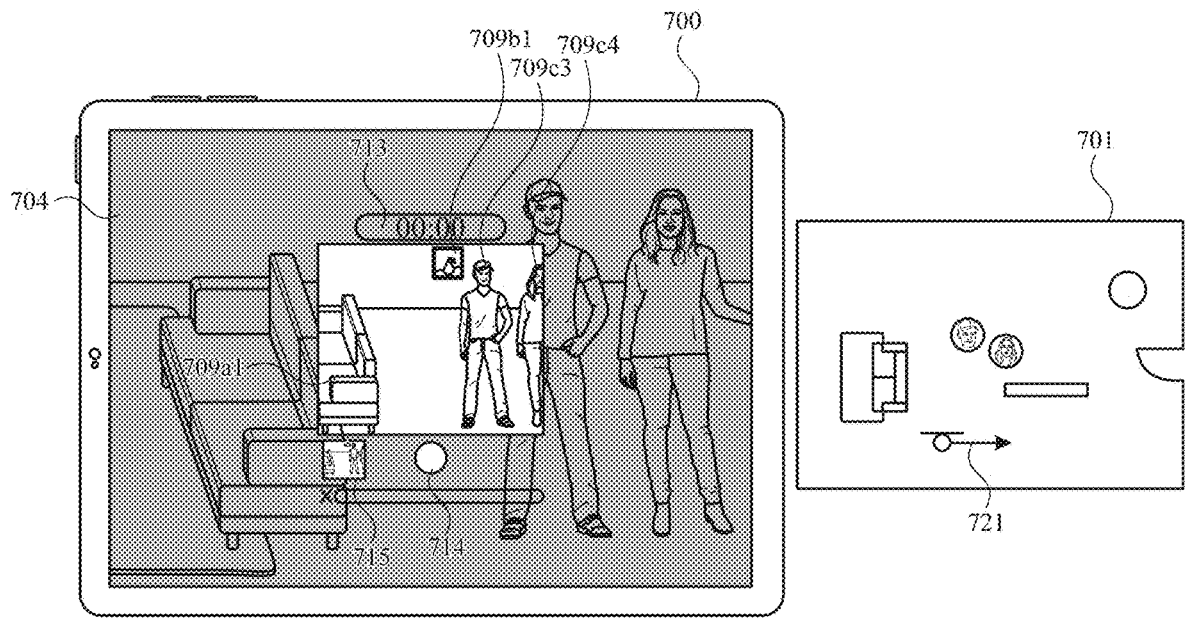

At FIG. 7E, in response to detecting body portion's 712*a* activation of hardware button 711*a* or input 750*d* directed at camera shutter virtual object 714, computer system 700 ceases the media capturing process. Because computer system 700 is no longer performing the media capturing process, the display of camera shutter virtual object 714 in FIG. 7E does not include a square. As illustrated in FIG. 7E, computer system 700 displays photo well virtual object 715 with a representation of the video that was captured in FIGS. 7C-7D (e.g., a video of the physical environment). Further, as illustrated in FIG. 7E, because computer system 700 is no longer performing the media capturing process, display of timer virtual object 713 reads 0:00.

As illustrated in FIG. 7E, schematic diagram 701 includes movement indicator 721. Movement indicator 721 indicates that computer system 700 is beginning to move within the physical environment. At FIG. 7E, computer system 700 begins to move laterally to the right within the physical environment.

Figure 7F:
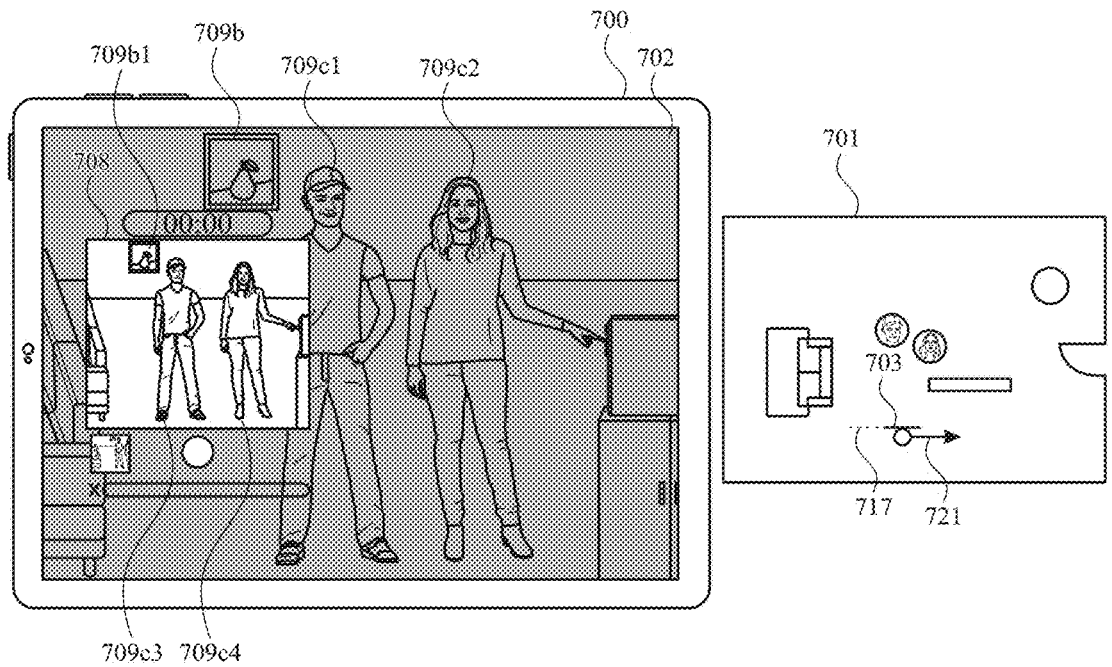
Figure 7G:
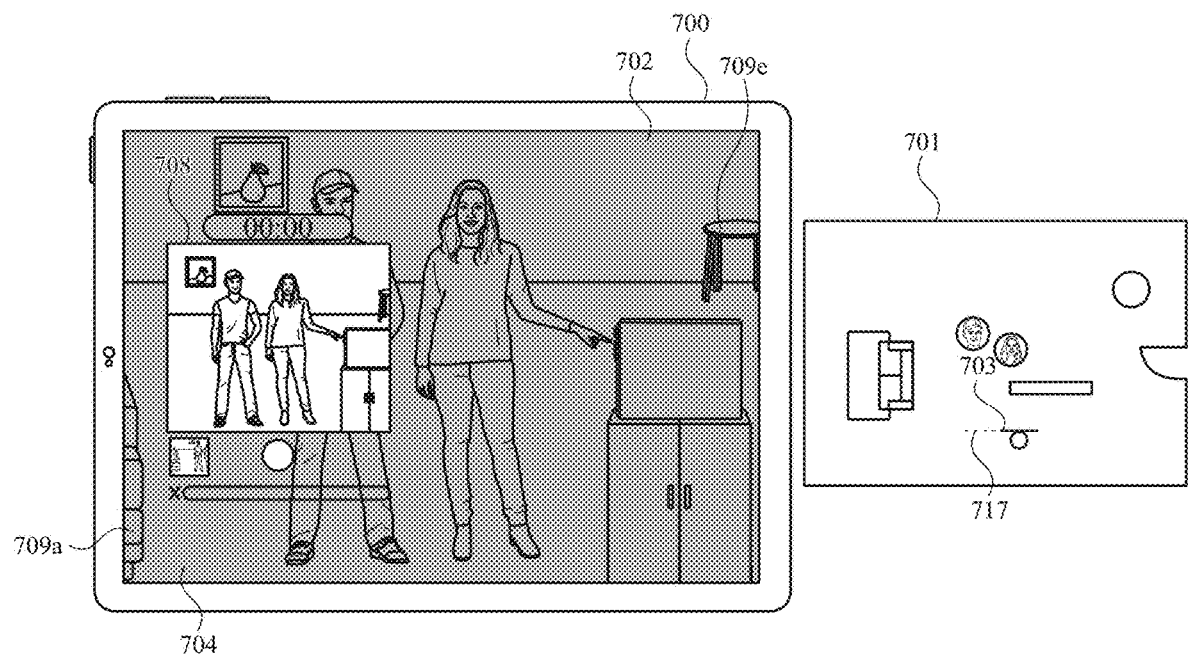
Figure 7H:
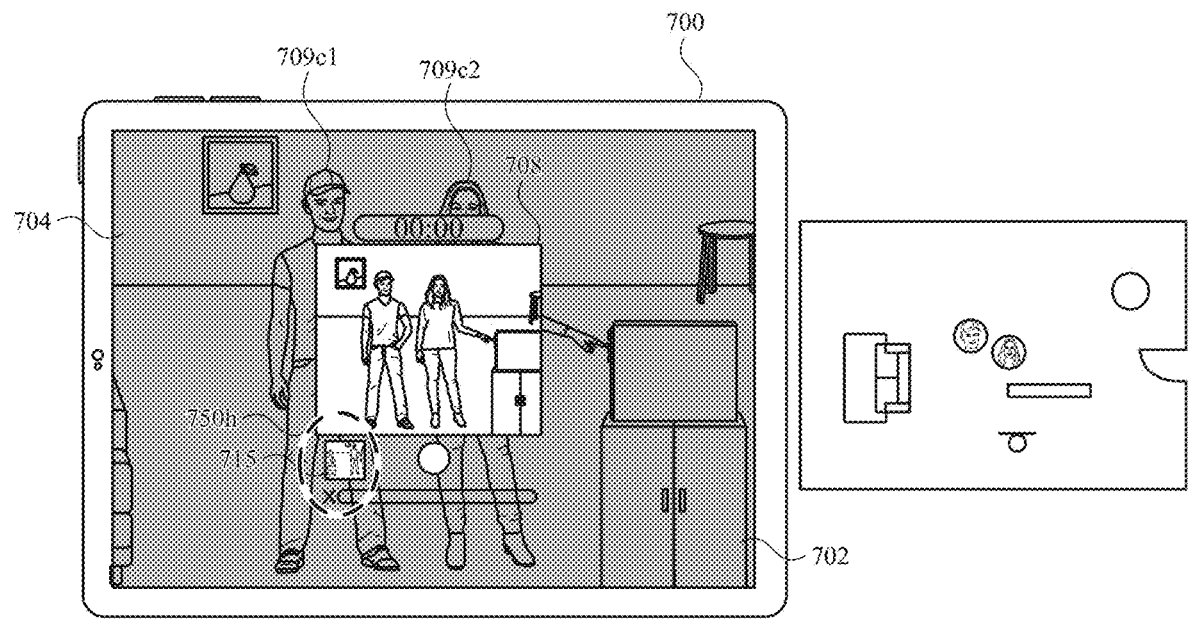

FIGS. 7F-7H illustrate a method of computer system 700 displaying media capture preview 708 as lagging (e.g., following) behind the movement of computer system 700. FIGS. 7E-7G, depict one continuous movement of computer system 700 laterally to the right within the physical environment. In some embodiments, computer system 700 is moved laterally to the left, up, and/or down within the physical environment. In some embodiments, computer system 700 is moved in a combination of different directions (e.g., up and to the left and/or down and to the right).

At FIG. 7F, computer system 700 is positioned laterally to the right of computer system's 700 previous position (e.g., computer system's 700 position in FIG. 7E). Movement of computer system 700 causes the viewpoint of the user to change. As explained above, representation of the physical environment 704 corresponds to the portion of the physical environment that is visible from the viewpoint of the user. Accordingly, as the viewpoint of the user changes, representation of physical environment 704 correspondingly changes. Further, as explained above, media capture preview 708 corresponds to a field-of-view of the one or more cameras that are in communication with computer system 700. Movement of computer system 700 causes the field-of-view of the one or more cameras to change. Accordingly, as the field-of-view of the one or more cameras changes, the content that is displayed within media capture preview 708 correspondingly changes.

As illustrated in FIG. 7F, computer system 700 displays media capture preview 708 as off-centered (e.g., to the right, to the left, above, or below the center of the display 702). At FIG. 7F, computer system 700 is being moved within the physical environment at a first speed (e.g., 1 ft/s, 3 ft/s, 5 ft/s) and computer system 700 displays media capture preview 708 as moving at a second speed (e.g., at a second speed relative to the physical environment) that is slower than the first speed (e.g., if computer system is moving at 5 ft/s, media capture preview moves at 3 ft/s). The difference between the speed at which computer system 700 moves within the physical environment and the speed at which computer system 700 displays media capture preview 708 as moving relative to the physical environment creates a lag visual effect that depicts media capture preview 708 as lagging behind (e.g., following) the movement of computer system 700. Strictly from the perspective of display 702, media capture preview 708 is moved, on-screen, in a direction opposite of the direction of movement of computer system 700 so as to create the visual effect of media capture preview 708 moving slower than computer system 700, relative to the physical environment. In some embodiments, while computer system 700 is moving, representation of physical environment 704 has a first set of parallax properties and computer system 700 displays media capture preview 708 with a second set of parallax properties that is different from the first set of parallax properties. For example, at FIG. 7F, as computer system 700 moves within the physical environment, there is a first amount of shift between the depiction of first individual 709c3 and second individual 709c4 and the depiction of picture 709b1 that is within media capture preview 708 and there is a second amount of shift between the depiction of first individual 709c1 and second individual 709c2 and depiction of picture 709b that is within representation of physical environment 704. Because representation of physical environment 704 has a different set of parallax properties than media capture preview 708, the first amount of shift between the depiction of first individual 709c3 and second individual 709c4 and the depiction of picture 709b1 within media capture preview 708 is different than the amount of shift between the depiction of first individual 709c1 and second individual 709c2 and the depiction of picture 709b in representation of physical environment 704. In some embodiments, media capture preview 708 is displayed without any parallax effects (e.g., the first amount of shift is zero) while representation of physical environment 704 includes a non-zero degree of shift, such that representation of physical environment 704 is perceived as having depth, whereas media capture preview 708 is not (e.g., it appears flat). In some embodiments, while computer system 700 is moving, computer system 700 applies a first image stabilization technique to representation of physical environment 704 and computer system 700 applies a second, different, stabilization technique to the display of media capture preview 708. In some embodiments, while computer system 700 is moving, computer system 700 applies a smaller amount of digital image stabilization to representation of physical environment 704 than the amount of digital stabilization that computer system 700 applies to media capture preview 708.

At FIG. 7F, computer system 700 is being moved laterally to the right. Because computer system 700 is being moved laterally to the right, computer system 700 displays media capture preview 708 to the left of the center of display 702. In some embodiments, computer system 700 is moved laterally to the left within the physical environment which causes computer system 700 to display media capture preview 708 to the right of center of display 702. In some embodiments, computer system 700 is moved vertically upwards within the physical environment, which causes computer system 700 to display media capture preview 708 beneath the center of display 702. In some embodiments, computer system 700 is moved vertically downward within the physical environment, which causes computer system 700 to display media capture preview 708 above the center of display 702. In some embodiments, computer system 700 is moved forward within the physical environment (e.g., in the z-direction) (e.g., into the page) which causes computer system 700 to display media capture preview 708 as larger relative to representation of physical environment 704 for a period of time before transitioning the size of media capture preview 708 to having the same relative size to representation of physical environment 704 before the start of the movement; in such embodiments, the rate at which media capture preview 708 transitions between the two sizes lags behind the speed forward movement of computer system 700. In some embodiments, computer system 700 is moved backward within the physical environment (e.g., out of the page) which causes computer system to display media capture preview 708 as smaller relative to representation of physical environment 704 for a period of time before transitioning the size of media capture preview 708 to having the same relative size to representation of physical environment 704 before the start of the movement; in such embodiments, the rate at which media capture preview 708 transitions between the two sizes lags behind the speed forward movement of computer system 700. In some embodiments, as computer system 700 moves within the physical environment, computer system 700 detects movement of computer system 700 with a first amount of tracking lag (e.g., measured as a function of distance over time). For example, while computer system 700 is located at the position indicated by indication 703 in schematic diagram 701 at FIG. 7F, computer system 700 detects that it is positioned at the position indicated by previous position indicator 717 at FIG. 7F for an amount of time that corresponds to the first amount of tracking lag. In some embodiments, the second speed at which computer system 700 displays media capture preview 708 as moving is configured to be less than the first amount of tracking lag in order to show the lag visual effect (e.g., so as to reduce visual artifacts).

As illustrated in FIG. 7F, schematic diagram 701 includes previous position indicator 717. Previous position indicator 717 indicates the prior position of computer system 700 (e.g., the position of computer system 700 in FIG. 7E). At FIG. 7F, as indicated by schematic diagram 701 including movement indication 721, computer system 700 continues to move laterally to the right within the physical environment.

At FIG. 7G, computer system 700 is positioned further to the right within the physical environment than the position of computer system 700 in FIG. 7F and has stopped moving. As illustrated in FIG. 7G, schematic diagram 701 includes previous position indication 717 that indicates the previous position of computer system 700 (e.g., the position of computer system 700 in FIG. 7F). Schematic diagram 701 also includes indication 703 that indicates the current location of computer system 700. At FIG. 7G, schematic diagram 701 does not include movement indicator 721 because computer system 700 is no longer moving at FIG. 7F.

As illustrated in FIG. 7G, computer system 700 displays media capture preview 708 to the left of the center of display 702. That is, though computer system 700 is no longer being moved at FIG. 7G, computer system 700 continues to display media capture preview 708 as moving at the second speed (e.g., 3 ft/s when computer system is moving at 5 ft/s) so that media capture preview 708 can "catch up" with computer system 700. In some embodiments, once computer system 700 stops moving, computer system 700 displays media capture preview 708 as moving at a third speed (e.g., 5 ft/s) that is faster than the second speed, such that media capture preview 708 is recentered more quickly than if it moved at the second speed.

At FIG. 7G, representation of physical environment 704 is updated with the respect to representation of physical environment 704 in 7H (e.g., representation of physical environment 704 in FIG. 7G includes table 709e in the background and less of couch 709a in the foreground). As explained above, the viewpoint of the user changes based on changes to the field-of-view of one or more cameras that are in communication with computer system 700. Accordingly, as computer system 700 is moved throughout the physical environment (e.g., which causes the field-of-view of the one or more cameras that are in communication with computer system 700 to change) viewpoint of the user changes, which causes representation of physical environment 704 to correspondingly change. Further, at 7G, the display of media capture preview 708 is updated. As computer system 700 moves within the physical environment, the field-of-view of the one or more cameras that are in communication with computer system changes which causes what is displayed within media capture preview 708 to change.

At FIG. 7H, media capture preview 708 has caught up to the previous movement of computer system 700 (e.g., the movement of computer system 700 as described above in relation to FIGS. 7E-7G). As illustrated in FIG. 7H, because media capture preview 708 caught up to the previous movement of computer system 700, computer system 700 displays media capture preview 708 in the center of display 702. Computer system's 700 display of media capture preview 708 in the center of display 702 causes a first portion (e.g., portion of second individual's 709*c*2 torso) of representation of physical environment 704 that was previously visible (e.g., visible in FIG. 7G) to cease to be visible (e.g., because media capture preview 708 is displayed as overlaid on the first portion) and causes a second portion of representation of physical environment 704 (e.g., the torso of first individual 709*c*1) that was not previously visible to be visible (e.g., because media capture preview 708 is no longer displayed as overlaid on the second portion). At FIG. 7H, computer system 700 detects input 750*h* directed at photo well virtual object 715. In some embodiments, input 750*h* is a gaze input (e.g., a sustained gaze) that is directed towards the direction of the display of photo well virtual object 715. In some embodiments, input 750*h* is a tap on photo well virtual object 715 (e.g., an air tap in space that corresponds to the location of the display of photo well virtual object). In some embodiments, input 750*h* is an air tap in combination with a detection of a gaze in the direction of the display of photo well virtual object 715. In some embodiments, input 750*h* is a gaze and blink that is directed towards the direction of the display of photo well virtual object 715.

Figure 7I:
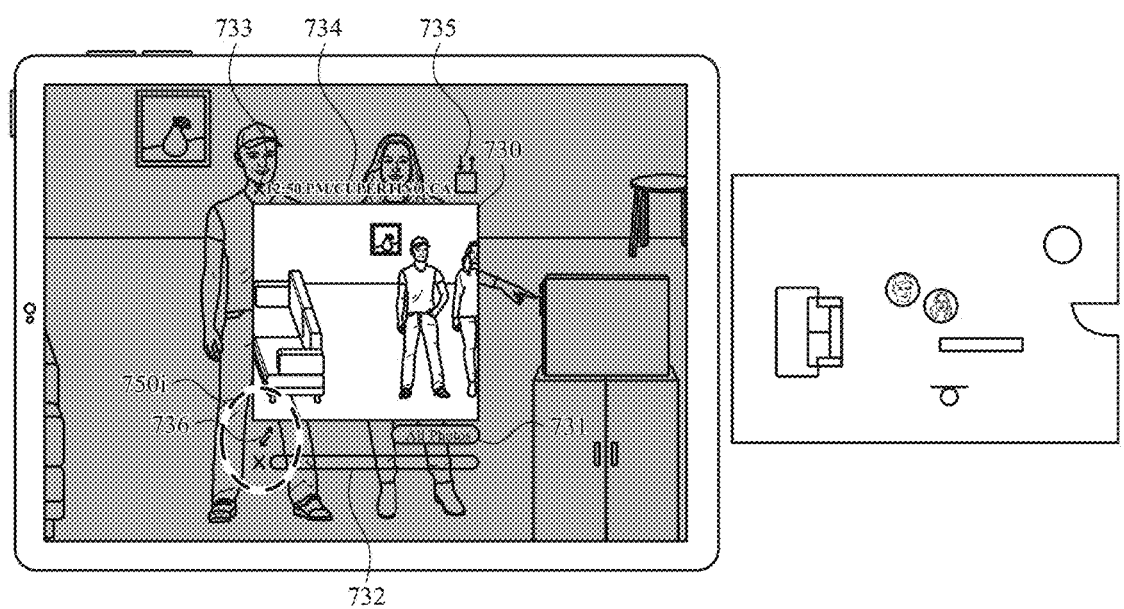

As illustrated in FIG. 7I, in response to detecting input 750*h*, computer system 700 displays previously captured media item 730. Previously captured media item 730 is the media item that was most recently captured by computer system 700 (e.g., the media item captured in FIGS. 7C and 7D). In some embodiments, previously captured media item 730 is a most recently captured media item that is captured by an external device (e.g., a device separate from computer system 700) that is in communication with computer system 700. Previously captured media item 730 is displayed as a square. In some embodiments, previously captured media item 730 is displayed as a rectangle, triangle, or any other suitable shape.

Computer system 700 displays previously captured media item 730 along with library virtual object 731, re-positioning virtual object 732, dismiss virtual object 733, identifier virtual object 734, share virtual object 735, and projection shape virtual object 736. In some embodiments, the above listed virtual objects are anchored (e.g., as described above in the description of FIG. 7C) to the display of previously captured media item 730. In some embodiments, the library virtual object 731, re-positioning virtual object 732, dismiss virtual object 733, identifier virtual object 734, share virtual object 735, and projection shape virtual object 736 are displayed with a different spatial configuration than the spatial configuration shown in FIG. 7I. In some embodiments, in response to detecting input 750*h*, computer system 700 displays a user interface that includes a subset of the virtual objects displayed in FIG. 7I.

Selection of library virtual object 731 causes the display of a plurality of representations of previously captured media items. In some embodiments, library virtual object 731 is concurrently displayed with media capture preview 708. In some embodiments, the display of the plurality of representations of previously captured media items replaces the display of previously captured media item 730. Re-positioning virtual object 732 allows a user to reposition the location of the display of the representation of previously captured media item 730 in the same manner that media capture preview 708 can be repositioned using re-positioning virtual object 716. Selection of dismiss virtual object 733 causes computer system 700 to cease to display previously captured media item 730. In some embodiments, selection of dismiss virtual object 733 causes computer system 700 to cease to display the library virtual object 731, re-positioning virtual object 732, dismiss virtual object 733, identifier virtual object 734, share virtual object 735, and projection shape virtual object 736. In some embodiments, selection of dismiss virtual object 733 causes computer system 700 to display media capture preview 708. Identifier virtual object 734 provides an indication of where and when previously captured media item 730 was captured. In some embodiments, identifier virtual object 734 provides different information (e.g., resolution of previously captured media item, date of when previously captured media item was captured) with respect to previously captured media item 730. Selection of share virtual object 735 initiates a process on computer system 700 for sharing previously captured media item 730 with external devices (e.g., devices that are separate from computer system 700). At FIG. 7I, computer system 700 detects input 750*i* directed at projection shape virtual object 736. In some embodiments, input 750*i* is a gaze input that is directed towards the direction of the display of projection shape virtual object 736. In some embodiments, input 750*i* is a tap input (e.g., an air tap in space that corresponds to the location of the display of projection shape virtual object 736) on projection shape virtual object 736. In some embodiments, input 750*i* is an air tap input in combination with a detection of a gaze in the direction of the display of projection shape virtual object 736. In some embodiments, input 750*i* is a gaze and blink that is directed towards the direction of the display of projection shape virtual object 736.

Figure 7J:
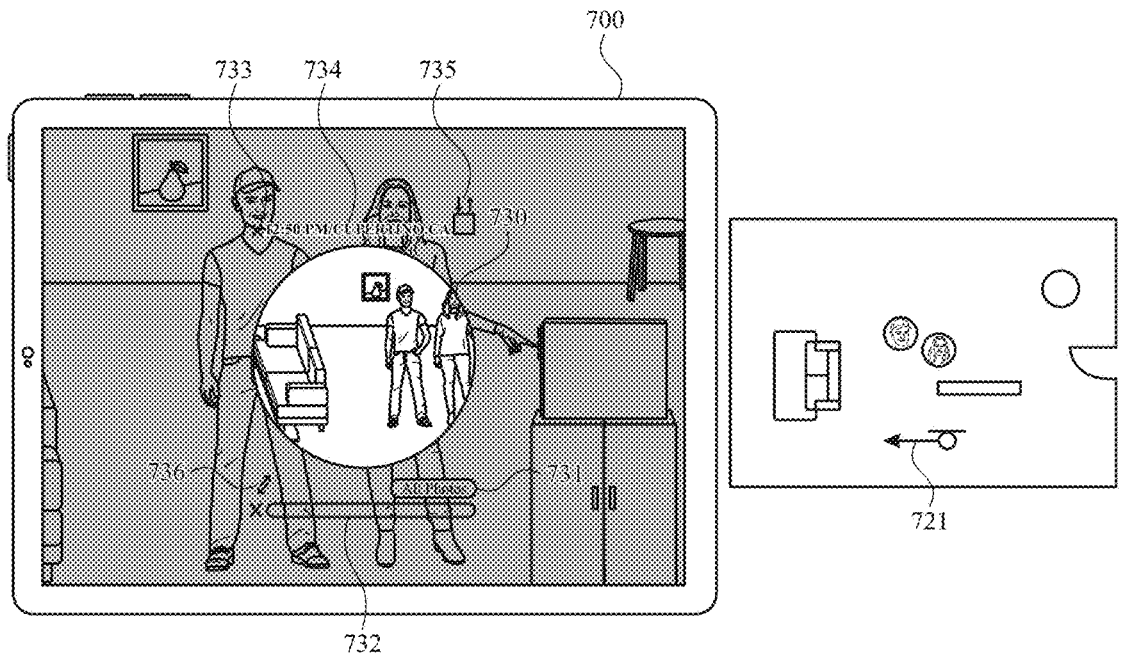

As illustrated in FIG. 7J, in response to detecting input 750*i*, computer system 700 displays the representation of previously captured media item 730 as a circle. As illustrated in FIG. 7J, while computer system 700 displays previously captured media item 730 as a circle, computer system 700 displays library virtual object 731, re-positioning virtual object 732, dismiss virtual object 733, identifier virtual object 734, share virtual object 735, and projection shape virtual object 736 as described above in the discussion of FIG. 7I. In some embodiments, in response to detecting input 750*i*, computer system 700 displays previously captured media item 730 as a three-dimensional sphere. As illustrated in FIG. 7I, schematic includes movement indicator 721. Movement indicator 721 indicates that computer system 700 is beginning to move within the physical environment (e.g., laterally to the left). At FIG. 7J, as indicated by schematic diagram 701 including movement indication 721, computer system 700 begins to move laterally to the left within the physical environment back to computer system's 700 initial position (e.g., the position of computer system 700 in FIG. 7A).

Figure 7K:
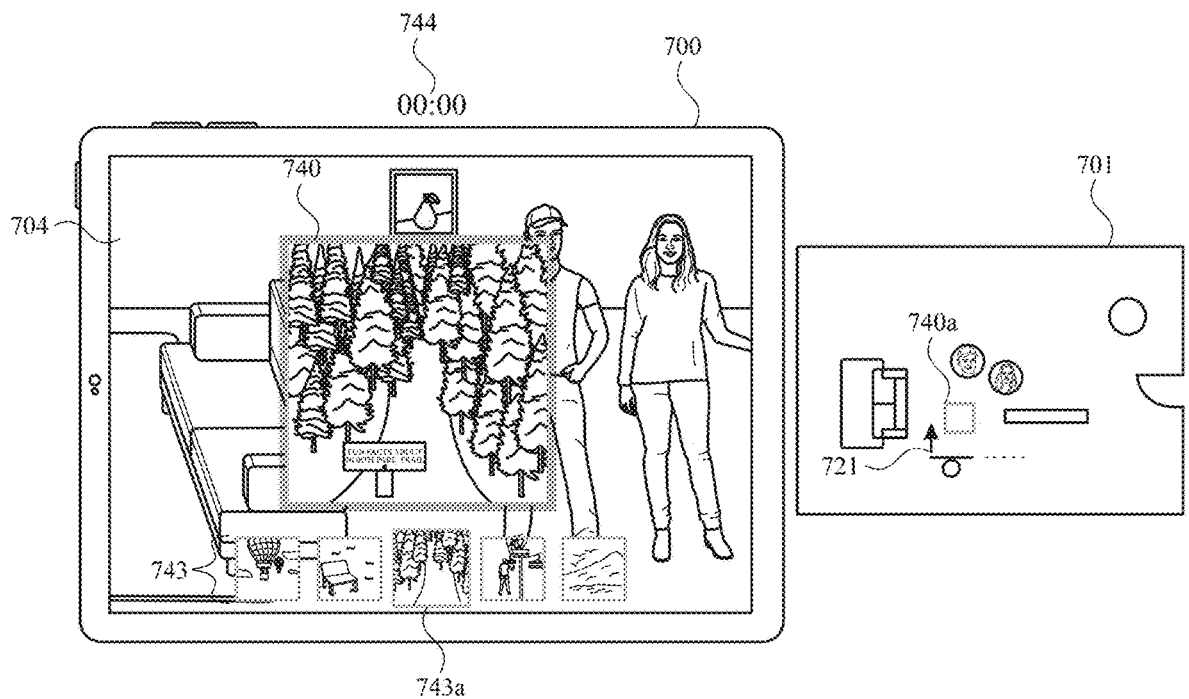
Figure 7L:
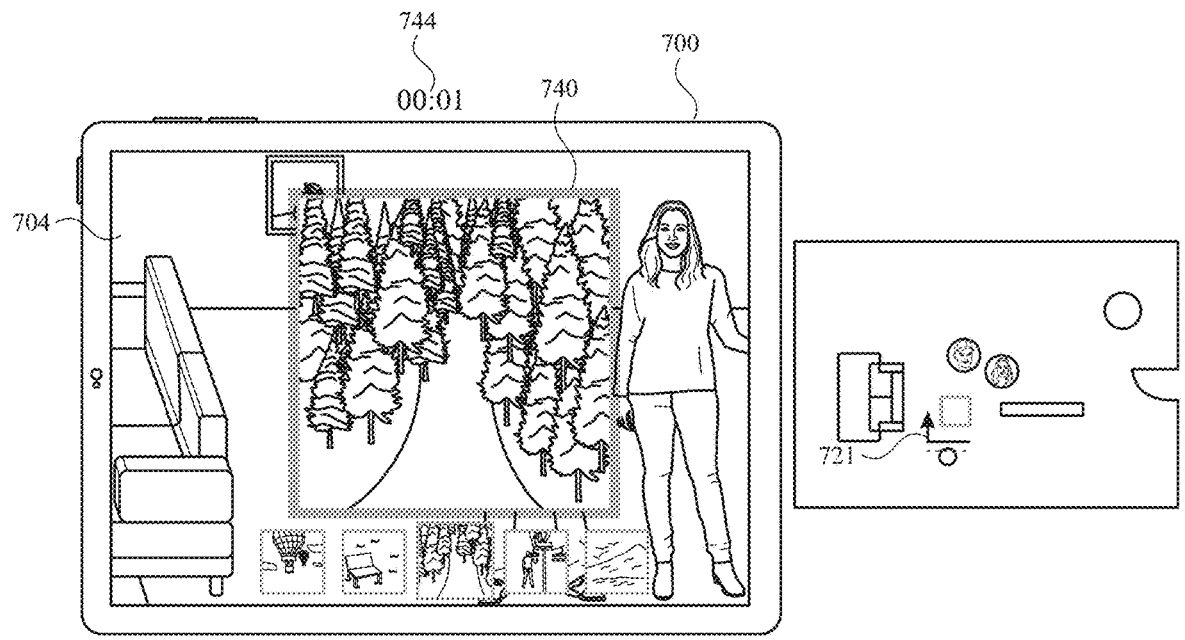
Figure 7M:
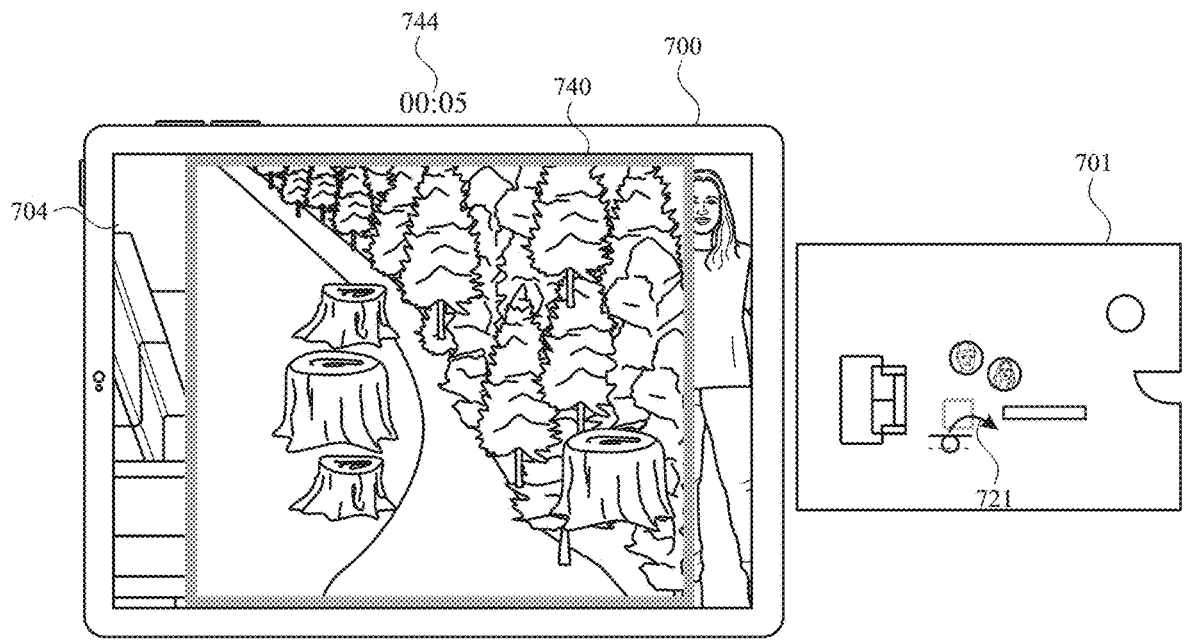
Figure 7N:
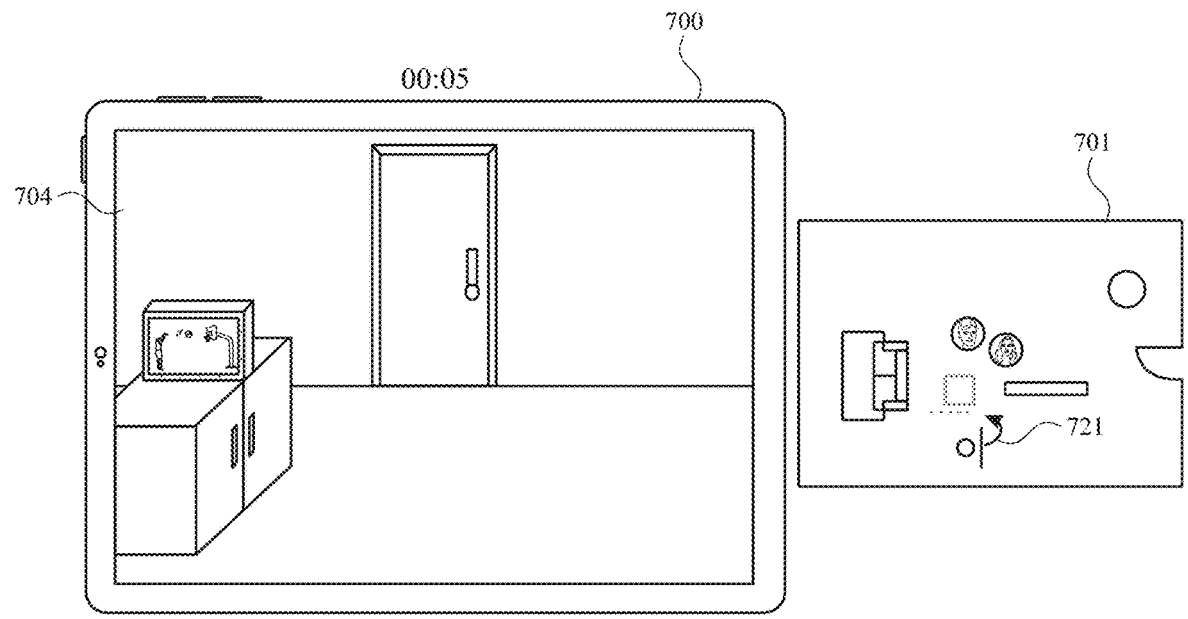
Figure 7O:
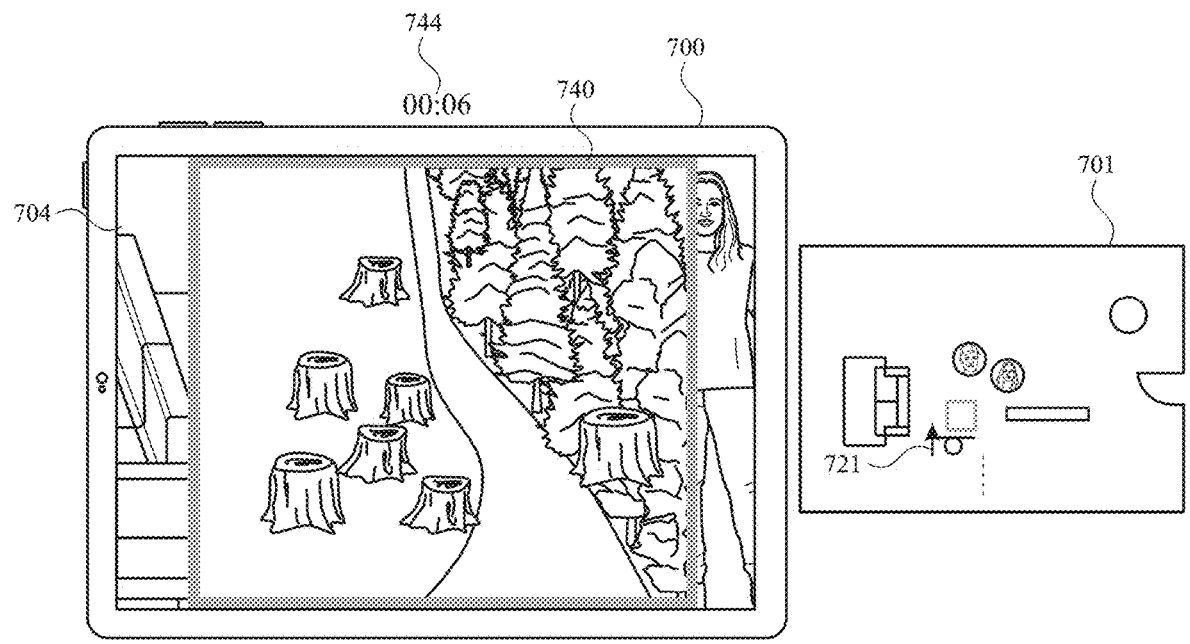
Figure 7P:
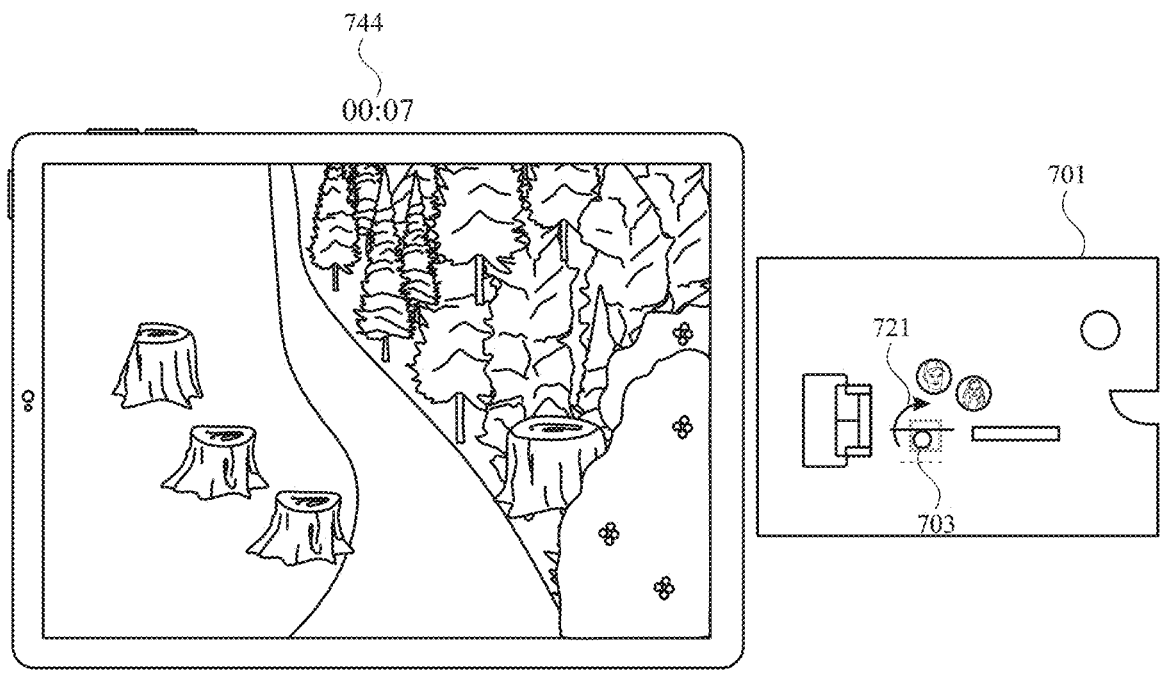
Figure 7Q:
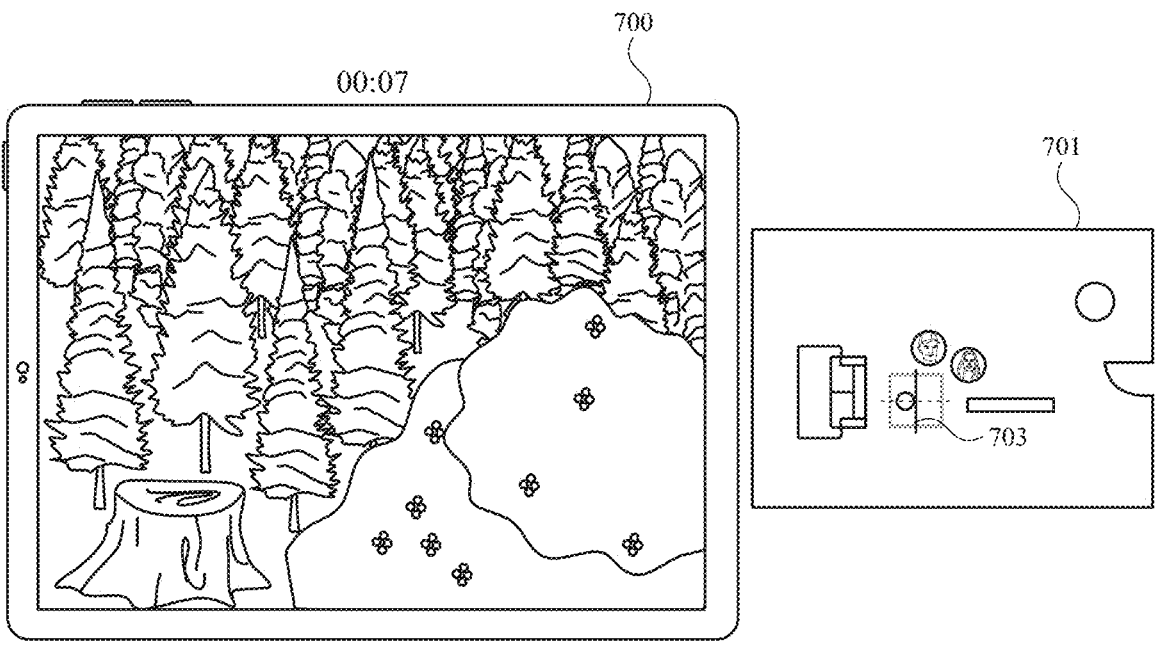

FIGS. 7K-7Q illustrate a method of a user interacting with a three-dimensional representation of a previously captured media item. FIGS. 7K-7Q include elapsed time indication 744. Elapsed time indication 744 is a visual aid to indicate the amount of time that has elapsed between each figure. Elapsed time indication 744 is not displayed by computer system 700. At FIG. 7K, computer system 700 is located at the initial location in the physical environment (e.g., the location of computer system 700 in FIGS. 7A-7E). Between FIGS. 7J and 7K, computer system 700 receives a request to display spatial capture virtual object 740. As illustrated in FIG. 7K, in response to receiving the request to display spatial capture virtual object 740, computer system 700 displays spatial capture virtual object 740 as overlaid on top of representation of physical environment 704. Display of spatial capture virtual object 740 obscures a portion of representation of physical environment 704. Spatial capture virtual object 740 is a representation of a previously captured video media item. In some embodiments, computer system 700 is a head-mounted device that presents spatial capture virtual object 740 as part of an extended reality environment, wherein, while computer system 700 is in motion, spatial capture virtual object 740 is displayed with a parallax effect (e.g., as discussed above with relation to FIG. 7F) that results in the media item that is represented by spatial capture virtual object 740 having an amount of depth between the foreground and background of the content in the media item. In some embodiments, spatial capture virtual object 740 is a representation of still media that was previously captured. In some embodiments, the previously captured video media item was captured using the one or more cameras that are in communication with computer system 700. In some embodiments, the request to display spatial capture virtual object 740 includes one or more inputs directed at one or more hardware buttons that are in communication with computer system 700. In some embodiments, the request to display spatial capture virtual object 740 includes one or more inputs directed at one or more virtual objects that are displayed by computer system 700. In some embodiments, the request to display spatial capture virtual object 740 includes the detection of a gaze (e.g., that is performed by the user) in a direction that corresponds to one of the sub-representations of previously captured media items. In embodiments where computer system 700 is an HMD, the viewpoint of the user is locked to the forward facing direction of the user's head, such that representation of physical environment 704 and one or more virtual objects, such as spatial capture virtual object 740, shift as the user's head moves (e.g., because computer system 700 also moves as the user's head moves).

Computer system 700 displays spatial capture virtual object 740 at a first location in representation of physical environment 704 that corresponds to a first location in the physical environment (e.g., the location indicated by spatial capture indicator 740a in schematic diagram 701). Computer system 700 displays spatial capture virtual object 740 when the first location of the physical environment is within the field-of-view of the one or more cameras that are in communication with computer system 700. The display of spatial capture virtual object 740 is environment-locked at the first location in representation of physical environment 704. That is, the location of the display of spatial capture virtual object 740 within representation of physical environment 704 does not change as the real-world position of computer system 700 changes. However, the display of spatial capture virtual object 740 updates as the viewpoint of the user changes in the physical environment. For example, as the viewpoint of the user gets closer to the first location in the physical environment, computer system 700 displays spatial capture virtual object 740 as larger (e.g., to provide the visual effect that the user has moved closer to spatial capture virtual object 740). In contrast, as the viewpoint of the user moves away from the first location in the physical environment, computer system 700 displays spatial capture virtual object 740 as smaller (e.g., to provide the visual effect that the user has moved further away from spatial capture virtual object 740).

As illustrated, in FIG. 7K, in response to receiving the request to display spatial capture virtual object 740, computer system 700 also displays a plurality of sub-representations of previously captured media items 743 concurrently with the display of spatial capture virtual object 740. As illustrated in FIG. 7K, computer system 700 displays the plurality of sub-representations of previously captured media items 743 beneath the display of spatial capture virtual object 740. Each sub-representation of previously captured media represents a respective media item (e.g., video media or still media) that was previously captured by computer system 700 or an external device that is in communication with computer system 700. Sub-representation of previously captured media item 743a, that is displayed in the middle of the plurality of sub-representations of previously captured media items 743, corresponds to the media item that is displayed as focused (e.g., that is represented by spatial capture virtual object 740). In some embodiments, a user can navigate through the plurality of sub-representations of previously captured media items 743 to select a sub-representation to be displayed as focused at the location of spatial capture virtual object 740. In some embodiments, a user can switch between which sub-representation is displayed as focused by performing a motion input (e.g., a pinch and drag gesture). In some embodiments, while spatial capture virtual object 740 is displayed, computer system 700 expands the size of the display spatial capture virtual object 740 in response to computer system 700 detecting (e.g., via the one or more cameras that are in communication with computer system 700) that a user has performed a pinch gesture. In some embodiments, computer system 700 decreases the size of the display of spatial capture virtual object 740 in response to computer system 700 detecting (e.g., via the one or more cameras that are in communication with computer system 700) that the user has performed a de-pinch air gesture.

As illustrated in FIG. 7K, schematic diagram 701 includes spatial capture indicator 740a. Spatial capture virtual object 740 is not physically present within the physical environment. Rather, spatial capture virtual object 740 is a virtual object that is only displayed as within representation of physical environment 704. Spatial capture indicator 740a indicates the spatial orientation/position of the display of spatial capture virtual object 740 within representation of physical environment 704 and also indicates the location to which spatial capture virtual object 740 is environment-locked.

At FIG. 7K, while spatial capture virtual object 740 is displayed, computer system 700 plays back the video media item that is represented by spatial capture virtual object 740. Computer system 700 automatically (e.g., without intervening user input) initiates the playback of the video media item that is represented by spatial capture virtual object 740 upon computer system 700 displaying spatial capture virtual object 740. In some embodiments, playback of the video media item that is represented by spatial capture virtual object 740 is not played back automatically. In some embodiments, computer system 700 outputs spatial audio as a part of playing back the video media item that is represented by spatial capture virtual object 740. In some embodiments, the video media item that is represented by spatial capture virtual object 740 is a stereoscopic video media item. Stereoscopic video media items present two different images of the same scene to the user. In some embodiments, the first image is from a first camera and the second image is from a second camera, with the first camera and the second camera having slightly different perspectives of the scene. As a result, the first image varies slightly from the second image. The two images are superimposed with each other, when viewed by the user, which creates an illusion of depth within the resulting image. In some embodiments, using the techniques described above in relation to FIG. 7J, a user can change the shape at which computer system 700 displays spatial capture virtual object 740. In some embodiments, a user can change the shape of spatial capture virtual object 740 from a flattened stereo projection to a spherical stereo projection and vice versa. In some embodiments, the video media item that is represented by spatial capture virtual object 740 is played back on an external electronic device that cannot playback stereoscopic videos. In some embodiments, spatial audio is used when the video media item that is represented by spatial capture virtual object 740 is played back on an external electronic device that cannot playback stereoscopic videos. In some embodiments, in accordance with a determination that a user of computer system 700 has an interpupillary distance that is different than a default interpupillary distance setting of computer system 700, computer system 700 plays back the video media item with a shift (e.g., computer system 700 plays back video the media item that is represented by spatial capture virtual object 740 at a different scale than the scale at which video media item was captured). Interpupillary distance is the distance (e.g., in millimeters) between the center of the pupils of an individual's eyes. In some embodiments, in accordance with a determination that a user of computer system 700 has an interpupillary distance that is different than a default interpupillary distance setting of computer system 700, computer system 700 alters (e.g., shifts) the first and/or second image (e.g., to the left or to the right) of stereoscopic video image based on the difference between the interpupillary distance of the user and the interpupillary setting of computer system 700 without changing scale of the playback of the stereoscopic video media item.

The video media item that is represented by spatial capture virtual object 740 is a video of an individual progressing along a trail. At FIG. 7K, computer system 700 plays back the video media item that is represented by spatial capture virtual object 740 from a non-immersive perspective. Playback of content from a non-immersive perspective cannot be presented from a plurality of perspectives in response to detected changes in the orientation/location of computer system 700. Video media, when presented from a non-immersive perspective, is presented from only one perspective irrespective of whether or not the orientation/location of computer system 700 changes. At FIG. 7K, computer system 700 is located a first distance (e.g., virtual distance) away from the first location in the physical environment that computer system 700 displays spatial capture virtual object 740 at in representation of physical environment 704. At FIG. 7K, as indicated by schematic diagram 701 including movement indication 721, computer system 700 begins to move toward the first location of the physical environment.

As illustrated in FIG. 7L, elapsed time indication 744 reads "00.01". Accordingly, 1 second has elapsed between FIGS. 7K and 7L. At FIG. 7L, computer system 700 continues to display spatial capture virtual object 740 within representation of physical environment 704. Further, at FIG. 7L, computer system 700 is positioned closer to the first location in the physical environment than the position of computer system 700 in FIG. 7K. Accordingly, at FIG. 7L, because computer system 700 is located closer to the first location of the physical environment, computer system 700 increases the size of the display of spatial capture virtual object 740 (e.g., compared to the size of the display of spatial capture virtual object 740 in 7K). As explained above, as the viewpoint of the user changes, the display of spatial capture virtual object 740 changes based on the changing viewpoint of the user. Because computer system 700 displays spatial capture virtual object 740 as larger, less of representation of physical environment 704 is visible. In some embodiments, computer system 700 moves backwards within the physical environment which causes the display of spatial capture virtual object 740 to decrease in size. In some embodiments, while computer system 700 moves laterally to the side within the physical environment, representation of physical environment 704 is presented with a respective visual parallax effect and computer system 700 displays spatial capture virtual object 740 with a respective visual parallax effect.

At FIG. 7L, computer system 700 continues playback of the video media that is represented by spatial capture virtual object 740. Accordingly, at FIG. 7L, computer system 700 updates the representation of the video media (e.g., the representation of the video media shows the user as having progressed along the trail) represented by spatial capture virtual object 740 to show that the playback of the video media has progressed by one second (e.g., the amount of time that has elapsed between FIGS. 7K and 7L). At FIG. 7L, as indicated by movement indication 721 within schematic diagram 701, computer system 700 continues to move toward the first location of the physical environment.

As illustrated in FIG. 7M, elapsed time indication 744 reads "00:05". Accordingly, 4 seconds have elapsed between FIGS. 7L and 7M. At FIG. 7M, computer system 700 is positioned closer to the first location of the physical environment than the position of computer system 700 in FIG. 7L. At FIG. 7M, because computer system 700 is positioned closer to the first location of the physical environment, computer system 700 increases the size of the display of spatial capture virtual object 740 (e.g., compared to the size of the display of spatial capture virtual object 740 in 7L). Because computer system 700 displays spatial capture virtual object 740 as larger, less of representation of physical environment 704 is visible.

At FIG. 7M, computer system 700 continues playback of the video media item that is represented by spatial capture virtual object 740. Accordingly, at FIG. 7M computer system 700 displays a frame of the representation of the video media item that is four seconds after the frame of the video media shown in FIG. 7L to show that the playback of the video media has progressed by four seconds. In some embodiments, computer system 700 ceases to display spatial capture virtual object 740 when computer system 700 moves past the first location of the physical environment. In some embodiments, computer system 700 is a head-mounted device that presents spatial capture virtual object 740 as part of an extended reality environment, wherein, the closer computer system 700 moves to the first location in the physical environment, the more immersive (e.g., having greater depth between foreground and background and/or responsiveness to shifts of orientation of computer system 700) the video media item that is represented by spatial capture virtual object 740 becomes. In some embodiments, at FIG. 7M, spatial capture virtual object 740 is displayed as a full screen configuration. While spatial capture virtual object 740 is displayed as a full screen configuration, representation of physical environment 704 is visually obscured (e.g., representation of physical environment 704 is blurred, dimmed, and/or blacked out). In some embodiments, while spatial capture virtual object 740 is displayed as a full screen configuration, computer displays a different virtual environment (e.g., a virtual movie theater environment and/or a virtual drive-in environment) in place of representation of physical environment 704. At FIG. 7M, as indicated by movement indication 721 within schematic diagram 701, computer system 700 begins to rotate in the clockwise direction (e.g., 90 degrees clockwise) within the physical environment.

At FIG. 7N, the viewpoint of the user is rotated 90 degrees in the clockwise direction with respect to the viewpoint of the user in FIG. 7M. As explained above, movement of computer system 700 causes the viewpoint of the user to change which causes representation of physical environment 704 to change. Accordingly, at FIG. 7N, representation of physical environment 704 corresponds to the change of the viewpoint of the user. At FIG. 7N, first individual 709c1, and second individual 709c2, picture 709b, and couch 709a that are a part of the physical environment are not visible from the viewpoint of the user at FIG. 7N. Accordingly, representation of physical environment 704 at FIG. 7N does not include a depiction of couch 709a, picture 709b, first individual 709c1, and second individual 790c2. Rather, representation of physical environment 704 at 7N, includes a depiction of the right side of the physical environment.

At FIG. 7N, the first location of the physical environment (e.g., the location at which computer system 700 displays spatial capture virtual object 740 within physical representation of physical environment 704) is not within the field-of-view of the one or more cameras that are in communication with computer system 700. Accordingly, at FIG. 7N, computer system 700 does not display the spatial capture virtual object 740. In some embodiments, when spatial capture virtual object 740 is displayed as a full screen configuration in a virtual environment that is not representative of physical environment 704 (e.g., as described above in relation to FIG. 7M), computer system displays a perspective of the virtual environment that corresponds to the viewpoint of the user rotating 90 degrees in the clockwise direction from the initial perspective of the virtual environment. At FIG. 7N, as indicated by movement indication 721 within schematic diagram 701, computer system 700 begins to rotate counterclockwise (e.g., 90 degrees to the left).

At FIG. 7O, the viewpoint of the user is rotated 90 degrees in the counterclockwise direction with respect to the viewpoint of the user in FIG. 7N. As illustrated in FIG. 7O, elapsed time indication 744 reads "00:06". Accordingly, 1 second has elapsed between FIGS. 7M and 7O. At FIG. 7O, the first location of the physical environment (e.g., the location at which computer system 700 displays spatial capture virtual object 740 within representation of physical environment 704) is within the field-of-view of the one or more cameras that are in communication with computer system 700. Accordingly, as illustrated in FIG. 7O, computer system 700 displays spatial capture virtual object 740 within representation of physical environment 704. At FIG. 7O, computer system 700 continues playback of the video media that is represented by spatial capture virtual object 740. Accordingly, at FIG. 7O, computer system 700 displays a frame of the video media item that is 1 second after the frame of the video media item shown in FIG. 7M to show that the playback of the video media item has progressed by one second.

At FIG. 7O, as indicated by schematic diagram 701 including movement indication 721, computer system 700 begins to move toward the first location of physical environment.

At FIG. 7P, as indicated by the positioning of indication 703 within schematic diagram 701, computer system 700 is at the first location (e.g., the location that computer system 700 displays spatial capture virtual object 740 at in representation of physical environment 704) in the physical environment. Because computer system 700 is positioned at the first location in the physical environment, computer system 700 plays back the video media represented by spatial capture virtual object 740 from an immersive perspective. Immersive visual content is visual content that includes content for a plurality of perspectives captured from the same first point (e.g., location) in a physical environment, at a given time point. Playback of content (e.g., playing back) from an immersive (e.g., first-person) perspective includes playing the content from a perspective that matches a first point of view and can, in response to user input, provide multiple, different perspectives (e.g., fields of view). In some embodiments, while computer system 700 is at the first location in the physical environment, computer system 700 is moved forward (e.g., past the first location within the physical environment) within the physical environment to an updated position, this causes computer system to display the spatial capture virtual object 740 from a non-immersive perspective at a location within representation of physical environment 704 that corresponds to a location that is in front of the updated position of computer system 700 within the physical environment. In some embodiments, while computer system 700 is at the first location in the physical environment, computer system 700 is moved backwards (e.g., moved such that computer system 700 is positioned in front of the first location within the physical environment) within the physical environment which causes computer system 700 to display spatial capture virtual object 740 from a non-immersive perspective at the location within representation of physical environment 704 that corresponds to the first location. Accordingly, by changing the positioning of computer system 700 within the physical environment, the user has the ability to control when computer system 700 displays the media item from an immersive perspective or a non-immersive perspective.

At FIG. 7P, computer system's 700 playback of the video media that is represented by spatial capture virtual object 740 from an immersive perspective takes up the entirety of display 702. Representation of physical environment 704 is not visible while computer system 700 plays back the video media that is represented by spatial capture virtual object 740 from the immersive perspective. In some embodiments, representation of physical environment 704 is visible while computer system 700 and plays back video media that represented by spatial capture virtual object 740 from the immersive perspective.

As illustrated in FIG. 7P, time indication reads 00:07. Accordingly, 1 second has elapsed between FIGS. 7O and 7P. At FIG. 7P, computer system 700 continues playback of the video media that represented by spatial capture virtual object 740. Accordingly, at FIG. 7P computer system 700 displays a frame of the video media that is one second ahead of the frame of the video media shown in FIG. 7O (e.g., the spatial capture virtual object 740 shows the user as having progress along the trail) to show that the playback of the video media has progressed by one second. In some embodiments, in response to detecting that the computer system is in the first location in the physical environment, computer system restarts playback of the video media represented by spatial capture virtual object 740 from the beginning. At FIG. 7P, as indicated by movement indication 721 within schematic diagram 701, computer system 700 begins to rotate clockwise (e.g., 90 degrees to the right).

At FIG. 7Q, the viewpoint of the user is rotated 90 degrees in the clockwise direction in the physical environment with respect to the viewpoint of the user in FIG. 7P. At FIG. 7Q, as indicated by indication 703 within schematic diagram 701, computer system 700 is located at the first location in the physical environment. As illustrated in FIG. 7Q, in response to the viewpoint of the user being rotated 90 degree in the clockwise direction in the physical environment, computer system 700 displays the playback of video media represented by spatial capture virtual object 740 from a different point of view than the point of view computer system 700 displays the video media in FIG. 7P. More specifically, computer system 700 displays the video media from the perspective of an individually facing the right side of the trail shown in the video media. As explained above, while computer system 700 is positioned at the first location in the physical environment, computer system 700 displays the video media represented by spatial capture virtual object 740 from an immersive perspective. That is, the perspective of the playback of the media item represented by spatial capture virtual object 740 changes based on the change of viewpoint of the user in the physical environment.

Additional descriptions regarding FIGS. 7A-7Q are provided below in reference to methods 800, 900, and 1000 described with respect to FIGS. 7A-7Q.

FIG. 8 is a flow diagram of an exemplary method 800 for capturing media, in accordance with some embodiments. In some embodiments, method 800 is performed at a computer system (e.g., computer system 101 in FIG. 1 and/or computer system 700) (e.g., a smart phone, a tablet, and/or a head-mounted device) including a display generation component (e.g., display generation component 120 in FIGS. 1, 3, and 4) (e.g., a heads-up display, a display, a display controller, a touch-sensitive display system, a display (e.g., integrated and/or connected), a 3D display, a transparent display, a projector, a touchscreen, and/or a projector), and one or more cameras (e.g., a camera (e.g., color sensors, infrared sensors, and other depth-sensing cameras) that points downward at a user's hand or a camera that points forward from the user's head), and, optionally, a physical input mechanism. In some embodiments, the computer system is in communication with one or more gaze-tracking sensors (e.g., an optical and/or IR camera configured to track a direction of gaze of a user of the computer system and/or the attention of the user). In some embodiments, the first camera has a FOV that is outside of at least a portion of the FOV of the second camera. In some embodiments, the second camera has a FOV that is outside of at least a portion of the FOV of the first camera. In some embodiments, the first camera is position on the opposite side of the computer system than the side of the computer system on which the second camera is positioned. In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 800 are, optionally, combined and/or the order of some operations is, optionally, changed.

The computer system, while displaying, via the display generation component (e.g., 702), a first user interface that is overlaid over a representation of a physical environment (e.g., 704), wherein the representation of the physical environment changes as the portion of the physical environment that corresponds to the representation of the physical environment changes and/or a viewpoint of the user (e.g., 712) changes (e.g., that is being captured by one or more cameras that are in communication with the computer system) (e.g., a mixed reality and/or an extended reality environment that is a representation of a physical environment), detects (802) a request to display a media capture user interface (e.g., 712a selection of 711a at FIG. 7B and/or 750b). In some embodiments, as a part of receiving the request to display the media capture user interface, the computer system detects an input (e.g., a press, a swipe, and/or a tap) on a hardware button. In some embodiments, as a part of receiving the request to display the media capture user interface, the computer system detects the attention of the user at one or more locations of the first user interface and/or one or move voice command inputs (e.g., via one or more microphones that are in communications with the computer system).

In response to detecting the request to display the media capture user interface (e.g., to capture immersive or semi-immersive visual media, to capture three-dimensional media, to capture three-dimensional, stereo media, and/or to capture spatial media) (e.g., to capture video content that can present the content from a plurality of perspectives in response to detected changes in orientation of the user and/or the computer system), the computer system displays (804) (e.g., after initiating capture of the media), via the display generation component, a media capture preview (e.g., 708) that includes a representation (e.g., a virtual representation and/or a virtual object) of a portion of a field-of-view of the one or more cameras with content that is updated as the portion of the physical environment that is in the portion of the field-of-view of the one or more cameras changes (e.g., a live preview that changes the field-of-view of the one or more cameras changes and/or the appearance of the physical environment changes) (e.g., immersive media content, as discussed above in relation to FIG. 7K).

The media capture preview indicates boundaries of media that will be captured in response to detecting a media capture input (e.g., 712a activation of 711a at FIG. 7D and/or 750d) while the media capture user interface is displayed (806).

The media capture preview is displayed while a first portion of the representation of the physical environment is visible (e.g., portion of 704 that includes 709b) (e.g., as described above in relation to FIG. 7C), where the first portion of the representation of the physical environment was visible (e.g., unobstructed) before the request to display the media capture user interface was detected (808).

The media capture preview is displayed in place of (e.g., overlaid on) a second portion of the representation of the physical environment (e.g., portion of 704 that includes a portion of 709c1) (e.g., as described above in relation to FIG. 7C), wherein the first portion of the representation of the physical environment is updated as the portion of the physical environment that corresponds to the first portion of the representation of the physical environment changes and/or the viewpoint of the user changes (810) (e.g., as described above in relation to FIG. 7C) (e.g., while one or more other portions of the representation of physical environment continue to be visible while the media capture preview is displayed and/or is visible). In some embodiments, the computer system 700 displays media capture preview with a black border. In some embodiments, in response to detecting the request to capture media, the computer system initiates capture of the media (e.g., three-dimensional media, three-dimensional, stereo media, and/or spatial media). In some embodiments, the first content captured by the first camera is different from the second content captured by the second camera. In some embodiments, the media capture preview is displayed in the center (e.g., middle) of the computer system (e.g., in the center of the display generation component), near the nose of a user wearing the computer system, in the center of the three-dimensional representation of a physical environment. In some embodiments, the media capture preview is displayed between one or more virtual objects (e.g., time elapse virtual object, capture control virtual object, camera roll virtual object, a close button virtual object). In some embodiments, computer system displays media capture preview in the center of the display above a shutter button virtual object (e.g., as described above in relation to FIG. 7C). In some embodiments, the captured media is played back using one or more techniques as described above in relation to FIGS. 7K-7Q. In some embodiments, media capture preview includes content of the physical environment, wherein the content is visible in the representation of the physical environment before the media capture preview is displayed. In some embodiments, while replaying in non-immersive perspective, multiple perspectives from a point in the physical environment, other than the first point, can be displayed in response to user input. Displaying a media capture preview that indicates boundaries of media that will be captured in response to detecting a media capture input provides the user with improved feedback as to what content in the viewpoint of the user will be captured. Displaying a media capture preview while a portion of a representation of the physical environment is visible provides the user with the ability to better compose and capture desired media, while also maintaining an awareness of the physical environment, which improves a media capture operation and reduces the risk of failing to capture a transient event that can be missed if the capture operation is inefficient or difficult to use. Improving media capture operations enhance the operability of the system and make the user-system interfaces more efficient (e.g., by helping the user to provide proper inputs and reducing user mistakes when operating/interacting with the device).

In some embodiments, the representation of the physical environment (e.g., 704 at FIG. 7B) is a passthrough representation (e.g., the passthrough representation is a virtual (e.g., a representation of camera image data that is captured by the one or more cameras that are integrated into the computer system) and/or optical passthrough (e.g., light directly passing through a portion of the system (e.g., a transparent portion) to the user)) of the real-world environment (e.g., as seen in FIG. 7A) (e.g., physical environment (e.g., outside of the computer system)) of the computer system (e.g., a portion of the real-world environment that surrounds the computer system). In some embodiments, in response to the position and/or orientation of the computer system changing, the passthrough representation is updated to reflect the change in position and/or orientation of the computer system. Providing a passthrough representation of the real-world environment of the computer system provides a user with visual feedback regarding the location (e.g., position and/or orientation) of the computer system within a real-world environment, which provides improved visual feedback, particularly when the passthrough representation is visible while the media capture preview is displayed.

In some embodiments, the representation (e.g., content in the representation) of the physical environment (e.g., 704) is visible (e.g., displayed or visible via optical passthrough) at a first scale (e.g., 1:1, 1:2, 1:4, and/or any other suitable scale) and the representation (e.g., content in the representation) of the portion of the field-of-view of the one or more cameras (e.g., a second portion of the representation of the physical environment) included in the media capture preview (e.g., 708) is displayed at a second scale, and wherein the first scale is larger than the second scale (e.g., as described above in relation to FIG. 7C) (e.g., the same object appearing in both representations appears larger in the representation of the physical environment). Displaying the media capture preview at a smaller scale than a scale at which the representation of the physical environment is visible provides the user with improved visual feedback as to which representation is which, reducing user confusion. Doing so also conserves display real estate, permitting both to be visible together, which provides the user with the ability to better compose and capture desired media, while also maintaining an awareness of the physical environment, which improves a media capture operation and reduces the risk of failing to capture a transient event that can be missed if the capture operation is inefficient or difficult to use. Improving media capture operations enhance the operability of the system and make the user-system interfaces more efficient (e.g., by helping the user to provide proper inputs and reducing user mistakes when operating/interacting with the device).

In some embodiments, representation of the physical environment (e.g., 704 at FIG. 7G) (e.g., a respective portion) includes first content (e.g., right half of 709E at FIG. 7G) that is not included in the representation of the field-of-view included in the media capture preview (e.g., 708 at FIG. 7G) (e.g., outside of)) (e.g., not displayed within the media capture preview). Having a representation of the physical environment that includes content not in the media capture preview provides a user with the ability to view additional content that could be (but currently is not) included in the media capture, if the user shifts the viewpoint, while also providing the user with greater awareness of their current physical environment, while composing media capture. Doing so improves a media capture operation and reduces the risk of failing to capture a transient event and/or content that can be missed if the capture operation is inefficient or difficult to use. Improving media capture operations enhance the operability of the system and make the user-system interfaces more efficient (e.g., by helping the user to provide proper inputs and reducing user mistakes when operating/interacting with the device).

In some embodiments, the representation of the physical environment (e.g., 704 at FIG. 7C) includes a portion (e.g., a first portion, a specific portion) of the physical environment (e.g., 709$c$1 at FIG. 7C) (e.g., different from (e.g., the angular range of the second portion of the physical environment is narrower than the angular range of the first portion of the physical environment) first portion of the representation of the physical environment) and the representation of the field-of-view of the one or more cameras that is included in the media capture preview (e.g., 708 at FIG. 7C) includes the portion (e.g., 709$c$3 at FIG. 7C) of the physical environment (e.g., the media capture preview includes an object that is also included in the representation of the physical environment). In some embodiments, the second portion of the physical environment that is included in the representation of the physical environment has a different visual appearance (e.g., blur and/or dimming) than the second portion of the physical environment that is included in the media capture preview).

In some embodiments, the computer system is in communication (e.g., direct communication (e.g., wired communication) and/or wireless communication) with a physical input mechanism (e.g., 711a or 711b) (e.g., a hardware button) (e.g., a hardware input device/mechanism) (e.g., a physical input device) and the request to display the media capture user interface includes activation (e.g., a actuation and/or selection (e.g., pressing a button)) of the physical input mechanism (e.g., 712a activation of 711a at FIG. 7B). Displaying a media capture preview that includes a representation (e.g., a virtual representation and/or a virtual object) of a portion of a field-of-view of the one or more cameras in response to detecting activation of a physical input mechanism allows a computer system to perform a display operation that provides a user with greater control over the computer system without displaying additional controls, which provides additional control options without cluttering the user interface.

In some embodiments, while displaying the media capture preview, the computer system detects (e.g., via one or more input devices that are in communication with the computer system) an input corresponding to a request to capture media (e.g., 750c and/or 712a activation of 711a in FIG. 7C). In response to detecting the input corresponding to the request to capture media and in accordance with a determination that input corresponding to the request to capture media is of a first type (e.g., a single, rapid press of a hardware button (e.g., a virtual shutter button), a tap gesture on touch-sensitive surface, or a rapid air gesture (e.g., an air gesture that is shorter in duration than the second type of input described below) (e.g., a pinch-and-release or any other suitable air gesture as described above in reference to selection of virtual objects in XR environments), the computer system initiates a process to capture media (e.g., using the one or more cameras of the computer system) content of a first type (e.g., still media (e.g., photo)) (e.g., as described above in relation to FIG. 7C) and in accordance with a determination that the input corresponding to the request to capture media is of a second type (e.g., different from the first type) (e.g., a long press of a button, a sustained gaze directed towards the display of a virtual shutter object, a touch-and-hold gesture at a location in space that corresponds to the display of the virtual shutter object, a touch-and-hold gesture on a virtual shutter button a sustained air gesture (e.g., a pinch that is held) or any other suitable air gesture as described above in reference to selection of virtual objects in XR environments), initiating a process to capture media (e.g., using the one or more cameras of the computer system) content of a second type (e.g., as described above in relation to FIG. 7C) (e.g., video) (e.g., different from the first type of media content). Initiating either a first type of media capturing process or a second type of media capturing process based on whether a short press or a long press a type of input (e.g., short press or long press) is received enables the computer system to provide a user with additional control options with respect to the type of media capturing process the computer system performs without displaying additional controls, which provides additional control options without cluttering the user interface.

In some embodiments, the representation of the portion of the field-of-view of the one or more cameras that is included in the media capture preview (e.g., 708) has a first set of visual parallax properties and the representation of the physical environment has a second set of visual parallax properties, different from the first set of parallax properties (e.g., as described above in relation to FIG. 7F). In some embodiments, the media capture preview includes a first foreground and a first background. In some embodiments, there is a first amount of shift between the first foreground and the first background as the portion of the physical environment that is in the portion of the field-of-view of the one or more cameras changes. In some embodiments, the representation of the physical environment includes a second foreground and a second background. In some embodiments, there is a second amount of shift (e.g., different from the first amount of shift) between the second foreground and the second background as the portion of the physical environment that is in the portion of the field-of-view of the one or more cameras changes) (e.g., as the portion of the physical environment that is in the portion of the field-of-view of the one or more cameras changes, the first foreground moves at a first speed relative to the first background and the second foreground moves at a second speed (different from the first speed) relative to the second background). Providing a first set of visual parallax properties to the representation of the portion of the field-of-view of the one or more cameras included in the media capture preview and providing a second set of visual parallax properties to the representation of the physical environment provides a user with visual feedback with respect to whether the computer system is in motion or not and also provides feedback as to which representation is a preview of media capture and which is of the physical environment, which provides improved visual feedback.

In some embodiments, the representation of the physical environment (e.g., 704) is an immersive perspective (e.g., first person view) (e.g., the representation of the environment is presented from a plurality of perspectives in response to detecting a change in orientation of the user and/or the computer system)) and the representation of the portion of the field-of-view of the one or more cameras that is included in the media capture preview is a non-immersive perspective (e.g., a third person view) (e.g., as described above in relation to FIG. 7C). In some embodiments, an immersive perspective includes content of the representation of the environment that includes content for a plurality of perspectives captured from the same point (e.g., location) in the environment. Providing the representation of the physical environment from an immersive perspective and providing the portion of the field-of-view of the one or more cameras that is included in the media capture preview from a non-immersive perspective provides improved visual feedback as to which representation is which and also provides feedback as to how captured media may be previewed when being displayed non-immersively (e.g., in a non-immersive photo album).

In some embodiments, before detecting the request to display the media capture user interface, a third portion (e.g., a portion that is the same as the first portion or different than the first portion) of the representation of the physical environment (e.g., the entirety of the representation of the environment) (e.g., a first portion of the representation of the environment that is less than the entirety of the representation of the environment) has a first visual appearance that includes a visual characteristic (e.g., dimming, blurring, and/or a superimposed filter) with a first magnitude (e.g., no amount, a low, non-zero amount (e.g., 0%, 10%, or 20% relatively to a maximum amount)). In some embodiments, in response to detecting the request to display the media capture user interface (e.g., 750*b* and/or 712*a* selection of 711*a* in FIG. 7B), the computer system changes the third portion of the representation of the physical environment to have a second visual appearance (e.g., different from the first visual appearance) that includes the visual characteristic with a second magnitude e.g., as described above in relation to FIG. 7C). In some embodiments, the second magnitude of the visual characteristic is different from (e.g., greater than or less than) the first magnitude of the visual characteristic (e.g., as described above in relation to FIG. 7C). In some embodiments, the magnitude of the visual characteristic is an amount of dimming applied to the third portion of the representation, and prior to receiving the request, the first magnitude is no dimming applied and second amount is a non-zero level of dimming applied. Changing the visual appearance of a third portion of the representation of the physical environment in response to detecting the request to display the media capture user interface provides a user with visual feedback about a state of the computer system (e.g., the computer system has detected the request to display the media capture user interface) and also emphasizes the media capture preview, which provides improved visual feedback.

In some embodiments, displaying the media capture preview includes (e.g., displayed as a part of) (e.g., incorporated into) displaying one or more virtual objects (e.g., 713, 714, 715, and 716) (e.g., virtual objects that when selected cause the computer system to perform an operation (e.g., a media-related operation (e.g., capture a photo, capture a video, display a previously captured photo and/or any other suitable operation)) (e.g., display of the one or more virtual objects surrounds the display of the media capture preview) that have a spatial relationship (e.g., the spatial relationship includes a predefined distance and relative orientation at which the one or more virtual objects are displayed with respect to display of the media capture preview and/or position (e.g., above, below, and/or to the side) at which the one or more virtual object are displayed relative to the display of the media capture preview) (e.g., each virtual object of the one or more virtual objects has a respective spatial relationship with the media capture preview) with the display of media capture preview (e.g., 708) and the media capture preview and the one or more virtual objects are displayed at a first display location (e.g., location of 713, 714, 715, and 716 at FIGS. 7C-7E) and while displaying the media capture preview and the one or more virtual objects at the first display location, the computer system detects (e.g., via one or more sensors that are in communication with the computer system) a change in pose of the viewpoint of the user (e.g., as discussed above in relation to FIG. 7E). In some embodiments, in response to detecting the change in pose of the viewpoint of the user, the computer system displays the media capture preview and the one or more virtual objects at a second display location (e.g., location of 708, 713, 714 715, and 716 at FIG. 7F), different (e.g., at a different location on the display generation component) from the first location and the computer system maintains the spatial relationship between the display of the media capture preview and the one or more virtual objects. Maintaining the spatial relationship between the display of the media capture preview and the one or more virtual objects in response to detecting the change in the pose of the viewpoint provides a user with visual feedback that allows the user to easily locate the display of the one or more virtual objects, which provides improved visual feedback. Displaying one or more virtual objects based on the computer system's display of the media capture preview causes the computer system to perform a display operation that provides the user with additional control options pertinent to media capture without requiring further user input, which reduces the number of inputs needed to perform an operation.

In some embodiments, the one or more virtual objects includes a time elapsed virtual object (e.g., 713) that provides an indication of an amount of time (e.g., seconds, minutes, and/or hours) that has elapsed since an initiation of a process for capturing of media (e.g., video recording). Displaying a time elapsed virtual object that indicates an amount of time that has elapsed since the computer system has initiated a process for capturing media provides visual feedback regarding a video media recording state of the computer system, which provides improved visual feedback.

In some embodiments, the one or more virtual objects includes a shutter button virtual object (e.g., 714) (e.g., a software shutter button) that, when selected (e.g., selected via detection of a gaze (e.g., a gaze-and-dwell) of a user directed to the shutter button virtual object and, in some embodiments, in combination with a detection of the user performing one or more gestures (e.g., air pinch gesture, de-pinch air gesture, air tap, and/or air swipe) (e.g., as described above in reference to selection of virtual objects in XR environments) and/or selected via detection of a tap on the shutter button virtual object), causes the initiation of a process for capturing media (e.g., causes the computer system to initiate of a process for capturing media) (e.g., still media or video media) (e.g., capturing media using the one or more cameras that are in communication with the computer system). In some embodiments, the display of shutter button virtual object updates to indicate that the computer system is recording video media. Displaying the shutter button virtual object, that is anchored to the display of the media capture preview, provides visual feedback about a display state of the computer system (e.g., the computer system is currently displaying the media capture preview) and also an operation that can be performed by interacting with the object, which provides improved visual feedback.

In some embodiments, the one or more virtual objects includes a camera roll virtual (e.g., 715) object that, when selected (e.g., selected via detection of a gaze (e.g., a gaze-and-dwell) of a user directed to the camera roll virtual object and, in some embodiments, in combination with a detection of the user performing one or more gestures (e.g., air pinch gesture, de-pinch air gesture, air tap, and/or air swipe) (e.g., as described above in reference to selection of virtual objects in XR environments) and/or selected via detection of a tap on the camera roll virtual object), causes the display (e.g., via the display generation component) of a previously captured media item (e.g., causes the computer system to display the previously captured media item) (e.g., still media or video media) (e.g., a media item that was previously captured using the one or more cameras that are in communication with the computer system) (e.g., a media item that was previously captured using an external device (e.g., smartphone) (e.g., a device that is separate from the computer system). In some embodiments, in response to detecting selection of the camera roll virtual object, the computer system displays a user interface that includes a subset of the one or more virtual objects. Displaying the camera roll virtual object, that is anchored to the display of the media capture preview, provides visual feedback about a display state of the computer system (e.g., the computer system is currently displaying the media capture preview) and also an operation that can be performed by interacting with the object, which provides improved visual feedback.

In some embodiments, while displaying the media capture preview, the computer system detects selection of the camera roll virtual object (e.g., 750h). In some embodiments, in response to detecting selection of the camera roll virtual object (e.g., 715 at FIG. 7H), the computer system, via the display generation component, displays a representation of the previously captured media item (e.g., 730) (e.g., and ceasing to display the media capture preview). In some embodiments, displaying the representation of the previously captured media includes displaying (e.g., concurrently displaying): a first dismiss virtual object (e.g., 733), that, when selected (e.g., selected via detection of a gaze (e.g., a gaze-and-dwell) of a user directed to the location of the display of the first dismiss virtual object and, in some embodiments, in combination with a detection of the user performing one or more gestures (e.g., air pinch gesture, de-pinch air gesture, air tap, and/or air swipe) (e.g., as described above in reference to selection of virtual objects in XR environments) and/or selected via the user tapping on the first dismiss virtual object), causes the representation of the previously captured media item to cease to be displayed (e.g., causes the computer system to cease displaying the previously captured media item), a share virtual object (e.g., 735), that, when selected (e.g., selected via detection of a gaze (e.g., a gaze-and-dwell) of a user directed to the location of the display of the share virtual object and, in some embodiments, in combination with a detection of the user performing one or more gestures (e.g., air pinch gesture, de-pinch air gesture, air tap, and/or air swipe) (e.g., as described above in reference to selection of virtual objects in XR environments) and/or selected via the user tapping on the share virtual object), causes the initiation of a process for sharing the representation of the previously captured media item (e.g., sharing the representation with contacts (e.g., external users) that are stored on the computer system) (e.g., causes the computer system to initiate a process for sharing the representation of the previously capture media item), a media library virtual object (e.g., 731), that, when selected (e.g., selected via detection of a gaze (e.g., a gaze-and-dwell) of a user directed to the location of the display of the media library virtual object and, in some embodiments, in combination with a detection of the user performing one or more gestures (e.g., air pinch gesture, de-pinch air gesture, air tap, and/or air swipe) (e.g., as described above in reference to selection of virtual objects in XR environments) and/or selected via the user tapping on the media library virtual object), causes the display of a plurality of previously captured media items (e.g., causes the computer system to display a plurality of previously captured media items (e.g., non-immersive and/or immersive media items)) and/or a resize virtual object (e.g., 736) that indicates that the representation of the previously captured media item will change in size (e.g., increase in size or decrease in size), based on the detection (e.g., detected by one or more cameras that are in communication with the computer system) of one or more gestures (e.g., a gesture on a touch-sensitive display and/or an air gesture (e.g., an air pinch-and-drag gesture, air swipe, and or air tap) (e.g., as described above in reference to selection of virtual objects in XR environments)). In some embodiments, the magnitude of the change in size is based on a characteristic of the gesture (e.g., the amount of resizing is based on the distance of a drag motion of a pinch-and-drag gesture). In some embodiments, selection of the first dismiss virtual object causes the media capture preview to be redisplayed. Displaying a plurality of virtual objects, based on the display of the previously captured media item, provides visual feedback about a display state of the computer system (e.g., the computer system is currently displaying the representation of the previously captured media item) and also operations that can be performed by interacting with the objects, which provides improved visual feedback.

In some embodiments, the computer system receives a set of one or more inputs that includes an input corresponding to the camera roll virtual object (e.g., 715). In some embodiments, the set of one or more inputs is a selection of the camera roll virtual object followed by selection of a virtual object corresponding to a subset of previously captured media items (e.g., all media items captured from an immersive perspective). In some embodiments, in response to receiving the set of one or more inputs, the computer system displays, at a first location (e.g., at a central location on the display generation component), a representation of a first previously captured media item (e.g., 730 at FIGS. 7I and 7J) (e.g., still photo and/or video) (e.g., the first representation of the first previously captured media item is selectable) (e.g., the first previously captured media item is captured by the computer system) of a plurality of previously captured media items and while displaying the representation of the first previously captured media item at the first location, the computer system receives a request (e.g., air pinch gesture, de-pinch air gesture, air tap, and/or air swipe) (e.g., as described above in reference to selection of virtual objects in XR environments) to navigate to a different previously captured media item of the plurality of previously captured media items. In some embodiments, in response to receiving the request to navigate to a different previously captured media item of the plurality of previously captured media items, the computer system replaces display of the representation of the first previously captured media item at the first location with display of a representation of a second previously captured media item (e.g., different from the first previously captured media item) of the plurality of previously captured media items (e.g., as described above in relation to FIG. 7K). In some embodiments, replacing display of the representation of the first previously captured media item includes ceasing to display the first previously captured media item. In some embodiments, while the second previously captured media item is displayed at the first location, the first previously captured media item is displayed (e.g., at a second location different from the first location). In some embodiments, the representation is displayed in place of a portion of the representation of the physical environment. In some embodiments, while the second previously captured media item is displayed, the computer system receives a second request to navigate to a different (e.g., different from the first previously captured media item and the second previously captured media item) previously captured media item, wherein the second request is a repeat of the initial request (e.g., the initial request and the second request include the same type of gesture) and/or the second request includes a gesture that is the opposite (e.g., performed in the opposite direction) of a gesture that is included in the initial request. In some embodiments, the request to navigate to a previously captured media item of the plurality of previously captured media items is an air gesture (e.g., as described above in reference to selection of virtual objects in XR environments) and the second previously captured media item is selected by the computer system based on the magnitude of the air gesture (direction of the air gesture, speed of the air gesture, and/or intensity of the air gesture). Replacing display of the representation of the first previously captured media item at the first location with display of a representation of a second previously captured media item provides visual feedback about a state of the computer system (e.g., that the computer system has received the request to navigate to a different previously captured media item while the first previously captured media item was displayed), which provides improved visual feedback.

In some embodiments, the one or more virtual objects includes a second dismiss virtual object (e.g., 719) that, when selected (e.g., selected via detection of a gaze (e.g., a gaze-and-dwell) of a user directed to the location of the display of the second dismiss virtual object and, in some embodiments, in combination with a detection of the user performing one or more gestures (e.g., air pinch gesture, de-pinch air gesture, air tap, and/or air swipe) (e.g., as described above in reference to selection of virtual objects in XR environments) and/or selected via the user tapping on the second dismiss virtual object), causes the media capture preview (e.g., 708) to cease to be displayed (e.g., causes the computer system to cease displaying the media capture preview). In some embodiments, ceasing display of the media capture preview results in the display of a portion (e.g., the second portion) of representation of the environment that was not displayed while the media capture preview was displayed. Displaying the second dismiss virtual object, that is anchored to the display of the media capture preview, provides visual feedback about a display state of the computer system (e.g., computer system is currently displaying the media capture preview) and also an operation that can be performed by interacting with the object, which provides improved visual feedback.

In some embodiments, the one or more virtual objects includes a re-positioning virtual object (e.g., 716) and while the media capture preview (e.g., 708) is displayed at a first location in the media capture user interface, the computer system detects a set of one or more inputs (e.g., a gesture(s) on a touch sensitive surface and/or air gesture(s)) that includes an input corresponding to the re-positioning virtual object. In some embodiments, in response to detecting the set of one or more inputs that includes the input corresponding to the re-positioning virtual object, the computer system moves the media capture preview from the first location to a second location (e.g., as described above in relation to FIG. 7C) (e.g., the media capture preview is moved (e.g., along the x-axis, y-axis, and/or the z-axis of the media capture user interface) based on the direction, magnitude, and/or speed of the request to move the display of the re-positioning virtual object). In some embodiments, the set of one or more inputs includes an input selecting the re-position virtual object followed by one or more inputs designating a target location and/or direction of movement. Displaying the re-positioning object, that is anchored to the display of the media capture preview, provides visual feedback about a display state of the computer system (e.g., the computer system is currently displaying the media capture preview) and also an operation that can be performed by interacting with the object, which provides improved visual feedback.

In some embodiments, while the media capture preview (e.g., 708) is displayed, the computer system concurrently displays, via the display generation component, a media library virtual object (e.g., 731) that, when selected (e.g., selected via detection of a gaze (e.g., a gaze-and-dwell) of a user directed to the location of the display of the media library virtual object and, in some embodiments, in combination with a detection of the user performing one or more gestures ((e.g., air pinch gesture, de-pinch air gesture, air tap, and/or air swipe) (e.g., as described above in reference to selection of virtual objects in XR environments) and/or selected via the user tapping on the media library virtual object, causes the display of a plurality of previously captured media items (e.g., as described above in relation to FIG. 7C)) causes the computer system to display the plurality of previously captured media items. In some embodiments, selection of the media library virtual object causes the media library virtual object to cease to be displayed. In some embodiments, selection of the media library virtual object causes the media capture preview to cease to be displayed. In some embodiments, selection of the media library virtual object causes the plurality of previously captured media items to be displayed beneath, above, and/or to the side of the display of the media capture preview. Concurrently displaying a media library virtual object (e.g., that is displayed while the media capture preview is displayed) provides visual feedback about a display state of the computer system (e.g., the computer system is currently displaying the media capture preview) and also an operation that can be performed by interacting with the object, which provides improved visual feedback.

In some embodiments, the portion of the field-of-view of the one or more cameras (e.g., the horizontal and/or vertical field-of-view of the one or more cameras) that is included in the media capture preview (e.g., 708) has a first visual angular range (e.g., 0-45°, 0-90°, 40-180°, or any other suitable angular range) (e.g., the portion of the field-of-view of the one or more cameras included in the media capture preview is based on an overlap of the fields of the one or more cameras) (e.g., the media capture preview only includes the data from the overlapping portion of the field-of-view of one or more cameras) (e.g., the media capture preview does not include data from the non-overlapping portion of the field-of-view of the one or more cameras) and the representation of the physical environment (e.g., 704) is representative of a second field-of-view of the one or more cameras (e.g., horizontal and/or vertical field-of-view of the one or more cameras) (e.g., the second field-of-view includes non-overlapping data from the one or more cameras) that has a second visual angular range (e.g., 0-45°, 0-90°, 40-180°, or any other suitable angular range) and the first angular range is narrower (e.g., less than) (e.g., the second angular is wider than the first angular range) than the second angular range (e.g., as described above in relation to FIG. 7C). In some embodiments, the first angular range is a subset of the second angular range. Displaying a representation of the physical environment that includes a wider field-of-view than the media capture preview provides a user with the ability to view additional content that could be (but currently is not) included in the media capture preview, if the user shifts the viewpoint, while also providing the user with greater awareness of their current physical environment, while composing media capture. Doing so improves a media capture operation and reduces the risk of failing to capture a transient event and/or content that can be missed if the capture operation is inefficient or difficult to use. Improving media capture operations enhance the operability of the system and makes the user-system interfaces more efficient (e.g., by helping the user to provide proper inputs and reducing user mistakes when operating/interacting with the device).

In some embodiments, the representation of the portion of the field-of-view of the one or more cameras included in the media capture preview (e.g., 708) includes first content (e.g., 709c3 and 709c4 in FIG. 7F) (e.g., three-dimensional content) that is in the field-of-view of a first camera (e.g., content captured by the first camera in response to detecting the request to capture media and/or content saved and/or stored by the computer system) of the one or more cameras and that is in the field-of-view of a second camera (e.g., content captured by the second camera in response to detecting the request to capture media and/or content saved and/or stored by the computer system) of the one or more cameras (e.g., as described above in FIG. 7C). In some embodiments, portions of the physical environment that are in the field-of-view of the first camera but that are not in the field-of-view of the second camera are not included in the media capture preview. In some embodiments, portions of the physical environment that are in the field-of-view of the first camera but that are not in the field-of-view of the second camera are not included in the media capture preview but are part of the representation of the physical environment.

In some embodiments, aspects/operations of methods 800, 900, 1000, 1200, 1400 and 1500 may be interchanged, substituted, and/or added between these methods. For example, the media item that is captured in method 800 may be displayed as part of method 1000. For brevity, these details are not repeated here.

FIG. 9 is a flow diagram of an exemplary method 900 for displaying a preview of media, in accordance with some embodiments. In some embodiments, method 900 is performed at a computer system (e.g., computer system 101 in FIG. 1 and/or computer system 700) (e.g., a smart phone, a tablet, and/or a head-mounted device) that is in communication with a display generation component (e.g., display generation component 120 in FIGS. 1, 3, and 4 and/or 702) (e.g., a display controller; a touch-sensitive display system; a display (e.g., integrated and/or connected), a 3D display, a transparent display, a projector, a heads-up display, and/or a head-mounted display) and one or more cameras (e.g., a camera (e.g., color sensors, infrared sensors, and other depth-sensing cameras) that points downward at a user's hand or a camera that points forward from the user's head). In some embodiments, the computer system is communication with one or more gaze-tracking sensors (e.g., an optical and/or IR camera configured to track a direction of gaze of a user and/or attention of the user of the computer system). In some embodiments, the computer system includes a first camera. In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 900 are, optionally, combined and/or the order of some operations is, optionally, changed.

The computer system, while a viewpoint of a user (e.g., 712) (e.g., and/or the computer system) (e.g., and/or while the head of the user detected as being) is in a first pose (e.g., orientation and/or position in a physical environment and/or a virtual environment), displays (902), via the display generation component, an extended reality user interface that includes a preview (e.g., a real-time preview) of a field-of-view of the one or more cameras (e.g., 708 at 7E) (e.g., a virtual camera or a physical camera that is configured to communicate with the computer system) that is overlaid on a first portion of a three-dimensional environment (e.g., 704) (e.g., an environment that is visible on the display generation component) (e.g., the first portion of the environment is visible via the display generation component) that is visible in the viewpoint of the user (e.g., 712), wherein the preview includes a representation (e.g., a three-dimensional representation, a spatial representation, and/or a two-dimensional representation) of the first portion of the three-dimensional environment and is displayed with a respective spatial configuration relative to the viewpoint of the user (e.g., 708 at FIGS. 7C-7E). In some embodiments, the field-of-view of the first camera is a portion of the field-of-view of the first camera and not the entire field-of-view of the first camera. In some embodiments, the preview includes a representation of at least a portion of a field-of-view of a second camera (e.g., that is different from the first camera) that includes a representation of the portion of the physical environment. In some embodiments, the field-of-view of the second camera is a portion of the field-of-view of the second camera. In some embodiments, the preview is displayed in the center (e.g., middle) of the computer system (e.g., in the center of the display generation component), near the nose of a user wearing the computer system, in the center of the three-dimensional representation of a physical environment The computer system detects (904) a change in the pose of the viewpoint of the user (and/or the head of the user) from the first pose to a second pose that is different from the first pose (e.g., as described above in relation to FIGS. 7E-7F) (e.g., while displaying the extended reality environment user interface that includes the preview of the field-of-view of the first camera that is overlaid on the first location on the extended reality user interface). In some embodiments, while the computer system and/or viewpoint of the user is in the second pose, the field-of-view of the first camera is directed at a second portion of the physical environment while the first camera is in the second pose and/or the second portion of the physical environment is visible in the viewpoint of the user.

In response to detecting the change in the pose of the viewpoint of the user from the first pose to the second pose, the computer system shifts (906) (e.g., changing and/or transitioning display of) the preview of the field-of-view of the one or more cameras (e.g., to pan, to change, and/or to update) away from the respective spatial configuration (e.g., 708 at FIGS. 7F and 7G) relative to the viewpoint of the user in a direction that is determined based on (e.g., opposite from) the change in the pose of the viewpoint of the user from the first pose to the second pose (e.g., based on the direction and/or speed of change of the pose of the viewpoint), wherein the shifting of the preview of the field-of-view of the one or more cameras occurs at a first speed (e.g., 708 at FIGS. 7F and 7G), wherein, while the preview of the field-of-view of the one or more cameras is shifting based on the change in pose of the viewpoint of the user, the representation of the three-dimensional environment changes based on the change in pose of the viewpoint of the user at a second speed that is different from (e.g., as described above in relation to FIG. 7F) (e.g., faster than or slower than) the first speed (e.g., while continuing to update the preview at the same rate that the movement of the viewpoint is updated). In some embodiments, the preview is updated to include a representation of the second portion of the environment at the first speed while being moved at the second speed. In some embodiments, display one or more objects in the representation of the field-of-view is updated at the same rate as the one or more objects in the viewpoint of the physical environment. In some embodiments, in response to detecting the change in the orientation of the viewpoint of the user from the first orientation to the second orientation, the first portion of the environment ceases to be visible. In some embodiments, the first portion of the environment is not encompassed by, does not surround, is separate from, is distinct from, does include the second portion of the environment and/or vice versa. In some embodiments, the location included in the first portion of the environment is different from the location included in the first portion of the environment. Shifting the preview of the field-of-view of the one or more cameras is based on the change in pose of the viewpoint of the user at a first speed while the representation of the three-dimensional environment changes based on the change in pose of the viewpoint of the user at a second speed that is different from the first speed (e.g., in response to detecting the change in the pose of the viewpoint of the user from the first pose to the second pose) allows the computer system to automatically perform an operation that reduces the amount of movement between elements shown to the user and reduces the chances of motion sickness, which performs an operation when a set of conditions has been met without requiring further user input. Doing so can also prompt the user to reduce changes to the viewpoint while in a media capture mode, as the user may be inclined to maintain focus on the preview. Reducing changes in viewpoint while capturing media can improve a media capture operation and reduces the risk of failing to capture a transient event and/or content that can be missed if the capture operation is inefficient or difficult to use. Improving media capture operations enhance the operability of the system and make the user-system interfaces more efficient (e.g., by helping the user to provide proper inputs and reducing user mistakes when operating/interacting with the device).

In some embodiments, the computer system (e.g., 700) tracks changes in pose of the viewpoint of the user (e.g., 712) with a first amount of tracking lag (e.g., as described above in relation to FIGS. 7E-7F) (e.g., delay (e.g., a delay of 0.1, 0.2, 0.3, 0.4, or 0.5 meters/second) between actual changes in the viewpoint and the computer system being configured to track that amount/degree of movement) and the first speed introduces an amount of visual delay in updating the location of the preview of the field-of-view of the one or more cameras (e.g., 708) that is greater than an amount of visual delay in updating the location of the preview of the field-of-view of the one or more cameras that would be introduced based on (e.g., solely based on) the first amount of detection tracking lag (e.g., as described above in relation to FIG. 7F) (e.g., the detection tracking lag is 0.1 meters/second and the first speed is 0.09 meters/second). In some embodiments, the maximum speed of the shifting of the preview of the field-of-view of the one or more cameras is limited (e.g., capped at) a value below the amount (e.g., current amount) of tracking lag. In some embodiments, the amount of tracking lag is proportional to the rate of change in the pose of the viewpoint). Maintaining the first speed below the amount of tracking lag reduces the occurrence of disruptions in display of the preview caused by tracking lag and automatically adjusts the speed of movement of the preview based on system parameters, without requiring further user input.

In some embodiments, while the preview of the field-of-view of the one or more cameras is shifting at the first speed (e.g., 708 in FIGS. 7F and 7G), the computer system detects that the viewpoint of the user is changing pose less than a first threshold amount (e.g., changing at a rate less than the threshold or not changing (e.g., a stationary pose) (e.g., the user is presently positioned in the second pose). In some embodiments, in response to detecting that the viewpoint of the user is changing pose less than the threshold amount (e.g., as described above in relation to FIG. 7G), the computer system shifts the preview of the field-of view of the one or more cameras towards the respective spatial configuration at a third speed that is greater than the first speed (e.g., as described above in relation to FIG. 7H) (e.g., in response to detecting that the user has stopped moving, the preview of the one or more cameras "snaps" back into its original position with the respective spatial configuration relative to the viewpoint of the user). In some embodiments, the computer system shifts the preview of the field-of-view of the one or more cameras in the opposite direction (e.g., opposite the direction of the shift away from the respective spatial configuration) when the computer system shifts the preview of the field-of-view of the one or more cameras towards the respective spatial configuration. Shifting the preview of the field-of-view of the one or more cameras towards the respective spatial configuration in response to detecting that the viewpoint of the user is changing pose less than a threshold amount causes the computer system to display the preview of the field-of-view at a location on the display that is central to the user's field-of-view, which performs the operation without requiring further user input In some embodiments, while the preview of the field-of-view of the one or more cameras is shifting at the first speed (e.g., 708 in FIGS. 7F and 7G), the computer system detects that the viewpoint of the user is changing pose less than a second threshold amount (e.g., as described above in relation to FIG. 7G) (e.g., changing at a rate less than the threshold or not changing (e.g., a stationary pose)) (e.g., a non-zero amount). In some embodiments, in response to detecting that the viewpoint of the user is changing pose less than the second threshold amount the computer system ceases shifting (e.g., automatically (e.g., without user input) the preview of the field-of-view of the one or more cameras away from the respective spatial configuration (e.g., as described above in FIG. 7H) and the computer system displays the preview of the field-of-view of the one or more cameras with the respective spatial configuration relative to the viewpoint of the user (e.g., 708 at FIG. 7H) (e.g., the preview of the field-of-view of the one or more cameras is displayed in the position that the preview of the field-of-view was displayed prior to the computer system detecting movement the change in the pose of the viewpoint of the user) (e.g., the preview of the field-of-view of the one or more cameras is displayed as overlaid on the first portion of the three-dimensional environment). In some embodiments, after ceasing shifting the preview of the field-of-view of the one or more cameras, the preview of the field-of-view of the one or more cameras shifts away from the respective spatial configuration for a second time, at a speed that is different from the speed at which the representation of the three-dimensional environment changes, in response to the computer system detecting that the viewpoint of the user is changing pose for a second time at a rate that is greater than second threshold amount. Ceasing shifting the preview of the field-of-view of the one or more cameras in response to detecting that the viewpoint of the user is changing poses less than a second threshold amount causes the computer system to display the preview of the field-of-view at a location on that display that is central to the user's field-of-view, which performs the operation without requiring further user input.

In some embodiments, the change in pose (e.g., as described above in relation to FIG. 7F) includes (e.g., corresponds to) lateral movement along a plane of the user's viewpoint (e.g., the change in the pose of the viewpoint of the user corresponds to the user's viewpoint moving to the left and/or to the right, from the user's viewpoint). Shifting the preview of the field-of-view of the one or more cameras based on a change of pose of the user's viewpoint in a lateral direction provides visual feedback regarding a direction in which the computer system in moving, which provides improved visual feedback.

In some embodiments, the change in pose (e.g., as described above in relation to (e.g., as described above in relation to FIG. 7F) includes (e.g., corresponds to) longitudinal movement along the plane of the user's viewpoint (e.g., the change in the pose of the viewpoint of the user corresponds to the user's viewpoint moving up and/or down). In some embodiments, the user's head is located a first distance from the ground in while the user is in the first pose and the user's head is located at a second distance, that is larger/smaller than the first distance, from the ground while the user is in the second pose). Shifting the preview of the field-of-view of the one or more cameras based on a change of pose of the user's viewpoint in a longitudinal direction provides visual feedback regarding a direction in which the computer system in moving, which provides improved visual feedback.

In some embodiments, the change in pose (e.g., as described above in relation to FIG. 7F) includes (e.g., corresponds to) anterior-posterior movement perpendicular the plane of the user's viewpoint (e.g., detecting a change in the pose of the viewpoint of the user corresponds to the user's viewpoint moving forwards and/or backwards). In some embodiments, while the viewpoint of the user is in the first pose, the computer system moves backwards within the physical environment which causes the computer system to cease to display the preview of the field-of-view of the one or more cameras. Shifting the preview of the field-of-view of the one or more cameras based on a change of pose of the user's viewpoint in an anterior and/posterior direction provides visual feedback regarding a direction in which the computer system in moving, which provides improved visual feedback.

In some embodiments, the preview of the field-of-view of the one or more cameras (e.g., 708) does not overlay a second portion of the three-dimensional environment (e.g., portion of 704 that includes second individual 709c2 in FIG. 7F) that is visible from the viewpoint of the user. In some embodiments, the three-dimensional physical environment is a real-world environment in which the user is currently situated. In some embodiments, the camera preview covers at least a portion of a view of the physical world while at least a portion of a view of the physical world is displayed near or adjacent to an edge of the camera preview. Displaying a preview of the field-of-view of the one or more cameras while at least a portion of a three-dimensional environment is visible provides the user with the ability to better compose and capture desired media, while also maintaining an awareness of the physical environment, which improves a media capture operation and reduces the risk of failing to capture a transient event that can be missed if the capture operation is inefficient or difficult to use. Improving media capture operations enhance the operability of the system and make the user-system interfaces more efficient (e.g., by helping the user to provide proper inputs and reducing user mistakes when operating/interacting with the device).

In some embodiments, the representation of the three-dimensional environment included in the media capture preview (e.g., 708) changes based on the change in pose of the viewpoint of the user (e.g., as described above in relation to FIG. 7G) and while detecting the change in the pose of the viewpoint of the user from the first pose to the second pose (e.g., as described above in relation to FIG. 7F), the computer system performs a first visual stabilization (e.g., automatically performing (e.g., without user input) (e.g., the first visual stabilization corresponds to a digital image stabilization) to the representation of the three-dimensional environment (e.g., to average out (e.g., dampen) involuntary head motion (e.g., head moment that is performed by the user that does not correspond to the change in the pose of the viewpoint of the user from the first pose to the second pose) (e.g., and not performing the first visual stabilization to the representation of the three-dimensional environment) included in the preview of the field-of-view of the one or more cameras (e.g., as discussed above in relation to FIG. 7F). In some embodiments, the first visual stabilization is an optical image stabilization technique that adjusts one or more glass elements inside one or more cameras that are in communication with the computer system based on the change in pose of the viewpoint of the user. In some embodiments, the first visual stabilization incudes a digital stabilization technique that involves zooming and/or cropping the representation of the three-dimensional environment included in the media capture preview based on the change in pose of the viewpoint of the user. Applying a first visual stabilization to the representation of the three-dimensional environment included in the preview of the field-of-view of the one or more camera automatically causes the computer system to perform a display operation that increases the clarity at which a user views the representation of the three-dimensional environment included in the field-of-view of the one or more cameras without requiring user input, which reduces the number of inputs needed to perform an operation. Applying a first visual stabilization to the representation of the three-dimensional environment improves a media capture operation and reduces the risk of failing to capture a transient event that can be missed if the capture operation is inefficient or difficult to use. Improving media capture operations enhance the operability of the system and make the user-system interfaces more efficient (e.g., by helping the user to provide proper inputs and reducing user mistakes when operating/interacting with the device).

In some embodiments, performing the first stabilization includes applying a first amount of visual stabilization to the representation of the three-dimensional environment included in the preview of the field-of-view of the one or more cameras (e.g., 708) and while detecting the change in the pose of the viewpoint of the user from the first pose to the second pose (e.g., as described above in relation to FIGS. 7E-7G), the computer system performs (e.g., via the computer system) (e.g., automatically performing (e.g., without user input) a second visual stabilization (e.g., the second visual stabilization corresponds to a digital visual stabilization) to a second portion of the representation of the three-dimensional environment (e.g., the representation of the three-dimensional environment not included in the preview of the field-of-view of the one or more cameras) (e.g., and not performing the second visual stabilization to the preview of the field-of-view of the one or more cameras). In some embodiments, the second visual stabilization applies a second amount of visual stabilization to the second portion of the representation of the three-dimensional environment that is less than the first amount of visual stabilization (e.g., as described above in relation to FIG. 7F) (e.g., the representation of the three-dimensional environment included in the preview of the field-of view of the one or more camera is sharper (e.g., clearer) than the representation of the three-dimensional environment). In some embodiments, the second visual stabilization is the same process (e.g., methodology) as the first visual stabilization. In some embodiments, the second visual stabilization is performed while the first visual stabilization is performed. Applying a second visual stabilization to a second portion of the representation of the three-dimensional environment while detecting the change in the pose of the viewpoint of the user automatically causes the computer system to perform a display operation that increases the clarity at which a user views the second portion of the representation of the three-dimensional environment without requiring user input, which reduces the number of inputs needed to perform an operation. Applying less stabilization to the representation of the three-dimensional environment provides more accurate visual feedback as to the current physical environment, which improves visual feedback.

In some embodiments, aspects/operations of methods 800, 900, 1000, 1200, 1400 and 1500 may be interchanged, substituted, and/or added between these methods. For example, the media capture preview that is displayed in method 800 is optionally shifted using the method described in method 900. For brevity, these details are not repeated here.

FIG. 10 is a flow diagram of an exemplary method 1000 for displaying previously captured media, in accordance with some embodiments. In some embodiments, method 1000 is performed at a computer system (e.g., computer system 101 in FIG. 1 and/or computer system 700) (e.g., a smart phone, a tablet, and/or a head-mounted device) that is in communication with a display generation component (e.g., display generation component 120 in FIGS. 1, 3, and 4 and/or 702) (e.g., a display controller; a touch-sensitive display system; a display (e.g., integrated and/or connected), a 3D display, a transparent display, a projector, a heads-up display, and/or a head-mounted display). In some embodiments, the computer system is communication with one or more gaze-tracking sensors (e.g., an optical and/or IR camera configured to track a direction of gaze of a user of the computer system). In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1000 are, optionally, combined and/or the order of some operations is, optionally, changed.

While displaying an extended reality environment user interface, the computer system detects (1002) a request to display (e.g., as described above in relation to FIG. 7K) captured media that includes immersive content (e.g., 730) that, when viewed from a respective range of one or more viewpoints provides a first set of visual cues (e.g., a visual indication of depth, a visual indication of perspective, a visual response to shifts in orientation of the viewpoint of the user) that the user is at least partially surrounded by the content (e.g., immersive or semi-immersive visual media, three-dimensional media, three-dimensional, stereo media, and/or spatial media) (e.g., video content that can be presented from a plurality of perspectives in response to detected changes in orientation of the user and/or the computer system). In some embodiments, the media content is immersive or semi-immersive visual media. In some embodiments, immersive or semi-immersive visual media is visual media that includes content for a plurality of perspectives captured from the same first point (e.g., location) in a physical environment, at a given time point. In some embodiments, replaying (e.g., playing back) the visual media from an immersive (e.g., first-person) perspective includes playing the media content from a perspective that matches the first point in the physical environment, at the given time point, and can, in response to user input, provide multiple, different perspectives (e.g., fields-of-view), all from the first point in the physical environment. In some embodiments, replaying the visual media from a non-immersive (e.g., third person) perspective includes playing the media content from a perspective other than the first point in the physical environment (e.g., shifts in perspective (e.g., that occur in response to user input)). In some embodiments, while replaying in non-immersive perspective, multiple perspectives that correspond to the first point in the physical environment are not displayed in response to user input. In some embodiments, as a part of detecting the request to playback captured media is detected, the computer system detects an attention of a user at (e.g., gaze of a user at and/or a viewpoint of the user directed to) one or more locations (e.g., one or more locations corresponding to one or more virtual objects) on the computer system detects one or more inputs on one or more hardware input mechanisms positioned on and/or coupled to the computer system, and/or detects one or more voice commands directed to playing back captured media). In some embodiments, the media was captured using one or more techniques as described above in relation to FIGS. 7C-7D. In some embodiments, the captured media is not non-immersive (e.g., not immersive visual media and/or not semi-immersive visual media). In some embodiments, non-immersive video media is video content that cannot be presented from a plurality of perspectives in response to detected changes in orientation of the user and/or the computer system. In some embodiments, non-immersive video media is can be presented in only one perspective (e.g., first person perspective or third person perspective), irrespective of whether or not the computer system detects changes in the orientation of the computer system and/or a user of the computer system.

In response to detecting the request to display the captured media, the computer system displays (1004) the captured media (e.g., displaying the capture media being played back) as a three-dimensional representation (e.g., 740) (e.g., a non-static representation) of the captured media that is displayed at a location (e.g., location of 740*a* in 701) in the three-dimensional environment selected by the computer system so that a first viewpoint of the user (e.g., 712) is outside of the respective range of one or more viewpoints (e.g., a non-immersive perspective) (e.g., a third-person perspective). In some embodiments, the three-dimensional representation of the captured media replaces one or more portions of a representation of an environment (e.g., virtual environment and/or physical environment) that was previously displayed (e.g., that was displayed before the request to playback the captured media was received) (e.g., using one or more techniques as described above in relation to FIG. 7C). In some embodiments, computer system displays the three-dimensional representation of captured media above a shutter button virtual object (e.g., as described above in relation to FIG. 7C) and/or in the center of the display generation component. In some embodiments, in response to detecting the request to display the capture media, the computer system displays a plurality of representations of previously captured media items concurrently with the three-dimensional representation of the captured media. In some embodiments, in response to receiving the request to playback the captured media, the computer system causes a representation (e.g., static representation) of the captured media to cease to be displayed. Displaying the captured media as a three-dimensional representation at a location that satisfies a set of prescribed conditions (e.g., the location is outside of the respective range of the one or more viewpoints) automatically allows the computer system to present the three-dimensional representation from a non-immersive perspective without a user input, which reduces the number of inputs needed to perform an operation. Doing so also provides improved visual feedback that the initially displayed viewpoint is not within the respective range of one or more viewpoints.

In some embodiments, the location selected by the computer system is a location in a physical environment (e.g., location of 740*a* in 701) and three-dimensional representation of the captured media is an environment-locked virtual object and while displaying the three-dimensional representation of the captured media, the computer system detects that the viewpoint of the user has changed (e.g., as described above in relation to FIGS. 7K-7P)(e.g., user moves left/right, up/down and/or toward/away in the real world environment) (e.g., user looks up, down, to the right, or to the left) (e.g., the field-of-view of one or more cameras that are integrated into the computer system has changed) (e.g., detecting via one or more cameras that are integrated into the computer system) (e.g., detecting via an external device (e.g., smartwatch, one or more cameras, and/or external computer system) that is in communication (e.g., wireless communication) with the computer system). In some embodiments, in response to detecting that the viewpoint of the user has changed, the computer system maintains the display of the three-dimensional representation of the captured media at the location in the three-dimensional environment selected by the computer system (e.g., as described above in relation to FIG. 7K). In some embodiments, the three-dimensional representation is environment-locked). In some embodiments, in response to detecting that the viewpoint of the user has changed the size of the three-dimensional representation of the captured media changes (e.g., the three-dimensional representation of the captured media is displayed as larger and or smaller). In some embodiments, in response to detecting that the viewpoint of the user has change, the three-dimensional representation of the captured media ceases to be displayed. Maintaining the display of the three-dimensional representation of the captured media at the location in the three-dimensional environment selected by the computer system in response to detecting that the viewpoint of the user has changed causes the computer system to automatically perform a display operation that allows a user to move and maintain view of the three-dimensional representation of the captured media without requiring user input, which reduces the number of inputs needed to perform an operation.

In some embodiments, the first viewpoint of the user corresponds to a first viewpoint location that is a first distance (e.g., 10 meters, 5 meters, or 3 meters) from the location selected by the computer system and while displaying the three dimensional representation of the captured media at the location selected by the computer system (e.g., location of 740 at FIG. 7K) and while the user is at the first viewpoint location, the computer system detects a change in pose (e.g., repositioning of the user's entire body, repositioning of a portion (e.g., head, hand, arms, and/or legs) of the user's body repositioning of user's head) (e.g., the change of the positioning of the user is detected user one or more cameras and/or an external device as described above) of the viewpoint of the user to a second viewpoint of the user that corresponds to a second viewpoint location that is a second distance (e.g., 5 meters, 3 meters, or 1 meter) from the location selected by the computer system, wherein the second distance is less than the first distance (e.g., as described above in FIG. 7L). In some embodiments, in response to detecting the change in pose of the viewpoint of the user to a second viewpoint of the user, the computer system displays the three-dimensional representation with a second set of visual cues (e.g., 740 at FIG. 7L) that the user is at least partially surrounded by the content. In some embodiments, the second set of visual cues includes at least a second visual cue that the user is at least partially surrounded by the content that is not provided while displaying the three-dimensional representation when viewed from the first viewpoint of the user (e.g., 740 at FIG. 7L). In some embodiments, as the user's viewpoint moves closer to the location selected by the computer system, the three-dimensional representation of the captured media becomes more immersive (though less immersive than when the viewpoint of the user is within the range of one or more viewpoints that provides the first set of visual cues). In some embodiments, the second set of visual cues does not include at least a first visual cue (e.g., a visual indication of depth, a visual indication of perspective, a visual response to shifts in orientation of the viewpoint of the user) that the user is at least partially surrounded by the content that is included in the first set of visual cues. In some embodiments, the second set of visual cues does not include at least a first visual cue (e.g., a visual indication of depth, a visual indication of perspective, a visual response to shifts in orientation of the viewpoint of the user) that the user is at least partially surrounded by the content that is included in the first set of visual cues. Displaying the three-dimensional representation with a different set of visual cues as the user moves closer to the location selected by the computer system causes the computer system to automatically perform a display operation that allows a user to perceive the three-dimensional representation of the captured media differently based on the location of the user's viewpoint with respect to the location selected by the computer without requiring user input, which performs an operation without requiring further user input. Displaying the three-dimensional representation with a different set of visual cues as the user moves closer to the location selected by the computer system provides visual feedback to the user regarding what actions the user needs to take such that the three-dimensional representation is displayed from an immersive perspective, which provides improved visual feedback.

In some embodiments, while the user is at the second viewpoint location and while the three-dimensional representation of the captured media is displayed, the computer system detects a change in pose of the viewpoint of the user to a third viewpoint of the user that corresponds to a third viewpoint location (e.g., as described above in relation to FIG. 7M). In some embodiments, in response to detecting the change in pose of the viewpoint of the user to the third viewpoint of the user and in accordance with a determination that a first set of display criteria are met, where the first set of display criteria includes a first criterion that is met when a distance between the third viewpoint location and the location selected by the computer system is greater than a first threshold distance (e.g., 0.1 meters, 0.5 meters, 1 meter, 2 meters, 3 meters) (e.g., user moves past the location selected by the computer system), the computer system ceases to display the three-dimensional representation of the captured media (e.g., as described above in relation to FIG. 7M). In some embodiments, the change in pose from the second viewpoint of the user to the third viewpoint of the user is in the same direction (e.g., along the same plane) (along the same path) as the change in pose from the first viewpoint of the user to the second viewpoint of the user (e.g., the directional component of the vector for the change in pose from the first viewpoint of the user to the second viewpoint of the user is the same as the directional component of the vector for the change in pose from the second viewpoint of the user to the third viewpoint of the user) In some embodiments, in response to detecting the change in pose of the viewpoint of the user to the third viewpoint of the user and in accordance with a determination that a first set of display criteria are not met, the computer system maintains display of the three-dimensional representation of the captured media. In some embodiments, the computer system ceases to display the three-dimensional representation of the captured media when the distance from the third viewpoint location to the location selected by the computer system is greater than a first threshold distance. In some embodiments, the first set of display criteria incudes a criterion that is met when the location selected by the computer system is not visible from the third viewpoint of the user (e.g., the location selected by the computer system is no longer in front of the user) Ceasing to display the three-dimensional representation in accordance with a determination that the distance between the third viewpoint location and the location selected by the computer system is greater than a first threshold distance provides visual feedback about the position (e.g., position of the computer system relative to the location selected by the computer system), which provides improved visual feedback.

In some embodiments, while the user is at the second viewpoint location and while the three-dimensional representation of the captured media is displayed, the computer system detects a change in pose of the viewpoint of the user to a fourth viewpoint of the user that corresponds to a fourth viewpoint location (e.g., as described above in relation to FIG. 7P). In some embodiments, in response to detecting the change in pose of the viewpoint of the user to the fourth viewpoint of the user and in accordance with a determination that a second set of display criteria are met, wherein the second set of display criteria includes a second criterion that is met when a distance between the fourth viewpoint location and the location selected by the computer system is less than a second threshold distance (e.g., 0.1 meters, 0.5 meters, 1 meter, 2 meters, or 3 meters) (e.g., user moves toward the location selected by the computer system), the computer system displays the three-dimensional representation of the captured media at a respective location selected by the computer system that is further from the fourth viewpoint location than the location selected by the computer system (e.g., as described above in relation to FIG. 7P) (e.g., the three-dimensional representation of the captured media is moved away from the current location of the user). In some embodiments, the respective location is a location in the physical environment that is visible from the fourth viewpoint of the user. In some embodiments, the second set of display criteria incudes a criterion that is met when the location selected by the computer system is not visible from the fourth viewpoint of the user (e.g., the location selected by the computer system is no longer in front of the user). In some embodiments, the respective location is a location that is visible from the fourth viewpoint of the user. In some embodiments, the computer system displays the three-dimensional representation of the captured media at a respective location selected by the computer system when the distance from the fourth viewpoint location to the location selected by the computer system is greater than a second threshold distance. In some embodiments, in accordance with a determination that the viewpoint location has moved past the location of the three-dimensional representation (e.g., when a distance between the fourth viewpoint location and the location selected by the computer system is greater than (or less than) a third threshold distance), the computer system displays the three-dimensional representation of the captured media at a respective location selected by the computer system that is further from the fourth viewpoint location than the location selected by the computer system. In some embodiments, the change in pose from the second viewpoint of the user to the fourth viewpoint of the user is in the same direction as the change in pose from the first viewpoint of the user to the second viewpoint of the user (e.g., the directional component of the vector of the change in pose from the first viewpoint of the user to the second viewpoint of the user is the same as the directional component of the vector of the change in pose from the second viewpoint of the user to the fourth viewpoint of the user)). Displaying the three-dimensional representation of the captured media at a respective location selected by the computer system that is further from the fourth viewpoint location than the location selected by the computer system when certain prescribed conditions are satisfied, automatically changes the display of the three-dimensional representation such that the three-dimensional representation of the captured media is easily viewable by the user, which performs an operation when a set of conditions has been met without requiring further user input. Displaying the three-dimensional representation of the captured media at a respective location that is further from the fourth viewpoint location than the location selected by the computer system provides the user with visual feedback about the position (e.g., position of the computer system relative to the location selected by the compute system) of the computer system, which provides improved visual feedback In some embodiments, the first viewpoint of the user corresponds to a fifth viewpoint location that is a fifth distance from the location selected by the computer system and while displaying the three-dimensional representation of the captured media at the location selected by the computer and the user is at the fifth viewpoint location, the computer system detects a change in pose (e.g., repositioning of the user's entire body, repositioning of a portion (e.g., head, hand, arms, legs) of the user's body repositioning of user's head) (e.g., the change of the positioning of the user is detected user one or more cameras and/or an external device as described above) of the viewpoint of the user to a sixth viewpoint of the user that corresponds to a sixth viewpoint location that is a sixth distance from the location selected by the computer system (e.g., as described above in relation to FIG. 7P). In some embodiments, in response to detecting the change in pose of the viewpoint of the user to the sixth viewpoint of the user, the computer system displays the three-dimensional representation with a third set of visual cues that the user is at least partially surrounded by the content. In some embodiments, as the user's viewpoint moves further from the location selected by the computer system, the three-dimensional representation of the captured media becomes less immersive (though less immersive than when the viewpoint of the user is within the range of one or more viewpoints that provides the first set of visual cues). In some embodiments, the third set of visual cues do not include at least a third visual cue that the user is at least partially surrounded by the content that is included in the first set of visual cues. In some embodiments, the third set of visual cues do not include at least a fourth visual cue that the user is at least partially surrounded by the content that was provided while displaying the three-dimensional representation when view from the first viewpoint of the user. Displaying the three-dimensional representation with a different set of visual cues as the user moves further from the location selected by the computer system causes the computer system to perform a display operation that allows a user to perceive the three-dimensional representation of the captured media differently based on the user's viewpoint without displaying additional controls, which provides additional control options without cluttering the user interface.

In some embodiments, the three-dimensional representation of the captured media includes a plurality of virtual objects including a first virtual object and a second virtual object and the computer system detects a change in pose of the viewpoint of the user to a seventh viewpoint of the user (e.g., change in the positioning of the user's entire body, change in the positioning of a first portion of the user's body) (e.g., change in the viewpoint of the user) of the user (e.g., lateral movement of the user, side to side movement of the user, and/or user's movement along a horizontal plane). In some embodiments, in response to detecting the change in pose of viewpoint of the user to the seventh viewpoint of the user, the computer system displays, via the display generation component, the first virtual object (e.g., foreground of content in 740) moving with respect to the second virtual object (e.g., background of content in 740) (e.g., as described above in relation to FIG. 7K) based on the change in pose of the user (e.g., displaying a parallax effect where the first and second virtual objects shift differently as the pose of the viewpoint of the user changes) (e.g., the first virtual object is displayed in the foreground of the three-dimensional representation of the captured media and moves at a first variable speed that is based on the change in pose of the viewpoint of the user and the second virtual object is displayed in the background of the three-dimensional representation of the captured media and moves at a second variable speed that is based on the change in pose of the viewpoint of the user. In some embodiments, the first variable speed, at any point in time, is greater than the second variable speed). Displaying the first virtual object moving with respect to the second virtual object in response to detecting a change in the pose of the viewpoint of the user provides the user with visual feedback regarding the depth data that is associated with the captured media, which provides improved visual feedback In some embodiments, the three-dimensional representation of the captured media (e.g., 740) is displayed as a first type of projection (e.g., first type of shape) and while displaying the three-dimensional representation of the captured media as the first projection shape, the computer system detects a request (e.g., selection of 736) (e.g., selection of a virtual arrow object) (e.g., one or more gestures that correspond to a selection of virtual objects) to display the three-dimensional representation as a second type of projection, different from (e.g., different shape, different size, and/or displayed at a different location) the first type of projection. In some embodiments, in response to detecting the request to display the three-dimensional representation as a second type of projection, the computer system displays the three-dimensional representation as the second type of projection (e.g., as described above in relation to FIG. 7K). In some embodiments, displaying the three-dimensional representation as the second type of projection include displaying less of the captured media than when the three-dimensional representation is displayed as the first type of projection. In some embodiments, displaying the three-dimensional representation as the first type of projection (e.g., a spherical projection) includes distorting the three-dimensional representation of the captured media along the edges of the projection and displaying the three-dimensional representation as the second type (e.g., flattened projection) of projection does not include distorting the three-dimensional representation of the captured media. In some embodiments, displaying the three-dimensional representation as the first type of projection (e.g., spherical projection) includes displaying the captured media along three axes (e.g., x-axis, y-axis, and z-axis) and displaying the three-dimensional representation as the second type of project (e.g., flattened projection) includes displaying the captured media along two axes (e.g., y-axis and z-axis). Displaying the three-dimensional representation as a second type or projection provides visual feedback about the state of the computer system (e.g., the computer system has detected the request to display the three-dimensional representation as a second type of projection while the three-dimensional representation is displayed as a first projection shape), which provides improved visual feedback.

In some embodiments, the first type of projection and the second type of projection are independently selected from the group consisting of a spherical shaped stereo projection (e.g., as described above in relation to FIG. 7K) and a flattened shaped stereo projection (e.g., shape of 730 in FIGS. 7I and 7J).

In some embodiments, the three-dimensional representation of the captured media is displayed at a first size (e.g., 740 at FIG. 7K) and while displaying the three-dimensional representation at the first size, the computer system detects (e.g., via one or more cameras that are integrated into the computer system) a set of one or more gestures (e.g., pinch and/or de-pinch) (e.g., as described above in reference to selection of virtual objects in XR environments) (e.g., one or more hand gestures on a touch sensitive surface or one or more air gestures) (e.g., as described above in FIG. 7K). In some embodiments, in response to detecting the set of one or more gestures, the computer system expands the display of the three-dimensional representation of the captured media to a second size that is greater than the first size (e.g., size of 740 at FIG. 7L). In some embodiments, in response to detecting the set of one or more hand gestures, the size of the three-dimensional representation is reduced. In some embodiments, displaying the three-dimensional representation of the captured media at the second size covers more than a predetermined amount or all of (e.g., the entirety of) the extend reality environment user interface. Expanding the display of the three-dimensional representation of the captured media in response to detecting a set of one or more gestures (e.g., air gestures, air motions) (e.g., as described above in reference to selection of virtual objects in XR environments) causes the computer system to perform a display operation without displaying additional controls, which provides additional control options without cluttering the user interface. Expanding the display of the three-dimensional representation of the captured media in response to detecting a set of one or more gestures provides visual feedback about a state of the computer system (e.g., the computer system has detected the request to expand the display of the three-dimensional representation while the three-dimensional representation is displayed at a first size), which provides improved visual feedback.

In some embodiments, before detecting the set of one or more gestures, the extended reality environment user interface includes a first portion of a representation (e.g., virtual representation and/or optical representation) of a physical environment (e.g., 709c1 at FIG. 7K) (e.g., the physical environment that corresponds to the location of the computer system) and expanding the display of three-dimensional representation of the captured media to the second size that is greater than the first size includes displaying the three-dimensional representation (e.g., a portion of the representation) of the captured media to the second size (e.g., 740 at FIG. 7L) in place of the first portion of the representation of the physical environment (e.g., 709c1 at FIG. 7L). In some embodiments, in response to detecting the set of one or more hand gestures, the representation of the physical environment (e.g., the entirety of the representation of the physical environment) is replaced with display of the three-dimensional representation at the second size. In some embodiments, in response to detecting the set of one or more hand gestures, more of the representation of the physical environment is visible. Displaying the three-dimensional representation of the captured media in place of the first portion of the representation of the physical environment provides more focused visual feedback to the user regarding the three-dimensional representation of the captured media by removing the content (e.g., the first portion of the representation of the physical environment) that the user has not expressed an explicit interest in, which provides improved visual feedback.

In some embodiments, while the three-dimensional representation of the captured media (e.g., 740) is displayed, the computer system detects a second set of one or more gestures that include a movement component (e.g., a pinch (e.g., placement of two fingers next to one another and/or movement of two fingers close to one another) and drag gesture (e.g., movement of a pinched hand) (e.g., detecting by one or more cameras that are in communication with the computer system) (e.g., a second set of one or more gestures that is performed by a user (e.g., a user of the computer system) (e.g., as described above in FIG. 7K). In some embodiments, in response to detecting the second set of one or more gestures the computer system ceases to display the three-dimensional representation of the captured media and the computer system displays a second three-dimensional representation of a second captured media (e.g., one of previously captured media items in 743) (e.g., different from the three-dimensional representation of the captured media) at the location (e.g., 740a) chosen by the computer system (e.g., the second three-dimensional representation of the second captured media was not displayed prior to detecting the set of one or more gestures that correspond to a motion input). In some embodiments, before detecting the set of one or more gestures that correspond to the motion input, the three-dimensional representation of the captured media and the second three-dimensional representation of the second captured media are concurrently displayed. In some embodiments, the one or more gestures include an air gesture (e.g., as described above in reference to selection of virtual objects in XR environments). Replacing the display of a first representation of a media item with a second representation of a media in response to detecting a second set of one or more gestures (e.g., air gestures, air motions) causes the computer system to perform a display operation without displaying additional controls, which provides additional control options without cluttering the user interface.

In some embodiments, while displaying captured media as a three-dimensional representation of the captured media (e.g., 740), the computer system receives a request to playback the captured media (e.g., playback the captured media using the computer system and/or an external device). In some embodiments, in response to receiving the request to playback the captured media and in accordance with a determination the captured media includes audio data, the computer system plays back the captured media, where playback of the captured media item includes outputting spatial audio that corresponds to the audio data (e.g., as described above in relation to FIG. 7K) (e.g., audio that a user perceives as originating from one or more fixed locations and/or directions in the physical environment, even as the viewpoint and/or position of the user changes) (e.g., the audio data includes various channels where the user perceives the output of each channel as emanating from a respective spatial position that surrounds the position of the user, wherein the spatial position that each channel emanates from is locked to the position of the computer system which causes the computer system to audibly emphasize a respective channel based on the movement of the user's head within the real world environment) (e.g., audio signals that have been adjusted using directional audio filters) (e.g., the spatial audio is outputted via speakers that are integrated into the computer system) (e.g., the spatial audio is outputted via speakers that are in communication with the computer system). In some embodiments, the output of the spatial audio depends on (e.g., based on) the positioning of the computer system relative to the physical environment. Outputting spatial audio when certain prescribed conditions are satisfied, automatically provides the computer system with the ability to perform an audio output operation that allows a user to hear three-dimensional audio sound without performing an input, which performs an operation when a set of conditions has been met without requiring further user input.

In some embodiments, the computer system is in communication with an external device (e.g., television, laptop, smartphone, smart watch) (e.g., a device that is separate from the computer system) and the captured media includes depth data (e.g., captured media item is a stereoscopic media item (e.g., a media item that includes media that is captured at the same time from two different cameras (or sets of cameras) and while displaying the captured media as a three-dimensional representation of the captured media (e.g., 740), the computer system receives a request to playback the captured media on the external device. In some embodiments, in response to receiving the request to playback the captured media on the external device and in accordance with a determination that the external device cannot display the depth data included in the captured media, the computer system initiates playback of the captured media on the external device (e.g., the captured media is played back on the external device without depth data), without a stereoscopic depth effect (e.g., as described above in relation to FIG. 7K). Initiating playback of the captured media on an external device provides visual feedback about a state of the computer system (e.g., computer systems has received a request to playback the captured media on the external device while the captured media is displayed as a three-dimensional representation), which provides improved visual feedback.

In some embodiments, playing back the captured media on the external device includes outputting spatial audio that corresponds to the captured media.

In some embodiments, the computer system has a default interpupillary distance value setting (e.g., a value between 58 mm to 70 mm such as 60 mm, 64 mm, or 68 mm) and the computer system detects a request to playback (e.g., playback the captured media using the computer system and/or an external device (e.g., an external device that is capable of playing back media items that include depth data) the captured media. In some embodiments, in response to detecting the request to playback the captured media and in accordance with a determination that the user's eyes have an interpupillary distance value that is different than the default interpupillary distance value setting (e.g., greater than and/or less than) (e.g., the difference between the default interpupillary distance value setting and the interpupillary distance value of the user's eyes is above a predetermined threshold), the computer system initiates playback of the captured media item with a first amount of visual shift (e.g., a shift in how the captured media is displayed to the user's right eye compared to the user's left eye) based on the user's interpupillary distance (e.g., playback of the captured media is displayed at a different scale than the scale at which the captured media idea was captured) (e.g., the first amount of shift correlates to the difference between the default interpupillary distance value setting and the value of the interpupillary distance of the user's eyes) (e.g., as described above in relation to FIG. 7K). In some embodiments, in response to detecting the request to playback the capture media and in accordance with a determination that the user's eyes have an interpupillary distance value that is the same (e.g., or within a threshold difference) of the default interpupillary distance value, initiating playback of the captured media item without the first amount of shift). In some embodiments, in accordance with a determination that the interpupillary distance value of the user is a first interpupillary distance value, the computer system initiates playback of the captured media item with a second amount of shift and in accordance with a determination that the interpupillary distance value of the user is second interpupillary distance value, different from the first interpupillary distance value, the computer system initiates playback of the captured media item with a third amount of shift, different from the second amount of shift. Playing back a captured media item with a first amount of shift when a user's interpupillary distance value does not match the interpupillary distance value causes the computer system to perform a playback operation that allows a user more easily view the playback of the media item without requiring additional user input, which provides additional control options without cluttering the user interface.

In some embodiments, aspects/operations of methods 800, 900, 1000, 1200, 1400, and 1500 may be interchanged, substituted, and/or added between these methods. For example, the video media item that is captured in method 800 may be the three-dimensional representation of captured media in method 1000. For brevity, these details are not repeated here.

FIGS. 11A-11D illustrate example techniques for displaying a representation of a physical environment with a recording indicator in accordance with some embodiments. The user interfaces in FIGS. 11A-11D are used to illustrate the processes described below, including the processes in FIG. 12.

Figure 11A:
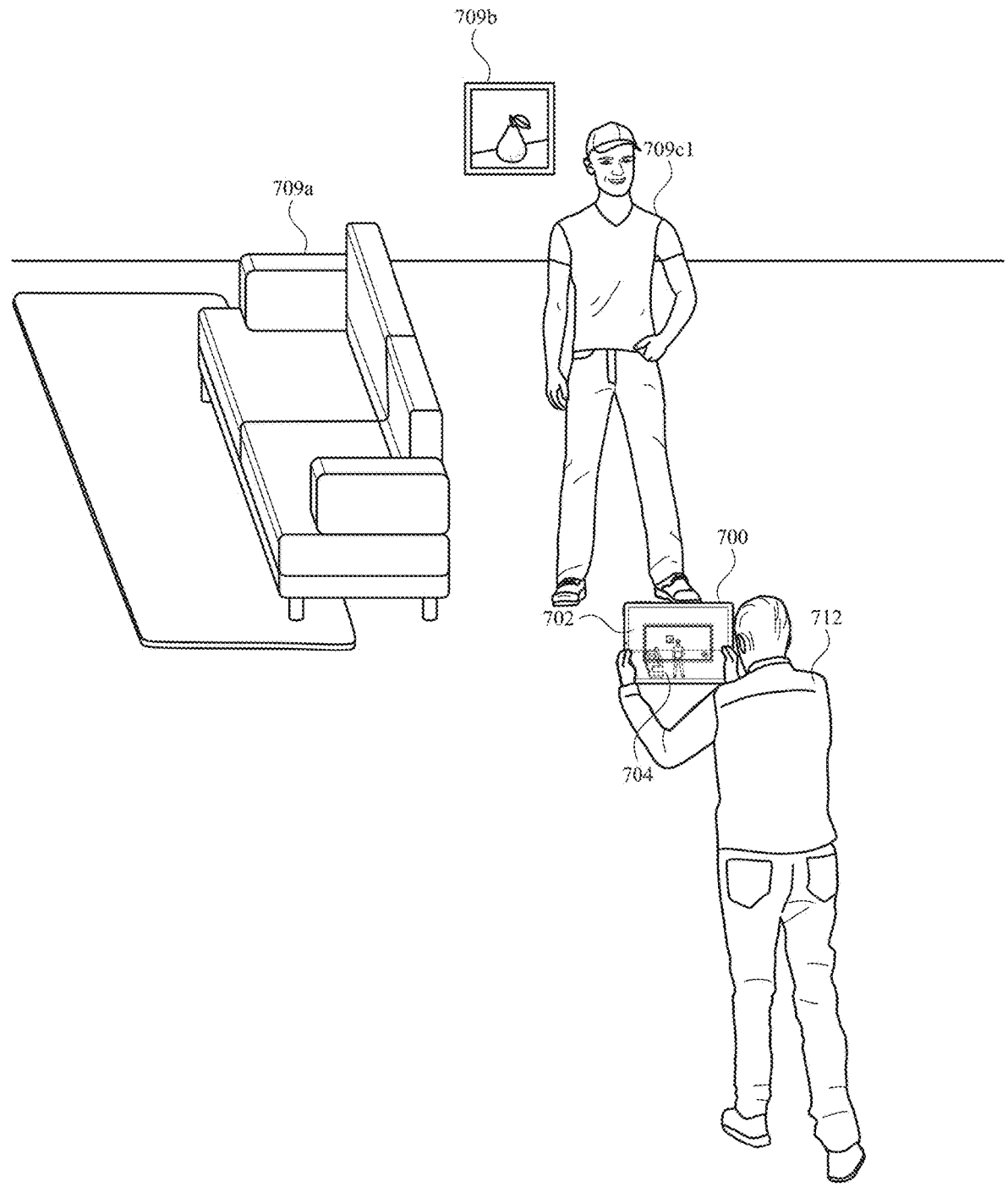
FIGS. 11A-11D illustrate example techniques for displaying a representation of a physical environment with a recording indicator in accordance with some embodiments.

FIG. 11A illustrates user 712 holding computer system 700 that includes display 702 in a physical environment. The physical environment includes couch 709a, picture 709b, and first individual 709c1. Display 702 presents representation of physical environment 704 (e.g., using "pass-through video" as described above). In the embodiment of FIGS. 11A-11D, the point of view of computer system 700 corresponds to the field-of-view of one or more cameras that are in communication (e.g., wired communication or wireless communication) with computer system 700 (e.g., cameras on the backside of computer system 700). Accordingly, as computer system 700 is moved throughout the physical environment, the field-of-view of the one or more cameras changes which causes the point of view of the computer system 700 to change.

At FIG. 11A, because couch 709a, picture 709b, and the first individual 709c1 are visible from the point of view of computer system 700, display 702 presents a depiction of couch 709a, picture 709b, and first individual 709c1. When user 712 looks at display 702, user 712 can see representation of physical environment 704 along with one or more virtual objects that computer system 700 displays (e.g., as shown in FIGS. 11A-11D). Thus, computer system 700 presents an augmented reality environment through display 702. In some embodiments, computer system 700 is a head-mounted device that presents representation of physical environment 704 along with one or more virtual objects that computer system 700 displays via a display generation component that encloses (or substantially encloses) the field-of-view of the user. In embodiments where computer system 700 is an HMD, the viewpoint of the user is locked to the forward facing direction of the user's head, such that representation of physical environment 704 and one or more virtual objects, such as recording indicator 1102 (discussed below), shift as the user's head moves (e.g., because computer system 700 also moves as the user's head moves).

Figure 11B:
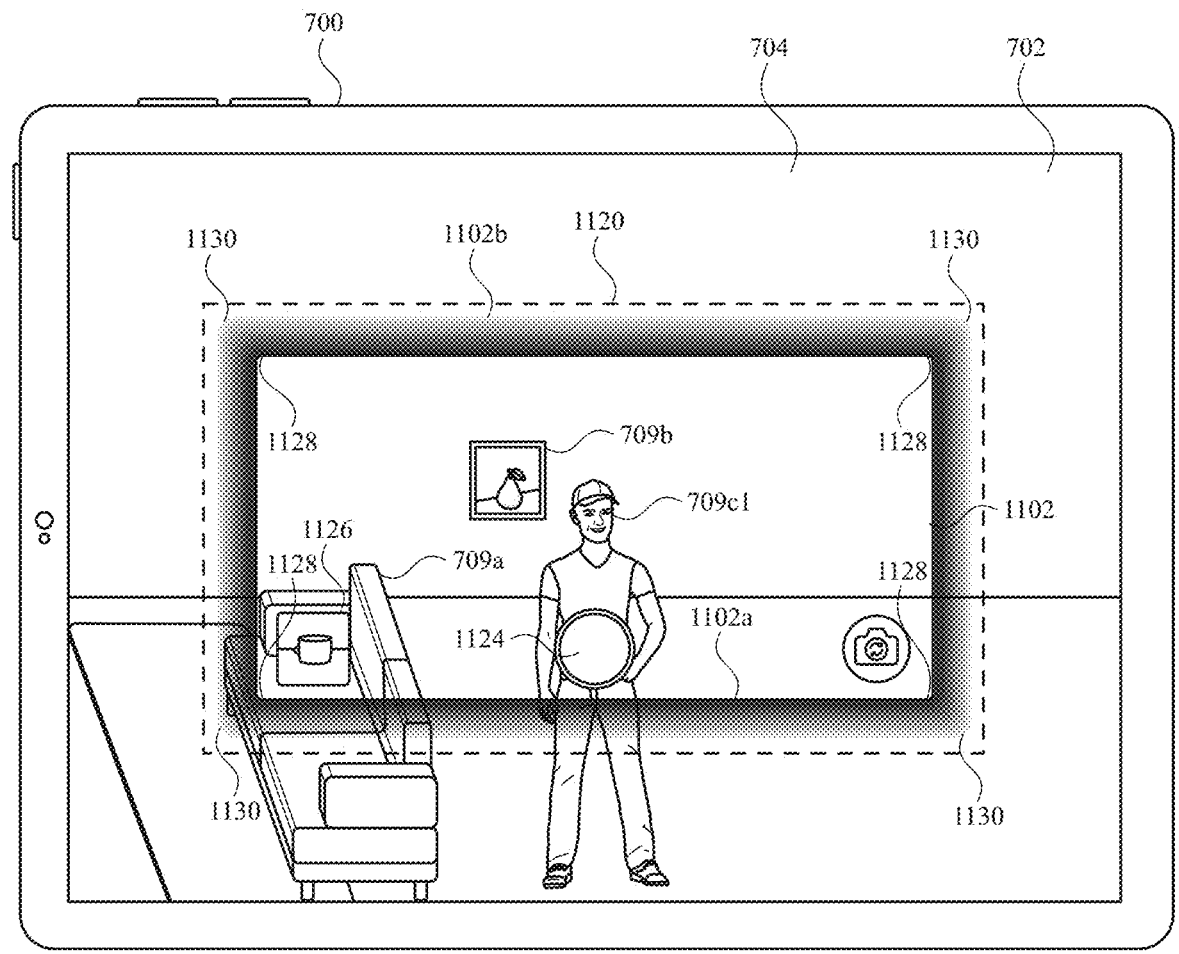
Figure 11C:
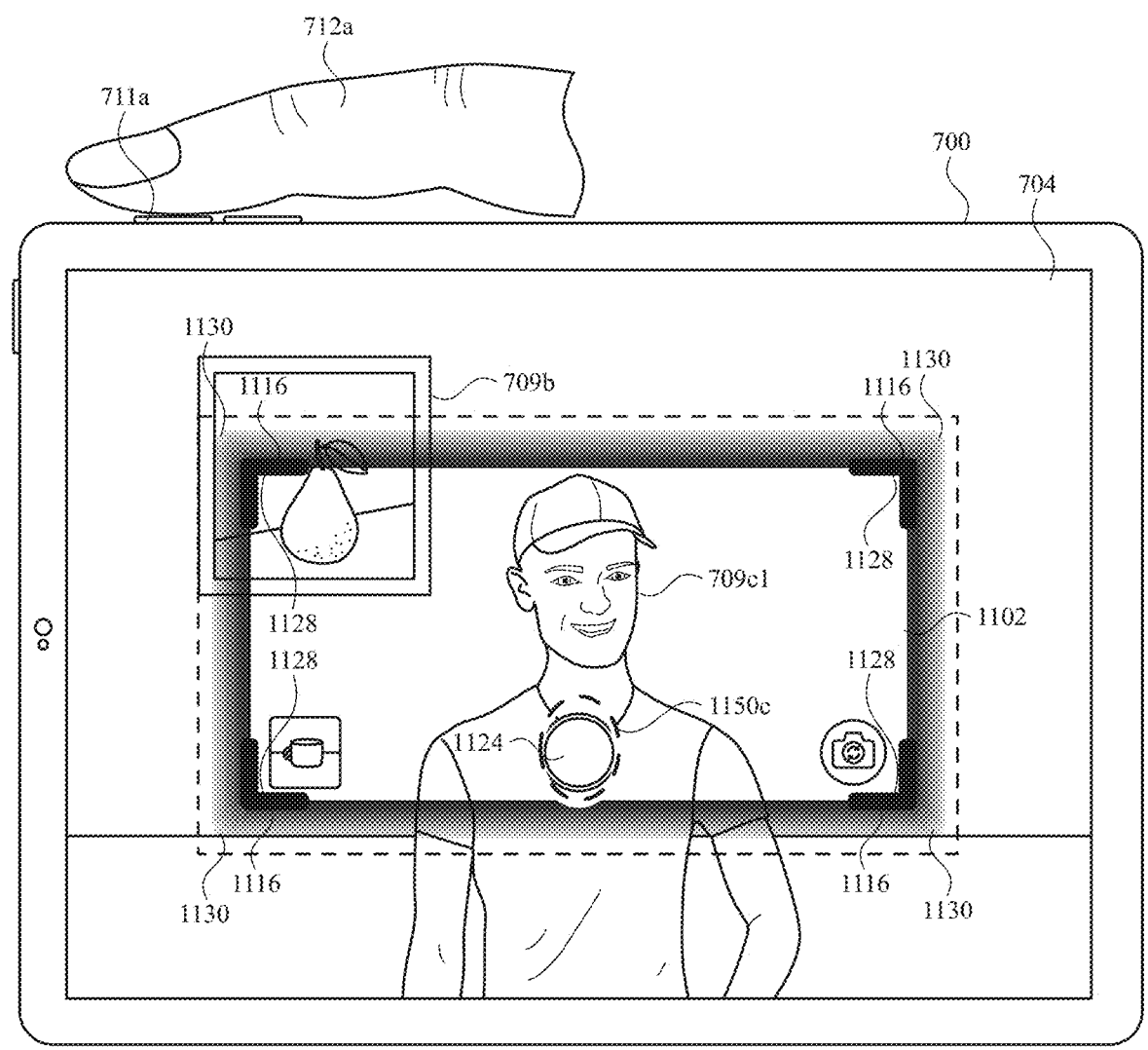
Figure 11D:
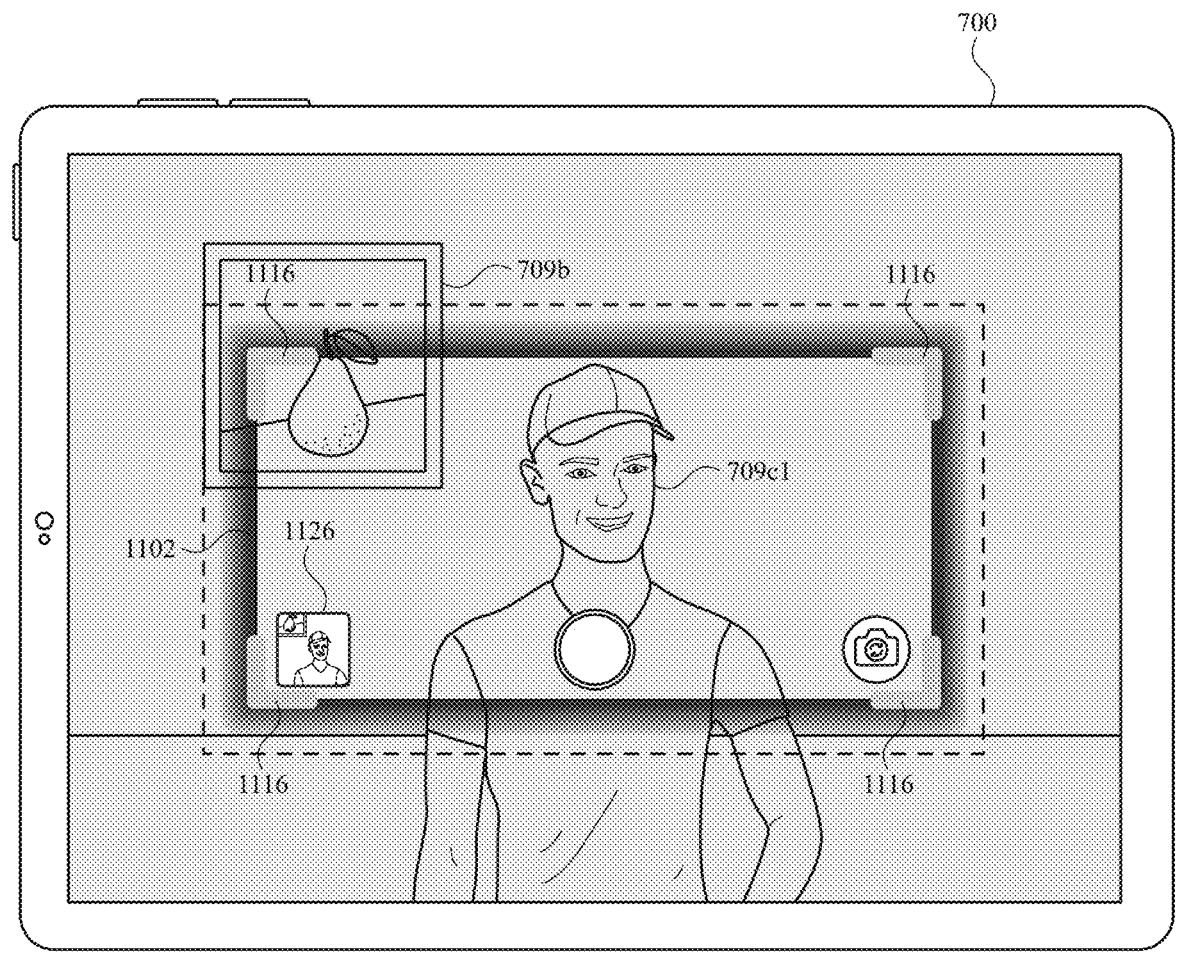

In FIGS. 11B-11D, computer system 700 is shown in an enlarged view to better illustrate the content that is visible on display 702. As illustrated in FIG. 11B, computer system 700 displays recording indicator 1102. Recording indicator 1102 is associated with a camera application that is installed on computer system 700. Computer system 700 displays recording indicator 1102 as fading in (e.g., recording indicator 1102 increases in brightness and/or becomes more visible over a period of time) in response to the camera application being launched. The boundary of recording indicator 1102 indicates at least a portion of representation of the physical environment 704 that will be captured via a media capturing process (e.g., a process of capturing a still photo and/or a process of capturing a video). For example, as illustrated in FIG. 11B, the boundary of recording indicator 1102 surrounds the upper torso of first individual 709c1, picture 709b, and a portion of couch 709a. Accordingly, while recording indicator 1102 is in the position shown in FIG. 11B, the upper torso of first individual 709c1, picture 709b, and the portion of couch 709a will be captured in response to computer system 700 initiating a media capturing process. When the field-of-view of the one or more cameras of computer system 700 changes (e.g., the positioning of computer system 700 is moved within the physical environment) representation of physical environment 704 that is surrounded by the boundary of recording indicator 1102 changes in accordance with the change of the field-of-view of the one or more cameras of computer system 700. As illustrated in FIG. 11B, computer system 700 displays recording indicator 1102 as a rectangle. In some embodiments, computer system 700 displays recording indicator 1102 as a shape that is different than a rectangle (e.g., a circle, a triangle, or a square).

At FIG. 11B, computer system 700 displays recording indicator 1102 at a fixed simulated depth within representation of physical environment 704 relative to the location of computer system 700 in the physical environment. Computer system 700 maintains the display of recording indicator 1102 at the fixed simulated depth within representation of physical environment 704 as the positioning of computer system 700 is changed within the physical environment (e.g., as the user moves computer system 700 around the physical environment). Because computer system 700 displays recording indicator 1102 at the fixed simulated depth within representation of physical environment 704, the display of recording indicator 1102 occludes certain content that is positioned within the physical environment at a distance from computer system 700 that is greater than the simulated depth at which recording indicator 1102 is displayed. In some embodiments, the display of recording indicator 1102 is occluded by content that is positioned within the physical environment at a distance that is less than the simulated depth at which computer system 700 displays recording indicator 1102.

In FIG. 11B, due to the darkening of the region outside of the recording indicator, a user perceives the content that is within recording indicator 1102 as brighter than the content that is outside of recording indicator 1102 (e.g., even if, optionally, computer system 700 has not significantly and/or systemically modified the brightness of the region inside recording indicator 1102 relative to the region outside recording indicator 1102). This visual effect aids and/or allows a user to easily view and focus on the content that is within the boundary of recording indicator 1102 that will be the subject of a resulting multimedia item. The above described visual effect is created by displaying recording indicator 1102 with various features (e.g., as described below) where the combination of the features creates the above described visual effect.

At FIG. 11B, recording indicator 1102 includes inner corners 1128 and outer corners 1130. Additionally, at FIG. 11B, recording indicator 1102 includes inner edge region 1102a and outer edge region 1102b. Inner edge region 1102a and outer edge region 1102b form a grayscale gradient that transitions from a dark color at the inner edge of recording indicator 1102 to a light color at the outer edge of recording indicator 1102. Inner edge region 1102a includes the discrete inner edge of recording indicator 1102 and the area of the grayscale gradient with minimum/zero translucency (e.g., maximum saturation). Outer edge region 1102 includes the remainder of the grayscale gradient that has a graduated translucency/saturation. Inner edge region 1102a of recording indicator 1102 forms inner corners 1128 and outer edge region 1102b of recording indicator 1102 forms outer corners 1130. Further, at FIG. 11B, recording indicator 1102 has a visual parameter (e.g., brightness, amount of translucency, and/or tint density) that changes in value from inner edge region 1102a of recording indicator 1102 to outer edge region 1102b of recording indicator 1102. Changing the value of the visual parameter of recording indicator 1102 from inner edge region 1102a of recording indicator 1102 to outer edge region 1102b of recording indicator 1102 helps create the visual effect that causes a user to view the content that is within recording indicator 1102 as brighter than the content that is outside recording indicator 1102, even though, optionally, the relative brightness of the areas of content have not been modified (e.g., the effect is a perceptual effect, not an actual difference in brightness). As illustrated in FIG. 11B, inner edge region 1102a of recording indicator 1102 is darker than outer edge region 1102b of recording indicator 1102. At FIG. 11B, the display of outer edge region 1102b of recording indicator 1102 is larger (e.g., covers more of display 702) than the display of inner edge region 1102a of recording indicator 1102. Both the discrepancy of the size of inner edge region 1102a of recording indicator 1102 and outer edge region 1102b of recording indicator 1102 and the transition of a dark color that is associated with inner edge region 1102a of recording indicator 1102 to a light color that is associated with outer edge region 1102b of recording indicator 1102 aids in creating the visual effect that causes a user to view the content that is within recording indicator 1102 as brighter than the content that is outside of recording indicator 1102.

At FIG. 11B, inner edge region 1102a of recording indicator 1102 is not translucent (e.g., inner edge region 1102a of recording indicator 1102 is a sharp solid color) and outer edge region 1102b of recording indicator 1102 is partially translucent. That is, at FIG. 11B, the translucency of recording indicator 1102 increases from inner edge region 1102a of recording indicator 1102 to outer edge region 1102b of recording indicator 1102. Increasing the translucency of recording indicator 1102 from inner edge 1102a region of recording indicator 1102 to outer edge region 1102b of recording indicator 1102 aids in creating the visual effect that causes a user to view the content within the boundary of recording indicator 1102 as brighter than the content that is not within the boundary of recording indicator 1102. In some embodiments, inner edge region 1102a of recording indicator 1102 is a different color than outer edge region 1102b of recording indicator. In some embodiments, inner edge region 1102a of recording indicator 1102 is lighter (e.g., brighter) than outer edge region 1102b of recording indicator 1102. In embodiments when inner edge region 1102a of recording indicator 1102 is lighter than outer edge region 1102b of recording indicator 1102, a user perceives the content that is outside of recording indicator 1102 as brighter than the content that is within recording indicator 1102.

As illustrated in FIG. 11B, computer system 700 displays recording indicator 1102 with rounded corners. Displaying recording indicator 1102 with rounded corners aids in creating the visual effect that causes a user to perceive that content that is within the boundaries of recording indicator 1102 is brighter than content that is not within the boundaries of recording indicator 1102.

In the embodiment of FIGS. 11A-11B, the one or more cameras that are in communication with computer system 700 have an optimal capture distance (e.g., or range of distances) that enables the one or more cameras to capture improved and/or optimal depth data, or in some embodiments, to capture depth data at all. That is, when computer system 700 is positioned at the optimal capture distance away from a subject, resulting media items that include the subject will include depth data and/or improved or optimized depth data. The size and shape of recording indicator 1102 is chosen (e.g., by the manufacturer of computer system 700) to encourage a user to place computer system 700 at the optimal capture distance from a subject (e.g., the size of recording indicator 1102 is chosen to be smaller to encourage a user to place computer system 700 closer to a subject or the size of recording indicator 1102 is chosen to be larger to encourage a user to stand further from the subject). In some embodiments, computer system 700 dynamically updates the size of recording indicator 1102 (e.g., based on data from previous media items that were captured using computer system 700 and/or based on current environmental conditions) to encourage a user to place computer system 700 at the optimal capture distance. In some embodiments, the size and shape of recording indicator 1102 is chosen by the user of computer system 700.

As illustrated in FIG. 11B, computer system 700 displays camera shutter virtual object 1124 within recording indicator 1102. Selection of camera shutter virtual object 1124 initiates a process on computer system 700 for capturing media wherein the captured media includes a representation of content that is within recording indicator 1102. Camera shutter virtual object 1124 is anchored to recording indicator 1102. That is, as computer system 700 is repositioned within the physical environment, computer system 700 maintains the display of camera shutter virtual object 1124 within recording indicator 1102. In some embodiments, camera shutter virtual object 1124 includes one or more features discussed above with respect to camera shutter virtual object 714.

As illustrated in FIG. 11B, computer system 700 displays photo well virtual object 1126 within recording indicator 1102. As discussed above, photo well virtual object 1126 includes a representation of a most recently captured media item (e.g., a still photo or video) (e.g., a coffee mug at FIG. 11B). Computer system 700 displays an enlarged version of the representation of the most recently captured media item in response to detecting a selection of photo well virtual object 1126. Similar to camera shutter virtual object 1124, photo well virtual object 1126 is anchored to the display of recording indicator 1102. In some embodiments, in response to the camera application (e.g., the camera application that is associated with recording indicator 1102 as discussed above) being launched, computer system 700 displays both camera shutter virtual object 1124 and photo well virtual object 1126 as concurrently fading in along with recording indicator 1102 fading in. In some embodiments, selection of photo well virtual object 1126 causes computer system 700 to cease to display recording indicator 1102. In some embodiments, computer system 700 displays additional virtual objects within recording indicator 1102 (e.g., a virtual object to control the zoom level of the one or more cameras that are in communication with the computer system). In some embodiments, photo well virtual object 1126 includes one or more features discussed above with respect to photo well virtual object 715.

FIG. 11B includes a depiction of media capture schematic 1120. Computer system 700 does not display media capture schematic 1120. Rather, media capture schematic 1120 is included in FIG. 11B as a visual aid to help explain the following concept. As discussed above, the boundary of recording indicator 1102 indicates what content will be captured via a respective media capturing process. However, the respective media capturing process captures additional content that is not within the boundary of recording indicator 1102. The content that is within the boundary of media capture schematic 1120 is also captured via the respective media capturing process captures. As illustrated in FIG. 11B, the boundary of media capture schematic 1120 covers a larger region of display 702 of computer system 700 (e.g., surrounds more of the representation of the physical environment) than the boundary of recording indicator 1102. Accordingly, the respective media capturing process captures more content than just the content that is surrounded by the boundary of recording indicator 1102. In some embodiments, resulting multimedia of the respective media capturing process includes content that is surrounded by the boundary of recording indicator 1102 and does not include content that is outside of the boundary of recording indicator 1102. In some embodiments, the widths of media capture schematic 1120 and recording indicator 1102 are the same while the height of media capture schematic 1120 is greater than the height of recording indicator 1102. In some embodiments, the heights of media capture schematic 1120 and the height of recording indicator 1102 are the same while the width of media capture schematic 1120 is greater than the width of recording indicator 1102.

At FIG. 11C, computer system 700 is repositioned within the physical environment (e.g., user 712 moves computer system 700 towards first individual 709c1). At FIG. 11C, because computer system 700 is repositioned within the physical environment, the portion of representation of physical environment 704 that is surrounded by recording indicator 1102 changes (e.g., with respect to the portion of representation of physical environment 704 that is surrounded by recording indicator 1102 at FIG. 11B). In some embodiments, the portion of representation of physical environment 704 that is surrounded by recording indicator 1102 changes in response to computer system 700 detecting (e.g., via one or more sensors coupled to the computer system and/or the one or more cameras that are in communication with the computer system) a gradual change in the viewpoint of the user (e.g., the viewpoint of the user corresponds to the field-of-view of the one or more cameras that are in communication with computer system 700). In some embodiments, the portion of representation of physical environment 704 that is surrounded by recording indicator 1102 changes in response to computer system 700 detecting (e.g., via the one or more cameras that are in communication with the computer system) a gradual change in the positioning of content in the physical environment (e.g., content, such as individual 709c1, in the physical environment moves relative to the positioning of computer system 700).

At FIG. 11C, a determination is made that a set of display criteria are satisfied (e.g., the distance between computer system 700 and first individual 709c1 is appropriate for depth capture (e.g., the distance between computer system 700 and first individual 709c1 is greater than a first threshold and/or less than a second threshold and/or the brightness of the light in the physical environment is greater than a third threshold and/or less than a fourth threshold) and/or the lighting in the physical environment is appropriate for depth capture). Because a determination is made that the set of display criteria are satisfied, computer system 700 displays secondary recording indicator 1116. As illustrated in FIG. 11C, secondary recording indicator 1116 includes one or more non-contiguous portions that are displayed at one or more inner corners 1128 of recording indicator 1102. The one or more non-contiguous portions of secondary recording indicator 1116 are displayed as a different color (e.g., yellow, red and/or orange) than the color of the display of recording indicator 1102. In some embodiments, computer system 700 displays secondary recording indicator 1116 as overlapping both inner corners 1128 and outer corners 1130 of recording indicator 1102. In some embodiments, secondary recording indicator 1116 is displayed at one or more outer corners 1130 of recording indicator 1102 (e.g., and not at one or more inner corners 1128 of recording indicator 1102). In some embodiments, computer system 700 does not display the secondary recording indicator 1116 on inner corners 1128 of recording indicator 1102. In some embodiments where computer system 700 does not display secondary recording indicator 1116 on inner corners 1128 of recording indicator 1102, computer system 700 displays secondary recording indicator 1116 around content (e.g., adjacent to content) that is within recording indicator 1102. In some embodiments, computer system 700 displays secondary recording indicator 1116 on a subset (e.g., less than all) of inner corners 1128 of recording indicator 1102. In some embodiments, secondary recording indicator 1116 is displayed to indicate that other criteria are met, such as autofocus, optimal exposure conditions, and/or face detection.

At FIG. 11C, computer system 700 displays recording indicator 1102 and secondary recording indicator 1116 in the same plane. As discussed above, computer system 700 displays recording indicator 1102 at a fixed depth within representation of physical environment 704 relative to the location of computer system 700 within the physical environment. Because computer system 700 displays recording indicator 1102 and secondary recording indicator 1116 in the same plane, computer system 700 also displays secondary recording indicator 1116 at the same fixed depth as the display of recording indicator 1102.

At FIG. 11C, computer system 700 detects activation of hardware button 711a by body portion 712a or computer system 700 detects input 1150c directed at camera shutter virtual object 1124. In some embodiments, input 1150c is a tap on camera shutter virtual object 1124 (e.g., an air tap in space that corresponds to the location of the display of camera shutter virtual object 1124). In some embodiments, input 1150c is a gaze (e.g., a sustained gaze) input that is directed towards the direction of the display of camera shutter virtual object 1124. In some embodiments, input 1150c is an air tap input in combination with a detection of a gaze in the direction of the display of camera shutter virtual object 1124. In some embodiments, input 1150c is a gaze and blink that is directed towards the direction of the display of camera shutter virtual object 1124. In some embodiments, activation of hardware button 711a by body portion 712a or input 1150c is a long press (e.g., a press and hold) (e.g., the duration of body portion's 712a activation of hardware button or input 1150c is for a duration that is greater than a respective threshold such as 0.25, 0.5, 1, 2, or 5 seconds). In some embodiments, activation of hardware button 711 by body portion 712a or input 1150c is a short press (e.g., press and release) (e.g., the duration of body portion's 712a activation of hardware button 711a or input 1150c is less than a second). In some embodiments, a specific air gesture (e.g., as described above in reference to selection of virtual objects in XR environments) that is recognized as a request to capture media is detected. In some embodiments, in response to detecting a long press that corresponds to selection of camera shutter virtual object 1124, computer system 700 changes the visual appearance of camera shutter virtual object 1124 to indicate that the one or more cameras that are in communication with computer system 700 are capturing video media At FIG. 11D, in response to detecting activation of hardware button 711a by body portion 712a or in response to detecting input 1150c, computer system 700 initiates a media capturing process. At FIG. 11D, a determination is made that activation of hardware button 711 by body portion 712a or input 1150c is a short press. Because a determination is made that activation of hardware button 711 by body portion 712a or input 1150c is a short press, still media is captured (e.g., and not video media). The resulting media item includes content that was surrounded by the boundary of recording indicator 1102 at FIG. 11C (e.g., the resulting media includes a representation of the upper torso of first individual 709c1 and a portion of picture 709b). At FIG. 11D, because the most recently captured media item is now a representation of the physical environment, computer system 700 updates the display of photo well virtual object 1126 to include a representation of the physical environment (e.g., photo well virtual object includes a representation of the content that was surrounded by the boundary of recording indicator 1102 at FIG. 11C).

At FIG. 11D, computer system 700 makes a determination that the ambient brightness in the physical environment has decreased. Because a determination is made that the ambient brightness in the physical environment has decreased, computer system 700 increases the visual prominence of secondary recording indicator 1116 (e.g., secondary recording indicator 1116 is displayed as more prominent than the display of secondary recording indicator 1116 at FIG. 11C). Computer system 700 increases the visual prominence of secondary recording indicator 1116 by increasing the brightness at which computer system 700 displays secondary recording indicator 1116 (e.g., in comparison to the brightness of secondary recording indicator 1116 in FIG. 11C). In some embodiments, computer system 700 increases the visual prominence of secondary recording indicator 1116 by (e.g., concurrently) decreasing the brightness of recording indicator 1102 and increasing the brightness of secondary recording indicator 1116. In some embodiments, computer system 700 increases the visual prominence of secondary recording indicator 1116 by decreasing the size of the display of recording indicator 1102 and increasing the size of the display of secondary recording indicator 1116. In some embodiments, the visual appearance of secondary recording indicator 1116 indicates that current conditions (e.g., distance between computer system 700 and a subject and/or lighting in the physical environment) are satisfactory for depth capture. In some embodiments, computer system 700 dynamically changes the visual appearance of secondary recording indicator 1116 to indicate that current conditions are satisfactory for depth capture or that current conditions are not satisfactory for depth capture.

FIG. 12 is a flow diagram illustrating a method for displaying a representation of a physical environment with a recording indicator in accordance with some embodiments. Method 1200 is performed at a computer system (e.g., 100, 300, 500) that is in communication with a display generation component and one or more cameras. Some operations in method 1200 are, optionally, combined, the orders of some operations are, optionally, changed, and some operations are, optionally, omitted.

The computer system (e.g., 700) displays (1200), via the display generation component (e.g., 702), an extended reality camera user interface (e.g., the display of 1124, 1126 and/or 1102) (e.g., a user interface that corresponds to a camera application (e.g., a third party camera application and/or a camera application that is installed on the computer system by the manufacturer of the computer system)) that includes: a representation (e.g., a real-time representation or a three-dimensional representation) (e.g., an optical representation (e.g., via light directly passing through a portion of the computer system to the user) or a graphical representation that is displayed by the computer system) of a physical environment (1204) (e.g., 704) (e.g., the physical environment that the computer system is positioned within) (e.g., the physical environment that is within the field-of-view of the one or more cameras) (e.g., the physical environment that is within the field-of-view of the user); and a recording indicator (1206) (e.g., 1102) (e.g., that surrounds a first portion of the representation of the physical environment and not a second portion of the representation of the physical environment) (e.g., the recording indicator is displayed at a central location on the camera user interface) that indicates a recording region (e.g., area within 1102) (e.g., the recording region includes at least a portion of the representation of physical environment that will be captured by the one or more cameras in response to the computer system detecting a request to capture media, wherein the portion of the representation of the physical environment within the recording region is visible in the resulting media (e.g., still media and/or video media) within a field-of-view of the one or more cameras, wherein the recording indicator includes at least a first edge region (e.g., 1102a) that has a visual parameter (e.g., a density and/or a color (e.g., a color gradient that is monochromatic or multicolored)) (e.g., an amount of translucency (e.g., the amount of the representation of the physical environment that is visible behind the visual property)) (e.g., the visual property is overlaid a first portion of the physical environment and is not overlaid a second portion of the representation of the physical environment) that decreases through a plurality of different values for the visual parameter in a visible portion of the recording indicator, where the values of the parameter progressively (e.g., gradually or through a plurality of discrete steps) decreases (e.g., decreases in a single direction relative to the center of the recording region) as (e.g., decreases proportionally, decreases based on a predetermined function, decreases linearly, and/or decreases non-linearly) a distance (e.g., inches, centimeters, and/or millimeters) from the first edge region (e.g., in a direction that is perpendicular to a direction of the first edge region and extending outwards from the recording region) of the recording indicator increases (e.g., as discussed above in relation to FIG. 11B) (e.g., the intensity (e.g., amount of shading) and/or density of the visual property decreases as the distance from the recording region increases). In some embodiments, the recording region is a portion of the field-of-view of at least one camera of the one or more cameras. In some embodiments, the recording region is a portion of a field-of-view of at least two cameras of the one or more cameras (e.g., a portion at which the fields-of-view overlap)). In some embodiments, the visual property is displayed on the corners of the recording indicator and not the lateral portions of the recording indicator. In some embodiments, the visual property is displayed on the lateral portions of the visual indicator and not the corners of the visual indicator. In some embodiments, the recording indicator is a boundary between the representation of the physical environment that is captured by the one or more cameras and the representation of the physical environment that is not captured by the one or more cameras. In some embodiments, the angular range of the recording region is the same (e.g., or substantially the same) as the angular range of the field-of-view of the one or more cameras. In some embodiments, the visual property extends onto the recording region. In some embodiments, the visual property increases based on a distance from the recording region. Displaying a recording indicator that includes at least a first edge region that has a visual parameter that decreases through a plurality of different values helps create a visual effect that causes a user to perceive the recording region as being visually emphasized (e.g., the recording region appears brighter than the representation of the physical environment outside of the recording region) which causes a user to more easily view and focus on content that is within the recording region that will be captured as either a photo or video, which provides improved visual feedback and assists the user in properly and quickly framing and capturing content of interest, which is particularly relevant for transient events and improves the functionality of the computer system.

In some embodiments, while the extended reality camera user interface (e.g., the display of 1124, 1126 and/or 1102) is displayed, the computer system (e.g., 700) detects (e.g., via the one or more cameras that are in communication with the computer system and/or via one or more sensors that are coupled to the computer system) an input (e.g., 712a or 1150c) (e.g., an air gesture (e.g., an air pinch, air swipe, air de-pinch, and/or air tap), an input that corresponds to a hardware button that is in communication with the computer system, and/or a gaze directed towards the direction of a shutter virtual object that is displayed in the extended reality camera user interface) that corresponds to a request to capture media. In response to detecting the input that corresponds to a request to capture media, the computer system captures media that includes a representation of at least a portion of the physical environment that is within the recording region (e.g., the representation of the photo shown in 1126 at FIG. 11D) (e.g., capturing media via the one or more cameras that are in communication with the computer system). Capturing media in response to detecting an input that corresponds to a request to capture media causes the computer system to perform a media capture operation that includes capturing a representation of at least a portion of the physical environment that is within the recording region that is indicated by the recording indicator, which assists the user in properly and quickly framing and capturing content of interest, which is particularly relevant for transient events and improves the functionality of the computer system.

In some embodiments, the captured media is still media (e.g., a photograph or media that corresponds to a single point in time) (e.g., as described above in reference to FIG. 1113).

In some embodiments, the captured media is animated media (e.g., as described above in reference to FIG. 11B) (e.g., a video, or media that corresponds to a span of time, such as a sequence of images). In some embodiments, when the captured media is animated media, the request to capture media is detected over a duration of time that is greater than a predetermined threshold (e.g., a long press of a button, a touch-and-hold gesture that corresponds to the display a virtual shutter button, or a sustained air gesture (e.g., a pinch that is held).

In some embodiments, the captured media includes a representation of the field-of-view of the one or more cameras that is (e.g., portion of 704 that is within 1120) that is different than a representation of the physical environment that is within the recording region (e.g., portion of 704 that is within 1102) (e.g., as discussed above in relation to FIG. 1113) (e.g., the captured representation of the field-of-view of the one or more cameras includes less of the representation of the physical environment than the representation of the physical environment that is within the recording region or the captured representation of the field-of-view of the one or more cameras includes more of the representation of the physical environment than the representation of the physical environment that is within the recording region). In some embodiments, multimedia (e.g., photographs and/or videos) that is representative of the captured media does not include portions of the representation of the physical environment that is within the recording region (e.g., portions of the representation of the physical environment that are within the recording region are not visible in photos and/or videos)). Having a representation of the physical environment that includes content that is different than the content included in the recording region provides a user with the ability to view additional content that could be (but currently is not) included in the recording region, if the user shifts the positioning of the computer system, while also providing the user with greater awareness of their current physical environment, while the computer system performs a media capturing process. Doing so improves a media capture operation and reduces the risk of failing to capture a transient event and/or content that can be missed if the capture operation is inefficient or difficult to use. Improving media capture operations enhance the operability of the system and make the user-system interfaces more efficient (e.g., by helping the user to provide proper inputs and reducing user mistakes when operating/interacting with the device).

In some embodiments, the visual parameter is a tint gradient (e.g., grayscale gradient created by inner edge region 1102a and outer edge region 1102b) (or a tint density gradient) (e.g., a tint gradient that ranges from 100% tint (e.g., a solid color (e.g., a given color such as black, grey, blue, or red) to 0% tint (e.g., the absence of the given color and/or any color (e.g., substantially transparent)). Displaying a recording indicator with a tint gradient helps create a visual effect that causes a user to perceive the recording region as being visually emphasized (e.g., the recording region appears brighter than the representation of the physical environment outside of the recording region) which causes a user to more easily view and focus on content that is within the recording region that will be captured as either a photo or video, which provides improved visual feedback and assists the user in properly and quickly framing and capturing content of interest, which is particularly relevant for transient events and improves the functionality of the computer system.

In some embodiments, the recording indicator (e.g., 1102) includes a second edge region (e.g., 1102*b*) that is further from the center of the recording region (e.g., interior of 1102) than the first edge region (e.g., 1102*a*), and wherein the second edge region is larger (e.g., takes up more space on the display generation component of the computer system, is greater in length and/or thickness than the first edge region) than the first edge region. In some embodiments, the size of the second edge region is a function of the size of the first edge region. Displaying a second edge region (e.g., that is feathered) as larger than a first sharp edge region helps create a visual effect that causes a user to perceive the recording region as being visually emphasized (e.g., the recording region appears brighter than the representation of the physical environment outside of the recording region) which causes a user to more easily view and focus on content that is within the recording region that will be captured as either a photo or video, which provides improved visual feedback and assists the user in properly and quickly framing and capturing content of interest, which is particularly relevant for transient events and improves the functionality of the computer system.

In some embodiments, the one or more cameras that are in communication with the computer system (e.g., 700) have an optimal capture distance (e.g., an optimal distance between the one or more cameras and a subject such that depth data can be captured) (e.g., a distance at which one or more capture parameters such as lighting, focus, and/or sharpness are satisfactory for depth capture) for capturing depth data, and wherein the size and/or the shape of the recording indicator (e.g., 1102) assists (e.g., assist a user) in positioning the computer system at the optimal capture distance (e.g., as discussed above in relation to FIG. 11B) (e.g., the size (e.g., the height of the recording indicator and the width of the recording indicator) and the shape of the recording indicator are chosen (e.g., chosen by the manufacturer of the computer system) to encourage a user to position themselves at the requisite capture distance away from a subject that the user intends to capture via the one or more cameras) of the one or more cameras relative to one or more objects (e.g., detected objects and/or detected subjects) in the field-of-view of the one or more cameras. In some embodiments, the size and/or shape of the recording indicator is dynamically adjusted based on one or more objects identified in the FOV of the one or more cameras. In some embodiments, the optimal distance is a range of distances in which capture parameters are within a range of optimal and/or acceptable values. Displaying the recording indicator with a size and/or shape that is chosen in order to encourage placement of the computer system at the optimal capture distance provides the user with visual cue(s) with respect to where in the physical environment the computer system needs to be positioned such that a resulting photo and/or video includes satisfactory depth data, which provides improved visual feedback and assists the user in properly and quickly framing and capturing content of interest in an optimal manner, which is particularly relevant for transient events and improves the functionality of the computer system.

In some embodiments, the recording indicator (e.g., 1102) is displayed at a fixed simulated (e.g., virtual) depth (e.g., 1 foot, 3 feet, 5 feet, and/or 7 feet) within the representation of the physical environment (e.g., 704) (e.g., relative to the positioning of the computer system within the physical environment) (e.g., the recording indicator is superimposed over the representation of the physical environment at a position that corresponds to a fixed depth from the position of the computer system in the physical environment) (e.g., as the computer system is moved in the physical environment, the recording indicator maintains to be displayed at the fixed simulated depth). In some embodiments, the recording indicator is occluded by objects included in the representation of the physical environment when the objects are at a distance (e.g., real-world distance) from the computer system that is less than the fixed simulated depth. In some embodiments, the recording indicator occludes objects that are included in the representation of the physical environment when the object is at a distance (e.g., real-world distance) from the computer system that is less than the fixed simulated depth. Displaying the recording indicator at a fixed simulated depth within the representation of the physical environment provides the user with a visual cue such that the user can determine their positioning within the physical environment relative to other objects in the physical environment, which provides improved visual feedback and assists the user in properly and quickly framing and capturing content of interest, which is particularly relevant for transient events and improves the functionality of the computer system.

In some embodiments, the recording indicator (e.g., 1102) includes one or more corners (e.g., 1128 or 1130). In some embodiments, while the recording indicator is displayed and in accordance with a determination that a set of display criteria are satisfied (e.g., a subject within the recording indicator satisfies the set of display criteria), the computer system (e.g., 700) displays, via the display generation component (e.g., 702), a secondary recording indicator (e.g., 1116) (e.g., non-contiguous yellow corners) at (e.g., on) the one or more corners of the recording indicator. In some embodiments, in accordance with a determination that the set of display criteria are not satisfied, forgoing display of the secondary recording indicator. In some embodiments, the secondary recording indicator is displayed directly adjacent (e.g., on the inner radius or on the outer radius) to the one or more corners of the recording indicator. In some embodiments, the secondary recording indicator ceases to be displayed in accordance with a determination that the set of display criteria ceases to be satisfied. In some embodiments, the secondary recording indicator continuously spans around the entire perimeter of the recording indicator. In some embodiments, the secondary recording indicator is displayed around one or more subjects (e.g., one or more subjects that satisfy the set of display criteria) within the recording indicator and not the one or more corners of the secondary recording indicator. Displaying a secondary recording indicator when certain prescribed conditions are satisfied (e.g., in accordance with a determination that a set of display criteria are satisfied) provides the computer system with the ability to automatically perform a display operation that indicates to a user that conditions in the physical environment satisfy the set of display criteria, which performs an operation when a set of conditions has been met without requiring further user input.

In some embodiments, the recording indicator (e.g., 1102) is displayed in a first plane (e.g., a plane that is perpendicular to the field of view of the one or more cameras that are in communication with the computer system) (e.g., a plane within the representation of the physical environment), and wherein the secondary recording indicator is displayed in the first plane (e.g., as described above in reference to FIG. 11C) (e.g., both the recording indicator and the secondary recording indicator are displayed in a first plane that is at a simulated (e.g., virtual) depth (e.g., the simulated depth discussed above) within the representation of the physical environment). Displaying the recording indicator and the secondary recording indicator in the same plane allows a user to easily view both the recording indicator and the secondary recording indicator at the same time and provides the user with additional visual cues such that the user can determine their positioning within the physical environment relative to other objects in the physical environment, which provides improved visual feedback and assists the user in properly and quickly framing and capturing content of interest via depth capture, which is particularly relevant for transient events and improves the functionality of the computer system.

In some embodiments, displaying the secondary recording indicator (e.g., 1116) includes: in accordance with a determination that the physical environment (e.g., the physical environment that corresponds to the location of the computer system) (e.g., the physical environment that corresponds to the representation of the physical environment) has a first amount of brightness (e.g., ambient lighting conditions (e.g., 1 lux, 5 lux, or 10 lux)), displaying the secondary recording indicator with a first amount of visual prominence (e.g., contrast) (e.g., a degree of which the secondary recording indicator visually contrasts with the recording indicator) relative to the recording indicator (e.g., 1102) and in accordance with a determination that the physical environment has as second amount of brightness, that is less than the first amount of brightness, displaying the secondary recording indicator with a second amount of visual prominence relative to the recording indicator, wherein the second amount of visual prominence is greater than the first amount of visual prominence (e.g., as described in reference to FIG. 11D). In some embodiments, the visual appearance of secondary recording indicator dynamically changes as the brightness of the physical environment changes while the visual appearance of the recording indicator remains static (e.g., the visual appearance of the secondary recording indicator becomes larger and/or brighter in response to the brightness of the physical environment dimming). In some embodiments, the visual appearance of the recording indicator dynamically changes as the brightness of the physical environment changes while the visual appearance of the secondary recording indicator remains static (e.g., the visual appearance of the recording indicator becomes smaller and/or dimmer in response to the brightness of the physical environment diming). Displaying the secondary recording indicator with a second amount of visual prominence (e.g., as brighter) when certain prescribed conditions are satisfied (e.g., there is a low amount of light in a physical environment) allows the computer system to automatically perform a display operation that allows a user to easily view the secondary recording indicator in environments that contain low amounts of light, which performs an operation when a set of conditions has been met without requiring further user input.

In some embodiments, the set of display criteria includes a criterion that is satisfied when conditions (e.g., distance between the subject and the computer system and/or lighting of the environment that the computer system is located in) of one or more subjects (e.g., 709a, 709b, and/or 709c1), (e.g., person, object, and/or scene that a user intends to capture using the one or more cameras that are in communication with the computer system) are appropriate for depth capture (e.g., as described above in reference to FIG. 11C) e.g., a process of capturing media from two or more different cameras (or sets of cameras) that results in a stereoscopic media item). In some embodiments, conditions are appropriate for depth capture when the distance between the computer system and the subject is greater than a first threshold and/or less than a second threshold and/or the amount of light (e.g., natural light and/or ambient light in the physical environment) is greater than a third threshold and/or less than a fourth threshold Displaying the secondary recording indicator when conditions of one or more subjects are appropriate for depth capture provides the user with visual feedback regarding whether a resulting multimedia item will include a representation of captured depth data, which provides improved visual feedback, performs an operation when a set of conditions has been met without requiring further user input, and assists the user in properly and quickly framing and capturing content of interest via depth capture, which is particularly relevant for transient events and improves the functionality of the computer system.

In some embodiments, while the secondary recording indicator (e.g., 1116) is displayed with a first visual appearance (e.g., the visual appearance of secondary recording indicator at FIG. 11C or FIG. 11D) (e.g., a first color and/or a first amount of opacity) that indicates that current conditions (e.g., distance between the computer system and a subject and/or lighting (e.g., ambient lighting and/or artificial lighting)) are not appropriate for depth capture (e.g., a process of capturing media from two or more different cameras (or sets of cameras) that results in a stereoscopic media item), the computer system (e.g., 700) displays the recording indicator around a representation of a second subject (e.g., 709a, 709b, and/or 709c1) (e.g., person, object, and/or scene that a user intends to capture using the one or more cameras that are in communication with the computer system) and in accordance with a determination (e.g., made by one or more sensors that are in communication (e.g., wired or wireless communication) with the computer system) that a set of one or more depth capture criteria are met (e.g., the distance between the second subject and the computer system is within a predetermined threshold, the lighting of the physical environment is above a predetermined brightness threshold), the computer system changes the visual appearance (e.g., changing the color of the secondary recording indicator, changing the size of the secondary recording indicator, changing the opacity of the second recording indicator, and/or changing the location of the display of the secondary recording) of the secondary recording indicator from the first visual appearance to a second visual (e.g., the visual appearance of secondary recording at FIG. 11C or FIG. 11D) appearance that indicates that the current conditions are appropriate for depth capture (e.g., as discussed above in reference to FIG. 11D). In some embodiments, the current conditions are not appropriate for depth capture when depth capture cannot occur under the current conditions. In some embodiments, the current conditions are not appropriate for depth capture when capture is possible, but at a non-optimal or non-ideal level (e.g., level of quality)) In some embodiments, in accordance with a determination that the set of one or more depth capture criteria are not met, the first visual appearance of the secondary recording indicator is maintained. In some embodiments, in accordance with a determination that the set of one or more depth capture criteria are not met, the secondary recording indication ceases to be displayed. Displaying the recording indicator with the second appearance when the set of one or more depth capture are met provides the user with visual feedback with respect to whether the conditions in the physical environment are suitable for depth capture, which provides improved visual feedback and assists the user in properly and quickly framing and capturing content of interest via depth capture, which is particularly relevant for transient events and improves the functionality of the computer system. Displaying the recording indicator when certain prescribed conditions are met (e.g., in accordance with a determination that the set of depth capture criteria is met) automatically provides the computer system with the ability to automatically perform a display operation that indicates to a user that conditions in the physical environment are appropriate for depth capture, which performs an operation when a set of conditions has been met without requiring further user input.

In some embodiments, before displaying the extended reality camera user interface (e.g., the display of 1102, 1124, and/or 1126), the computer system (e.g., 700) detects (e.g., via the one or more cameras that are in communication with the computer system and/or one or more sensors that are in communication with the computer system) an input (e.g., an air gesture (e.g., an air pinch, air swipe, air de-pinch, and/or air tap), tactile input (e.g., an input that corresponds to the selection of a hardware button that is coupled to the computer system, or an input on a camera application launch icon) that corresponds to a request to display the extended reality camera user interface and in response to detecting the input that corresponds to the request to display the extended reality camera user interface, the computer system displays the extended reality camera user interface, wherein displaying the extended reality camera user interface includes displaying an animation of the recording indicator fading in (e.g., as discussed above in relation to FIG. 11B) (e.g., the appearance of the recording indicator progressively changes (e.g., becomes more prominent) over a predetermined period of time). In some embodiments, in response to detecting an input that corresponds to a request to cease to display the extended reality camera user interface, the recording indicator fades outs. In some embodiments, the representation of the physical environment is displayed while the recording indicator fades in. In some embodiments, the recording indicator fades in before the representation of the physical environment is displayed. In some embodiments, the recording indicator fades in while the representation of the physical environment fades in. Displaying the recording indicator as fading in provides the user with visual feedback about the state of the computer system (e.g., the computer system has detected the request to display the extended reality camera user interface), which provides improved visual feedback and assists the user in properly and quickly framing and capturing content of interest, which is particularly relevant for transient events and improves the functionality of the computer system.

In some embodiments, the representation of the physical environment (e.g., 704) includes a third portion (e.g., portion of 704 that is not surrounded by recording indicator 1102 at FIGS. 11B-11C) that surrounds the recording indicator (e.g., 1102) (e.g., and is not surrounded by the recording indicator), and wherein the third portion of the representation of the physical environment and the recording region (e.g., the interior of recording indicator 1102), optionally, have substantially the same amount of brightness modification due to displayed user interface elements (e.g., as described above in reference to FIG. 11B) (e.g., optionally having the same amount of brightness modification or having less than a threshold amount of difference in brightness modification where the threshold is less than 5%, 4%, 3%, 2%, or 1% of the total brightness range) (e.g., an average amount of brightness: a same amount of ambient brightness; the third portion of the representation of the physical environment and the recording region have the same amount of brightness but a user perceives the recording region as being brighter than the third portion of the representation of the physical environment). In some embodiments, the third portion of the representation of the physical environment and the recording region are, optionally, displayed with the same amount of brightness). In some embodiments, the computer system does not differentially modify the amount of brightness of the third portion as compared to the amount of brightness of the recording region. Displaying the third portion of the representation of the physical environment and the recording region with the same amount of brightness allows a user to easily ascertain which content in the physical environment is within the recording region and will be captured as part of a medica capturing process and which content in the physical environment is not within the recording region and will not be captured as part of the media capturing process, which provides improved visual feedback and assists the user in properly and quickly framing and capturing content of interest via depth capture, which is particularly relevant for transient events and improves the functionality of the computer system.

In some embodiments, the recording indicator (e.g., 1102) has a third edge region (e.g., 1102*b*) (e.g., the first edge region is closer to the center of the recording indicator than the third edge region), and wherein the first edge region (e.g., 1102*a*) is darker (e.g., the color of the first edge region is darker than the color of the third edge region) (e.g., the first edge region and the third edge region are displayed with the same brightness) than the third edge region (e.g., as described above in reference to FIG. 11B). In some embodiments, the visual parameter is a level of darkness. Displaying the third edge region as darker than the first edge region helps create a visual effect that causes a user to perceive the recording region as being visually emphasized (e.g., the recording region appears brighter than the representation of the physical environment outside of the recording region) which causes a user to more easily view and focus on content that is within the recording region that will be captured as either a photo or video, which provides improved visual feedback and assists the user in properly and quickly framing and capturing content of interest, which is particularly relevant for transient events and improves the functionality of the computer system.

In some embodiments, the recording indicator (e.g., 1102) has a fourth edge region (e.g., 1102*b*) (e.g., the first edge region is closer to the center of the recording indicator than the fourth edge region), and wherein the fourth edge region is darker (e.g., the color of the fourth edge region is darker than the color of the first edge region) (e.g., the fourth edge region and the first edge region are displayed with the same brightness) than the first edge region (e.g., 1102*a*) (e.g., as described above in reference to FIG. 11B). In some embodiments, the visual parameter is a grayscale (e.g., a grayscale with color values ranging from 0 to 255 with 0 corresponds to black and 255 corresponds to a white). Displaying the fourth edge region as darker than the first edge region helps create a visual effect that causes a user to perceive that a portion of the extended reality camera user interface (e.g., the recording region or the portion of the extended reality user interface that surrounds the recording indicator) appears brighter (e.g., the recording region appears brighter than the representation of the physical environment outside of the recording indicator or the representation of the physical environment that surrounds the recording indicator appears brighter) which allows a user to easily view and focus on content in a certain portion of the extended reality camera user interface, which provides improved visual feedback and assists the user in properly and quickly framing and capturing content of interest, which is particularly relevant for transient events and improves the functionality of the computer system.

In some embodiments, the computer system (e.g., 700) displays, within the recording indicator (e.g., 1102), a capture virtual object (e.g., 1124) that, when selected, (e.g., selected via detection of a gaze (e.g., a gaze-and-dwell) of a user directed to the capture virtual object and, in some embodiments, in combination with a detection of the user performing one or more gestures (e.g., pinch gesture, de-pinch gesture, air tap, and/or air swipe) and/or selected via detection of a tap directed at a point in space that corresponds to the display of the capture virtual object), causes the initiation of a process for capturing media (e.g., as described above in reference to FIG. 11D) (e.g., causes the computer system to initiate a process for capturing media) (e.g., still media or video media) (e.g., capturing media using the one or more cameras that are in communication with the computer system). In some embodiments, the appearance of the capture virtual object changes in response to the capture virtual object being selected. Displaying the capture affordance within the recording indicator allows the user to easily view and access the capture affordance while viewing content that will be captured, via a process for capturing media, upon selection of the capture affordance, which provides improved visual feedback and assists the user in properly and quickly framing and capturing content of interest, which is particularly relevant for transient events and improves the functionality of the computer system.

In some embodiments, the computer system (e.g., 700) displays, within the recording indicator (e.g., 1102), a camera roll virtual object (e.g., 1126), that, when selected (e.g., selected via detection of a gaze (e.g., a gaze-and-dwell) of a user directed to the display of the camera roll virtual object and, in some embodiments, in combination with a detection of the user performing one or more gestures (e.g., pinch gesture, de-pinch gesture, air tap, air swipe, and/or an input on a hardware input device such as a touch-sensitive surface or activation of a button or rotatable input mechanism) and/or selected via detection of a tap at a point in space that corresponds to the display of on the camera roll virtual object), causes the initiation of a process for displaying (e.g., via the display generation component) previously captured media (e.g., as described above in reference to FIG. 11B) (e.g., causes the computer system to display previously captured media item) (e.g., still media or video media) (e.g., a media item that was previously captured using the one or more cameras that are in communication with the computer system) (e.g., media items that were previously captured using an external device (e.g., smartphone) (e.g., a device that is separate from the computer system)). In some embodiments, selection of the camera roll virtual object ceases the display of the extended reality camera user interface. Displaying the camera roll virtual object within the recording indicator allows the user to easily view and access the camera roll virtual object while viewing content that will be captured as part of a process for capturing media, which provides improved visual feedback and assists the user in properly and quickly framing and capturing content of interest, which is particularly relevant for transient events and improves the functionality of the computer system.

In some embodiments, the recording indicator (e.g., 1102) includes one or more rounded corners (e.g., 1128 or 1130) (e.g., the radiuses of each of the rounded corners of the recording indicator are the same).

In some embodiments, while the recording indicator (e.g., 1102) is displayed as surrounding a fourth portion of the representation of the physical environment (e.g., portion of 704 that is within 1102 at FIG. 11B) (e.g., the fourth portion of the representation of the physical environment is less than the entirety of the representation of the physical environment) (e.g., the fourth portion of the representation of the physical environment is surrounded by the recording indicator), the computer system (e.g., 700) detects (e.g., via one or more sensors that are in communication (e.g., wired communication or wireless communication) with the computer system) a change in a pose of the one or more cameras (e.g., the change in the pose of the one or more cameras corresponds to a change in the field of view of the user (e.g., the user of the computer system)) (e.g., the movement of computer system between FIGS. 11B and 11C). In response to detecting the change in the pose of the one or more cameras the computer system displays the recording indicator around a fifth portion of the representation of the physical environment without displaying the recording indicator around the fourth portion of the representation of the physical environment (e.g., portion of 704 that is within 1102 at FIG. 11C) (e.g., ceasing the display of the recording indicator around the fourth portion of the representation of the physical environment) (e.g., the fourth portion of the representation of the physical environment remains visible to the user) (e.g., the computer system maintains the display of the recording indicator) (e.g., as the one or more cameras are moved within the physical environment, the portion of the physical environment that is within the recording indicator changes) (e.g., the fifth portion of the representation of the physical environment is different from the fourth portion of the representation of the physical environment). In some embodiments, there is an overlap in the content included in the fourth portion of the representation of the physical environment and the fifth portion of the representation of the physical environment. In some embodiments, there is no overlap in the content included in the fourth portion of the representation of the physical environment and the fifth portion of the representation of the physical environment. In some embodiments, the fourth portion of the representation of the physical environment ceases to be visible to user in response to detecting the change in the pose of the one or more cameras. In some embodiments, the computer system displays the recording indicator around the fifth portion of the representation of the physical environment without displaying the recording indicator around the fourth portion of the representation of the physical environment in response to detecting (e.g., via one or more sensors coupled to the computer system and/or the one or more cameras that are in communication with the computer system) a gradual shift of the viewpoint of the user (e.g., the shift of the viewpoint of the user corresponds to the change in pose of the one or more cameras). In some embodiments, the computer system displays the recording indicator around the fifth portion of the representation of the physical environment without displaying the recording indicator around the fourth portion of the representation of the physical environment in response to detecting (e.g., via the one or more cameras that are in communication with the computer system) a gradual change in the content in the physical environment (e.g., the content in the physical environment is shifting while the computer system is stationary). Ceasing to display the recording indicator around a fourth portion of the representation of the physical environment and displaying the recording indicator around a fifth portion of the representation of the physical environment in response to detecting a change in the pose of the one more cameras provides the user with the ability to control what portion of the physical environment will be captured via a media capturing process without displaying additional controls, which provides additional control options without cluttering the user interface.

In some embodiments, aspects/operations of methods 800, 900, 1000, 1200, 1400 and 1500 may be interchanged, substituted, and/or added between these methods. For example, the manner in which the preview of the field-of-view of the one or more cameras is shifted in response to detecting a change of pose of the viewpoint of the user (e.g., as described in method 900) may be applied to the recording indicator of method 1200. For brevity, these details are not repeated here.

FIGS. 13A-13J illustrate examples of displaying a camera user interface. FIG. 14 is a flow diagram of an exemplary method 1400 for displaying information related to capturing media. FIGS. 15A-15B are flow diagrams of an exemplary method 1500 for changing the appearance of a viewfinder. The user interfaces in FIGS. 13A-13J are used to illustrate the processes described below, including the processes in FIG. 14 and FIGS. 15A-15B.

Figure 13A:
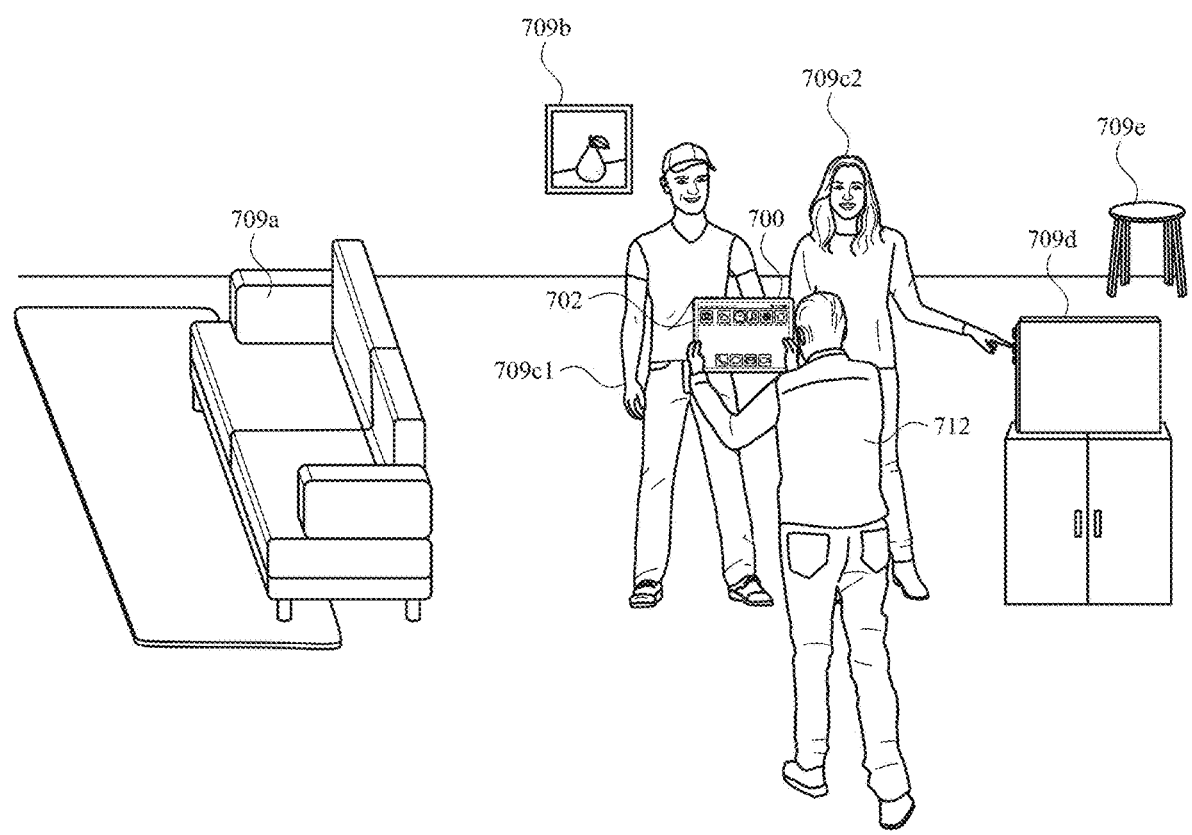

FIG. 13A illustrates user 712 holding computer system 700 that includes display 702 in a physical environment. The above description of computer system 700 (e.g., as described above in relation to FIGS. 7A-7Q and 11A-11D) applies to computer system 700 that is depicted in FIGS. 13A-13J. The physical environment includes couch 709a, picture 709b, first individual 709c1, second individual 709c2, television 709d, and chair 709e. In the embodiment of FIGS. 13A-13J, the point of view of computer system 700 corresponds to the field-of-view of one or more cameras that are in communication (e.g., wired communication or wireless communication) with computer system 700 (e.g., cameras on the backside of computer system 700). Accordingly, as computer system 700 is moved throughout the physical environment, the point of view of computer system 700 changes which causes field-of-view of the one or more cameras to change. Though FIG. 13A depicts computer system 700 as a tablet, the techniques described blow are applicable to head-mounted devices. In some embodiments, where computer system 700 is a head-mounted device, computer system 700 optionally includes two displays (one for each eye of the user of computer system 700), with each display displaying various content. When computer system 700 is a head-mounted device, the appearance of representation of physical environment 1306 (e.g., as discussed in greater detail below) changes based on changes to the viewpoint of the user (e.g., the user rotates their head and/or the user repositions themselves within the physical environment). Further, when computer system 700 is a head-mounted device, the content that is within viewfinder 1318 (e.g., as discussed in greater detail below) changes based on changes to the viewpoint of the user (e.g., the user rotates their head and/or the user repositions themselves within the physical environment).

Figure 13B:
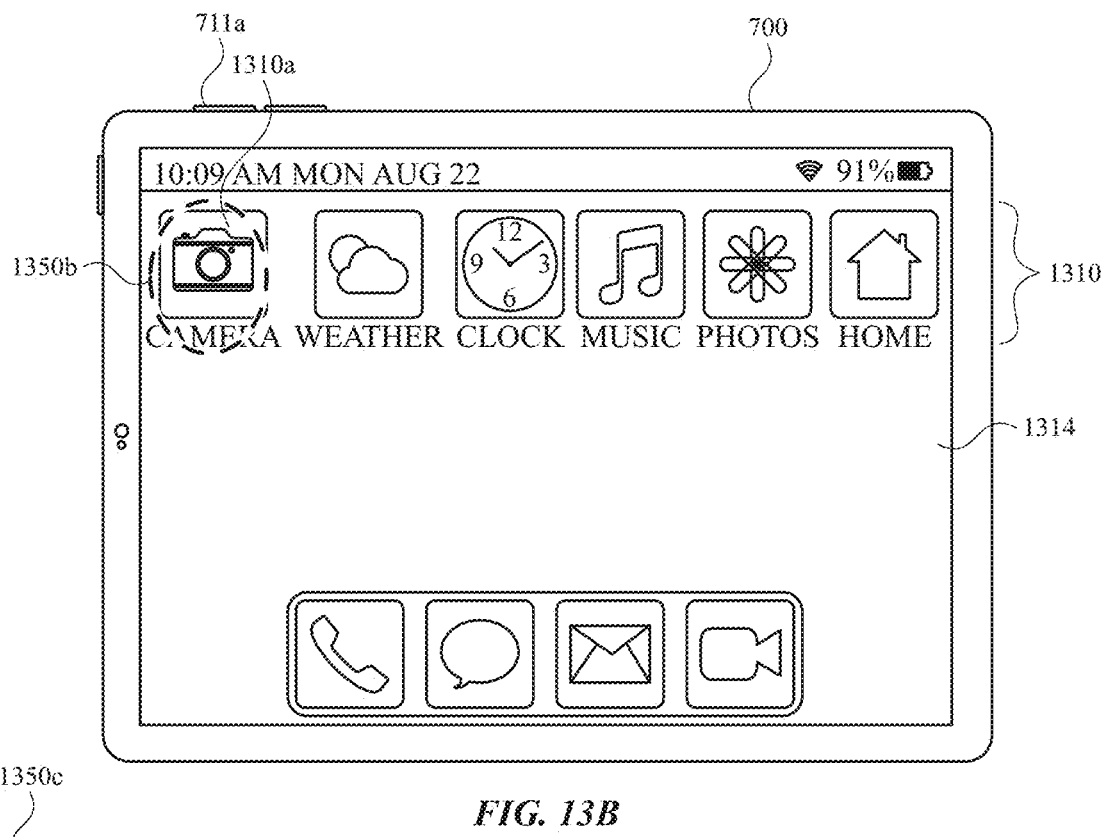

At FIGS. 13B-13J, computer system 700 is shown in an enlarged view to better illustrate the content that is visible on display 702. As illustrated in FIG. 13B, computer system 700 displays home screen user interface 1314. Home screen user interface 1314 includes plurality of virtual objects 1310. Each virtual object in plurality of virtual objects 1310 corresponds to a respective application that is installed on computer system 700. Computer system 700 launches a corresponding application in response to detecting selection of a respective virtual object in plurality of virtual objects 1310.

Camera application virtual object 1310a corresponds to a camera application that is installed on computer system 700. As illustrated in FIG. 13B, computer system 700 includes hardware button 711a. Hardware button 711a is activated in response to computer system 700 detecting that hardware button 711a is depressed. At FIG. 13B, computer system 700 detects input 1350b (e.g., a tap) that corresponds to selection of camera application virtual object 1310a. In some embodiments, input 1350b corresponds to an air gesture (e.g., an air tap, air pinch, air de-pinch, and/or air swipe) that is detected (e.g., via one or more cameras that are in communication with computer system 700) at a point in space that corresponds to the display of camera application virtual object 1310a. In some embodiments, input 1350b corresponds to the detection (e.g., by the one or more cameras of computer system 700) of a sustained gaze of the user in the direction of the display of camera application virtual object 1310a. In some embodiments, hardware button 711a is not visible to a user while the user is operating computer system 700 (e.g., hardware button 711a is not within the user's field of view when computer system 700 is an HMD). In some embodiments, hardware button 711a is a rotatable button. In some embodiments, hardware button 711a is activated in response to computer system 700 detecting that hardware button 711a is rotated. In some embodiments, hardware button 711a is activated in response to computer system 700 detecting that hardware button 711a is depressed and rotated.

Figure 13C:
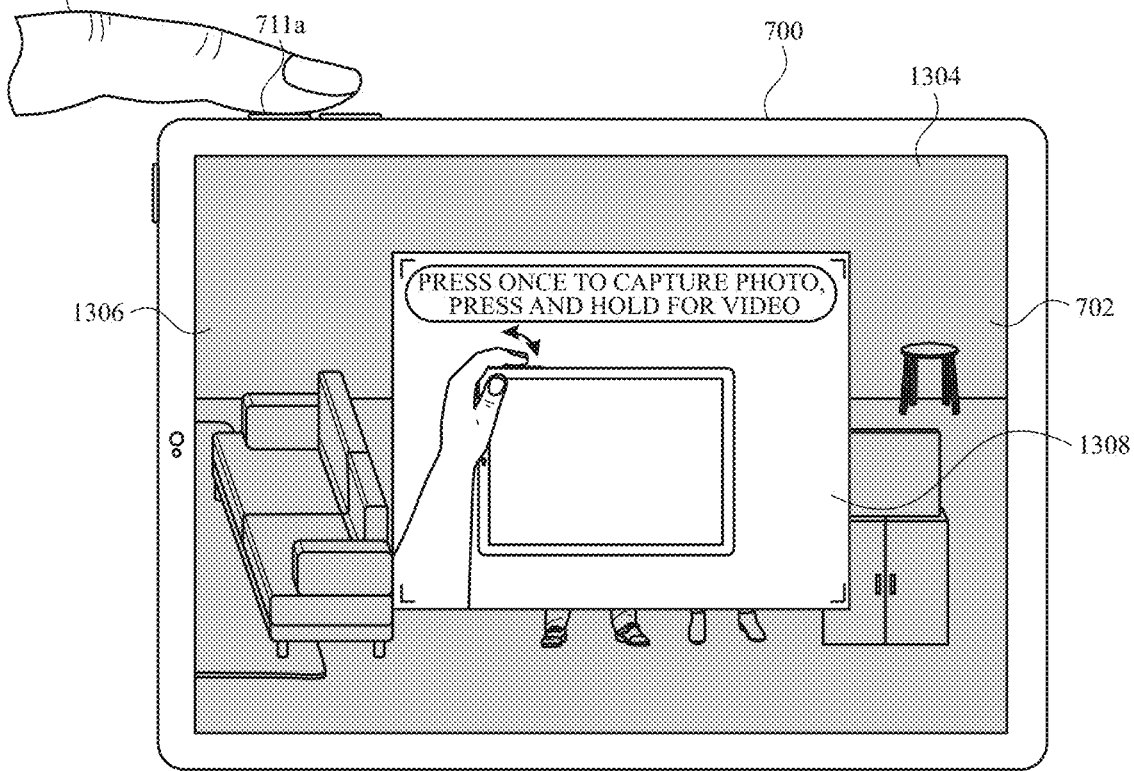

At FIG. 13C, in response to detecting input 1350b, computer system 700 displays camera user interface 1304. Camera user interface 1304 corresponds to a camera application that is installed on computer system 700. As illustrated in FIG. 13C, camera user interface 1304 includes representation of physical environment 1306. Representation of physical environment 1306 corresponds to the field-of-view of the one or more cameras that are in communication (e.g., wired communication and/or wireless communication) with computer system 700. Accordingly, the content that is included in representation of physical environment 1306 changes based on a change of the field-of-view of the one or more cameras. When a user looks at display 702, the user can see representation of physical environment 1106 along with one or more virtual objects that computer system 700 displays (e.g., as shown in FIGS. 13C-13F and 13H-13J). Thus, computer system 700 presents an augmented reality environment through display 702.

At FIG. 13C, computer system 700 makes a determination that camera user interface 1304 is displayed for the first time since computer system 700 was initially powered on (e.g., computer system 700 displays camera user interface 1304 for the first time during the life of computer system 700 at FIG. 13C). Because computer system 700 makes a determination that camera user interface 1304 is displayed for the first time, computer system 700 displays tutorial 1308 within camera user interface 1304. Tutorial 1308 includes a graphical representation of computer system 700, a graphical representation of hardware button 711a, and instructions regarding how to capture a video and/or a photo using computer system 700.

Tutorial 1308 is a video (e.g., a looping video (e.g., computer system 700 displays playback of tutorial 1308 in a repeating pattern)) that depicts a representation of a finger of a user performing an input on the representation of hardware button 711a. The instructions included in tutorial 1308 indicate that computer system 700 will capture a photo in response to detecting a tap input on hardware button 711a and that computer system 700 will capture a video in response to detecting a press and hold input on hardware button 711a. In some embodiments, computer system 700 displays tutorial 1308 within a user interface that corresponds to a different application that is installed on computer system 700 (e.g., a media playback application, an email application, and/or a text messaging application) when computer system 700 launches the application for the first time. In some embodiments, tutorial 1308 includes instructions regarding how to use other functionalities of computer system 700 (e.g., how to playback media on computer system 700, how to control the playback of media on computer system 700, and/or how to navigate an internet browser on computer system 700).

As illustrated in FIG. 13C, while computer system 700 displays tutorial 1308 in camera user interface 1304, computer system 700 displays representation of physical environment 1306 with a reduction in brightness (e.g., in comparison to the brightness that computer system 700 displays tutorial 1308 at). Further, as illustrated in FIG. 13C, while computer system 700 displays tutorial 1308 in camera user interface 1304, computer system 700 displays tutorial 1308 as overlaid on top of representation of physical environment 1306 such that a portion of representation of physical environment 1306 is note visible.

At FIG. 13C, computer system 700 detects input 1350c that corresponds to the activation of hardware button 711a. In some embodiments, input 1350c corresponds to a press and hold of hardware button 711a (e.g., computer system 700 detects that hardware button 711a is depressed for greater than a predetermined amount of time). In some embodiments, input 1350c corresponds to a tap of hardware button 711a (e.g., computer system 700 detects that hardware button 711a is depressed for less than a predetermined amount of time). In some embodiments, input 1350c corresponds to a rotation of hardware button 711a. In some embodiments, computer system 700 displays tutorial 1308 with a degree of translucency such that the display of tutorial 1308 does not obscure the appearance of representation of physical environment 1306.

At FIG. 13D, in response to detecting input 1350c, computer system 700 ceases to display tutorial 1308. That is, computer system 700 ceases to display tutorial 1308 in response to detecting an input (e.g., an activation of hardware button 711a) that is depicted by tutorial 1308. As illustrated in FIG. 13D, computer system 700 maintains the display of camera user interface 1304 even though tutorial 1308 is not displayed. Further, as illustrated in FIG. 13D, computer system 700 displays viewfinder 1318 within camera user interface 1304 as a part of ceasing the display of tutorial 1308.

As illustrated in FIG. 13D, computer system 700 displays reticle virtual object 1320 at each corner of viewfinder 1318. Reticle virtual object 1320 indicates the capture region of the one or more cameras that are in communication with computer system 700. Content from representation of physical environment 1306 that is within reticle virtual object 1320 while computer system 700 performs a media capturing operation (e.g., computer system 700 captures a photo and/or a video) is visible in the resulting media item. Additionally, as illustrated in FIG. 13D, computer system 700 displays exit virtual object 1316. Computer system 700 ceases to display camera user interface 1304 in response to computer system 700 detecting an input that corresponds to selection of exit virtual object 1316. In some embodiments, reticle virtual object 1320 indicates a boundary of viewfinder 1318. In some embodiments, viewfinder 1318 indicates the capture region of the one or more cameras that are in communication with computer system 700. In some embodiments, computer system 700 captures content that is outside of viewfinder 1318 and/or reticle virtual object 1320 as a part of performing a media capture operation. In some embodiments, reticle virtual object 1320 is a contiguous line around the periphery of viewfinder 1318.

Of note, at FIG. 13D, computer system 700 does not display a virtual object within viewfinder 1318 that, when selected, causes the computer system 700 to perform a media capture operation. Rather, as explained in greater detail below, computer system 700 performs a media capture operation in response to detecting activation of a hardware button that is coupled to computer system 700. At FIG. 13D, computer system detects input 1350d that corresponds to a tap of hardware button 711a. Input 1350d corresponds to a request to capture a photograph. In some embodiments, computer system 700 displays a plurality of camera mode virtual objects outside of the display of viewfinder 1318 (e.g., each virtual object in the plurality of camera mode virtual objects, when selected, causes the one or more cameras that are in communication with computer system 700 to be configured to capture a respective type of media item (e.g., a slow motion video, a panoramic photo, and/or a portrait style photo)). In some embodiments, computer system 700 displays exit virtual object 1316 outside of viewfinder 1318. In some embodiments, computer system 700 displays tutorial 1308 within/overlaid on top of the display of viewfinder 1318. In some embodiments, when an accessibility setting of computer system 700 is enabled, computer system 700 displays a shutter button virtual object within viewfinder 1318 that, when selected, causes computer system 700 to initiate a process to capture a media item (e.g., a photo or a video).

FIGS. 13E1-13E5 depict various exemplary embodiments of how computer system 700 responds to detecting input 1350d (e.g., how computer system 700 changes the appearance of reticle virtual object 1320 and/or representation of physical environment 1306 in response to detecting the input 1350d). As explained in greater detail below, in each of the exemplary embodiments that are depicted in FIGS. 13E1-13E5, computer system 700 changes at least one optical property (e.g., the brightness, contrast, translucency and/or size) of representation of physical environment 1306 that is within viewfinder 1318 in response to detecting input 1350d. In some embodiments, computer system 700 changes two or more optical properties of representation of physical environment 1306 that is within viewfinder 1317 in response to detecting input 1350d.

FIG. 13E1 illustrates a first exemplary embodiment, in which, computer system 700 makes a determination that input 1350d corresponds to a tap input on hardware button 711a (e.g., hardware button 711a is depressed for less than a predetermined amount of time (e.g., 0.1, 0.3, 0.5, 7 seconds). At FIG. 13E1, because computer system 700 makes a determination that input 1350d corresponds to a tap input on hardware button 711a, computer system 700 performs a photo capture operation. At FIG. 13E1, as a part of performing the photo capture operation, computer system 700 darkens the majority of representation of the physical environment 1306 (e.g., more than 80%) that is within viewfinder 1318. That is, at FIG. 13E1, computer system 700 uniformly changes the appearance of representation of physical environment 1306 that is positioned at a location within viewfinder 1318 that is greater than a distance threshold from an edge of viewfinder 1318. At FIG. 13E1, computer system 700 does not modify the appearance of representation of physical environment 1306 that is within the threshold distance from a respective edge of viewfinder 1318.

Additionally, at FIG. 13E1, as part of performing the photo capture operation, computer system 700 ceases the display of exit virtual object 1316. In some embodiments, as a part of performing the photo capture operation, computer system 700 also darkens the portion representation of physical environment 1306 that is not within viewfinder 1318. In some embodiments, computer system 700 darkens the portion of representation of physical environment 1306 that is within viewfinder 1318 more than the portion of representation of physical environment 1306 that is not within viewfinder 1318 or vice versa.

FIG. 13E2 illustrates a second exemplary embodiment, in which, computer system 700 makes a determination that input 1350d corresponds to a tap input on hardware button 711a. At FIG. 13E2, because computer system 700 makes a determination that input 1350d corresponds to a tap input on hardware button 711a, computer system 700 performs a photo capture operation. At FIG. 13E2, as a part of performing the photo capture operation, computer system 700 darkens all of representation of physical environment 1306 that is within viewfinder 1318. At FIG. 13E2, all of representation of physical environment 1306 within viewfinder 1318 is changed uniformly. At FIG. 13E2, computer system 700 darkens the portion of representation of physical environment 1306 that is outside of viewfinder 1318. As illustrated in FIG. 13E2, computer system 700 darkens the portion of representation of physical environment 1306 that is within viewfinder 1318 more than the portion of representation of physical environment 1306 that is outside of viewfinder 1318. As illustrated in FIG. 13E2, computer system 700 displays reticle virtual object 1320 with a white color (e.g., in contrast to the black color that computer system 700 displays reticle virtual object 1320 with at FIG. 13D). At FIG. 13E2, computer system 700 changes the color of reticle virtual object 1320 (e.g., in comparison to the appearance of reticle virtual object 1320 at FIG. 13D) as part of performing the photo capture operation. In some embodiments, computer system 700 changes the appearance of reticle virtual object 1320 relative to representation of physical environment 1306 that is within viewfinder 1318. In some embodiments, as a part of performing the photo capture operation, computer system 700 changes the appearance of one or more corners of viewfinder 1318 and/or one or more corners of reticle virtual object 1320 differently than how computer system 700 changes the appearance of one or more edges of viewfinder 1318 and/or one or more edges of reticle virtual object 1320.

FIG. 13E3 illustrates a third exemplary embodiment, in which, computer system 700 makes a determination that input 1350d corresponds to a tap input on hardware button 711a (e.g., hardware button 711a is depressed for shorter than a predetermined amount of time). At FIG. 13E3, because computer system 700 makes a determination that input 1350d corresponds to a tap input on hardware button 711a, computer system 700 performs a photo capture operation. At FIG. 13E3, as a part of performing the photo capture operation, computer system 700 darkens a portion of representation of physical environment 1306 that is within viewfinder 1318 and is a threshold distance from a respective edge of viewfinder 1318. That is, at FIG. 13E3, computer system 700 uniformly changes the appearance of representation of physical environment 1306 that is positioned at a location within viewfinder 1318 and within a distance threshold of an edge of viewfinder 1318. At FIG. 13E3, computer system 700 does not change the appearance of representation of physical environment 1306 that is within viewfinder 1318 and is located at a distance from a respective edge of viewfinder 1318 that is greater than the threshold distance.

At FIG. 13E3, computer system 700 darkens the portion of representation of physical environment 1306 that is outside of viewfinder 1318. As illustrated in FIG. 13E3, computer system 700 darkens the portion of representation of physical environment 1306 that is within viewfinder 1318 and is a threshold distance from a respective edge of viewfinder 1318 such that it is darker than the portion of representation of physical environment 1306 that is outside of viewfinder 1318. Additionally, at FIG. 13E3, as part of performing the photo capture operation, computer system 700 displays reticle virtual object 1320 with an increased thickness (e.g., in comparison to the thickness of reticle virtual object 1320 at FIG. 13D) and ceases to display exit virtual object 1316.

FIG. 13E4 illustrates a fourth exemplary embodiment, in which, computer system 700 makes a determination that input 1350d corresponds to a tap input on hardware button 711a. At FIG. 13E4, because computer system 700 makes a determination that input 1350d corresponds to a tap input on hardware button 711a, computer system 700 performs a photo capture operation. At FIG. 13E4, as a part of performing the photo capture operation, computer system 700 darkens the entirety of representation of physical environment 1306 that is within viewfinder 1318. At FIG. 13E4, the appearance of the portion of representation of physical environment 1306 that is not within viewfinder 1318 is not modified. Further, at FIG. 13E4, as a part of performing the photo capture operation, computer system 700 ceases to display reticle virtual object 1320 and exit virtual object 1316 within viewfinder 1318. As illustrated in FIG. 13E4, computer system 700 displays representation of physical environment 1306 that is within viewfinder 1318 as darker than representation of physical environment 1306 that is outside of viewfinder 1318. In some embodiments, as part of performing the photo capture operation, computer system 700 darkens the portion of representation of physical environment 1306 that is outside of viewfinder 1318. In some embodiments, computer system 700 darkens portion of representation of physical environment 1306 that is within viewfinder 1318 more than the portion of representation of physical environment 1306 that is not within viewfinder 1318 or vice versa.

FIG. 13E5 illustrates a fifth exemplary embodiment, in which, computer system 700 makes a determination that input 1350d corresponds to a tap input on hardware button 711a. At FIG. 13E5, because computer system 700 makes a determination that input 1350d corresponds to a tap input on hardware button 711a, computer system 700 performs a photo capture operation. At FIG. 13E5, as a part of performing the photo capture operation, computer system 700 darkens the display of reticle virtual objects 1320. At FIG. 13E5, computer system 700 does not modify the appearance of representation of physical environment 1306 that is within viewfinder 1318 or outside viewfinder 1318.

It should be noted that the behavior of computer system 700 shown in the exemplary embodiments of FIGS. 13E1-13E5 can be combined. For example, in response to detecting input 1350*d*, computer system 700 can change the appearance of reticle virtual object 1320, as shown in FIG. 13E2, and computer system 700 can change the appearance of the portion of representation of physical environment 1306 as shown in FIGS. 13E1 and/or 13E3.

Figure 13F:
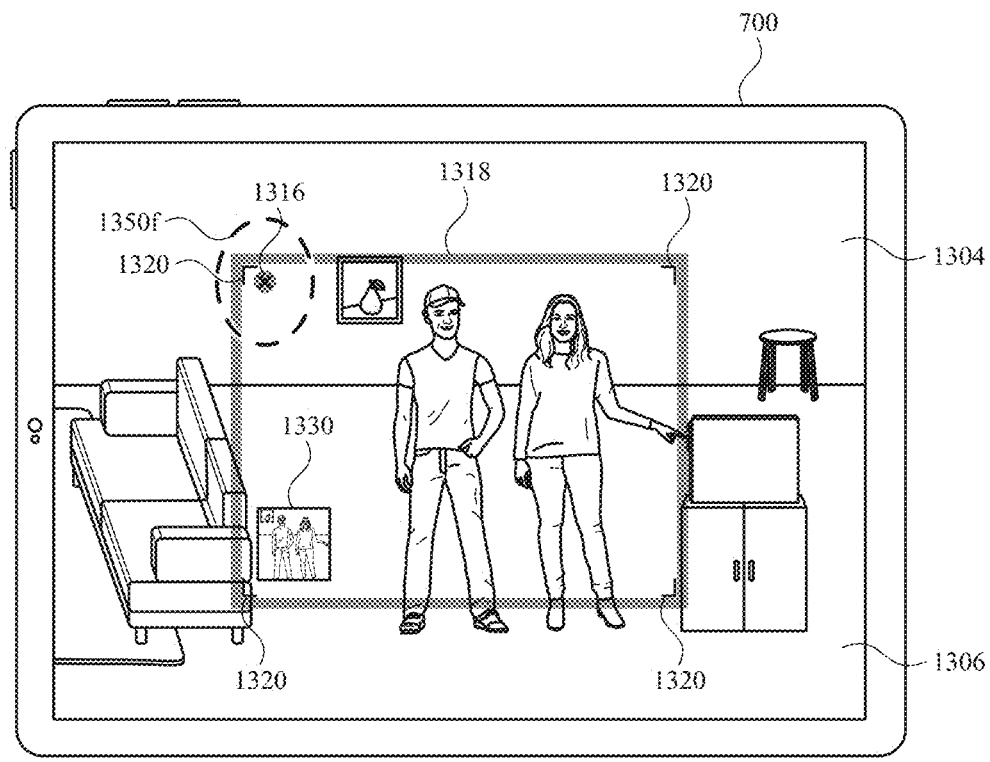

At FIG. 13F, computer system 700 has completed the photo capture operation that was initiated in response to computer system 700 detecting of input 1350*d*. The depiction of computer system 700 as shown in FIG. 13F can follow the behavior of computer system 700 as shown in any one of FIGS. 13E1-13E5. As illustrated in FIG. 13F, because computer system 700 has completed the photo capture operation, computer system 700 reverts the display reticle virtual object 1320 and representation of physical environment 1306 back to their initial appearance (e.g., the appearance of reticle virtual object 1320 and representation of physical environment 1306 as shown in FIG. 13D). That is, the changes to the appearance of reticle virtual object 1318 and representation of physical environment 1306, as seen in FIGS. 13E1-13E5, are temporary. Computer system 700 reverses the changes to the appearance of reticle virtual object 1320 and representation of physical environment 1306 after computer system 700 has completed the photo capture operation. In some embodiments, computer system 700 reverses the changes to the appearance of reticle virtual object 1320 and representation of physical environment 1306 after a predetermined amount of time (e.g., 1, 3, 5, 10, 15, 15 or 30 seconds) has elapsed since computer system 700 has completed the photo capture operation.

As illustrated in FIG. 13F, because computer system 700 has completed the photo capture operation, computer system 700 displays photo well virtual object 1330 within viewfinder 1318. Photo well virtual object 1330 includes a representation of a media item that was most recently captured by computer system 700. Accordingly, at FIG. 13F, photo well virtual object 1330 includes a representation of the photo that computer system 700 captured in response to detecting input 1350*d*. As illustrated in FIG. 13F, once computer system 700 completes the photo capture operation, computer system 700 brightens representation of physical environment 1306 (e.g., in comparison to the appearance of representation of physical environment 1306 at FIGS. 13E1-13E5) and computer system 700 displays exit virtual object 1316 within viewfinder 1318.

At FIG. 13F, computer system 700 detects input 1350*f* that corresponds to selection of exit virtual object 1316. In some embodiments, input 1350*f* corresponds to an air gesture (e.g., an air tap, air pinch, air de-pinch, and/or air swipe) that is detected (e.g., via the one or more cameras that are in communication with computer system 700) at a point in space that corresponds to the display of exit virtual object 1316. In some embodiments, after computer system 700 finishes a media capture operation, computer system 700 displays a preview of the captured media as fading into the display of camera user interface 1304 (e.g., computer system 700 progressively displays the preview of the captured media). In some embodiments, after computer system 700 finishes a media capture operation, computer system 700 displays a preview of the captured media shrinking from a first size to a second size and moving to a corner of viewfinder 1318. In some embodiments, after computer system 700 performs a media capture operation, computer system 700 replaces the display of reticle virtual object 1320 with a display of a preview of the captured media. In some embodiments, after computer system 700 performs a media capture operation, computer system 700 initially displays a preview of the captured media at a size that is slightly larger than the size of photo well virtual object 1330 and computer system 700 displays the preview of the captured media item as decreasing in size and moving to the display location of photo well virtual object 1330. In some embodiments, computer system 700 captures a stereoscopic media item in response to detecting input 1350*d* (e.g., a media item that is captured from two or more cameras that are positioned at different locations (e.g., slightly different (e.g., separated by a 1 inch, 2 inches, 3 inches, and/or the average interpupillary distance for a person) in a physical environment, where each camera captures a different perspective of the physical environment). In some embodiments, computer system 700 displays representations of previously captured media item in response to detecting an input that corresponds to selection of photo well virtual object 1330.

Figure 13G:
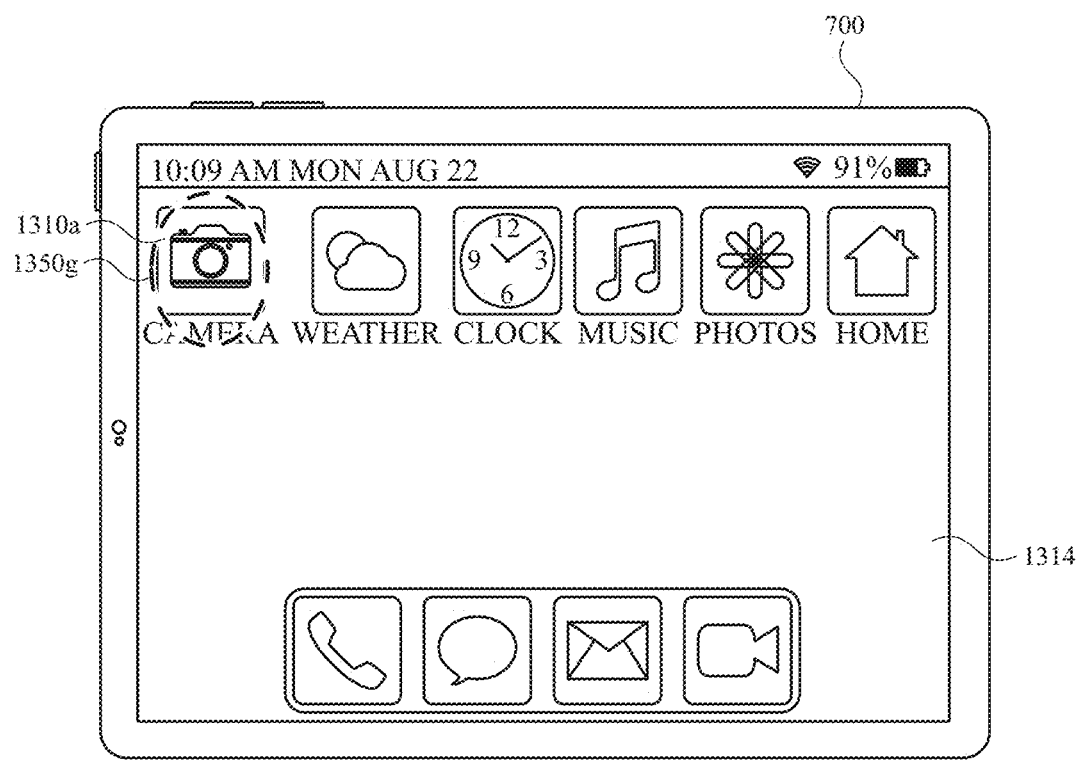

At FIG. 13G, in response to detecting input 1350*f*, computer system 700 ceases to display camera user interface 1304 and displays home screen user interface 1314. At FIG. 13G, computer system 700 detects input 1350*g* that corresponds to selection of camera application virtual object 1310*a*. In some embodiments, input 1350*g* corresponds to an air gesture (e.g., an air tap, air pinch, air de-pinch, and/or air swipe) that is detected (e.g., via one or more cameras that are in communication with computer system 700) at a point in space that corresponds to the display of camera application virtual object 1310*a*.

Figure 13H:
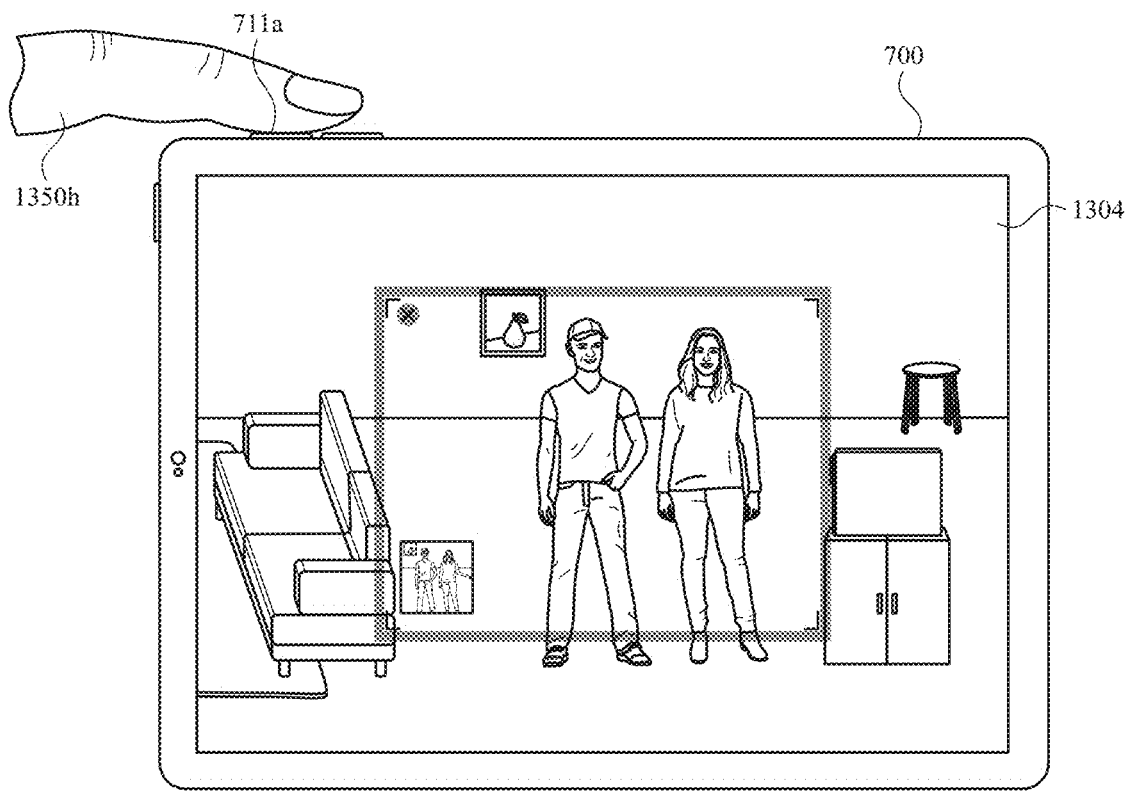

At FIG. 13H, in response to detecting input 1350*g*, computer system 700 displays camera user interface 1304. At FIG. 13H, computer system 700 makes a determination that camera user interface 1304 was previously displayed by computer system 700 (e.g., at FIG. 13D). Because computer system 700 makes a determination that camera user interface 1304 was previously displayed by computer system 700, computer system 700 displays camera user interface 1304 without tutorial 1308. As explained above, computer system 700 displays tutorial 1308 within camera user interface 1304 when computer system 700 displays camera user interface 1304 for the first time. However, computer system 700 does not display tutorial 1308 within camera user interface 1304 subsequently to computer system 700 displaying camera user interface 1304 for the first time. At FIG. 13H, computer system 700 detects input 1350*h* that corresponds to activation of hardware button 711*a*. Input 1350*h* corresponds to a request to capture video media.

Figure 13I:
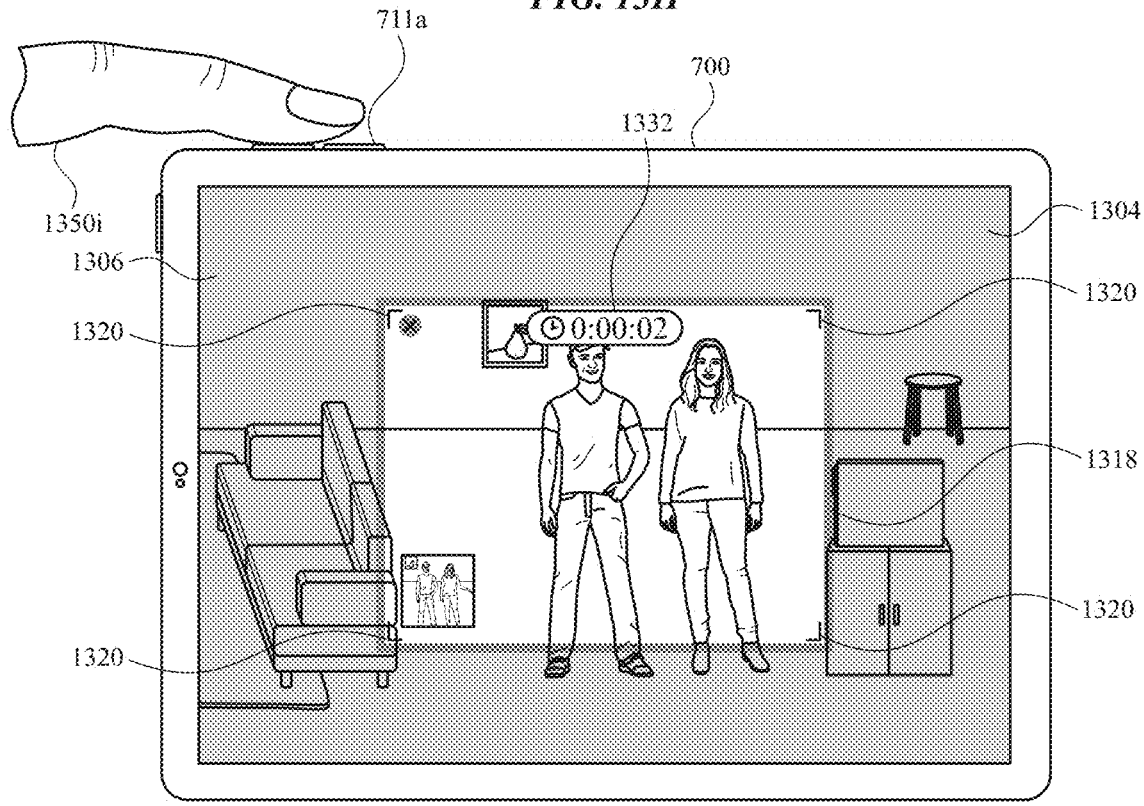

At FIG. 13I, computer system 700 makes a determination that input 1350*h* is a press and hold input of hardware button 711*a* (e.g., computer system 700 detects that hardware button 711*a* is depressed for longer than a predetermined amount of time (e.g., 0.5, 1, 2, 3, 4, or 5 seconds). Because computer system 700 makes a determination that input 1350*h* is a press and hold input of hardware button 711*a*, computer system 700 initiates a video capture operation. Accordingly, at FIG. 13H, computer system 700 is performing a video capture operation where content that is within reticle virtual object 1320 while computer system 700 performs the video capture operation will be visible in the resulting video media. As illustrated in FIG. 13I, because computer system 700 is performing a video capture operation, computer system 700 reduces the brightness of the appearance of representation of physical environment 1306 that is outside of viewfinder 1318 (e.g., in comparison to representation of physical environment 1306 at FIG. 13H).

As illustrated in FIG. 13I, because computer system 700 is performing a video capture operation, computer system 700 displays recording indicator virtual object 1332 within viewfinder 1318. Recording indicator virtual object 1332 provides an indication with respect to the amount of time that has elapsed since computer system 700 initiated the video capture operation. Accordingly, at FIG. 13I, computer system 700 has performed the video capture operation for two seconds. The display of recording indicator virtual object 1332 is part of the visual feedback that computer system 700 displays as part of performing the video capture operation. Computer system 700 displays a first type of feedback (e.g., the feedback that is depicted in any one of FIGS. 13E1-13E5) while computer system 700 performs a photo capture operation and computer system 700 displays a second type of feedback (e.g., as depicted in FIG. 13I) while computer system 700 performs a video capture operation.

At FIG. 13I, computer system 700 detects input 1350*i* that corresponds to activation of hardware button 711*a*. In some embodiments, computer system 700 does not modify the brightness of representation of physical environment 1306 while computer system 700 performs the video capture operation. In some embodiments, computer system 700 performs the video capture operation for as long as computer system 700 detects input 1350*h*. In some embodiments, after computer system 700 detects input 1350*h* for greater than a predetermined amount of time (e.g., 2, 3, 4, or 5), computer system 700 continues to perform the video capture operation even if computer system 700 ceases to detect input 1350*h*. In some embodiments, computer system 700 changes the appearance of recording indicator virtual object 1332 to indicate to a user that computer system 700 will continue to perform the video capture operation even if computer system 700 ceases to detect input 1350*h*. In some embodiments, computer system 700 displays recording indicator virtual object 1332 outside of viewfinder 1318.

Figure 13J:
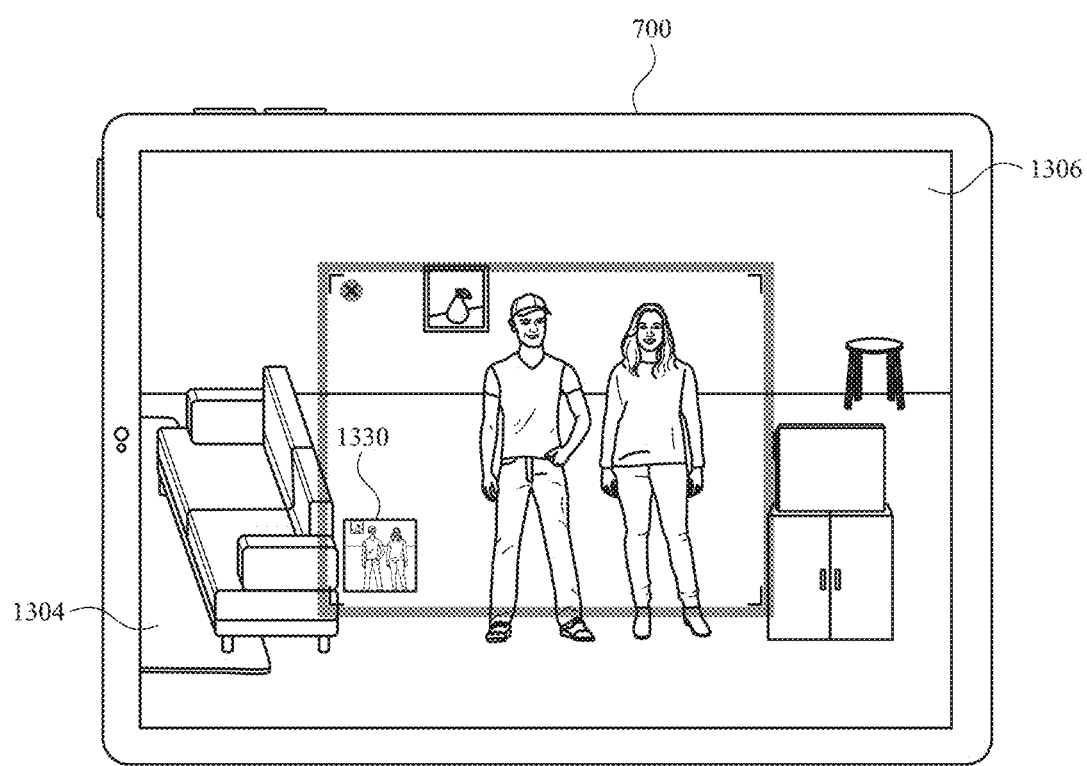

At FIG. 13J, in response to detecting input 1350*i*, computer system 700 ceases to perform the video capture operation. That is, computer system 700 initiates the video capture operation in response to detecting a first activation of hardware button 711*a* and computer system 700 ends the video capture operation in response to detecting a subsequent activation of hardware button 711*a*. Computer system 700 ceases the display of recording indicator virtual object 1332 as a part of ceasing to perform the video capture operation. As explained above, display of photo well virtual object 1330 includes a representation of the media item that is most recently captured by computer system 700. Accordingly, at FIG. 13J, computer system 700 updates the display of photo well virtual object 1330 (e.g., in comparison to the appearance of photo well virtual object at FIG. 13I) such that photo well virtual object 1330 includes a representation of the video media item that was captured at FIG. 13I. At FIG. 13J, as a part of ceasing the video capture operation, computer system 700 brightens the appearance of representation of physical environment 1306 within camera user interface 1304 (e.g., in comparison to the appearance of representation of physical environment 1306 at FIG. 13I).

Additional descriptions regarding FIGS. 13A-13J are provided below in reference to methods 1400 and 1500 described with respect to FIGS. 13A-13J.

FIG. 14 is a flow diagram of an exemplary method 1400 for displaying a media item, in accordance with some embodiments. In some embodiments, method 1400 is performed at a computer system (e.g., 700) (e.g., a smart phone, a tablet, and/or a head-mounted device) that is in communication with a display generation component (e.g., 702) (e.g., a display controller, a touch-sensitive display system, a display (e.g., integrated and/or connected), a 3D display, a transparent display, a projector, a heads-up display, and/or a head-mounted display), one or more input devices (e.g., 711*a*) (e.g., a touch-sensitive surface (e.g., a touch-sensitive display); a mouse; a keyboard; a remote control; a visual input device (e.g., a camera); an audio input device (e.g., a microphone); and/or a biometric sensor (e.g., a fingerprint sensor, a face identification sensor, and/or an iris identification sensor)), and one or more cameras. In some embodiments, method 1400 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1400 are, optionally, combined and/or the order of some operations is, optionally, changed.

The computer system detects (1402), via the one or more input devices, a request (e.g., 1350*b*, 1350*g*, 1350*c*, 1350*d*) (e.g., an air gesture (e.g., an air swipe, air tap, air pinch, and/or air de-pinch) that is detected by the one or more cameras, gaze-based request, and/or an activation of a hardware input mechanism that is in communication (e.g., wired and/or wireless communication) with the computer system) to display a camera user interface (e.g., 1304) (e.g., a camera user interface that corresponds to a camera application that is installed on the computer system).

In response to detecting the request to display the camera user interface, the computer system displays (1404) the camera user interface, wherein the camera user interface includes a reticle virtual object (e.g., 1320) (e.g., a set of one or more contiguous or non-contiguous lines or other shapes) that indicates a capture region (e.g., content (e.g., a preview of a field-of-view of the one or more cameras) that is within the capture region is visible in resulting media (e.g., still media and/or video media) that is captured by the one or more cameras) (the capture region is a portion of a field-of-view of at least two cameras of the one or more cameras (e.g., a portion of the fields-of-view that overlap) of the one or more cameras, wherein displaying the camera user interface includes: in accordance with (1406) a determination that a set of one or more criteria is satisfied, displaying the camera user interface with a tutorial (e.g., 1308) (e.g., 1304 at FIG. 13C) (e.g., a guide explaining to a user how to user one or more functions of the computer system) (e.g., within the reticle virtual object) within the camera user interface (e.g., the tutorial is embedded within the camera user interface), wherein the tutorial provides information about how to capture media with the computer system while the camera user interface is displayed and in accordance with (1408) a determination that the set of one or more criteria is not satisfied, displaying the camera user interface without displaying the tutorial (e.g., 1304 at FIG. 13D). In some embodiments, the reticle is overlaid on top of a representation of the physical environment of the location of the computer system. In some embodiments, the tutorial is displayed while a representation of the physical environment is displayed to the user. In some embodiments, the display of the tutorial is environment-locked. In some embodiments, the display of the tutorial is viewpoint-locked. In some embodiments, the tutorial is a looping animation (e.g., the animation repeats itself). In some embodiments, the appearance of a representation of the physical environment is changed (e.g., dimmed) in response to detecting the request to display the camera user interface. In some embodiments, the computer system does not continue to playback the tutorial once the computer system completes the playback of the tutorial. In some embodiments, the tutorial includes a combination of two different types of media (e.g., video, still photo, and/or a textual description). In some embodiments, the computer system displays a representation of the tutorial (e.g., a still photo representation of the last video frame of the tutorial) is after the computer system completes playback of the tutorial. Displaying the camera user interface with the tutorial when a set of conditions are met (e.g., the camera user interface is initially displayed) automatically allows the computer system to perform a display operation that provides the user with information regarding how to use the computer system's media capturing functions at a point in time where the user has limited information regarding how to operate the computer system's media capturing functions, which performs an operation when a set of conditions has been met without requiring further user input.

In some embodiments, the set of one or more criterion includes a criterion that is satisfied when the camera user interface (e.g., 1304) is initially displayed (e.g., as discussed above in relation to FIG. 11C) (e.g., the camera user interface is displayed for the first time after the computer system is powered on for the first time or when the camera user interface is displayed for the first time after a software update) (e.g., the computer system executes the camera application that is associated with the camera user interface for the first time since the computer system was initially powered on). In some embodiments, the criteria include a criterion that is satisfied when the camera user interface is initially displayed after the operating system of the computer system has been reset. In some embodiments, after the camera user interface is initially displayed, the computer system displays the tutorial in response to detecting a request to display the tutorial. In some embodiments, the set of one or more criteria are not met when a second instance of the camera user interface is being displayed after a previous instance of the camera user interface was displayed with the tutorial. In some embodiments, the set of one or more criteria is not satisfied when the computer system redisplays the camera user interface subsequent to the computer system initially displaying the camera user interface. In some embodiments, the set of one or more criteria is not satisfied when the computer system displays the camera user interface for the first time during a discrete time period (e.g., computer system displays the camera user interface for the first time in a day) after the computer system initially displays the camera user interface. In some embodiments, subsequent to the computer system initially displaying the camera user interface, the set of one or more criteria is not satisfied when the computer system displays the camera user interface for the first time after the computer system has been rebooted. In some embodiments, the set of one or more criteria is not satisfied when the computer system displays the camera user interface for the first time after a period of time (e.g., 3 days, 1 week, 1 month, and/or 1 year) has elapsed since the computer system previously displayed the camera user interface. Displaying the tutorial when the camera user interface is displayed for the first time provides the user with visual feedback regarding whether or not the camera user interface has been displayed by the computer system in the past, which provides improved visual feedback.

Displaying the tutorial (e.g., 1308) includes displaying instructions (e.g., textual instructions and/or graphical instructions) for capturing a first media item (e.g., the media item captured in FIGS. 13E1-13E5 and/or 13I) using the one or more cameras (e.g., as discussed above in reference to FIGS. 13C and 13I) (e.g., a still photo and/or a video). In some embodiments, the tutorial includes instructions for how to operate two or more media capturing functions (e.g., a photo capturing functions and a video capturing function) of computer system. Displaying instructions for capturing a media item when the camera user interface is displayed for the first time provides the user with clarity regarding how to operate the computer system's media capturing functionalities at a point in time where the user is unfamiliar with the computer system's media capturing functionalities, which results in a reduction in the amount of user error when the user is using the computer system's media capturing functionalities for the first time.

In some embodiments, the tutorial (e.g., 1308) includes a video (e.g., as discussed above in reference to FIG. 13C) (e.g., a looping video) (e.g., the computer system continuously plays back the tutorial in a repeating loop). In some embodiments, the computer system plays back the video of the tutorial once. In some embodiments, the computer system displays one or more controls for controlling the playback of the video of the tutorial (e.g., the user may pause, rewind, and/or fast forward the playback of the video). In some embodiments, in response to detecting a request to cease playback of the video of the tutorial, the computer system ceases playback of the video of the tutorial. Displaying a video that includes instructions for how to capture media with the computer system provides the user with a clear and unambiguous guidance with respect to how to use the computer system's media capturing functionalities at a point in time where the user is unfamiliar with the computer system's media capturing functionalities, which results in a reduction in the amount of user error when the user is using the computer system's media capturing functionalities for the first time.

In some embodiments, displaying the camera user interface (e.g., 1304) includes displaying a viewfinder virtual object (e.g., 1318) (e.g., the viewfinder virtual object indicates the capture region of the one or more cameras that are in communication with the computer system), and wherein displaying the tutorial (e.g., 1308) includes displaying the tutorial overlaying at least a portion of the viewfinder virtual object (e.g., as described above in reference to FIG. 13D) (e.g., the tutorial is displayed within the viewfinder (e.g., in the center of the viewfinder. In some embodiments, the tutorial is not displayed as centered within the viewfinder virtual object. In some embodiments, the tutorial is overlaid on top of the viewfinder virtual object and a representation (e.g., an optical representation or a virtual representation) of the physical environment.

In some embodiments, the computer system (e.g., 700) is in communication (e.g., wireless communication and/or wired communication) with a hardware input mechanism (e.g., 711*a*) (e.g., a depressible and/or rotatable hardware input mechanism) (e.g., the hardware input mechanism is not visible to the user while the tutorial is displayed) (e.g., a side button that is integrated into the computer system) that, when activated (e.g., when the hardware input mechanism is depressed), causes the initiation of a media capture process (e.g., as shown in FIGS. 13E1-13E5 and 13I) (e.g., capturing video or still media), wherein the tutorial (e.g., 1308) includes a representation of the hardware input mechanism (e.g., a graphical representation of the hardware input mechanism) (ISE, includes a representation (e.g., a graphical representation) of the computer system), and wherein displaying the tutorial includes displaying a representation (e.g., a graphical representation) of an input (e.g., a tap input and/or a press and hold input) (e.g., a user input) that corresponds to activation of the hardware input mechanism (e.g., as described above in reference to FIG. 13C) (e.g., the tutorial depicts a representation of a user selecting (e.g., depressing) the representation of the hardware input mechanism). Displaying a representation of an input that corresponds to selection of a representation of the hardware input mechanism provides the user with guidance with respect to how to use the computer system's media capturing functionalities at a point in time where the user is unfamiliar with the computer system's media capturing functionalities, which results in a reduction in the amount of user error when the user is using the computer system's media capturing functionalities for the first time.

In some embodiments, the hardware input mechanism (e.g., 711a) (e.g., that, when activated, causes the initiation of the media capturing process) is not visible to a user (e.g., 712) while the user operates the computer system (e.g., 700) (e.g., the hardware input mechanism is not in the field of view of the user while the computer system (e.g., when the computer system is an HMD) displays the tutorial) (e.g., the computer system obstructs the user's ability to view the hardware input mechanism) (e.g., the hardware input mechanism is not visible to the user while the computer system displays the tutorial). Allowing a user to operate the computer system while the hardware input mechanism is not visible to the user prevents the hardware input mechanism from obstructing the user's ability to view the information and/or instructions that are displayed by the computer (e.g., the user can clearly view tutorials that the computer system displays) which, given the user's inability to see the hardware input mechanism, provides the computer system with the ability to effectively deliver information of heightened importance regarding the location and functionality of the hardware input mechanism, which increases the effectiveness of the ability of the computer system to deliver information and/or instructions to the user.

In some embodiments, the computer system detects a first activation of the hardware input mechanism (e.g., 1350c, 1350h, 1350i on 711a) (e.g., the hardware input mechanism is depressed and/or rotated), wherein the first activation of the hardware input mechanism is an input of a first type (e.g., corresponds to a tap input (e.g., the hardware input mechanism is depressed for less than a threshold amount of time (e.g., 0.1, 0.3, 0.5, 7, 1, or 2 seconds)) and/or a input that does not include a sustained input component). In some embodiments, in response to detecting the first activation of the hardware input mechanism, the computer system captures a second media item using the one or more cameras (e.g., as described above in reference to FIGS. 13E1-13E5 and 13I) (e.g., a photo) (e.g., content that is within the reticle virtual object at the time the computer system detects the first activation of the hardware input mechanism is visible in the second media item). In some embodiments, the computer system detects the first activation of the hardware input mechanism while the camera user interface is displayed without the tutorial. Capturing a second media item in response to detecting activation of a hardware input mechanism allows the user to control a media capture process of the computer system without displaying additional controls, which provides additional control options without cluttering the user interface.

In some embodiments, the computer system detects a second activation of the hardware input mechanism (e.g., 1350h, 1350i, 1350c on 711a), wherein the second activation of the hardware input mechanism corresponds to an input of a second type (ISE, that is different than the first type) that includes maintaining the input for a predetermined period of time (e.g., as described above in reference to FIG. 13I) (e.g., a press-and-hold (e.g., the hardware input mechanism is depressed for greater than a threshold amount of time (0.5, 1, 2, 3, 5, or 8 seconds)) (e.g., as described above in reference to FIG. 13I). In some embodiments, in response to detecting the second activation of the hardware input mechanism, the computer system captures a third media item (e.g., as described above in reference to FIG. 13I) (e.g., a video) (e.g., content that is within the reticle virtual object during the duration of the capture of the third media item is visible in the third media item). In some embodiments, activation of the hardware input mechanism that does not include maintaining the input for a predetermined period of time does not cause capture of media. In some embodiments, the computer detects a second activation of the hardware input mechanism while the camera user interface is displayed without the tutorial. Capturing a second media item in response to detecting activation of a hardware input mechanism allows the user to control a media capture process of the computer system without displaying additional controls, which provides additional control options without cluttering the user interface.

In some embodiments, while camera user interface (e.g., 1304) is displayed with the tutorial (e.g., 1308), the computer system detects a third activation (e.g., a long press (e.g., press and hold) or a short press (e.g., press and release)) of the hardware input mechanism (e.g., 1350c, 1350h, or 1350i on 711a) (e.g., a solid state input mechanism that is activated in response to the computer system detecting pressure (e.g., directly (e.g., on the solid state input mechanism) or indirectly (e.g., not on the solid state input mechanism)) (e.g., the hardware input mechanism is depressed and/or rotated). In some embodiments, in response to detecting the third activation of the hardware input mechanism, ceasing the display of the tutorial (e.g., as described above in FIG. 13D) (e.g., and maintaining the display of camera user interface with the reticle virtual object). In some embodiments, ceasing the display of the tutorial includes changing the appearance of a representation of a physical environment (e.g., the representation of the physical environment changes from blurred to unblurred or vice versa). In some embodiments, when the hardware input mechanism is a solid state input mechanism, the hardware input mechanism generates a tactile output in response to the hardware input mechanism being activated. Capturing a second media item in response to detecting activation of a hardware input mechanism allows the user to control a display operation of the computer system without displaying additional controls, which provides additional control options without cluttering the user interface. Ceasing the display of the tutorial in response to detecting the third activation of the hardware input mechanism provides the user with visual feedback regarding the state of the computer system (e.g., the computer system has detected the activation of the hardware input mechanism), which provides improved visual feedback.

In some embodiments, in accordance with a determination that a set of criteria is satisfied (e.g., an accessibility setting of the computer system is enabled), the camera user interface (e.g., 1304) includes a camera shutter virtual object that, when selected, initiates a process for capturing a media item (e.g., a still photo and/or a video) (e.g., the camera shutter virtual object is displayed within the reticle virtual object) (e.g., as discussed above in reference to FIG. 13D)

and in accordance with a determination that the set of criteria is not satisfied (e.g., an accessibility setting of the computer system is not enabled), the camera user interface does not include the camera shutter virtual object (e.g., a selectable virtual object) for initiating a process of capturing a media item (e.g., as discussed above in reference to FIG. 13D) (e.g., still photo and/or video). In some embodiments, the camera shutter virtual object is displayed within the reticle virtual object. In some embodiments, the computer system ceases to display the camera shutter virtual object in response to a determination that the setting of the computer system is disabled. In some embodiments, in response to detecting an input that corresponds to selection of the camera shutter virtual object, the computer system initiates a process for capturing a media item (e.g., the computer optionally adds the captured media item to a media library (e.g., on the computer system and/or on a cloud server) as a part of capturing the media item) (e.g., the captured media includes content from the extended reality environment that is within the reticle virtual object, as discussed below). In some embodiments, the camera user interface includes the camera shutter virtual object while the camera user interface is displayed without the tutorial (e.g., and with the reticle virtual object)). Displaying the camera shutter virtual object when a set of prescribed conditions are met (e.g., the first set of criteria is satisfied (e.g., an accessibility setting of the computer system is enabled)), automatically allows the computer system to perform a display operation that aids in facilitating a media capturing process, which performs an operation when a set of conditions has been met without requiring further user input.

In some embodiments, the set of criteria includes a criterion that is satisfied when a setting (e.g., an accessibility setting) of the computer system (e.g., 700) is enabled (e.g., enabled by the user) (e.g., as described above in relation to FIG. 13D). In some embodiments, the setting is enabled in response to the computer system detecting that the gaze of a user is directed towards the display of a virtual object that corresponds to the setting for greater than a predetermined amount of time (e.g., 1, 3, 5, or 7 seconds). In some embodiments, the set of criteria is not satisfied when the setting of the computer system is not enabled. In some embodiments, the set of criteria is not satisfied when the set of the computer system transitions from enabled to disabled.

In some embodiments, the camera user interface (e.g., 1304) includes a close virtual object (e.g., 1316) that, when selected, (e.g., selected via the detection of an air gestures (e.g., an air tap, air pinch, air de-pinch, and/or air swipe) at a point in space that corresponds to the display of the close virtual object) causes the camera user interface to cease to be displayed (e.g., as described above in relation to FIG. 13G). In some embodiments, the computer system displays a user interface that corresponds to a home screen user interface of the computer system (e.g., a user interface that contains a number of selectable virtual objects that correspond to various applications that are installed on the computer system) in response to detecting selection of the close virtual object. Displaying the close virtual object within camera user interface allows the user to easily view and access the close virtual object while viewing content that will be captured as part of a process for capturing media, which provides improved visual feedback and assists the user in properly and quickly framing and capturing content of interest, which is particularly relevant for transient events and improves the functionality of the computer system.

In some embodiments, the camera user interface (e.g., 1304) is displayed within an extended reality environment (e.g., the camera user interface is displayed as overlaid on top of the extended reality environment), wherein a first portion (e.g., less than the entirety of the extended reality environment) of the extended reality environment is displayed within the reticle virtual object (e.g., as shown in FIGS. 13D-13E5, 13F, 13H, and 13I). In some embodiments, the first portion of the extended reality environment is visible to a second user (e.g., a user of the computer system). In some embodiments, the computer system changes the portion of the extended reality environment that is displayed within the reticle vertical object in response to detecting a change in the viewpoint of the user. In some embodiments, the first portion of the extended reality environment is visible to the user in a resulting media item. Displaying a first portion of the extended reality environment within the reticle virtual object informs the user what content the computer system will capture if the computer system detects a request to capture media, this allows the user to review and potentially change what content will be captured via the media capture process prior to the computer system performing the media capture process which provides improved visual feedback and enhances the privacy and security of the computer system by informing the user the content that will be visible in a resulting media item. Enhancing the privacy and security of the computer system enhances the operability of the device and makes the user-device interface more efficient (e.g., by assisting the user in capturing content that the user intends to capture without capturing content that the user does not intend to capture) which, additionally, reduces power usage and improves battery life of the device by enabling the user to use the device more quickly and efficiently.

In some embodiments, the computer system detects a request to capture a fourth media item (e.g., 1350h, 1350c, 1350i on 711a) (e.g., detecting an activation of a hardware input mechanism that is in communication with the computer system, detecting a voice command, and/or detecting an air gesture (e.g., air pinch, air de pinch, air tap, and/or air swipe)). In some embodiments, in response to detecting the request to capture the fourth media item, the computer system captures the fourth media item (e.g., the media item captured in FIG. 13E1-13E5 or 13I) (e.g., a photo or a video), wherein the fourth media item is a stereoscopic media item (e.g., as discussed above in reference to FIG. 13F) (e.g., the fourth media item is captured from a set of cameras (e.g., two or more cameras) that are located at a common location in a physical environment, where each camera in the set of cameras captures a unique perspective of the physical environment (e.g., the perspective of the physical environment that a first camera in the set of cameras captures is different than the perspective of the physical environment that a second camera in the set of cameras captures)) (e.g., the fourth media item is a stereoscopic still photo and/or stereoscopic video). In some embodiments, the computer system detects the request to capture a fourth media item while displaying the camera user interface without the tutorial. Capturing a stereoscopic media item allows the user to perceive depth between content that is included in the fourth media item which provides the user with a more accurate sense of the real world positional relationship between content included in the fourth media item, which results in an improved and more accurate media capturing process.

In some embodiments, aspects/operations of methods 800, 900, 1000, 1200, 1400 and 1500 may be interchanged, substituted, and/or added between these methods. For example, the tutorial that is discussed in method 1400 is optionally displayed when a user views previously captured media for the first time as discussed in method 1000. For brevity, these details are not repeated here.

FIGS. 15A-15B are a flow diagram of an exemplary method 1500 for displaying a media item, in accordance with some embodiments. In some embodiments, method 1500 is performed at a computer system (e.g., 700) (e.g., a smart phone, a tablet, and/or a head-mounted device) that is in communication with a display generation component (e.g., 702) (e.g., a display controller; a touch-sensitive display system; a display (e.g., integrated and/or connected), a 3D display, a transparent display, a projector, a heads-up display, and/or a head-mounted display), one or more cameras, and one or more input devices (711*a*) (e.g., a touch-sensitive surface (e.g., a touch-sensitive display); a mouse; a keyboard; a remote control; a visual input device (e.g., a camera); an audio input device (e.g., a microphone); and/or a biometric sensor (e.g., a fingerprint sensor, a face identification sensor, and/or an iris identification sensor)). In some embodiments, method 1500 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1500 are, optionally, combined and/or the order of some operations is, optionally, changed.

The computer system displays (1502), via the display generation component, a user interface that includes a representation of a physical environment (1504) (e.g., 1306) (e.g., an optical passthrough representation or a virtual representation), wherein a first portion of the representation of the physical environment is within a capture region of the one or more cameras (e.g., portion of 1306 that is within 1318) (e.g., the first portion of the representation of the physical environment is within a viewfinder) (e.g., the first portion of the representation of the physical environment is visible in a resulting media item that is captured by the one or more cameras) and a second portion of the representation of the physical environment (e.g., that is different from the first portion) is outside of the capture region of the one or more cameras (e.g., portion of 1306 that is outside 1318) (e.g., the second portion of the representation of the physical environment is not visible in a resulting media item that is captured by the one or more cameras) (e.g., the second portion of the representation of the physical environment is outside of the viewfinder) and a viewfinder (1506) (e.g., 1318) (e.g., at least the first portion of the representation of the physical environment is within the viewfinder), wherein the viewfinder includes a boundary (e.g., the boundary of the viewfinder separates the content within the capture region of the one or more cameras from the content that is not within the capture region of the one or more cameras) (e.g., a solid and/or dashed line around the periphery of the viewfinder).

While displaying the user interface, the computer system detects (1508), via the one or more input devices, a first request (e.g., an air gesture (e.g., an air swipe, an air tap, an air pinch, and/or an air de-pinch) and/or an activation of a hardware input mechanism that is in communication (e.g., wireless communication or wired communication) with the computer system) to capture media (e.g., a still photo or a video) (e.g., the media is captured using the one or more cameras).

In response to (1510) detecting the first request to capture media, the computer system captures (1512), using the one or more cameras, a first media item (e.g., a still photo or a video) that includes at least the first portion of the representation of the physical environment; and the computer system changes (1514) the appearance of the viewfinder (e.g., 1318 at FIGS. 13E1-13E5) (e.g., changing the translucency of the viewfinder, blurring the interior (e.g., a portion of the interior or the entirety of the interior) of the viewfinder), wherein changing the appearance of the viewfinder includes changing (1516) the appearance of a first portion of content (e.g., a portion of 1306) (e.g., blurring) (e.g., content that is visible to the user) (e.g., a portion of the representation of the physical environment) (e.g., content within and/or proximate to the viewfinder) that is within a threshold distance (e.g., 0.1 inch, 0.25 inches, 0.5 inches 1 inch, 3 inches or 5 inches) of a first side (e.g., edge) of the boundary of the viewfinder (e.g., left boundary of 1318) and changing (1518) the appearance of a second portion of content (e.g., a portion of 1306) that is within the threshold distance of a second side (e.g., edge) of the boundary of the viewfinder (e.g., right boundary of 1318), that is different from the first side of the boundary of the viewfinder (e.g., the representation of the physical environment remains visible to a user while the appearance of the viewfinder and the appearance of the content are changed). In some embodiments, changing the appearance of the viewfinder includes changing the appearance of a first portion of the viewfinder without changing the appearance of a second portion of the viewfinder. In some embodiments, changing the appearance of the viewfinder includes changing a first portion of the viewfinder in a first manner and changing a second portion of the viewfinder in a second manner that is different from the first manner. In some embodiments, the entirety of the viewfinder is changed in a uniform manner. In some embodiments, content that is within the viewfinder is not visible while the appearance of the viewfinder is changed. In some embodiments, the appearance of the viewfinder is changed in a different manner than the first portion of content and the second portion of content. In some embodiments, the appearance of the first portion of content is changed in a different manner than the appearance of the second portion of content. In some embodiments, two or more visual characteristics (e.g., color, size, shape, translucency, and/or brightness) of the viewfinder and the content are changed. In some embodiments, the computer system captures a media item (e.g., photo or video) in response to detecting the request to capture the media item and a representation of the captured media item is displayed within the interior of the viewfinder. In some embodiments, the user interface is an extended reality user interface. Changing the appearance of a viewfinder in response to detecting a request to capture media provides the user with visual feedback regarding the state of the computer system (e.g., the computer system has detected the request to capture media), which provides the user with improved visual feedback. Providing improved visual feedback during a media capture operation enhances the privacy and security of the computer system by informing the user that the user may review and/or edit the captured media. Further, providing improved visual feedback during a media capture operation allows a user to capture content that the user intends to capture with a fewer number of capture operations that would otherwise use additional power of the computer system, thus conserving the battery life of the computer system.

In some embodiments, the first media item is a stereoscopic media item (e.g., as described above in reference to FIG. 13F) (e.g., a media item that is comprised of two or more images that are captured from a set of cameras (e.g., two or more cameras (e.g., a first respective camera in the set of cameras captures a first image and a second respective camera captures a second image)) that are positioned at a common point in a physical environment, where each camera in the set of camera captures a different perspective of the physical environment (e.g., the perspective of the physical environment that a first camera in the set of cameras captures is different than the perspective of the physical environment that a second camera in the set of cameras captures). Capturing the first media item as a stereoscopic media item allows the user to perceive depth between content that is included in the first media item which provides the user with a more accurate sense of the real world positional relationship between content included in the first media item, which results in an improved and more accurate media capturing process.

In some embodiments, prior to detecting the first request to capture media (e.g., 1350*d*, 1350*h*, 1350*i* or 1350*d* on 711*a*), the viewfinder (e.g., 1318) is displayed with a first appearance (e.g., the appearance of 1318 at FIG. 13D), and wherein changing the appearance of the viewfinder includes displaying the viewfinder with a second appearance that is different from the first appearance (e.g., the appearance of 1318 at FIGS. 13E1-13E5) (e.g., amount of brightness, translucency, contrast and/or size of the viewfinder is different when the viewfinder is displayed with the second appearance in comparison to when the viewfinder is displayed with the first appearance). In some embodiments, (e.g., while the viewfinder is displayed with the second appearance) after the viewfinder has been displayed with the second appearance for a period of time (e.g., 0.1 0.3, 5, 0.7, 1, 1.5, or 2 seconds) (e.g., a first period of time has elapsed since the computer system has captured the first media item), the computer system changes (e.g., automatically, without further user input, changing) the appearance of the viewfinder from the second appearance to the first appearance (e.g., as explained above at FIG. 13F) (e.g., the appearance of the viewfinder reverts back to the initial appearance of the viewfinder). In some embodiments, a representation of a physical environment remains visible to the user while the appearance of the viewfinder changes from the second appearance to the first appearance. In some embodiments, changing the appearance of the viewfinder from the second appearance to the first appearance includes changing two or more visual properties (e.g., size, brightness, translucency, and/or contrast) of the viewfinder. In some embodiments, changing the appearance of the viewfinder from the second appearance to the first appearance includes ceasing to display the viewfinder for a period of time (e.g., 0.1 0.3, 5, 0.7, 1, 1.5, 2 seconds). Changing the appearance of the viewfinder from the second appearance to the first appearance provides the user with visual feedback that the period of time has elapsed since the computer system captured the first media item, which provides improved visual feedback. Providing improved visual feedback that a media capture operation was performed enhances the privacy and security of the computer system by informing the user that the user may review and/or edit the captured media to ensure that the captured media includes content that the user intended to capture without including content that the user did not intend to capture.

In some embodiments, the appearance of the first portion of content (e.g., a first portion of 1306 within 1318) and the appearance of the second portion of content (e.g., a second portion of 1306 within 1318) are changed in the same way (e.g., one or more optical properties (e.g., brightness, translucency, size, and/or contrast) of both the first portion of content and the second portion of content are changed in the same manner). In some embodiments, the appearance of the viewfinder, the second portion of content, and the first portion of content are changed in the same way.

In some embodiments, changing the appearance of the viewfinder (e.g., 1318) includes changing the appearance of a third portion of content (e.g., portion of 1306 within 1318) (e.g., the third content is different from the second portion of content and first portion of content) that is within the threshold distance of a third side (e.g., the third side is different than the first side and the second side of the boundary) of the boundary of the viewfinder (e.g., top/bottom boundary of 1318), and wherein the appearance of the first portion of content, the second portion of content and the third portion of content are changed in the same way (e.g., one or more optical properties (e.g., brightness, translucency, size, and/or contrast) of both the first portion of content, second portion of content, and the third portion of content are changed in the same manner. In some embodiments, the appearance of the first portion of content, the second portion of content, the third portion of content, and the viewfinder are all changed in the same way.

In some embodiments, the boundary of the viewfinder (e.g., 1318) is a reticle virtual object (e.g., 132) (e.g., a series of contiguous or non-contiguous lines displayed around the periphery of the viewfinder or at one or more corners of the viewfinder) (e.g., the reticle virtual object indicates the capture region of the one or more cameras that are in communication with the computer system), and wherein, before the first request to capture media is detected (e.g., 1350*c*, 1350*d*, 1350*h*, and/or 1350*i* on 711*a*), the reticle virtual object is displayed with a first appearance (e.g., 1320 at FIG. 13D). In some embodiments, in response to detecting the first request to capture media, the computer system changes the appearance of the reticle virtual object from the first appearance to a second appearance (e.g., 1320 at FIGS. 13E2, 13E3, and/or 13E4) (e.g., the brightness, translucency, contrast, positioning and/or size of the reticle virtual object changes), that is different from the first appearance. In some embodiments, the appearance of the reticle virtual object changes from the second appearance back to the first appearance after the computer system captures a respective media item. In some embodiments, changing the appearance of the reticle virtual object from the first appearance to the second appearance includes changing a portion (e.g., less than the entirety of the reticle) of the reticle virtual object. In some embodiments, the reticle virtual object ceases to be displayed for a period of time in response to detecting the request to capture media. Changing the appearance of the reticle from the first appearance to the second appearance in response to detecting the request to capture media provides the user with visual feedback regarding the state of the computer system (e.g., the computer system has detected the request to capture media), which provides improved visual feedback. Providing improved visual feedback during a media capture operation enhances the privacy and security of the computer system by informing the user that the user may review and/or edit the captured media to ensure that the captured media includes content that the user intended to capture without including content that the user did not intend to capture. Further, providing improved visual feedback during a media capture operation allows a user to capture content that the user intends to capture with a fewer number of capture operations that would otherwise use additional power of the computer system, thus conserving the battery life of the computer system. Changing the appearance of the reticle virtual object instead of performing an animation that is unrelated to the display of the reticle virtual object reduces the number of elements that are displayed on the display of the computer system, which reduces the amount of the field of view of the one or more cameras that is obscured by the display of virtual elements which results in a reduction of power consumption of the computer system.

In some embodiments, displaying the viewfinder (e.g., 1318) includes displaying one or more elements (e.g., 1306, 1316, 1330, and/or 1332) within the viewfinder (e.g., content) (e.g., one or more selectable virtual objects within the viewfinder) (e.g., content (e.g., a representation of a physical environment), and wherein changing the appearance of the reticle virtual object (e.g., 1320) includes changing the appearance of the reticle virtual object relative to the one or more elements that are displayed within the viewfinder (e.g., one or more optical properties of the reticle virtual object is changed relative to one or more optical properties of the one or more elements within the viewfinder) (e.g., one or more optical properties of the reticle virtual object are changed by a different magnitude than the same one or more optical properties of the one or more elements within the viewfinder). Changing the appearance of the reticle virtual object instead of performing an animation that is unrelated to the display of the reticle virtual object reduces the number of elements that are displayed on the display of the computer system, which reduces the amount of the field of view of the one or more cameras that is obscured by the display of virtual elements which results in a reduction of power consumption of the computer system In some embodiments, displaying the user interface (e.g., 1304) includes displaying one or more corners (e.g., one or more corners of 1318 and/or 1320) (e.g., rounded corners) (e.g., the one or more corners are displayed within the viewfinder) (e.g., the corners are displayed at the one or more corners of the viewfinder) (e.g., the one or more corners are a part of the viewfinder) (e.g., the one or more corners are a part of the reticle virtual object) (e.g., the one or more corners are independent of both the viewfinder and the reticle virtual object), and wherein changing the appearance of the viewfinder (e.g., 1318) includes changing the appearance of the one or more corners in a first manner (e.g., the color of one or more corners of the reticle virtual object is changed to a first color (e.g., white, black, yellow and/or orange) (e.g., appearance of 1320 at FIG. 13E2 and/or FIG. 13E3) and changing the appearance of at least the first side of the boundary of the viewfinder in a second manner that is different from the first manner (e.g., as discussed above in reference to FIG. 13E2) (e.g., the color of the first side of the boundary of the viewfinder is changed to a second color that is different than the first color). In some embodiments, the appearance of the one or more corners and the appearance of the first side of the boundary of the viewfinder are concurrently changed. In some embodiments, the appearance of the one or more corners and the appearance of the first side of the boundary of the viewfinder are changed such that the contrast between the one or more corners and the first side of the boundary of the viewfinder increases. In some embodiments, the same optical property (e.g., brightness, translucency, and/or size) of the one or more corners and the first side of the boundary of the viewfinder are changed. In some embodiments, the appearance of the first side of the boundary of the viewfinder and the appearance of the one or more corners are inversely changed (e.g., the first side of the boundary of the viewfinder gets darker while the one or more corners get lighter). In some embodiments, the one or more corners are not connected. Changing the appearance of one or more corners differently than how the appearance of the first side of the boundary is changed as part of performing a media capture process results in the computer system being able to more effectively alert the user that a media item has been captured in contrast to the computer system changing the appearance of the reticle as part of performing a media capture process without changing the appearance of other portions of the viewfinder, which results in improved visual feedback. Providing improved visual feedback during a media capture operation enhances the privacy and security of the computer system by more reliability informing the user that the user may review and/or edit the captured media to ensure that the captured media includes content that the user intended to capture without including content that the user did not intend to capture. Further, providing improved visual feedback during a media capture operation allows a user to capture content that the user intends to capture with a fewer number of capture operations that would otherwise use additional power of the computer system, thus conserving the battery life of the computer system.

In some embodiments, changing the appearance the viewfinder (e.g., 1318) includes changing a first set of one or more optical properties of a first portion of the content (e.g., 1306) (e.g., a value of the first optical property is increased or decreased) (e.g., a majority of content, more than 50%, 70%, 80%, 90% or 95% of content that is within the viewfinder) within the viewfinder (e.g., as explained above in reference to FIGS. 13E1-13E5). In some embodiments, a first portion of the content is changed inversely with respect to how a second portion of the content is changed (e.g., the first portion of content is darkened and the second portion of content is brightened). In some embodiments, two or more optical properties of content within the viewfinder are changed. In some embodiments, two or more optical properties of content within the viewfinder are changed in an inverse manner (e.g., the value of a first optical property is increased and the value of a second optical property is decreased). In some embodiments, the computer system changes a first optical property of the content in the viewfinder before the computer system changes a second optical property of the content in the viewfinder. Changing an optical property of the content within the viewfinder in response to detecting a request to capture media provides the user with visual feedback regarding the state of the computer system (e.g., the computer system detects the request to capture media) and alerts the user that the computer system has captured and media item which the user can review to confirm that the captured media does not contain content that the user did not intend to capture which provides improved visual feedback. Providing improved visual feedback during a media capture operation enhances the privacy and security of the computer system by informing the user that the user may review and/or edit the captured media. Further, providing improved visual feedback during a media capture operation allows a user to capture content that the user intends to capture with a fewer number of capture operations that would otherwise use additional power of the computer system, thus conserving the battery life of the computer system.

In some embodiments, the first set of one or more optical properties includes the contrast of the content (e.g., 1306) within the viewfinder (e.g., 1318) (e.g., the amount of contrast between the content in the viewfinder and a representation of the physical environment increases and/or decreases) (e.g., the amount of contrast between a first portion of the content and a second portion of the content). Changing the contrast of the content within the viewfinder in response to detecting a request to capture media provides the user with visual feedback regarding the state of the computer system (e.g., the computer system detects the request to capture media), and alerts the user that the computer system has captured and media item which the user can review to confirm that the captured media does not contain content that the user did not intend to capture which provides improved visual feedback. Providing improved visual feedback during a media capture operation enhances the privacy and security of the computer system by informing the user that the user may review and/or edit the captured media. Further, providing improved visual feedback during a media capture operation allows a user to capture content that the user intends to capture with a fewer number of capture operations that would otherwise use additional power of the computer system, thus conversing the battery life of the computer system.

In some embodiments, the first set of one or more optical properties includes the brightness of the content (e.g., 1306) within the viewfinder (e.g., 1318) (e.g., the amount of brightness of the content in the viewfinder increases and/or decreases). In some embodiments, the brightness of a first portion of the content included in the viewfinder increases and the brightness of a second portion of the content included in the viewfinder decreases. Changing the brightness of the content within the viewfinder in response to detecting a request to capture media provides the user with visual feedback regarding the state of the computer system (e.g., the computer system detects the request to capture media), and alerts the user that the computer system has captured and media item which the user can review to confirm that the captured media does not contain content that the user did not intend to capture which provides improved visual feedback. Providing improved visual feedback during a media capture operation enhances the privacy and security of the computer system by informing the user that the user may review and/or edit the captured media. Further, providing improved visual feedback during a media capture operation allows a user to capture content that the user intends to capture with a fewer number of capture operations that would otherwise use additional power of the computer system, thus conversing the battery life of the computer system.

In some embodiments, the first set of one or more optical properties includes the translucency of the content (e.g., 1306) within the viewfinder (e.g., 1318) (e.g., the amount of translucency of the content in the viewfinder increases and/or decreases). In some embodiments, the translucency of a first portion of the content included in the viewfinder increases and the translucency of a second portion of the content included in the viewfinder decreases. Changing the translucency of the content within the viewfinder in response to detecting a request to capture media provides the user with visual feedback regarding the state of the computer system (e.g., the computer system detects the request to capture media), and alerts the user that the computer system has captured and media item which the user can review to confirm that the captured media does not contain content that the user did not intend to capture which provides improved visual feedback. Providing improved visual feedback during a media capture operation enhances the privacy and security of the computer system by informing the user that the user may review and/or edit the captured media. Further, providing improved visual feedback during a media capture operation allows a user to capture content that the user intends to capture with a fewer number of capture operations that would otherwise use additional power of the computer system, thus conserving the battery life of the computer system.

In some embodiments, the first set of one or more optical properties includes the size of the content (e.g., 1306) within the viewfinder (e.g., 1318) (e.g., the size of the content within the viewfinder increases and/or decreases). In some embodiments, the size of the content within the viewfinder increases before the size of the content within the viewfinder decreases or vice versa. In some embodiments, the size of a first portion of the content included in the viewfinder increases and the size of a second portion of the content included in the viewfinder decreases. Changing the size of the content within the viewfinder in response to detecting a request to capture media provides the user with visual feedback regarding the state of the computer system (e.g., the computer system detects the request to capture media), and alerts the user that the computer system has captured and media item which the user can review to confirm that the captured media does not contain content that the user did not intend to capture which provides improved visual feedback. Providing improved visual feedback during a media capture operation enhances the privacy and security of the computer system by informing the user that the user may review and/or edit the captured media. Further, providing improved visual feedback during a media capture operation allows a user to capture content that the user intends to capture with a fewer number of capture operations that would otherwise use additional power of the computer system, thus conserving the battery life of the computer system.

In some embodiments, displaying the user interface (e.g., 1304) includes displaying a first set of virtual control objects (e.g., 1316, 1320, 1332 and/or 1330) (e.g., one or more virtual control objects) (e.g., one or more media capture control virtual objects) (e.g., each virtual control object in the first set of virtual control objects is selectable) within the boundary of the viewfinder. Displaying the first set of virtual objects within the boundary of the viewfinder allows the user to easily view and access the first set of virtual objects while viewing content that will be captured as part of a process for capturing media, which provides improved visual feedback and assists the user in properly and quickly framing and capturing content of interest, which is particularly relevant for transient events and improves the functionality of the computer system.

In some embodiments, the first set of virtual objects includes a first close virtual object (e.g., 1316). In some embodiments, the computer system detects an input (e.g., 1350*f,* 1350*c,* 1350*d*) that corresponds to selection of the first close virtual object (e.g., an air gesture (e.g., an air swipe, air tap, air pinch, and/or air de-pinch (e.g., that is detected at a point in space that corresponds to the display of the first close virtual object) that is detected by the one or more cameras, gaze-based request, and/or an activation of a hardware input mechanism that is in communication (e.g., wired and/or wireless communication) with the computer system). In some embodiments, in response to detecting the input that corresponds to selection of the first close virtual object, the computer system ceases the display of the user interface (e.g., as described above in reference to FIG. 13G). In some embodiments, the user interface corresponds to a first application and the computer system displays a second user interface that corresponds to a second application as a part of ceasing to display the user interface. In some embodiments, the computer system displays a home user interface ((e.g., a user interface that contains a number of selectable virtual objects that correspond to various applications that are installed on the computer system) as a part of ceasing to display the user interface. In some embodiments, the computer system displays a reduced number of virtual objects (e.g., in comparison to the number of virtual objects that are included in the user interface) as overlaid on top of a passthrough representation of the physical environment as a part of ceasing to the user interface. Displaying the close virtual object within the boundary of the viewfinder allows the user to easily view and access the close virtual object while viewing content that will be captured as part of a process for capturing media, which provides improved visual feedback and assists the user in properly and quickly framing and capturing content of interest, which is particularly relevant for transient events and improves the functionality of the computer system.

In some embodiments, the first set of virtual objects includes a first media review virtual (e.g., 1330) object (e.g., the first media review virtual object includes a representation of a media item that was most recently captured by the one or more cameras that are in communication with the computer system) (e.g., a photo well). In some embodiments, the computer system detects an input (e.g., 1350*f*, 1350*g*, 1350*d*, 1350*c*) that corresponds to selection of the first media review virtual object (e.g., an air gesture (e.g., an air swipe, air tap, air pinch, and/or air de-pinch (e.g., that is detected at a point in space that corresponds to the display of the first media review virtual object) that is detected by the one or more cameras, gaze-based request, and/or an activation of a hardware input mechanism that is in communication (e.g., wired and/or wireless communication) with the computer system). In some embodiments, in response to detecting the input that corresponds to selection of the first media review virtual object, the computer system displays one or more representations of previously captured media items (e.g., as explained above in reference to FIG. 13F) (e.g., media items that were previously captured by the one or more cameras that are in communication with the computer system). In some embodiments, the one or more representations of the previously captured media items represent media items that are captured by an external device (e.g., smart phone and/or tablet) that is in communication with the computer system. In some embodiments, the first media review virtual object is displayed at a corner of the viewfinder. In some embodiments, the first media review virtual object updates to include a representation of a most recently captured media item in response to the computer system performing a media capture operation. Displaying the media review virtual object within the boundary of the viewfinder allows the user to easily view and access the media review virtual object while viewing content that will be captured as part of a process for capturing media, which provides improved visual feedback and assists the user in properly and quickly framing and capturing content of interest, which is particularly relevant for transient events and improves the functionality of the computer system.

In some embodiments, the first set of virtual objects includes a recording time virtual object (e.g., 1332) that indicates an amount of time that has elapsed since the computer system (e.g., 700) initiated a first video capture operation (e.g., the recording time virtual object is displayed while the computer system is performing the video capture operation). In some embodiments, the computer system ceases to display the recording time virtual object in response to the computer system ceasing the video recording operation. Displaying a recording time virtual object that indicates an amount of time that has elapsed since the computer system initiated a video capture operation provides the user with visual feedback with respect to how long the computer system has performed a video capture operation for, and alerts the user that the computer system is capturing a video media item which the user can review (e.g., when the computer system is done performing the video capture operation) to confirm that the captured video media does not contain content that the user did not intend to capture, which provides improved visual feedback. Providing improved visual feedback during a media capture operation enhances the privacy and security of the computer system by informing the user that the user may review and/or edit the captured media. Further, providing improved visual feedback during a media capture operation allows a user to capture content that the user intends to capture with a fewer number of capture operations that would otherwise use additional power of the computer system, thus conserving the battery life of the computer system.

In some embodiments, displaying the user interface includes displaying a second set of virtual control objects (e.g., 1332, 1330, 1316, and/or 1320) (e.g., one or more capture control virtual objects) outside of the boundary of the viewfinder (e.g., 1318). Displaying the second set of virtual objects outside of the boundary of the viewfinder results in the display of the second set of virtual objects not obstructing the display of content that is within the viewfinder which allows a user to clearly view and focus on content that will be captured via a media capturing process, which assists the user in properly and quickly framing and capturing content of interest, which is particularly relevant for transient events and improves the functionality of the computer system.

In some embodiments, the second set of virtual control objects includes a set of camera mode virtual objects that each correspond to a respective mode of operation of the one or more cameras, (e.g., the set of camera mode virtual objects includes one or more of: a time-lapse virtual object (e.g., that, when selected, causes the one or more cameras of the computer system to be configured such that the one or more cameras capture a series of images of a time period); a slow motion virtual object (e.g., that, when selected, causes the one or more cameras of the computer system to be configured such that the one or more cameras capture video media with a slow motion effect); a cinematic virtual object (e.g., that, when selected, causes the one or more cameras of the computer system to be configured such that the one or more cameras capture media with a blurred background); a portrait virtual object (e.g., that, when selected, causes the one or more cameras of the computer system to be configured such that the one or more cameras capture still media with a depth-of-field effect); and a panoramic virtual object (e.g., that, when selected, causes the one or more cameras of the computer system to be configured such that the one or more cameras capture media that spans over an increased capture range (e.g., in comparison to the capture range when the one or more cameras are operating a normal operation range), wherein the set of camera mode virtual objects include a first camera mode virtual object and a second camera mode virtual object (e.g., that is different from the first camera mode virtual object). In some embodiments, the computer system detects an input (e.g., 1350*g*, 1350*c*, 1350*d*) (e.g., an air gesture (e.g., an air swipe, air tap, air pinch, and/or air de-pinch) that is detected by the one or more cameras, gaze-based request, and/or an activation of a hardware input mechanism that is in communication (e.g., wired and/or wireless communication) with the computer system) that corresponds to selection of a respective camera mode virtual object in the set of camera mode virtual objects. In some embodiments, in response to detecting the input that corresponds to selection of a respective camera mode virtual object in the set of camera mode virtual objects and in accordance with a determination that the input corresponds to selection of the first camera mode virtual object, the computer system configures the one or more cameras to operate in a first mode and in accordance with a determination that the input corresponds to selection of the second camera mode virtual object, the computer system configures the one or more cameras to operate in a second mode (e.g., that is different than the first mode) (e.g., as discussed above in reference to FIG. 13D). Displaying the set of camera mode virtual objects outside of the boundary of the viewfinder results in the display of the set of camera mode virtual object not obstructing the display of content that is within the viewfinder which allows a user to clearly view and focus on content that will be captured via a media capturing process which assists the user in properly and quickly framing and capturing content of interest, which is particularly relevant for transient events and improves the functionality of the computer system.

In some embodiments, the second set of virtual control objects includes a second close virtual object (e.g., 1316). In some embodiments, the computer system detects an input (e.g., 1350g, 1350c,1350d) that corresponds to selection of the second close virtual object (e.g., an air gesture (e.g., an air swipe, air tap, air pinch, and/or air de-pinch (e.g., that is detected at a point in space that corresponds to the display of the first close virtual object) that is detected by the one or more cameras, gaze-based request, and/or an activation of a hardware input mechanism that is in communication (e.g., wired and/or wireless communication) with the computer system). In some embodiments, in response to detecting the input that corresponds to selection of the second virtual object, the computer system ceases to display the user interface (e.g., 1304) (e.g., as discussed above in reference to FIG. 13G). In some embodiments, a home user interface (e.g., a user interface that contains a number of selectable virtual objects that correspond to various applications that are installed on the computer system) of the computer system is displayed upon detection of the second close virtual object. In some embodiments, the user interface corresponds to a first application and the computer system displays a second user interface that corresponds to a second application as a part of ceasing to display the user interface. In some embodiments, the computer system displays a home user interface (e.g., a user interface that contains a number of selectable virtual objects that correspond to various applications that are installed on the computer system) as a part of ceasing to display the user interface. In some embodiments, the computer system displays a reduced number of virtual objects (e.g., in comparison to the number of virtual objects that are included in the user interface) as overlaid on top of a passthrough representation of the physical environment as a part of ceasing to the user interface. Displaying the close virtual object virtual object outside of the boundary of the viewfinder results in the display of the close virtual object not obstructing the display of content that is within the viewfinder which allows a user to clearly view and focus on content that will be captured via a media capturing process which assists the user in properly and quickly framing and capturing content of interest, which is particularly relevant for transient events and improves the functionality of the computer system.

In some embodiments, after the first media item is captured, the computer system displays (e.g., automatically (e.g., without intervening user input) a representation of the first media item (e.g., the media item captured at FIG. 13E1-13E5 or 13I) fading into (e.g., the representation of the first media item is gradually (e.g., over a predetermined amount of time) displayed) the display of the user interface (e.g., 1304) (e.g., as discussed above in reference to FIG. 13F). In some embodiments, a first portion of the representation of the first media item fades into the display of the user interface before a second portion of the representation of the first media item. In some embodiments, the amount of time it takes for the representation of the first media item to fade into the display of the user interface directly correlates to the size of the first media item (e.g., the larger the size of the first media item the longer it takes for the first media item to fade into the user interface). Displaying a representation of the first media item as fading into the display of the user interface after the first media item is captured provides the user with visual feedback regarding the state of the computer system (e.g., the computer system has completed the process of capturing the first media item) which provides the user with improved visual feedback. Providing improved visual feedback that a media capture operation was performed enhances the privacy and security of the computer system by informing the user that the user may review and/or edit the captured media to ensure that the captured media includes content that the user intended to capture without including content that the user did not intend to capture.

In some embodiments, displaying the representation of the first media item (e.g., the media item captured at FIG. 13E1-13E5 or 13I) fading into the display of the user interface includes displaying the representation of the first media item transitioning from a first size (e.g., the representation of the first media item is initially displayed at the first size) to a second size, wherein the first size is larger than the second size (e.g., the size of the representation of the first media item gradually decreases) (e.g., the computer system displays the representation of the first media item transitioning from the first size to the second size over a period of time) and displaying the representation of the first media item moving from a first location (e.g., a central location within the user interface) in the user interface to a second location (e.g., that is different from the first location) (e.g., the second location is at a corner of the viewfinder) in the user interface, wherein the second location corresponds to a corner (e.g., location of 1330) of the viewfinder (e.g., 1318) (e.g., as described above in reference to FIG. 13F). In some embodiments, the computer system displays the representation of the first media item as transitioning from the first size to the second size while the computer system displays the representation of the first media item as moving from the first location to the second location. In some embodiments, the computer system displays the representation of the first media item as transitioning from the first size to the second size before/after the computer system displays the representation of the first media item as moving from the first location to the second location. In some embodiments, the computer displays the representation of the first media item as transitioning from the first size to the second size and moving from the first location to the second location while the computer system displays the representation of the first media item as fading into the display of the user interface. In some embodiments, the computer displays the representation of the first media item as transitioning from the first size to the second size and moving from the first location to the second location before/after the computer system displays the representation of the first media item as fading into the display of the user interface. Displaying the representation of the first media item as decreasing in size and moving from a first location on the user interface to a second location in the user interface after the first media item is captured provides the user with visual feedback regarding the state of the computer system (e.g., the computer system has captured the first media item), which provides improved visual feedback. Providing improved visual feedback that a media capture operation was performed enhances the privacy and security of the computer system by informing the user that the user may review and/or edit the captured media to ensure that the captured media includes content that the user intended to capture without including content that the user did not intend to capture.

In some embodiments, before displaying the representation of the first media item, the viewfinder (e.g., 1318) includes a second reticle virtual object (e.g., 1320) (e.g., a set of contiguous or non-contiguous lines), and wherein the display of the representation of the first media item replaces the display of the second reticle virtual object (e.g., as discussed above in reference to FIG. 13F). In some embodiments, the second reticle virtual object is redisplayed after display of the representation moves from the first location to the second location. In some embodiments, the second reticle virtual object is redisplayed in response to the representation of the first media item ceasing to be displayed. Replacing the display of the second reticle virtual object after the first media item is captured provides the user with visual feedback regarding the state of the computer system (e.g., the computer system has captured the first media item), which provides improved visual feedback. Providing improved visual feedback that a media capture operation was performed enhances the privacy and security of the computer system by informing the user that the user may review and/or edit the captured media to ensure that the captured media includes content that the user intended to capture without including content that the user did not intend to capture.

In some embodiments, displaying the user interface (e.g., 1304) includes displaying a second media review virtual object (e.g., 1330) (e.g., the media review virtual object includes a representation of a most recently captured (e.g., most recently captured by the one or more cameras of the computer system) media item that, when selected, causes display of a user interface for reviewing previously captured media (e.g., a camera roll affordance))) (e.g., the second media review virtual object is displayed at a corner of the viewfinder) at a third location in the user interface (e.g., the location of 1330), wherein the second media review virtual object is displayed at a third size (e.g., the size of 1330), and wherein displaying the representation of the first media item (e.g., the media item captured at FIG. 13E1-13E5 or 13I) fading into the user interface includes displaying the representation of the first media item transitioning from a fourth size to a fifth size, wherein the fourth size is larger than the fifth size, and wherein the fourth size is larger than the third size (e.g., the fourth size is slightly larger than the third size (e.g., the first size is 2%, 5%, 7% or 10% larger than the third size)) (e.g., the representation of the first media item shrinks) and displaying the representation of the first media item as moving from a fourth location (e.g., the fourth location is centrally located in the user interface) in the user interface to the third location in the user interface (e.g., as described above in reference to FIG. 13F).

In some embodiments, the first media item (e.g., the media item captured at FIG. 13E1-13E5 or 13I) is a still photo or video (e.g., as described above in FIGS. 13E1-13E5 and 13I).

In some embodiments, after changing the appearance of the viewfinder, the computer system detects a second request to capture media (e.g., 1350c, 1350d, 1350h, 1350i). In some embodiments, in response to detecting the second request to capture media and in accordance with a determination that the second request to capture media corresponds to a request to capture a still photo (e.g., the request is a tap of a hardware input mechanism that is in communication with the computer system), the computer system displays a first type of feedback (e.g., the appearance of 1318 at FIGS. 13E1-13E5) (e.g., the first type of feedback includes changing the appearance of the first portion of content that is within the threshold distance of the first side of the boundary of the viewfinder and displaying the first type of feedback includes changing the appearance the second portion of content that is within the threshold distance of the second boundary of the viewfinder) and in accordance with a determination that the second request to capture media corresponds to a request to capture a video (e.g., the request is a tap and hold of a hardware input mechanism that is in communication with the computer system), the computer system displays a second type of feedback (e.g., display of 1332 within 1318) (e.g., as described above in reference to FIG. 13I) that is different than the first type of feedback (e.g., without displaying the first type of feedback) (e.g., displaying the second type of feedback includes displaying a video recording indicator within the viewfinder that indicates how long the computer system has performed a video capture process). Displaying a first type of feedback when the computer system captures a still photo and a second type of feedback when the computer system captures a video provides the user with visual feedback with respect to what type of media capture operation the computer system is performing, which provides improved visual feedback. Providing improved visual feedback during a media capture operation enhances the privacy and security of the computer system by informing the user that the user may review and/or edit the captured media. Additionally, providing improved visual feedback during a media capture operation allows a user to capture content that the user intends to capture with a fewer number of capture operations that would otherwise use additional power of the computer system, thus conserving the battery life of the computer system.

In some embodiments, the first request to capture media (e.g., 1350c, 1350d, 1350h, 1350i) corresponds to a first type of input, wherein the first media item is a still photo (e.g., the media item captured at 13E1-13E5) (e.g., a photograph), and wherein the first type of input corresponds to a short press of a first hardware input mechanism (e.g., 711a) (e.g., a hardware input mechanism that is in communication (e.g., wireless communication and/or wired communication) with the computer system) (e.g., a press and release of the hardware input mechanism) (e.g., the hardware input mechanism is depressed for less than a threshold amount of time) (e.g., the first media item includes content that is within the viewfinder at the time the computer system detects the request to capture media) (e.g., a solid state input mechanism that is activated in response to the computer system detecting pressure (e.g., directly (e.g., on the solid state input mechanism) or indirectly (e.g., not on the solid state input mechanism)). In some embodiments, when the hardware input mechanism is a solid state input mechanism, the hardware input mechanism generates a tactile output in response to the hardware input mechanism being activated. Capturing a still photo when a set of conditions are met (e.g., the request to capture media corresponds to a first type of input) automatically allows the computer system to perform a media capturing process that allows a user to capture a desired type of media item, which performs an operation when a set of conditions has been met without requiring further user input. Capturing a still photo in response to activating a hardware input mechanism allows the user to control the media capturing operation of the computer system without displaying additional controls, which provides additional control options without cluttering the user interface.

In some embodiments, after changing the appearance of the viewfinder (e.g., 1318 at FIG. 13F), the computer system detects a third request to capture media (e.g., 1350*c*, 1350*d*, 1350*h*, 1350*i*). In some embodiments, in response to detecting the third request to capture media and in accordance with a determination that the third request to capture media corresponds to a second type of input (e.g., the second type of input is different than the first type of input), the computer system captures a video media item (e.g., the video media item captured at FIG. 13I), wherein the second type of input corresponds to a long press (e.g., 1350*h*) (e.g., a press and hold) of a second hardware input mechanism (e.g., 711*a*) (e.g., as described above in relation to FIG. 13I) (e.g., the hardware input mechanism is in communication (e.g., wireless communication and/or wired communication) with the computer system) (e.g., the first media item includes content that is included within the viewfinder at any point in time while the computer system is performing the video capture operation) (e.g., a solid state input mechanism that is activated in response to the computer system detecting pressure (e.g., directly (e.g., on the solid state input mechanism) or indirectly (e.g., not on the solid state input mechanism)). In some embodiments, when the hardware input mechanism is a solid state input mechanism, the hardware input mechanism generates a tactile output in response to the hardware input mechanism being activated. Capturing a video when a set of conditions are met (e.g., the request to capture media corresponds to a second type of input) automatically allows the computer system to perform a media capturing process that allows a user to capture a desired type of media item, which performs an operation when a set of conditions has been met without requiring further user input. Capturing a video in response to activating a hardware input mechanism allows the user to control the media capturing operation of the computer system without displaying additional controls, which provides additional control options without cluttering the user interface.

In some embodiments, the third request to capture media corresponds to the second type of input (e.g., 1350*c*, 1350*d*, 1350*h*, 1350*k*). In some embodiments, in response to detecting the third request to capture media, the computer system displays an indication (e.g., 1332) (e.g., the indication is displayed within the viewfinder) (e.g., the indication is displayed as overlaid on top of a representation of the physical environment) that capture of the video media item corresponds to a second video capture operation (e.g., as discussed above in reference to FIG. 13I), wherein displaying the indication include in accordance with a determination that a set of criteria is not satisfied (e.g., the computer system has detected the second type of input for less than a predetermined amount of time (e.g., 0.1, 0.3, 0.5, 0.7, 1, 1.5, or 2 seconds)), displaying the indication with a first appearance and in accordance with a determination that the set of criteria is satisfied, displaying the indication with a second appearance (e.g., appearance of 1332 at FIG. 13I) (e.g., the computer system has detected the second type of input for longer than the predetermined amount of time) (e.g., that is different from the first appearance (e.g., the indication includes different content when the indication is displayed with the second appearance in comparison to when the indication is displayed with the first appearance). In some embodiments, while the indication is displayed, the computer ceases to detect the second type of input (e.g., the user ceases to depress the second hardware input mechanism). In some embodiments, in response to ceasing to detect the second type of input and in accordance with a determination that the set of criteria was not satisfied before ceasing to detect the second type of input (e.g., and that the indication is displayed with the first appearance), the computer system ceases to perform the second video capture operation (e.g., as described above in reference to FIG. 13I) and in accordance with a determination that the set of criteria was satisfied before ceasing to detect the second type of input (e.g., and that the indication is displayed with the second appearance), the computer system continues to perform the second video capture operation (e.g., as described above in FIG. 13I) (e.g., the computer system continues to capture video while the computer system does not detect the second input). In some embodiments, when the computer system ceases to detect the second type of input while the indication is displayed with the first appearance, the computer system performs a photo capture operation (e.g., the computer system captures a photo). In some embodiments, the indication includes instructions with respect to how to capture video media while the indication is displayed with the first appearance. Ceasing to perform a second video capture operation in response to ceasing to detect a second type of input that corresponds to a selection of a hardware input mechanism allows the user to control the media capturing operation of the computer system without displaying additional controls, which provides additional control options without cluttering the user interface. Displaying the indication with a certain condition when prescribed conditions are met automatically allows the computer system to perform a display operation that indicates to a user whether the computer system will continue a second video capture operation if the user ceases to depress the hardware input mechanism.

In some embodiments, the indication (e.g., 1332) indicates an amount of time that has elapsed since the computer system (e.g., 700) has initiated the second video capture operation (e.g., the indication is a timer), wherein displaying the indication includes displaying the indication with the first appearance (e.g., the set of criteria is not satisfied when the indication is initially displayed). In some embodiments, while the indication is displayed with the first appearance, the computer system detects that the set of criteria is satisfied (e.g., the computer system has detected the second type of input for longer than a predetermined amount of time). In some embodiments, in response to detecting that the set of criteria is satisfied, the computer system changes the appearance of the indication from the first appearance to the second appearance (e.g., appearance of 1332 at FIG. 13I) (e.g., as discussed above in reference to FIG. 13I), (e.g., the computer system changes the appearance of the indication while the computer system performs the second video capture operation). Changing the appearance of the indication from the first appearance to the second appearance when the set of criteria is satisfied provides the user with visual feedback that the set of criteria is satisfied and that the computer system will continue performing the second video capture operation if the computer system ceases to detect the second type of input, which provides improved visual feedback. Providing improved visual feedback during a media capture operation enhances the privacy and security of the computer system by informing the user that the user may review and/or edit the captured media. Further, providing improved visual feedback during a media capture operation allows a user to capture content that the user intends to capture with a fewer number of capture operations that would otherwise use additional power of the computer system, thus conserving the battery life of the computer system.

In some embodiments, while the computer system (e.g., 700) is capturing the video media item (e.g., while the computer system is performing the video capture operation), the computer system detects an input (e.g., 1350*c*, 1350*d*, 1350*h*, 1350*k*) that corresponds to an activation of a third hardware input mechanism (e.g., 711*a*) (e.g., the hardware input mechanism is depressed) (e.g., the user performs a short press (e.g., a press and release) and/or a long press (press and hold) on the third hardware input mechanism) (e.g., a solid state input mechanism that is activated in response to the computer system detecting pressure (e.g., directly (e.g., on the solid state input mechanism) or indirectly (e.g., not on the solid state input mechanism)). In some embodiments, in response to detecting the input that corresponds to activation of the third hardware input mechanism, the computer system ceases the capture of the video media item (e.g., as explained above in reference to FIG. 13J). In some embodiments, the input that ceases the capture of the first media item is the same type of input (e.g., tap input and/or press and hold input) that initiates the capture of the first media item. In some embodiments, the input that ceases the capture of the first media item is a different type of input than the input that initiates the capture of the first media. In some embodiments, when the hardware input mechanism is a solid state input mechanism, the hardware input mechanism generates a tactile output in response to the hardware input mechanism being activated. In some embodiments, the captured video media item is optionally added to a media library (e.g., that is stored on the computer system and/or stored on a cloud server) when the capture of the video media item is complete. Ceasing the capture of the first media item in response to detecting the input that corresponds to activation of a hardware input mechanism allows the user to control a media capture process of the computer system without displaying additional controls, which provides additional control options without cluttering the user interface.

In some embodiments, the first side of the boundary (e.g., right boundary of 1318) and the second side of the boundary (e.g., left boundary of 1318) are on opposite sides of the boundary (e.g., the first side of the boundary is on the left side of the boundary and the second side of the boundary is on the right side of the boundary or the first side is on the top of the boundary and the second side is at the bottom of the boundary).

In some embodiments, the first portion of content (e.g., 1306) is at the threshold distance from the first side of the boundary (e.g., right boundary of 1318) of the viewfinder (e.g., the first portion of content is positioned/location at the threshold distance from first side of the boundary of the viewfinder), and wherein the second portion of content (e.g., 1306) is at the threshold distance from the second side of the boundary (e.g., left boundary of 1318) of the viewfinder (e.g., the first portion of content is positioned/location at the threshold distance from second side of the boundary of the viewfinder). In some embodiments, the first portion of content and the second portion of content are on opposite sides of the viewfinder.

In some embodiments, displaying the user interface (e.g., 1304) includes displaying a third reticle virtual object (e.g., 1320) (e.g., the reticle is displayed at one or more corners of the viewfinder or around the periphery of the viewfinder) (e.g., the reticle is comprised of a series of non-contiguous lines or a contiguous line) wherein the third reticle virtual object indicates the capture region of the one or more cameras (e.g., as discussed above in reference to FIG. 13D) (e.g., content that is within the reticle while the computer system performs a media capturing operation (e.g., capturing video or a still photo) is visible in a resulting media item). Displaying a reticle virtual object that indicates the capture region of the one or more cameras provides the user with a visual aid that helps the user correctly position the one or more cameras of the computer system such that desired content is within the reticle and desired content is visible in resulting media, which results in a faster and more efficient media capturing process.

In some embodiments, aspects/operations of methods 800, 900, 1000, 1200, 1400 and 1500 may be interchanged, substituted, and/or added between these methods. For example, changing the appearance of content as a part of performing a media capture process (e.g., as discussed in method 1500) can optionally be applied to the media capturing operation discussed in method 800. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve a user's experience of capturing and viewing media in an XR environment. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve a media capturing process for a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of capturing and/or displaying media in various XR environments, the present technology can be configured to allow users to select to "opt in" or "opt out" of participation in the collection of personal information data during registration for services or anytime thereafter. In another example, users can select not to provide data for media that is captured and/or displayed. In yet another example, users can select to limit the length of time data is maintained or entirely prohibit the development of a profiled based on that type of media that is captured and/or displayed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media items can be displayed by inferring preferences based on non-personal information data or a bare minimum amount of personal information, such as the content being requested by the device associated with a user, other non-personal information available to the service, or publicly available information.

What is claimed is:

1. A computer system configured to communicate with a display generation component, one or more input devices, one or more cameras, and a hardware input mechanism that, when activated, causes an initiation of a media capture process, the computer system comprising:
    one or more processors; and
    memory storing one or more programs configured to be executed by the one or more processors, the one or more programs including instructions for:
        detecting, via the one or more input devices, a request to display a camera user interface; and
        in response to detecting the request to display the camera user interface, displaying the camera user interface, wherein the camera user interface includes a reticle virtual object that indicates a capture region of the one or more cameras, wherein displaying the camera user interface includes:
            in accordance with a determination that a set of one or more criteria is satisfied, displaying the camera user interface with a tutorial within the camera user interface, wherein:
                the tutorial provides information about how to capture media with the computer system while the camera user interface is displayed;
                the tutorial includes a representation of the hardware input mechanism; and
                displaying the camera user interface with the tutorial includes displaying a representation of an input that corresponds to activation of the hardware input mechanism; and
            in accordance with a determination that the set of one or more criteria is not satisfied, displaying the camera user interface without displaying the tutorial.

2. The computer system of claim 1, wherein the set of one or more criteria includes a criterion that is satisfied when the camera user interface is initially displayed.

3. The computer system of claim 1, wherein displaying the tutorial includes displaying instructions for capturing a first media item using the one or more cameras.

4. The computer system of claim 1, wherein the tutorial includes a video.

5. The computer system of claim 1, wherein displaying the camera user interface includes displaying a viewfinder virtual object, and wherein displaying the tutorial includes displaying the tutorial overlaying at least a portion of the viewfinder virtual object.

6. The computer system of claim 1, wherein the hardware input mechanism is not visible to a user while the user operates the computer system.

7. The computer system of claim 1, the one or more programs including instructions for:
    detecting a first activation of the hardware input mechanism, wherein the first activation of the hardware input mechanism is an input of a first type; and
    in response to detecting the first activation of the hardware input mechanism, capturing a second media item using the one or more cameras.

8. The computer system of claim 1, the one or more programs including instructions for:
    detecting a second activation of the hardware input mechanism, wherein the second activation of the hardware input mechanism corresponds to an input of a second type that includes maintaining the input for a predetermined period of time; and in response to detecting the second activation of the hardware input mechanism, capturing a third media item.

9. The computer system of claim 1, the one or more programs including instructions for:

while camera user interface is displayed with the tutorial, detecting a third activation of the hardware input mechanism; and in response to detecting the third activation of the hardware input mechanism, ceasing the display of the tutorial.

10. The computer system of claim 1, wherein:

in accordance with a determination that a set of criteria is satisfied, the camera user interface includes a camera shutter virtual object that, when selected, initiates a process for capturing a media item; and in accordance with a determination that the set of criteria is not satisfied, the camera user interface does not include the camera shutter virtual object for initiating a process of capturing a media item.

11. The computer system of claim 10, wherein the set of criteria includes a criterion that is satisfied when a setting of the computer system is enabled.

12. The computer system of claim 1, wherein the camera user interface includes a close virtual object that, when selected, causes the camera user interface to cease to be displayed.

13. The computer system of claim 1, wherein the camera user interface is displayed within an extended reality environment, wherein a first portion of the extended reality environment is displayed within the reticle virtual object.

14. The computer system of claim 1, the one or more programs including instructions for:

detecting a request to capture a fourth media item; and in response to detecting the request to capture the fourth media item, capturing the fourth media item, wherein the fourth media item is a stereoscopic media item.

15. A non-transitory computer-readable storage medium storing one or more programs configured to be executed by one or more processors of a computer system that is in communication with a display generation component, one or more input devices, one or more cameras, and a hardware input mechanism that, when activated, causes an initiation of a media capture process, the one or more programs including instructions for:

detecting, via the one or more input devices, a request to display a camera user interface; and in response to detecting the request to display the camera user interface, displaying the camera user interface, wherein the camera user interface includes a reticle virtual object that indicates a capture region of the one or more cameras, wherein displaying the camera user interface includes:

in accordance with a determination that a set of one or more criteria is satisfied, displaying the camera user interface with a tutorial within the camera user interface, wherein:

the tutorial provides information about how to capture media with the computer system while the camera user interface is displayed;

the tutorial includes a representation of the hardware input mechanism; and displaying the camera user interface with the tutorial includes displaying a representation of an input that corresponds to activation of the hardware input mechanism; and in accordance with a determination that the set of one or more criteria is not satisfied, displaying the camera user interface without displaying the tutorial.

16. The non-transitory computer-readable storage medium of claim 15, wherein the set of one or more criteria includes a criterion that is satisfied when the camera user interface is initially displayed.

17. The non-transitory computer-readable storage medium of claim 15, wherein displaying the tutorial includes displaying instructions for capturing a first media item using the one or more cameras.

18. The non-transitory computer-readable storage medium of claim 15, wherein the tutorial includes a video.

19. The non-transitory computer-readable storage medium of claim 15, wherein displaying the camera user interface includes displaying a viewfinder virtual object, and wherein displaying the tutorial includes displaying the tutorial overlaying at least a portion of the viewfinder virtual object.

20. The non-transitory computer-readable storage medium of claim 15, wherein the hardware input mechanism is not visible to a user while the user operates the computer system.

21. The non-transitory computer-readable storage medium of claim 15, the one or more programs including instructions for:

detecting a first activation of the hardware input mechanism, wherein the first activation of the hardware input mechanism is an input of a first type; and in response to detecting the first activation of the hardware input mechanism, capturing a second media item using the one or more cameras.

22. The non-transitory computer-readable storage medium of claim 15, the one or more programs including instructions for:

detecting a second activation of the hardware input mechanism, wherein the second activation of the hardware input mechanism corresponds to an input of a second type that includes maintaining the input for a predetermined period of time; and in response to detecting the second activation of the hardware input mechanism, capturing a third media item.

23. The non-transitory computer-readable storage medium of claim 15, the one or more programs including instructions for:

while camera user interface is displayed with the tutorial, detecting a third activation of the hardware input mechanism; and in response to detecting the third activation of the hardware input mechanism, ceasing the display of the tutorial.

24. The non-transitory computer-readable storage medium of claim 15, wherein:

in accordance with a determination that a set of criteria is satisfied, the camera user interface includes a camera shutter virtual object that, when selected, initiates a process for capturing a media item; and in accordance with a determination that the set of criteria is not satisfied, the camera user interface does not include the camera shutter virtual object for initiating a process of capturing a media item.

25. The non-transitory computer-readable storage medium of claim 24, wherein the set of criteria includes a criterion that is satisfied when a setting of the computer system is enabled.

26. The non-transitory computer-readable storage medium of claim 15, wherein the camera user interface includes a close virtual object that, when selected, causes the camera user interface to cease to be displayed.

27. The non-transitory computer-readable storage medium of claim 15, wherein the camera user interface is displayed within an extended reality environment, wherein a first portion of the extended reality environment is displayed within the reticle virtual object.

28. The non-transitory computer-readable storage medium of claim 15, the one or more programs including instructions for:
detecting a request to capture a fourth media item; and
in response to detecting the request to capture the fourth media item, capturing the fourth media item, wherein the fourth media item is a stereoscopic media item.

29. A method, comprising:
at a computer system that is in communication with a display generation component, one or more input devices, one or more cameras, and a hardware input mechanism that, when activated, causes an initiation of a media capture process:
detecting, via the one or more input devices, a request to display a camera user interface; and
in response to detecting the request to display the camera user interface, displaying the camera user interface, wherein the camera user interface includes a reticle virtual object that indicates a capture region of the one or more cameras, wherein displaying the camera user interface includes:
in accordance with a determination that a set of one or more criteria is satisfied, displaying the camera user interface with a tutorial within the camera user interface, wherein:
the tutorial provides information about how to capture media with the computer system while the camera user interface is displayed;
the tutorial includes a representation of the hardware input mechanism; and
displaying the camera user interface with the tutorial includes displaying a representation of an input that corresponds to activation of the hardware input mechanism; and
in accordance with a determination that the set of one or more criteria is not satisfied, displaying the camera user interface without displaying the tutorial.

30. The method of claim 29, wherein the set of one or more criteria includes a criterion that is satisfied when the camera user interface is initially displayed.

31. The method of claim 29, wherein displaying the tutorial includes displaying instructions for capturing a first media item using the one or more cameras.

32. The method of claim 29, wherein the tutorial includes a video.

33. The method of claim 29, wherein displaying the camera user interface includes displaying a viewfinder virtual object, and wherein displaying the tutorial includes displaying the tutorial overlaying at least a portion of the viewfinder virtual object.

34. The method of claim 29, wherein the hardware input mechanism is not visible to a user while the user operates the computer system.

35. The method of claim 29, further comprising:
detecting a first activation of the hardware input mechanism, wherein the first activation of the hardware input mechanism is an input of a first type; and
in response to detecting the first activation of the hardware input mechanism, capturing a second media item using the one or more cameras.

36. The method of claim 29, further comprising:
detecting a second activation of the hardware input mechanism, wherein the second activation of the hardware input mechanism corresponds to an input of a second type that includes maintaining the input for a predetermined period of time; and
in response to detecting the second activation of the hardware input mechanism, capturing a third media item.

37. The method of claim 29, further comprising:
while camera user interface is displayed with the tutorial, detecting a third activation of the hardware input mechanism; and
in response to detecting the third activation of the hardware input mechanism, ceasing the display of the tutorial.

38. The method of claim 29, wherein:
in accordance with a determination that a set of criteria is satisfied, the camera user interface includes a camera shutter virtual object that, when selected, initiates a process for capturing a media item; and
in accordance with a determination that the set of criteria is not satisfied, the camera user interface does not include the camera shutter virtual object for initiating a process of capturing a media item.

39. The method of claim 38, wherein the set of criteria includes a criterion that is satisfied when a setting of the computer system is enabled.

40. The method of claim 29, wherein the camera user interface includes a close virtual object that, when selected, causes the camera user interface to cease to be displayed.

41. The method of claim 29, wherein the camera user interface is displayed within an extended reality environment, wherein a first portion of the extended reality environment is displayed within the reticle virtual object.

42. The method of claim 29, further comprising:
detecting a request to capture a fourth media item; and
in response to detecting the request to capture the fourth media item, capturing the fourth media item, wherein the fourth media item is a stereoscopic media item.

* * * * *